US010286603B2

(12) United States Patent
Buller et al.

(10) Patent No.: US 10,286,603 B2
(45) Date of Patent: May 14, 2019

(54) SKILLFUL THREE-DIMENSIONAL PRINTING

(71) Applicant: VELO3D, INC., Campbell, CA (US)

(72) Inventors: Benyamin Buller, Cupertino, CA (US); Tasso Lappas, Pasadena, CA (US); Erel Milshtein, Cupertino, CA (US); Rueben Mendelsberg, Santa Clara, CA (US); Kimon Symeonidis, Santa Clara, CA (US); Alan Rick Lappen, San Jose, CA (US)

(73) Assignee: VELO3D, INC., Campbell, CA (US)

( * ) Notice: Subject to any disclaimer, the term of this patent is extended or adjusted under 35 U.S.C. 154(b) by 0 days.

(21) Appl. No.: 15/374,616

(22) Filed: Dec. 9, 2016

(65) Prior Publication Data

US 2017/0165754 A1    Jun. 15, 2017

Related U.S. Application Data

(60) Provisional application No. 62/265,817, filed on Dec. 10, 2015, provisional application No. 62/317,070, filed on Apr. 1, 2016.

(51) Int. Cl.
*B22F 3/105* (2006.01)
*B29C 64/153* (2017.01)
(Continued)

(52) U.S. Cl.
CPC .......... *B29C 64/307* (2017.08); *B22F 3/1055* (2013.01); *B23K 26/04* (2013.01);
(Continued)

(58) Field of Classification Search
CPC .............. B22F 3/008; B22F 2003/1056; B22F 2003/1057; B22F 2003/1058;
(Continued)

(56) References Cited

U.S. PATENT DOCUMENTS

| 430,047 A | 6/1890 | Tylee |
| 3,790,787 A | 2/1974 | Geller |

(Continued)

FOREIGN PATENT DOCUMENTS

| CN | 101835554 A | 9/2010 |
| CN | 102076456 A | 5/2011 |

(Continued)

OTHER PUBLICATIONS

R. Morgan, C.J. Sutcliffe, W. O'Neill, "Experimental investigation of nanosecond pulsed Nd:YAG laser re-melted pre-placed powder beds," Rapid Prototyping Journal, 2001, vol. 7, No. 3, pp. 159-172.*
(Continued)

*Primary Examiner* — Scott R Kastler
*Assistant Examiner* — Vanessa T. Luk
(74) *Attorney, Agent, or Firm* — Ronit Buller; Wilson Sonsini Goodrich & Rosati

(57) ABSTRACT

The present disclosure various apparatuses, and systems for 3D printing. The present disclosure provides three-dimensional (3D) printing methods, apparatuses, software and systems for a step and repeat energy irradiation process; controlling material characteristics and/or deformation of the 3D object; reducing deformation in a printed 3D object; and planarizing a material bed.

35 Claims, 44 Drawing Sheets

(51) Int. Cl.

| | | |
|---|---|---|
| *B29C 64/307* | (2017.01) | |
| *B29C 64/214* | (2017.01) | |
| *B29C 64/188* | (2017.01) | |
| *B29C 64/357* | (2017.01) | |
| *B29B 17/00* | (2006.01) | |
| *B33Y 10/00* | (2015.01) | |
| *B33Y 30/00* | (2015.01) | |
| *B33Y 50/02* | (2015.01) | |
| *B23K 26/142* | (2014.01) | |
| *B23K 26/144* | (2014.01) | |
| *B23K 26/342* | (2014.01) | |
| *B23K 26/04* | (2014.01) | |
| *B23K 26/08* | (2014.01) | |
| *B33Y 70/00* | (2015.01) | |
| *G05B 19/4099* | (2006.01) | |
| *B33Y 40/00* | (2015.01) | |
| *B23K 37/06* | (2006.01) | |
| *B23K 26/14* | (2014.01) | |
| *B23K 26/70* | (2014.01) | |
| *B29C 64/386* | (2017.01) | |
| *B29C 64/40* | (2017.01) | |
| *B29C 64/35* | (2017.01) | |
| *B28B 1/00* | (2006.01) | |
| *B33Y 80/00* | (2015.01) | |
| *B29K 105/00* | (2006.01) | |

(52) U.S. Cl.
CPC ........ *B23K 26/0869* (2013.01); *B23K 26/142* (2015.10); *B23K 26/144* (2015.10); *B23K 26/1462* (2015.10); *B23K 26/342* (2015.10); *B23K 26/702* (2015.10); *B23K 37/06* (2013.01); *B29B 17/0005* (2013.01); *B29C 64/153* (2017.08); *B29C 64/188* (2017.08); *B29C 64/214* (2017.08); *B29C 64/35* (2017.08); *B29C 64/357* (2017.08); *B29C 64/386* (2017.08); *B29C 64/40* (2017.08); *B33Y 10/00* (2014.12); *B33Y 30/00* (2014.12); *B33Y 40/00* (2014.12); *B33Y 50/02* (2014.12); *B33Y 70/00* (2014.12); *G05B 19/4099* (2013.01); *B22F 2003/1056* (2013.01); *B22F 2003/1058* (2013.01); *B22F 2003/1059* (2013.01); *B22F 2998/10* (2013.01); *B28B 1/001* (2013.01); *B29K 2105/251* (2013.01); *B33Y 80/00* (2014.12); *G05B 2219/35134* (2013.01); *G05B 2219/49007* (2013.01); *Y02P 10/295* (2015.11); *Y02P 90/265* (2015.11)

(58) Field of Classification Search
CPC .......... B22F 2003/1059; B22F 2998/00; B22F 2998/10; B22F 2999/00; B22F 3/1055; B33Y 10/00; B33Y 50/02; B29C 67/0051; B29C 67/0074; B29C 67/0077; B29C 67/0085; B29C 67/0088; B29C 67/0092; B29C 67/0096; B28B 1/001
See application file for complete search history.

(56) References Cited

U.S. PATENT DOCUMENTS

| | | |
|---|---|---|
| 3,864,809 A | 2/1975 | Donachie |
| 4,177,087 A | 12/1979 | Hills et al. |
| 4,323,756 A | 4/1982 | Brown et al. |
| 4,359,622 A | 11/1982 | Dostoomian et al. |
| 4,863,538 A | 9/1989 | Deckard |
| 4,938,816 A | 7/1990 | Beaman et al. |
| 4,961,154 A | 10/1990 | Pomerantz et al. |
| 4,962,988 A | 10/1990 | Swann |
| 5,088,047 A | 2/1992 | Bynum |
| 5,127,037 A | 6/1992 | Bynum |
| 5,155,321 A | 10/1992 | Grube et al. |
| 5,156,697 A | 10/1992 | Bourell et al. |
| 5,162,660 A | 11/1992 | Popil |
| 5,202,837 A | 4/1993 | Coe et al. |
| 5,203,944 A | 4/1993 | Prinz et al. |
| 5,204,055 A | 4/1993 | Sachs et al. |
| 5,208,431 A | 5/1993 | Uchiyama et al. |
| 5,252,264 A | 10/1993 | Forderhase et al. |
| 5,255,057 A | 10/1993 | Stelter et al. |
| 5,286,573 A | 2/1994 | Prinz et al. |
| 5,296,062 A | 3/1994 | Bourell et al. |
| 5,303,141 A | 4/1994 | Batchelder et al. |
| 5,342,919 A | 8/1994 | Dickens, Jr. et al. |
| 5,352,405 A | 10/1994 | Beaman et al. |
| 5,354,414 A | 10/1994 | Feygin |
| 5,387,380 A | 2/1995 | Cima et al. |
| 5,393,482 A | 2/1995 | Benda et al. |
| 5,430,666 A | 7/1995 | Deangelis et al. |
| 5,460,758 A | 10/1995 | Langer et al. |
| 5,508,489 A | 4/1996 | Benda et al. |
| 5,527,877 A | 6/1996 | Dickens, Jr. et al. |
| 5,534,104 A | 7/1996 | Langer et al. |
| 5,536,467 A | 7/1996 | Reichle et al. |
| 5,582,876 A | 12/1996 | Langer et al. |
| 5,593,531 A | 1/1997 | Penn |
| 5,594,652 A | 1/1997 | Penn et al. |
| 5,647,931 A | 7/1997 | Retallick et al. |
| 5,648,450 A | 7/1997 | Dickens, Jr. et al. |
| 5,658,412 A | 8/1997 | Retallick et al. |
| 5,665,401 A | 9/1997 | Serbin et al. |
| 5,730,925 A | 3/1998 | Mattes et al. |
| 5,733,497 A | 3/1998 | McAlea et al. |
| 5,745,834 A | 4/1998 | Bampton et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,786,562 A | 7/1998 | Larson |
| 5,818,718 A | 10/1998 | Thomas et al. |
| 5,821,475 A | 10/1998 | Morehead et al. |
| 5,824,259 A | 10/1998 | Allanic et al. |
| 5,832,415 A | 11/1998 | Wilkening et al. |
| 5,876,550 A * | 3/1999 | Feygin ..................... B22C 9/00 156/256 |
| 5,876,767 A | 3/1999 | Mattes et al. |
| 5,904,890 A | 5/1999 | Lohner et al. |
| 5,908,569 A | 6/1999 | Wilkening et al. |
| 5,932,059 A | 8/1999 | Langer et al. |
| 6,042,774 A | 3/2000 | Wilkening et al. |
| 6,066,285 A | 5/2000 | Kumar |
| 6,085,122 A | 7/2000 | Manning |
| 6,106,659 A | 8/2000 | Spence et al. |
| 6,126,276 A | 10/2000 | Davis et al. |
| 6,136,257 A | 10/2000 | Graf et al. |
| 6,143,378 A | 11/2000 | Harwell et al. |
| 6,151,345 A | 11/2000 | Gray |
| 6,169,605 B1 | 1/2001 | Penn et al. |
| 6,175,422 B1 | 1/2001 | Penn et al. |
| 6,206,672 B1 | 3/2001 | Grenda |
| 6,207,097 B1 | 3/2001 | Iverson |
| 6,215,093 B1 | 4/2001 | Meiners et al. |
| 6,251,488 B1 | 6/2001 | Miller et al. |
| 6,261,077 B1 | 7/2001 | Bishop et al. |
| 6,268,584 B1 | 7/2001 | Keicher et al. |
| 6,336,480 B2 | 1/2002 | Gaylo et al. |
| 6,337,459 B1 | 1/2002 | Terwijn et al. |
| 6,376,148 B1 | 4/2002 | Liu et al. |
| 6,391,251 B1 | 5/2002 | Keicher et al. |
| 6,401,001 B1 | 6/2002 | Jang et al. |
| 6,483,596 B1 | 11/2002 | Philippi et al. |
| 6,531,086 B1 | 3/2003 | Larsson |
| 6,554,600 B1 | 4/2003 | Hofmann et al. |
| 6,583,379 B1 | 6/2003 | Meiners et al. |
| 6,636,676 B1 | 10/2003 | Renn |
| 6,656,409 B1 | 12/2003 | Keicher et al. |
| 6,656,410 B2 | 12/2003 | Hull et al. |
| 6,672,343 B1 | 1/2004 | Perret et al. |
| 6,682,688 B1 | 1/2004 | Higashi et al. |

(56) References Cited

U.S. PATENT DOCUMENTS

| | | |
|---|---|---|
| 6,688,886 B2 | 2/2004 | Hughes et al. |
| 6,767,499 B1 | 7/2004 | Hory et al. |
| 6,811,744 B2 | 11/2004 | Keicher et al. |
| 6,814,823 B1 | 11/2004 | White |
| 6,815,636 B2 | 11/2004 | Chung et al. |
| 6,823,124 B1 | 11/2004 | Renn et al. |
| 6,824,714 B1 | 11/2004 | Tuerck et al. |
| 6,905,645 B2 | 6/2005 | Iskra |
| 6,930,278 B1 | 8/2005 | Chung et al. |
| 6,932,935 B1 | 8/2005 | Oberhofer et al. |
| 6,945,638 B2 | 9/2005 | Teung et al. |
| 6,955,023 B2 | 10/2005 | Rotheroe |
| 6,986,654 B2 | 1/2006 | Imiolek et al. |
| 6,994,894 B2 | 2/2006 | Hofmeister |
| 7,008,209 B2 | 3/2006 | Iskra et al. |
| 7,027,887 B2 | 4/2006 | Gaylo et al. |
| 7,045,015 B2 | 5/2006 | Renn et al. |
| 7,047,098 B2 | 5/2006 | Lindemann et al. |
| 7,073,442 B2 | 7/2006 | Fedor et al. |
| 7,084,370 B2 | 8/2006 | Hagemeister et al. |
| 7,108,894 B2 | 9/2006 | Renn |
| 7,149,596 B2 | 12/2006 | Berger et al. |
| 7,153,463 B2 | 12/2006 | Leuterer et al. |
| 7,229,272 B2 | 6/2007 | Leuterer et al. |
| 7,241,415 B2 | 7/2007 | Khoshnevis |
| 7,261,542 B2 | 8/2007 | Hickerson et al. |
| 7,261,550 B2 | 8/2007 | Herzog |
| 7,270,844 B2 | 9/2007 | Renn |
| 7,294,366 B2 | 11/2007 | Renn et al. |
| 7,296,599 B2 | 11/2007 | Cox et al. |
| 7,326,377 B2 | 2/2008 | Adams |
| 7,419,632 B2 | 9/2008 | Keller |
| 7,452,500 B2 * | 11/2008 | Uckelmann ........ A61C 13/0004 419/6 |
| 7,454,262 B2 | 11/2008 | Larsson |
| 7,485,345 B2 | 2/2009 | Renn et al. |
| 7,515,986 B2 | 4/2009 | Huskamp |
| 7,521,652 B2 | 4/2009 | Chung et al. |
| 7,537,722 B2 | 5/2009 | Andersson et al. |
| 7,540,738 B2 | 6/2009 | Larsson et al. |
| 7,604,768 B2 | 10/2009 | Kritchman |
| 7,615,179 B2 | 11/2009 | Dumond et al. |
| 7,628,600 B2 | 12/2009 | Perret |
| 7,635,825 B2 | 12/2009 | Larsson |
| 7,639,267 B1 | 12/2009 | Desimone et al. |
| 7,658,163 B2 | 2/2010 | Renn et al. |
| 7,661,948 B2 | 2/2010 | Perret et al. |
| 7,665,979 B2 | 2/2010 | Heugel |
| 7,674,107 B2 | 3/2010 | Perret et al. |
| 7,674,671 B2 | 3/2010 | Renn et al. |
| 7,686,605 B2 | 3/2010 | Perret et al. |
| 7,704,432 B2 | 4/2010 | Dumond et al. |
| 7,713,048 B2 | 5/2010 | Perret et al. |
| 7,713,454 B2 | 5/2010 | Larsson |
| 7,740,683 B2 | 6/2010 | Thorsson et al. |
| 7,741,578 B2 | 6/2010 | Adams et al. |
| 7,789,037 B2 | 9/2010 | Teulet et al. |
| 7,820,241 B2 | 10/2010 | Perret et al. |
| 7,833,465 B2 | 11/2010 | Larsson |
| 7,837,458 B2 | 11/2010 | Perret et al. |
| 7,847,212 B2 | 12/2010 | Renz et al. |
| 7,850,885 B2 | 12/2010 | Philippi et al. |
| 7,863,544 B2 | 1/2011 | Serruys et al. |
| 7,871,551 B2 | 1/2011 | Wallgren et al. |
| 7,879,394 B1 | 2/2011 | Keicher et al. |
| 7,891,095 B2 | 2/2011 | Jonsson et al. |
| 7,901,604 B2 | 3/2011 | Oberhofer et al. |
| 7,931,462 B2 | 4/2011 | Mattes |
| 7,936,352 B2 | 5/2011 | Baran et al. |
| 7,938,079 B2 | 5/2011 | King et al. |
| 7,938,341 B2 | 5/2011 | Renn et al. |
| 7,946,840 B2 | 5/2011 | Perret et al. |
| 7,976,302 B2 | 7/2011 | Halder et al. |
| 7,987,813 B2 | 8/2011 | Renn et al. |
| 8,025,831 B2 | 9/2011 | Kong et al. |
| 8,031,384 B2 | 10/2011 | Perret et al. |
| 8,034,279 B2 | 10/2011 | Dimter et al. |
| 8,048,359 B2 | 11/2011 | Wang et al. |
| 8,073,315 B2 | 12/2011 | Philippi |
| 8,075,814 B2 | 12/2011 | Fruth et al. |
| 8,083,513 B2 | 12/2011 | Montero-Escuder et al. |
| 8,110,247 B2 | 2/2012 | Renn et al. |
| 8,124,192 B2 | 2/2012 | Paasche et al. |
| 8,132,744 B2 | 3/2012 | Renn et al. |
| 8,137,739 B2 | 3/2012 | Philippi et al. |
| 8,172,562 B2 | 5/2012 | Mattes |
| 8,186,414 B2 | 5/2012 | Furlong et al. |
| 8,186,990 B2 | 5/2012 | Perret et al. |
| 8,187,521 B2 | 5/2012 | Larsson et al. |
| 8,187,522 B2 | 5/2012 | Higashi et al. |
| 8,249,480 B2 | 8/2012 | Aslam et al. |
| 8,260,447 B2 | 9/2012 | Mattes et al. |
| 8,272,579 B2 | 9/2012 | King et al. |
| 8,299,208 B2 | 10/2012 | Muller et al. |
| 8,303,886 B2 | 11/2012 | Philippi |
| 8,308,466 B2 | 11/2012 | Ackelid et al. |
| 8,313,087 B2 | 11/2012 | Hesse et al. |
| 8,317,508 B2 | 11/2012 | Bokodi et al. |
| 8,366,432 B2 | 2/2013 | Perret et al. |
| 8,414,281 B2 | 4/2013 | Schleiss et al. |
| 8,455,051 B2 | 6/2013 | Renn et al. |
| 8,488,994 B2 | 7/2013 | Hanson et al. |
| 8,501,075 B2 | 8/2013 | Philippi et al. |
| 8,502,107 B2 * | 8/2013 | Uckelmann ........ A61C 13/0004 156/272.2 |
| 8,524,142 B2 | 9/2013 | Uckelmann et al. |
| 8,525,071 B2 | 9/2013 | Leuterer |
| 8,570,534 B1 | 10/2013 | Loewgren |
| 8,590,157 B2 | 11/2013 | Kruth et al. |
| 8,640,975 B2 | 2/2014 | King |
| 8,658,078 B2 | 2/2014 | Weidinger et al. |
| 8,705,144 B2 | 4/2014 | Gullentops et al. |
| 8,710,144 B2 | 4/2014 | Hesse et al. |
| 8,728,387 B2 * | 5/2014 | Jones ................. A61F 2/30907 148/525 |
| 8,734,694 B2 | 5/2014 | Perret et al. |
| 8,753,105 B2 | 6/2014 | Scott |
| 8,784,720 B2 | 7/2014 | Oberhofer et al. |
| 8,784,721 B2 | 7/2014 | Philippi et al. |
| 8,794,263 B2 | 8/2014 | Scott et al. |
| 8,796,146 B2 | 8/2014 | Renn et al. |
| 8,803,073 B2 | 8/2014 | Philippi |
| 8,845,319 B2 | 9/2014 | Oberhofer et al. |
| 8,884,186 B2 | 11/2014 | Uckelmann et al. |
| 8,887,658 B2 | 11/2014 | Essien et al. |
| 8,895,893 B2 | 11/2014 | Perret et al. |
| 8,906,216 B2 | 12/2014 | Detor et al. |
| 8,945,456 B2 | 2/2015 | Zenere et al. |
| 8,967,990 B2 | 3/2015 | Weidinger et al. |
| 8,968,625 B2 | 3/2015 | Tan |
| 8,994,592 B2 | 3/2015 | Scott et al. |
| 9,011,982 B2 | 4/2015 | Muller et al. |
| 9,064,671 B2 | 6/2015 | Ljungblad et al. |
| 9,073,265 B2 | 7/2015 | Snis |
| 9,079,248 B2 | 7/2015 | Ackelid |
| 9,114,478 B2 | 8/2015 | Scott et al. |
| 9,114,652 B1 | 8/2015 | Wayman |
| 9,117,039 B1 | 8/2015 | Mosterman et al. |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King et al. |
| 9,205,691 B1 | 12/2015 | Jones et al. |
| 9,221,100 B2 | 12/2015 | Schwarze et al. |
| 9,233,507 B2 | 1/2016 | Bibas |
| 9,254,535 B2 | 2/2016 | Buller et al. |
| 9,314,972 B2 | 4/2016 | Green |
| 9,327,450 B2 | 5/2016 | Hein et al. |
| 9,327,451 B2 | 5/2016 | Teulet |
| 9,346,127 B2 | 5/2016 | Buller et al. |
| 9,380,304 B1 | 6/2016 | Chang et al. |
| 9,399,256 B2 | 7/2016 | Buller et al. |
| 9,403,235 B2 | 8/2016 | Buller et al. |
| 9,415,443 B2 | 8/2016 | Ljungblad et al. |

(56) References Cited

U.S. PATENT DOCUMENTS

| | | |
|---|---|---|
| 9,486,878 B2 | 11/2016 | Buller et al. |
| 9,498,921 B2 | 11/2016 | Teulet et al. |
| 9,505,057 B2 | 11/2016 | Nordkvist et al. |
| 9,522,426 B2 | 12/2016 | Das et al. |
| 9,527,246 B2 | 12/2016 | Wiesner et al. |
| 9,533,452 B2 | 1/2017 | Guenster et al. |
| 9,550,207 B2 | 1/2017 | Ackelid et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,592,554 B2 | 3/2017 | Abe et al. |
| 9,700,908 B2 | 7/2017 | Baker et al. |
| 9,827,717 B2 | 11/2017 | Huang et al. |
| 9,835,568 B2 | 12/2017 | Woods et al. |
| 9,886,526 B2 | 2/2018 | Huang et al. |
| 1,003,530 A1 | 7/2018 | Reinarz et al. |
| 10,035,304 B2 | 7/2018 | Reinarz et al. |
| 10,112,236 B2 | 10/2018 | Schlick et al. |
| 2002/0017509 A1 | 2/2002 | Ishide et al. |
| 2002/0020945 A1 | 2/2002 | Cho et al. |
| 2002/0041818 A1 | 4/2002 | Abe et al. |
| 2002/0079601 A1 | 6/2002 | Russell et al. |
| 2002/0104973 A1 | 8/2002 | Kerekes |
| 2002/0152002 A1 | 10/2002 | Lindemann et al. |
| 2002/0158054 A1 | 10/2002 | Manetsberger et al. |
| 2002/0195747 A1 | 12/2002 | Hull et al. |
| 2003/0201255 A1 | 10/2003 | Manetsberger et al. |
| 2003/0222066 A1 | 12/2003 | Low et al. |
| 2004/0003738 A1 | 1/2004 | Imiolek et al. |
| 2004/0003741 A1 | 1/2004 | Iskra et al. |
| 2004/0004303 A1 | 1/2004 | Iskra |
| 2004/0004653 A1 | 1/2004 | Pryor et al. |
| 2004/0005182 A1 | 1/2004 | Gaylo et al. |
| 2004/0026807 A1 | 2/2004 | Andersson et al. |
| 2004/0045941 A1 | 3/2004 | Herzog et al. |
| 2004/0056022 A1 | 3/2004 | Meiners et al. |
| 2004/0061260 A1 | 4/2004 | Heugel |
| 2004/0084814 A1 | 5/2004 | Boyd et al. |
| 2004/0094728 A1 | 5/2004 | Herzog et al. |
| 2004/0099996 A1 | 5/2004 | Herzog |
| 2004/0118309 A1 | 6/2004 | Fedor et al. |
| 2004/0173946 A1 | 9/2004 | Pfeifer et al. |
| 2004/0179808 A1 | 9/2004 | Renn |
| 2004/0197493 A1 | 10/2004 | Renn et al. |
| 2004/0204785 A1 | 10/2004 | Richardson |
| 2004/0217095 A1 | 11/2004 | Herzog |
| 2004/0222549 A1 | 11/2004 | Sano et al. |
| 2004/0228004 A1 | 11/2004 | Sercel et al. |
| 2004/0262261 A1 | 12/2004 | Fink et al. |
| 2005/0035285 A1 | 2/2005 | Tan et al. |
| 2005/0116391 A1 | 6/2005 | Lindemann et al. |
| 2005/0133527 A1 | 6/2005 | Dullea et al. |
| 2005/0142024 A1 | 6/2005 | Herzog |
| 2005/0156991 A1 | 7/2005 | Renn |
| 2005/0163917 A1 | 7/2005 | Renn |
| 2005/0207901 A1 | 9/2005 | Klobucar et al. |
| 2005/0258570 A1 | 11/2005 | Kong et al. |
| 2005/0278933 A1 | 12/2005 | Macke et al. |
| 2005/0287031 A1 | 12/2005 | Macke et al. |
| 2006/0003095 A1 | 1/2006 | Bullen et al. |
| 2006/0019232 A1 | 1/2006 | Fischer et al. |
| 2006/0054079 A1 | 3/2006 | Withey et al. |
| 2006/0118532 A1 | 6/2006 | Chung et al. |
| 2006/0156978 A1 | 7/2006 | Lipson et al. |
| 2006/0181700 A1 | 8/2006 | Andrews et al. |
| 2006/0187326 A1 | 8/2006 | Spencer et al. |
| 2006/0192322 A1 | 8/2006 | Abe et al. |
| 2006/0208396 A1 | 9/2006 | Abe et al. |
| 2006/0214335 A1 | 9/2006 | Cox et al. |
| 2006/0228248 A1 | 10/2006 | Larsson |
| 2006/0228897 A1 | 10/2006 | Timans et al. |
| 2006/0249485 A1 | 11/2006 | Partanen et al. |
| 2006/0280866 A1 | 12/2006 | Marquez et al. |
| 2007/0003656 A1 | 1/2007 | Labossiere et al. |
| 2007/0019028 A1 | 1/2007 | Renn et al. |
| 2007/0023977 A1 | 2/2007 | Braun et al. |
| 2007/0035069 A1 | 2/2007 | Wust et al. |
| 2007/0051704 A1 | 3/2007 | Husmann et al. |
| 2007/0052836 A1 | 3/2007 | Yamada et al. |
| 2007/0057412 A1 | 3/2007 | Weiskopf et al. |
| 2007/0122562 A1 | 5/2007 | Adams |
| 2007/0142914 A1 | 6/2007 | Jones et al. |
| 2007/0154634 A1 | 7/2007 | Renn |
| 2007/0175875 A1 | 8/2007 | Uckelmann et al. |
| 2007/0183918 A1 | 8/2007 | Monsheimer et al. |
| 2007/0196561 A1 | 8/2007 | Philippi et al. |
| 2007/0241482 A1 | 10/2007 | Giller et al. |
| 2007/0290409 A1 | 12/2007 | Brice et al. |
| 2008/0006334 A1 | 1/2008 | Davidson et al. |
| 2008/0013299 A1 | 1/2008 | Renn |
| 2008/0014457 A1 | 1/2008 | Gennaro et al. |
| 2008/0026338 A1 | 1/2008 | Cinader et al. |
| 2008/0060330 A1 | 3/2008 | Davidson et al. |
| 2008/0131540 A1 | 6/2008 | Perret et al. |
| 2008/0138515 A1 | 6/2008 | Williams |
| 2008/0151951 A1 | 6/2008 | Elliott et al. |
| 2008/0204748 A1 | 8/2008 | Nomaru et al. |
| 2008/0206460 A1 | 8/2008 | Rhoades et al. |
| 2008/0208268 A1 | 8/2008 | Bartic et al. |
| 2009/0004380 A1 | 1/2009 | Hochsmann et al. |
| 2009/0017220 A1 | 1/2009 | Muller et al. |
| 2009/0025638 A1 | 1/2009 | Inoue |
| 2009/0035411 A1 | 2/2009 | Seibert et al. |
| 2009/0039570 A1 | 2/2009 | Clark |
| 2009/0042050 A1 | 2/2009 | Matteazzi et al. |
| 2009/0045553 A1 | 2/2009 | Weidinger et al. |
| 2009/0047165 A1 | 2/2009 | Syvanen et al. |
| 2009/0061077 A1 | 3/2009 | King et al. |
| 2009/0090298 A1 | 4/2009 | King et al. |
| 2009/0114151 A1 | 5/2009 | Renn et al. |
| 2009/0152771 A1 | 6/2009 | Philippi et al. |
| 2009/0206065 A1 | 8/2009 | Kruth et al. |
| 2009/0206522 A1 | 8/2009 | Hein et al. |
| 2009/0257672 A1 | 10/2009 | Sullender et al. |
| 2009/0314391 A1 | 12/2009 | Crump et al. |
| 2010/0006228 A1 | 1/2010 | Abe et al. |
| 2010/0044547 A1 | 2/2010 | Higashi et al. |
| 2010/0125356 A1 | 5/2010 | Shkolnik et al. |
| 2010/0140550 A1 | 6/2010 | Keller et al. |
| 2010/0163405 A1 | 7/2010 | Ackelid |
| 2010/0173096 A1 | 7/2010 | Kritchman et al. |
| 2010/0215856 A1 | 8/2010 | Kritchman |
| 2010/0233012 A1 | 9/2010 | Higashi et al. |
| 2010/0242843 A1 | 9/2010 | Peretti et al. |
| 2010/0305743 A1 | 12/2010 | Larsson |
| 2011/0029093 A1 | 2/2011 | Bojarski et al. |
| 2011/0042031 A1 | 2/2011 | Furlong et al. |
| 2011/0046916 A1 | 2/2011 | Yu et al. |
| 2011/0052927 A1 | 3/2011 | Martinoni et al. |
| 2011/0106290 A1 | 5/2011 | Hoevel et al. |
| 2011/0123383 A1 | 5/2011 | Fuwa et al. |
| 2011/0133367 A1 | 6/2011 | Weidinger et al. |
| 2011/0135840 A1 | 6/2011 | Doye et al. |
| 2011/0165339 A1 | 7/2011 | Skoglund et al. |
| 2011/0165340 A1 | 7/2011 | Baumann |
| 2011/0168091 A1 | 7/2011 | Baumann et al. |
| 2011/0190904 A1 | 8/2011 | Lechmann et al. |
| 2011/0221100 A1 | 9/2011 | Wesselky et al. |
| 2011/0223349 A1 | 9/2011 | Scott |
| 2011/0259862 A1 | 10/2011 | Scott et al. |
| 2011/0278773 A1 | 11/2011 | Bokodi et al. |
| 2011/0287185 A1 | 11/2011 | Felstead et al. |
| 2011/0293771 A1 | 12/2011 | Oberhofer et al. |
| 2012/0000893 A1 | 1/2012 | Broude et al. |
| 2012/0010741 A1 | 1/2012 | Hull et al. |
| 2012/0090734 A1 | 4/2012 | Heinlein |
| 2012/0100031 A1 | 4/2012 | Ljungblad et al. |
| 2012/0106150 A1 | 5/2012 | Vaes et al. |
| 2012/0107496 A1 | 5/2012 | Thoma |
| 2012/0119399 A1 | 5/2012 | Fruth |
| 2012/0126457 A1 | 5/2012 | Abe et al. |
| 2012/0130525 A1 | 5/2012 | Tsai et al. |
| 2012/0133928 A1 | 5/2012 | Urano et al. |
| 2012/0134386 A1 | 5/2012 | Bender et al. |

(56) References Cited

U.S. PATENT DOCUMENTS

| | | |
|---|---|---|
| 2012/0139166 A1 | 6/2012 | Abe et al. |
| 2012/0145806 A1 | 6/2012 | Yang |
| 2012/0155606 A1 | 6/2012 | Simon et al. |
| 2012/0164322 A1 | 6/2012 | Teulet |
| 2012/0186779 A1 | 7/2012 | Tan et al. |
| 2012/0211926 A1 | 8/2012 | Larsson et al. |
| 2012/0223059 A1 | 9/2012 | Ackelid |
| 2012/0228492 A1 | 9/2012 | Franzen |
| 2012/0228807 A1 | 9/2012 | Teulet |
| 2012/0231175 A1 | 9/2012 | Tan |
| 2012/0231576 A1 | 9/2012 | King et al. |
| 2012/0234671 A1 | 9/2012 | Ackelid |
| 2012/0235548 A1 | 9/2012 | Cordes et al. |
| 2012/0251378 A1 | 10/2012 | Abe et al. |
| 2012/0267347 A1 | 10/2012 | Arjakine et al. |
| 2012/0308781 A1 | 12/2012 | Abe et al. |
| 2012/0318777 A1 | 12/2012 | Kwok et al. |
| 2013/0016400 A1 | 1/2013 | Yamashita |
| 2013/0064706 A1 | 3/2013 | Schwarze et al. |
| 2013/0080866 A1 | 3/2013 | Ogilvie et al. |
| 2013/0093866 A1 | 4/2013 | Ohlhues et al. |
| 2013/0112672 A1 | 5/2013 | Keremes et al. |
| 2013/0134637 A1 | 5/2013 | Wiesner et al. |
| 2013/0162643 A1 | 6/2013 | Cardle |
| 2013/0168902 A1 | 7/2013 | Herzog et al. |
| 2013/0171019 A1 | 7/2013 | Gessler et al. |
| 2013/0180959 A1 | 7/2013 | Weston et al. |
| 2013/0228302 A1 | 9/2013 | Rickenbacher et al. |
| 2013/0256953 A1 | 10/2013 | Teulet |
| 2013/0270750 A1 | 10/2013 | Green |
| 2013/0272746 A1 | 10/2013 | Hanson et al. |
| 2013/0277891 A1 | 10/2013 | Teulet |
| 2013/0280547 A1 | 10/2013 | Brandl et al. |
| 2013/0300035 A1 | 11/2013 | Snis |
| 2013/0300286 A1 | 11/2013 | Ljungblad et al. |
| 2013/0312928 A1 | 11/2013 | Mercelis et al. |
| 2013/0329098 A1 | 12/2013 | Lim et al. |
| 2013/0330470 A1 | 12/2013 | Gersch et al. |
| 2014/0034626 A1* | 2/2014 | Illston ............... B29C 67/0077 219/121.78 |
| 2014/0035182 A1 | 2/2014 | Boyer et al. |
| 2014/0049964 A1 | 2/2014 | McClure et al. |
| 2014/0065194 A1 | 3/2014 | Yoo et al. |
| 2014/0086654 A1 | 3/2014 | Kojima |
| 2014/0086780 A1 | 3/2014 | Miller et al. |
| 2014/0123458 A1 | 5/2014 | Fearon et al. |
| 2014/0150992 A1 | 6/2014 | Koontz et al. |
| 2014/0154088 A1 | 6/2014 | Etter et al. |
| 2014/0157579 A1 | 6/2014 | Chhabra et al. |
| 2014/0163717 A1 | 6/2014 | Das et al. |
| 2014/0176127 A1 | 6/2014 | Kogej et al. |
| 2014/0251481 A1 | 9/2014 | Kroll et al. |
| 2014/0252687 A1 | 9/2014 | El-Dasher et al. |
| 2014/0265045 A1 | 9/2014 | Cullen et al. |
| 2014/0271221 A1 | 9/2014 | Soucy et al. |
| 2014/0271328 A1* | 9/2014 | Burris ............... B23K 26/034 419/53 |
| 2014/0287080 A1 | 9/2014 | Scott et al. |
| 2014/0288890 A1 | 9/2014 | Khainson et al. |
| 2014/0301883 A1 | 10/2014 | Wiesner et al. |
| 2014/0314609 A1 | 10/2014 | Ljungblad et al. |
| 2014/0314964 A1 | 10/2014 | Ackelid |
| 2014/0329953 A1 | 11/2014 | Paternoster |
| 2014/0332507 A1* | 11/2014 | Fockele ............... B22F 3/1055 219/121.61 |
| 2014/0335313 A1 | 11/2014 | Chou et al. |
| 2014/0348691 A1 | 11/2014 | Ljungblad et al. |
| 2014/0348692 A1 | 11/2014 | Bessac et al. |
| 2014/0348969 A1 | 11/2014 | Scott |
| 2014/0361464 A1 | 12/2014 | Holcomb |
| 2014/0363585 A1 | 12/2014 | Pialot et al. |
| 2014/0370323 A1 | 12/2014 | Ackelid |
| 2014/0377117 A1 | 12/2014 | Herrmann et al. |
| 2015/0004046 A1 | 1/2015 | Graham et al. |
| 2015/0014281 A1 | 1/2015 | Trimmer et al. |
| 2015/0017013 A1 | 1/2015 | Tozzi et al. |
| 2015/0021815 A1 | 1/2015 | Albrecht et al. |
| 2015/0021832 A1 | 1/2015 | Yerazunis et al. |
| 2015/0034606 A1 | 2/2015 | Blackmore |
| 2015/0037599 A1 | 2/2015 | Blackmore |
| 2015/0048528 A1 | 2/2015 | Barton |
| 2015/0049082 A1 | 2/2015 | Coffey et al. |
| 2015/0050463 A1 | 2/2015 | Nakano et al. |
| 2015/0054191 A1 | 2/2015 | Ljungblad |
| 2015/0060042 A1 | 3/2015 | Shilpiekandula et al. |
| 2015/0061170 A1 | 3/2015 | Engel et al. |
| 2015/0061195 A1 | 3/2015 | Defelice et al. |
| 2015/0064047 A1 | 3/2015 | Hyde et al. |
| 2015/0071809 A1 | 3/2015 | Nordkvist et al. |
| 2015/0076739 A1 | 3/2015 | Batchelder |
| 2015/0088295 A1 | 3/2015 | Hellestam |
| 2015/0091200 A1 | 4/2015 | Mech et al. |
| 2015/0093720 A1 | 4/2015 | Beeby et al. |
| 2015/0097307 A1 | 4/2015 | Batchelder et al. |
| 2015/0097308 A1 | 4/2015 | Batchelder et al. |
| 2015/0110910 A1 | 4/2015 | Hartmann et al. |
| 2015/0115490 A1 | 4/2015 | Reinarz |
| 2015/0139849 A1 | 5/2015 | Pialot, Jr. et al. |
| 2015/0142153 A1 | 5/2015 | Chun et al. |
| 2015/0145169 A1 | 5/2015 | Liu et al. |
| 2015/0158249 A1 | 6/2015 | Goto |
| 2015/0165525 A1 | 6/2015 | Jonasson |
| 2015/0165545 A1 | 6/2015 | Goehler et al. |
| 2015/0165681 A1 | 6/2015 | Fish et al. |
| 2015/0165684 A1 | 6/2015 | Deane et al. |
| 2015/0174658 A1 | 6/2015 | Ljungblad |
| 2015/0174822 A1 | 6/2015 | Huang et al. |
| 2015/0185454 A1 | 7/2015 | Kalkbrenner et al. |
| 2015/0198052 A1* | 7/2015 | Pavlov ............... F23R 3/002 416/241 B |
| 2015/0210013 A1 | 7/2015 | Teulet |
| 2015/0246485 A1 | 9/2015 | Guenster et al. |
| 2015/0251355 A1 | 9/2015 | Rehme |
| 2015/0268099 A1 | 9/2015 | Craig et al. |
| 2015/0283610 A1 | 10/2015 | Ljungblad et al. |
| 2015/0283611 A1 | 10/2015 | Takezawa et al. |
| 2015/0283613 A1 | 10/2015 | Backlund et al. |
| 2015/0306667 A1 | 10/2015 | Yao |
| 2015/0306820 A1 | 10/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336330 A1 | 11/2015 | Herzog |
| 2015/0367415 A1 | 12/2015 | Buller et al. |
| 2015/0367416 A1 | 12/2015 | Buller et al. |
| 2015/0367417 A1 | 12/2015 | Buller et al. |
| 2015/0367418 A1 | 12/2015 | Buller et al. |
| 2015/0367419 A1 | 12/2015 | Buller et al. |
| 2015/0367446 A1 | 12/2015 | Buller et al. |
| 2015/0367447 A1 | 12/2015 | Buller et al. |
| 2015/0367448 A1 | 12/2015 | Buller et al. |
| 2015/0367453 A1 | 12/2015 | Herzog |
| 2015/0367574 A1 | 12/2015 | Araie et al. |
| 2015/0375456 A1 | 12/2015 | Cheverton et al. |
| 2016/0001401 A1 | 1/2016 | Dimter et al. |
| 2016/0022336 A1 | 1/2016 | Bateman |
| 2016/0026337 A1 | 1/2016 | Wassvik et al. |
| 2016/0026889 A1 | 1/2016 | Parkhomenko et al. |
| 2016/0059352 A1 | 3/2016 | Sparks et al. |
| 2016/0067740 A1 | 3/2016 | Voris et al. |
| 2016/0067779 A1 | 3/2016 | Dautova et al. |
| 2016/0107263 A1 | 4/2016 | Koerber |
| 2016/0114431 A1 | 4/2016 | Cheverton et al. |
| 2016/0114432 A1 | 4/2016 | Ferrar et al. |
| 2016/0114535 A1 | 4/2016 | Kritchman et al. |
| 2016/0121399 A1 | 5/2016 | Benyamin et al. |
| 2016/0121548 A1 | 5/2016 | Nauka et al. |
| 2016/0129502 A1 | 5/2016 | Varetti |
| 2016/0129631 A1 | 5/2016 | Chen et al. |
| 2016/0136730 A1 | 5/2016 | McMurtry et al. |
| 2016/0136896 A1 | 5/2016 | Wighton |
| 2016/0144574 A1 | 5/2016 | Eilken et al. |
| 2016/0151860 A1 | 6/2016 | Engeli et al. |
| 2016/0154906 A1 | 6/2016 | Schmidt et al. |

(56) References Cited

U.S. PATENT DOCUMENTS

| | | |
|---|---|---|
| 2016/0159010 A1 | 6/2016 | Perez et al. |
| 2016/0179064 A1 | 6/2016 | Arthur et al. |
| 2016/0185048 A1 | 6/2016 | Dave et al. |
| 2016/0193696 A1 | 7/2016 | McFarland et al. |
| 2016/0193785 A1 | 7/2016 | Bell et al. |
| 2016/0193790 A1 | 7/2016 | Shuck et al. |
| 2016/0207109 A1 | 7/2016 | Buller et al. |
| 2016/0214175 A1 | 7/2016 | Nordstrom |
| 2016/0228987 A1 | 8/2016 | Baudimont et al. |
| 2016/0236279 A1 | 8/2016 | Ashton et al. |
| 2016/0236414 A1 | 8/2016 | Reese et al. |
| 2016/0236419 A1 | 8/2016 | Griffin et al. |
| 2016/0241885 A1 | 8/2016 | Ström et al. |
| 2016/0246908 A1 | 8/2016 | Komzsik |
| 2016/0250717 A1 | 9/2016 | Kruger et al. |
| 2016/0258045 A1 | 9/2016 | Carter, Jr. et al. |
| 2016/0271698 A1* | 9/2016 | Schmidt ............... C04B 35/571 |
| 2016/0271884 A1 | 9/2016 | Herzog |
| 2016/0279706 A1* | 9/2016 | Domrose ............. B22F 3/1055 |
| 2016/0288254 A1 | 10/2016 | Pettit et al. |
| 2016/0297006 A1 | 10/2016 | Buller et al. |
| 2016/0297007 A1 | 10/2016 | Buller et al. |
| 2016/0299996 A1 | 10/2016 | Huang |
| 2016/0300356 A1 | 10/2016 | Kitamura et al. |
| 2016/0303687 A1 | 10/2016 | Ljungblad |
| 2016/0311025 A1 | 10/2016 | Kaneko |
| 2016/0318129 A1 | 11/2016 | Hu et al. |
| 2016/0320236 A1 | 11/2016 | Fortin et al. |
| 2016/0320771 A1 | 11/2016 | Huang |
| 2016/0326880 A1 | 11/2016 | Slavens et al. |
| 2016/0332384 A1 | 11/2016 | De Pena et al. |
| 2016/0339639 A1 | 11/2016 | Chivel |
| 2017/0001371 A1 | 1/2017 | Sobue et al. |
| 2017/0001379 A1 | 1/2017 | Long |
| 2017/0014902 A1 | 1/2017 | Tanaka et al. |
| 2017/0021420 A1 | 1/2017 | Buller et al. |
| 2017/0021455 A1 | 1/2017 | Dallarosa et al. |
| 2017/0036404 A1 | 2/2017 | Rengers et al. |
| 2017/0066052 A1* | 3/2017 | Abe ....................... B33Y 30/00 |
| 2017/0066084 A1 | 3/2017 | Ladewig et al. |
| 2017/0090461 A1 | 3/2017 | Chong et al. |
| 2017/0102689 A1 | 4/2017 | Khajepour et al. |
| 2017/0106603 A1 | 4/2017 | Pobihun |
| 2017/0123222 A1 | 5/2017 | Demuth et al. |
| 2017/0129052 A1 | 5/2017 | Buller et al. |
| 2017/0136574 A1 | 5/2017 | Zenzinger et al. |
| 2017/0136703 A1 | 5/2017 | Hayes et al. |
| 2017/0144374 A1 | 5/2017 | Ono et al. |
| 2017/0144874 A1 | 5/2017 | Huebinger et al. |
| 2017/0145586 A1 | 5/2017 | Xiao |
| 2017/0157845 A1 | 6/2017 | Bihari et al. |
| 2017/0189963 A1 | 7/2017 | Buller et al. |
| 2017/0216917 A1 | 8/2017 | Zhang et al. |
| 2017/0232515 A1 | 8/2017 | Demuth et al. |
| 2017/0252975 A1 | 9/2017 | Park et al. |
| 2017/0259502 A1 | 9/2017 | Chapiro et al. |
| 2017/0259504 A1 | 9/2017 | Lin et al. |
| 2017/0266878 A1 | 9/2017 | Furukawa |
| 2017/0266887 A1 | 9/2017 | Roviaro et al. |
| 2017/0274589 A1 | 9/2017 | Wu et al. |
| 2017/0282245 A1 | 10/2017 | Yasuda et al. |
| 2017/0282294 A1 | 10/2017 | Uchida |
| 2017/0297110 A1 | 10/2017 | Echigo et al. |
| 2017/0320265 A1 | 11/2017 | Baumann et al. |
| 2017/0333994 A1 | 11/2017 | Schmitt et al. |
| 2017/0341143 A1 | 11/2017 | Abe et al. |
| 2017/0341183 A1 | 11/2017 | Buller et al. |
| 2017/0341299 A1 | 11/2017 | Kniola et al. |
| 2017/0341307 A1 | 11/2017 | Vilajosana et al. |
| 2018/0015670 A1 | 1/2018 | Gu et al. |
| 2018/0021855 A1 | 1/2018 | De et al. |
| 2018/0093416 A1 | 4/2018 | Prexler et al. |
| 2018/0099454 A1 | 4/2018 | Hümmeler et al. |
| 2018/0104892 A1 | 4/2018 | Herzog et al. |
| 2018/0111320 A1 | 4/2018 | Zhao et al. |
| 2018/0117845 A1 | 5/2018 | Buller et al. |
| 2018/0126629 A1 | 5/2018 | Staal et al. |
| 2018/0178286 A1 | 6/2018 | Martin et al. |
| 2018/0185961 A1 | 7/2018 | Meidani et al. |
| 2018/0207721 A1 | 7/2018 | Schlick et al. |
| 2018/0236550 A1 | 8/2018 | Herzog et al. |
| 2018/0244034 A1 | 8/2018 | Sutcliffe et al. |
| 2018/0281067 A1 | 10/2018 | Small et al. |
| 2018/0319150 A1 | 11/2018 | Buller et al. |
| 2019/0022944 A1 | 1/2019 | Döhler et al. |

FOREIGN PATENT DOCUMENTS

| | | |
|---|---|---|
| CN | 103392153 A | 11/2013 |
| CN | 103561891 A | 2/2014 |
| CN | 103611934 A | 3/2014 |
| CN | 103612393 A | 3/2014 |
| CN | 103629198 A | 3/2014 |
| CN | 103676588 A | 3/2014 |
| CN | 105904729 A | 8/2016 |
| CN | 105921747 A | 9/2016 |
| DE | 19939616 A1 | 3/2001 |
| DE | 102004061836 A1 | 7/2006 |
| DE | 102007029142 A1 | 1/2009 |
| DE | 102009036153 A1 | 2/2011 |
| DE | 102010048335 A1 | 4/2012 |
| DE | 202013009787 U1 | 12/2013 |
| DE | 102013208651 A1 | 11/2014 |
| DE | 102014000022 A1 | 7/2015 |
| DE | 102014204528 A1 | 9/2015 |
| EP | 0296818 B1 | 4/1993 |
| EP | 1466718 A2 | 10/2004 |
| EP | 1622086 B1 | 9/2008 |
| EP | 1992709 A1 | 11/2008 |
| EP | 2277687 A1 | 1/2011 |
| EP | 2361704 A1 | 8/2011 |
| EP | 2522446 A1 | 11/2012 |
| EP | 2583773 A2 | 4/2013 |
| EP | 2620241 A1 | 7/2013 |
| EP | 2789413 A1 | 10/2014 |
| EP | 2832473 A1 | 2/2015 |
| EP | 2832474 A1 | 2/2015 |
| EP | 2992942 A1 | 3/2016 |
| EP | 3127635 A1 | 2/2017 |
| EP | 3208077 A1 | 8/2017 |
| EP | 3263316 A1 | 1/2018 |
| JP | 2001009921 A | 1/2001 |
| JP | 2003502184 A | 1/2003 |
| JP | 2003245981 A | 9/2003 |
| JP | 2004143581 A | 5/2004 |
| JP | 2006150977 A | 6/2006 |
| JP | 2008291318 A | 12/2008 |
| JP | 2008302607 A | 12/2008 |
| JP | 2009001900 A | 1/2009 |
| JP | 2009512579 A | 3/2009 |
| JP | 2012502178 A | 1/2012 |
| JP | 2012213971 A | 11/2012 |
| KR | 20160059726 A | 5/2016 |
| KR | 20160076708 A | 7/2016 |
| NO | 317085 B1 | 8/2004 |
| SE | 524467 C2 | 8/2004 |
| WO | WO-9208592 A1 | 5/1992 |
| WO | WO-9511100 A1 | 4/1995 |
| WO | WO-9711837 A1 | 4/1997 |
| WO | WO-9933641 A1 | 7/1999 |
| WO | WO-0177988 A2 | 10/2001 |
| WO | WO-2004037469 A1 | 5/2004 |
| WO | WO-2006066939 A1 | 6/2006 |
| WO | WO-2008028443 A2 | 3/2008 |
| WO | WO-2008049384 A1 | 5/2008 |
| WO | WO-2008064620 A1 | 6/2008 |
| WO | WO-2008067496 A2 | 6/2008 |
| WO | WO-2008074287 A1 | 6/2008 |
| WO | WO-2008096105 A1 | 8/2008 |
| WO | WO-2008128502 A2 | 10/2008 |
| WO | WO-2009015619 A2 | 2/2009 |
| WO | WO-2009096750 A2 | 8/2009 |
| WO | WO-2010026396 A2 | 3/2010 |
| WO | WO-2013092997 A1 | 6/2013 |

(56) References Cited

FOREIGN PATENT DOCUMENTS

| | | |
|---|---|---|
| WO | WO-2013160188 A1 | 10/2013 |
| WO | WO-2013167903 A1 | 11/2013 |
| WO | WO-2013178825 A2 | 12/2013 |
| WO | WO-2013179017 A1 | 12/2013 |
| WO | WO-2013189473 A1 | 12/2013 |
| WO | WO-2014023657 A1 | 2/2014 |
| WO | WO-2014042970 A1 | 3/2014 |
| WO | WO-2014044589 A1 | 3/2014 |
| WO | WO-2014049159 A1 | 4/2014 |
| WO | WO-2014083292 A1 | 6/2014 |
| WO | WO-2014118783 A1 | 8/2014 |
| WO | WO-2014120991 A1 | 8/2014 |
| WO | WO-2014135136 A1 | 9/2014 |
| WO | WO-2014144255 A2 | 9/2014 |
| WO | WO-2014144482 A1 | 9/2014 |
| WO | WO-2014144630 A1 | 9/2014 |
| WO | WO-2014193406 A1 | 12/2014 |
| WO | WO-2015023612 A2 | 2/2015 |
| WO | WO 2015040433 A2 * 3/2015 ............ B22F 3/1055 |
| WO | WO-2015053946 A1 | 4/2015 |
| WO | WO-2015082677 A1 | 6/2015 |
| WO | WO-2015176709 A1 | 11/2015 |
| WO | WO-2015196149 A1 | 12/2015 |
| WO | WO-2016026852 A1 | 2/2016 |
| WO | WO-2016026853 A1 | 2/2016 |
| WO | WO-2016055523 A1 | 4/2016 |
| WO | WO-2016075025 A1 | 5/2016 |
| WO | WO-2016075026 A1 | 5/2016 |
| WO | WO-2016077250 A1 | 5/2016 |
| WO | WO-2016094827 A1 | 6/2016 |
| WO | WO-2016113253 A1 | 7/2016 |
| WO | WO-2016169768 A1 | 10/2016 |
| WO | WO-2016196223 A1 | 12/2016 |
| WO | WO-2016196382 A1 | 12/2016 |
| WO | WO-2017011456 A1 | 1/2017 |
| WO | WO-2017015217 A2 | 1/2017 |
| WO | WO-2017079091 A1 | 5/2017 |
| WO | WO-2017100695 A1 | 6/2017 |
| WO | WO-2017179001 A1 | 10/2017 |
| WO | WO-2018005439 | 1/2018 |
| WO | WO-2018064349 A1 | 4/2018 |
| WO | WO-2018075741 A1 | 4/2018 |
| WO | WO-2018106586 A1 | 6/2018 |
| WO | WO-2018128695 A2 | 7/2018 |
| WO | WO-2018129089 A1 | 7/2018 |

OTHER PUBLICATIONS

Adam, et al. Design for additive manufacturing—element transitions and aggregated structures. CIRP Journal of Manufacturing Science and Technology. Nov. 2014; 7:20-28.

Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.

Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.

Arcam EBM at Sirris Belgium. Uploaded Jun. 17, 2010. 2 pages. https://www.youtube.com/watch?v=nR7EtduqVYw&list=PLD7ckJoR_kR6ua0GOMlyJ1mpCKh342iL1.

Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.

Childs, et al. Raster scan of selective laser melting of the surface layer of a tool steel powder bed. Proc. IMechE. Jan. 26, 2005; vol. 219, Part B, pp. 379-384.

Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.

Chivel, et al. On-line temperature monitoring in selective laser sintering/melting. Physics Procedia. Dec. 31, 2010; (5):515-521.

Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.

Co-pending U.S. Appl. No. 15/288,251, filed Oct. 7, 2016.

Co-pending U.S. Appl. No. 15/339,759, filed Oct. 31, 2016.

Co-pending U.S. Appl. No. 15/339,775, filed Oct. 31, 2016.

Co-pending U.S. Appl. No. 15/374,318, filed Dec. 9, 2016.

Co-pending U.S. Appl. No. 15/374,442, filed Dec. 9, 2016.

Co-pending U.S. Appl. No. 15/374,535, filed Dec. 9, 2016.

Co-pending U.S. Appl. No. 15/374,821, filed Dec. 9, 2016.

Co-pending U.S. Appl. No. 15/399,186, filed Jan. 5, 2017.

Craeghs, et al. Feedback control of layerwise laser melting using optical sensors. Physics Procedia. Dec. 2010; 5:505-514.

Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.

Direct Manufacturing: ARCAM. Uploaded on Jun. 6, 2011. 2 pages. https://www.youtube.com/watch?v=M_qSnjKN7f8.

EOS. Direct Metal Laser Sintering Published Aug. 22, 2012. https://www.youtube.com/watch?v=cRE-Pzl6uZA.

Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.

Gibson, et al. Additive Manufacturing Technologies, Springer 2010, Chapter 5, pp. 103-142. ISBN978-1-4419-1119-3 (Print978-1-4419-1120-9 (Online). Published: Dec. 14, 2009.

Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.

Hauser, et al. Further Developments in Process Mapping and modelling in direct metal selective laser melting. Aug. 2004, 15th solid Free Form Fabrication Proceedings. Austin, Texas, pp. 448-459.

Hussein. The development of Lightweight Cellular Structures for Metal Additive Manufacturing. Nov. 2013, thesis of University of Exeter, pp. 1-228.

International Search Report and Written Opinion dated Jan. 16, 2017 for International PCT Patent Application No. PCT/US2016/059781.

International search report and written opinion dated Feb. 19, 2016 for PCT/US2015/059790.

International search report and written opinion dated Apr. 11, 2016 for PCT/US2015/065297.

International search report and written opinion dated Sep. 20, 2016 for PCT/US2016/034454.

International search report and written opinion dated Oct. 30, 2015 for PCT Application No. US2015/036802.

International search report and written opinion dated Sep. 13, 2016 for PCT Application No. US-2016034857.

Kannatey-Asibu Jr, Elijah. Principles of laser materials processing. John Wiley & Sons, 2009, Chapter 10, pp. 231-405. Published: Apr. 20, 2009.

Kannatey-Asibu Jr, Elijah. Principles of laser materials processing. John Wiley & Sons, 2009, Chapter 16, pp. 502-668. Published: Apr. 20, 2009.

Kruth, et al. Feedback control of selective laser melting. Proceedings of the 3rd International Conference on Advanced Research in Virtual and Rapid Prototyping, Leiria, Portugal, Sep. 2007. 521-527.

Kruth, et al. Selective laser melting of iron-based power. Journal of Materials Processing Technology. Nov. 2004; 149:616-622.

Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015).

(56) References Cited

OTHER PUBLICATIONS

Kumar, et al. Designing and slicing heterogenous components for rapid prototyping. Department of Mechanical Engineering, University of Florida. Aug. 2000; 428-436.
Kumar, et al. Electrophotographic Layered Manufacturing. J. Manuf. Sci. Eng 126(3), 571-576 (Sep. 7, 2004) (6 pages) doi:10.1115/1.1765146.
Kumar, et al. Electrophotographic powder deposition for freeform fabrication. Department of Mechanical Engineering, University of Florida. Aug. 1999; 647-654.
Kumar, et al. Electrophotographic printing of part and binder powders. Rapid Prototyping Journal. Jul. 2004; 10(1):7-13.
Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.
Kumar, et al. Solid freeform fabrication by electrophotographic printing. Department of Mechanical and Aerospace Engineering, University of Florida. Aug. 2003; 39-49.
Kumar. Powder deposition and sintering for a two-powder approach to solid freeform fabrication. Department of Mechanical Engineering, University of Florida. Aug. 1998; 169-173.
Laser Engineered Net Shaping (LENS) 850-R system overview. System features and example application video clips. Published Jun. 3, 2012. https://www.youtube.com/watch?v=mkUVURLkxS4.
Leirvag. Additive Manufacturing for Large Products. Feb. 2013, thesis. Norwegian University of Science and Technology.
Lyckfeldt. Powder rheology of steel powders for additive manufacturing. Swerea IVF. Oct. 24, 2013.
Manfredi, et al. From Powders to Dense Metal Parts: Characterization of a Commercial AlSiMg Alloy Processed through Direct Metal Laser Sintering. Mar. 2013, Materials, vol. 6, pp. 856-869.
Mertens, et al. Optimization fo scan strategies in selective laser melting of aluminum parts with downfacing areas. Journal of Manufacturing Science and Technology. Dec. 2014; 136:061012-1-7.
Moridi, et al. Cold spray coating: review of material systems and future perspectives. Surface engineering. Jun. 2014; 36(6):36*-395.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
Netfabb-Professional 5.2, User Manual, Netfabb GmbH 2014, Version: Jul. 29, 2014, Chapter 6: sections 6.1, 6.3, Chapter 7: section 7.7, Chapter 9: section 9.6.
Notice of allowance dated Mar. 1, 2016 for U.S. Appl. No. 14/745,108.
Notice of allowance dated May 11, 2016 for U.S. Appl. No. 14/744,955.
Notice of allowance dated May 25, 2016 for U.S. Appl. No. 14/744,675.
Notice of allowance dated Jun. 20, 2016 for U.S. Appl. No. 14/744,675.
Notice of allowance dated Aug. 10, 2016 for U.S. Appl. No. 14/967,118.
Notice of allowance dated Sep. 6, 2016 for U.S. Appl. No. 14/745,032.
Notice of allowance dated Sep. 17, 2015 for U.S. Appl. No. 14/745,081.
Notice of allowance dated Sep. 28, 2015 for U.S. Appl. No. 14/745,081.
Notice of allowance dated Nov. 30, 2015 for U.S. Appl. No. 14/745,081.
Notice of Allowance dated Dec. 9, 2016 for U.S. Appl. No. 15/188,939.
Notice of allowance dated Dec. 14, 2015 for U.S. Appl. No. 14/745,081.
Notice of allowance dated Dec. 15, 2015 for U.S. Appl. No. 14/745,081.
Office action dated Jan. 7, 2016 for U.S. Appl. No. 14/744,859.
Office action dated Jan. 11, 2016 for U.S. Appl. No. 14/745,032.
Office action dated Feb. 10, 2016 for U.S. Appl. No. 14/744,910.
Office action dated Feb. 16, 2016 for U.S. Appl. No. 14/744,955.
Office action dated Mar. 4, 2016 for U.S. Appl. No. 14/744,988.
Office action dated Mar. 10, 2016 for U.S. Appl. No. 14/744,675.
Office action dated Jun. 29, 2016 for U.S. Appl. No. 14/744,859.
Office action dated Jul. 1, 2016 for U.S. Appl. No. 14/745,032.
Office action dated Jul. 19, 2016 for U.S. Appl. No. 15/085,884.
Office action dated Jul. 21, 2016 for U.S. Appl. No. 14/744,910.
Office action dated Aug. 25, 2016 for U.S. Appl. No. 14/744,988.
Office action dated Sep. 10, 2015 for U.S. Appl. No. 14/744,675.
Office action dated Sep. 13, 2016 for U.S. Appl. No. 15/188,939.
Office action dated Oct. 2, 2015 for U.S. Appl. No. 14/744,955.
Office action dated Nov. 1, 2016 for U.S. Appl. No. 15/085,884.
Office action dated Nov. 12, 2015 for U.S. Appl. No. 14/745,108.
Office action dated Nov. 18, 2016 for U.S. Appl. No. 15/188,939.
Papadakis, et al. Numerical computation of component shape distortion manufactured by selective laser melting. Procedia CIRP. Aug. 2014; 18:90-95.
Proto Labs. Direct Metal Laser Sintering (DMLS). Published Sep. 10, 2014. https://www.protolabs.com/additive-manufacturing/direct-metal-laser-sintering 2 pages.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015).
Selective Laser Sintering (SLS) Process at Loughborough University. Published May 4, 2015. 2 pages. https://www.youtube.com/watch?v=oO77VKDB89l.
Spears, et al. In-process sensing in selective laser melting (SLM) additive manufacturing. Integrating Materials and Manufacturing Innovation. Feb. 11, 2016; 5:2. DOI: 10.1186/s40192-016-0045-4.
Strano, et al. A new approach to the design and optimisation of support structures in additive manufacturing. Int J Adv Manuf Technol (2013) 66:1247-1254 DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Van Der Eijk, et al. Metal printing process: development of a new rapid manufacturing process for metal parts. Proceedings of the World PM 2004 conference held in Vienna. Oct. 17-21, 2004. 5 pages.
Wang, et al. Research on the fabricating quality optimization of the overhanging surface in SLM process. Int J Adv Manuf Technol (2013) 65:1471-1484 DOI 10.1007/s00170-012-4271-4. Published online: Jun. 16, 2012.
Wilkes, et al. Emerald Article: Additive manufacturing of ZrO2—Al2O3 ceramic components by selective laser melting. Rapid Prototyping Journal, vol. 19, Issue 1, Aug. 7, 2012.
Wright, Roger. Wire Technology, Process Engineering and Metallurgry, Ch. 19, Elsevier, 2011, pp. 279-283. Published: Nov. 17, 2010.
Yin. Accurately quantifying process-relevant powder properties for AMPM applications. Freeman Technology. May 2014. 39 pages.
Co-pending U.S. Appl. No. 15/435,065, filed Feb. 16, 2017.
Co-pending U.S. Appl. No. 15/435,078, filed Feb. 16, 2017.
Co-pending U.S. Appl. No. 15/435,090, filed Feb. 16, 2017.
Co-pending U.S. Appl. No. 15/435,110, filed Feb. 16, 2017.
Co-pending U.S. Appl. No. 15/435,120, filed Feb. 16, 2017.
Co-pending U.S. Appl. No. 15/435,128, filed Feb. 16, 2017.
Co-pending U.S. Appl. No. 15/490,219, filed Apr. 18, 2017.
Ex Parte Quayle Action dated Apr. 19, 2017 for U.S. Appl. No. 15/374,821.
Extended European Search Report dated Jul. 7, 2017 for European Patent Application No. EP17156707.6.
International Search Report and Written Opinion dated Apr. 5, 2017 for International PCT Patent Application No. PCT/US2016/066000.
International Search Report and Written Opinion dated May 18, 2017 for International PCT Patent Application No. PCT/US2017/018191.

(56) References Cited

OTHER PUBLICATIONS

Manzhirov, et al. Mathematical Modeling of Additive Manufacturing Technologies. Proc. of the World Congress of Engineering 2014, vol. II. WCE 2014, Jul. 2-4, 2014, London, U.K. 6 pages.
Notice of allowance dated Jan. 5, 2017 for U.S. Appl. No. 15/085,884.
Notice of Allowance dated Mar. 16, 2017 for U.S. Appl. No. 15/339,775.
Notice of Allowance dated Mar. 20, 2017 for U.S. Appl. No. 15/339,759.
Notice of Allowance (second) dated Apr. 6, 2017 for U.S. Appl. No. 15/339,759.
Office Action dated Feb. 7, 2017 for U.S. Appl. No. 14/744,988.
Office Action dated Feb. 8, 2017 for U.S. Appl. No. 14/744,859.
Office Action dated Mar. 6, 2017 for U.S. Appl. No. 14/744,910.
Office action dated Mar. 7, 2017 for U.S. Appl. No. 15/339,712.
Office Action dated Mar. 23, 2017 for U.S. Appl. No. 15/399,186.
Office Action dated Jun. 15, 2017 for U.S. Appl. No. 15/288,251.
Office Action dated Jun. 29, 2017 for U.S. Appl. No. 15/435,128.
Office Action dated Jul. 3, 2017 for U.S. Appl. No. 15/435,120.
Xiao, et al. Numerical Simulation of Direct Metal Laser Sintering of Single-Component Powder on Top of Sintered Layers. Journal of Manufacturing Science and Engineering. vol. 130, Aug. 2008. 10 pages.
Co-pending U.S. Appl. No. 15/668,662, filed Aug. 3, 2017.
International Search Report and Written Opinion dated Aug. 30, 2017 for International PCT Patent Application No. PCT/US2017/039422.
Notice of Allowance dated Aug. 7, 2017 for U.S. Appl. No. 14/744,910.
Office Action dated Jul. 28, 2017 for U.S. Appl. No. 14/744,988.
Office Action dated Aug. 2, 2017 for U.S. Appl. No. 15/435,090.
Office Action dated Aug. 18, 2017 for U.S. Appl. No. 15/374,318.
Office Action dated Aug. 25, 2017 for U.S. Appl. No. 15/339,712.
Office Action dated Sep. 11, 2017 for U.S. Appl. No. 15/374,821.
Office Action dated Oct. 19, 2017 for U.S. Appl. No. 15/399,186.
Co-pending U.S. Appl. No. 15/719,084, filed Sep. 28, 2017.
Co-pending U.S. Appl. No. 15/719,133, filed Sep. 28, 2017.
Co-pending U.S. Appl. No. 15/719,229, filed Sep. 28, 2017.
Co-pending U.S. Appl. No. 15/788,364, filed Oct. 19, 2017.
Co-pending U.S. Appl. No. 15/788,418, filed Oct. 19, 2017.
Co-pending U.S. Appl. No. 15/788,463, filed Oct. 19, 2017.
Co-pending U.S. Appl. No. 15/788,495, filed Oct. 19, 2017.
Co-pending U.S. Appl. No. 15/788,532, filed Oct. 19, 2017.
Co-pending U.S. Appl. No. 15/788,568, filed Oct. 19, 2017.
Co-pending U.S. Appl. No. 15/788,662, filed Oct. 19, 2017.
Co-pending U.S. Appl. No. 15/803,675, filed Nov. 3, 2017.
Co-pending U.S. Appl. No. 15/803,683, filed Nov. 3, 2017.
Co-pending U.S. Appl. No. 15/803,686, filed Nov. 3, 2017.
Co-pending U.S. Appl. No. 15/803,688, filed Nov. 3, 2017.
Co-pending U.S. Appl. No. 15/803,692, filed Nov. 3, 2017.
European Search Report and Search Opinion dated Nov. 30, 2017 for European Patent Application No. EP17178143.8.
Notice of Allowability dated Oct. 17, 2017 for U.S. Appl. No. 14/744,910.
Notice of Allowance dated Dec. 8, 2017 for U.S. Appl. No. 15/435,128.
Notice of Allowance dated Dec. 11, 2017 for U.S. Appl. No. 15/435,120.
Office Action dated Nov. 27, 2017 for U.S. Appl. No. 15/374,318.
Office Action dated Dec. 8, 2017 for U.S. Appl. No. 15/435,090.
Rhinehart, R.R. §2.13 Control Theory: Mode-Based Control, in Bela G. Liptak, Instrument Engineers' Handbook, vol. 2: Process Control and Optimization, 209-213 (4th ed., CRC Press (part of Taylor & Francis Group), 2006), ISBN-13: 978-0849310812.
Co-pending U.S. Appl. No. 15/893,523, filed Feb. 9, 2018.
Anusci, Victor. Aerosint Is Developing the First Commercial Multi-powder SLS 3D Printer. 3D Printing Media Network. Web. Published Jan. 28, 2018. 4 pages. URL:<https://www.3dprintingmedia.network/aerosint-multi-powder-sls-3d-printer/>.
Co-pending U.S. Appl. No. 15/830,421, filed Dec. 4, 2017.
Co-pending U.S. Appl. No. 15/830,470, filed Dec. 4, 2017.
Co-pending U.S. Appl. No. 15/853,700, filed Dec. 22, 2017.
Co-pending U.S. Appl. No. 15/855,744, filed Dec. 27, 2017.
Co-pending U.S. Appl. No. 15/861,544, filed Jan. 3, 2018.
Co-pending U.S. Appl. No. 15/861,548, filed Jan. 3, 2018.
Co-pending U.S. Appl. No. 15/861,553, filed Jan. 3, 2018.
Co-pending U.S. Appl. No. 15/861,561, filed Jan. 3, 2018.
Co-pending U.S. Appl. No. 15/870,561, filed Jan. 12, 2018.
Co-pending U.S. Appl. No. 15/871,763, filed Jan. 15, 2018.
Co-pending U.S. Appl. No. 15/873,832, filed Jan. 17, 2018.
Co-pending U.S. Appl. No. 15/886,544, filed Feb. 1, 2018.
Dahotre et al. Laser Fabrication and Machining of Materials. Springer. 2008. 561 pages. DOI: 10.1007/978-0-387-72344-0.
David et al. Welding: Solidification and microstructure. The Journal of The Minerals, Metals & Materials Society (TMS). Jun. 2003, vol. 55, Issue 6, pp. 14-20.
International Search Report and Written Opinion dated Jan. 9, 2018 for International PCT Patent Application No. PCT/2017/054043.
Merriam-Webster. Definition of "reservoir". Retrieved Dec. 21, 2017. 13 pages. URL:<https://merriam-webster.com/dictionary/reservoir>.
Notice of Allowance dated Jan. 12, 2018 for U.S. Appl. No. 15/435,120.
Notice of Allowance dated Jan. 12, 2018 for U.S. Appl. No. 15/435,128.
Notice of Allowance dated Feb. 6, 2018 for U.S. Appl. No. 15/374,821.
Office Action dated Jan. 2, 2018 for U.S. Appl. No. 15/288,251.
Office Action dated Jan. 24, 2018 for U.S. Appl. No. 15/615,004.
Office Action dated Jan. 25, 2018 for U.S. Appl. No. 15/634,727.
Office Action dated Feb. 7, 2018 for U.S. Appl. No. 15/614,979.
Office Action dated Feb. 7, 2018 for U.S. Appl. No. 15/719,229.
Office Action dated Nov. 16, 2017 for U.S. Appl. No. 15/634,267.
Office Action dated Dec. 15, 2017 for U.S. Appl. No. 15/435,110.
Optomec. Lens 850R 3D Printer for Structual Metals. Optomec. YouTube—Web. Published on Jun. 3, 2012. 3 pages. URL:<https://www.youtube.com/watch?v=mkUVURLkxS4>.
Saunders, Marc. Real-time AM monitoring opens up new process control opportunities. Web: LinkedIn. Published on Jan. 3, 2018. 12 pages. URL:<https://www.linkedin.com/pulse/real-time-am-monitoring-opens-new-process-control-marc-saunders/>.
Schott. TIE-19: Temperature Coefficient of the Refractive Index. Technical Information: Advanced Optics. Schott AG. Jul. 2016. 10 pages.
Schott. TIE-19: Temperature Coefficient of the Refractive Index. Technical Information: Advanced Optics. Schott North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Wang et al. Effects of thermal cycles on the microstructure evolution of Inconel 718 during selective laser melting process. Additive Manufacturing. vol. 18, Dec. 2017, pp. 1-14.
DOXYGEN. CGAL 4.11.1—Kinetic Data Structures. User Manual. Web. Published Apr. 8, 2006. 4 pages. URL:< https://doc.cgal.org/latest/Manual/how_to_cite_cgal.html>.
Gaudin, Sharon. Researcher works to make 3D-printed metals stronger, customizable. Oct. 2014. Accessed online on Mar. 22, 2018. 4 pages. URL:<https://www.computerworld.com/article/2838780/researcher-works-to-make-3d-printed-materials-stronger-customizable.html>.
integrativemodeling.org. IMP, the Integrative Modeling Platform. Web. Published Jul. 26, 2013.1 page. URL:< https://integrativemodeling.org/>.
PCT/US2017/064474 International Search Report and Written Opinion dated Apr. 30, 2018.
PCT/US2018/012250 International Search Report and Written Opinion dated Apr. 30, 2018.
RP Photonics Consulting GmbH. Definition of "Optical Intensity". Encyclopedia of Laser Physics and Technology. Jun. 2012. 3 pages. URL:<https://www.rp-photonics.com/optical_intensity.html>.
U.S. Appl. No. 15/339,712 Notice of Allowance dated Jun. 18, 2018.

(56) References Cited

OTHER PUBLICATIONS

U.S. Appl. No. 15/339,712 Notice of Allowance dated May 23, 2018.
U.S. Appl. No. 15/374,318 Notice of Allowance dated Apr. 20, 2018.
U.S. Appl. No. 15/374,442 Office Action dated May 21, 2018.
U.S. Appl. No. 15/374,535 Office Action dated Apr. 20, 2018.
U.S. Appl. No. 15/374,821 Notice of Allowance dated Apr. 4, 2018.
U.S. Appl. No. 15/435,090 Office Action dated May 18, 2018.
U.S. Appl. No. 15/435,110 Office Action dated Apr. 19, 2018.
U.S. Appl. No. 15/614,979 Office Action dated Jun. 8, 2018.
U.S. Appl. No. 15/615,004 Office Action dated Jun. 8, 2018.
U.S. Appl. No. 15/634,228 Office Action dated Jun. 14, 2018.
U.S. Appl. No. 15/634,267 Office Action dated Apr. 3, 2018.
U.S. Appl. No. 15/719,133 Office Action dated Mar. 28, 2018.
U.S. Appl. No. 15/853,700 Office Action dated Apr. 6, 2018.
U.S. Appl. No. 15/855,744 Office Action dated Apr. 27, 2018.
U.S. Appl. No. 15/870,561 Office Action dated Jun. 15, 2018.
U.S. Appl. No. 15/871,763 Office Action dated Apr. 19, 2018.
U.S. Appl. No. 15/893,523 Notice of Allowance dated Jun. 15, 2018.
U.S. Appl. No. 15/893,523 Notice of Allowance dated May 7, 2018.
U.S. Appl. No. 15/909,826 Office Action dated May 2, 2018.
Barriobero-Vila et al. Inducing Stable α + β Microstructures during Selective Laser Melting of Ti—6Al—4V Using Intensified Intrinsic Heat Treatments. Materials (Basel). Mar. 2017; 10(3): 268.
Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.
Bohnet, M. Advances in the Design of Pneumatic Conveyors. International Chemical Engineering, vol. 25, No. 3, Jul. 1985, pp. 387-405.
Co-pending U.S. Appl. No. 16/030,795, filed Jul. 9, 2018.
Co-pending U.S. Appl. No. 16/031,896, filed Jul. 10, 2018.
De Dietrich Process Systems, Inc. Powder Pump™. Product Brochure. Created Jul. 3, 2012. 2 pages.
EP15809160.3 European Search Report dated Aug. 7, 2018.
EP15866668.5 European Search Report dated Aug. 7, 2018.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
Kant et al. An integrated FEM-ANN model for laser bending process with inverse estimation of absorptivity. Mechanics of Advanced Materials and Modern Processes. Dec. 2015, 1:6.
PCT/US2017/060035 International Search Report and Written Opinion dated Jul. 20, 2018.
PCT/US2018/020406 International Search Report and Written Opinion dated Jun. 28, 2018.
PCT/US2018/024667 International Search Report and Written Opinion dated Jul. 17, 2018.
Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.
U.S. Appl. No. 15/339,712 Notice of Allowance dated Jul. 10, 2018.
U.S. Appl. No. 15/435,065 Office Action dated Aug. 16, 2018.
U.S. Appl. No. 15/435,078 Office Action dated Aug. 16, 2018.
U.S. Appl. No. 15/634,267 Office Action dated Sep. 6, 2018.
U.S. Appl. No. 15/719,084 Office Action dated Jul. 12, 2018.
U.S. Appl. No. 15/830,421 Office Action dated Jul. 26, 2018.
U.S. Appl. No. 15/830,470 Office Action dated Jul. 5, 2018.
U.S. Appl. No. 15/861,553 Office Action dated Aug. 7, 2018.
U.S. Appl. No. 15/861,548 Office Action dated Sep. 6, 2018.
U.S. Appl. No. 15/871,763 Notice of Allowance dated Aug. 15, 2018.
U.S. Appl. No. 15/886,544 Office Action dated Aug. 27, 2018.
U.S. Appl. No. 15/909,406 Office Action dated Aug. 27, 2018.
U.S. Appl. No. 15/909,784 Office Action dated Jul. 13, 2018.
U.S. Appl. No. 15/909,806 Office Action dated Aug. 13, 2018.
U.S. Appl. No. 15/909,809 Office Action dated Aug. 10, 2018.
U.S. Appl. No. 15/909,826 Notice of Allowance dated Aug. 30, 2018.
Xu et al. In situ tailoring microstructure in additively manufactured Ti—6Al—4V for superior mechanical performance. Acta Materialia. vol. 125, Feb. 15, 2017, pp. 390-400.
Bonnet, M. Advances in the Design of Pneumatic Conveyors. International Chemical Engineering, vol. 25, No. 3, Jul. 1985, pp. 387-405.
Bremen et al. Selective Laser Melting. Laser Technik Journal. vol. 9, No. 2, Apr. 2012. 6 pages.
Calvert, Jack G. Glossary of Atmospheric Chemistry Terms (Recommendations 1990). Pure & Appl. Chem., vol. 62, No. 11, Jan. 1, 1990, pp. 2167-2219.
Co-pending U.S. Appl. No. 16/177,090, filed Oct. 31, 2018.
Co-pending U.S. Appl. No. 16/183,557, filed Nov. 7, 2018.
Co-pending U.S. Appl. No. 16/195,810, filed Nov. 19, 2018.
Co-pending U.S. Appl. No. 16/245,183, filed Jan. 10, 2019.
Das et al. Producing metal parts with selective laser sintering/hot isostatic pressing. JOM; Dec. 1998, vol. 50, Issue 12, pp. 17-20.
*Formlabs* v. *DWS*. Civil Action filed on Jun. 29, 2018 in the United States Court for the Eastern District of Virginia. Case No. 1:18-cv-00810-CMH-IDD. 13 pages.
IUPAC. "Inert gas". IUPAC Compendium of Chemical Terminology. Published Feb. 24, 2014.<http://goldbook.iupac.org/html/I/I03027.html.
Ryan et al. Fabrication methods of porous metals for use in orthopaedic applications. Biomaterials. May 2006; vol. 27, Issue 13, pp. 2651-2670.
U.S. Appl. No. 15/399,186 Notice of Allowance dated Dec. 20, 2018.
U.S. Appl. No. 15/435,078 Office Action dated Jan. 10, 2019.
U.S. Appl. No. 15/435,110 Notice of Allowance dated Dec. 20, 2018.
U.S. Appl. No. 15/479,531 Office Action dated Jan. 9, 2019.
U.S. Appl. No. 15/490,219 Office Action dated Oct. 12, 2018.
U.S. Appl. No. 15/614,979 Office Action dated Nov. 5, 2018.
U.S. Appl. No. 15/615,004 Office Action dated Oct. 30, 2018.
U.S. Appl. No. 15/634,228 Notice of Allowance dated Nov. 5, 2018.
U.S. Appl. No. 15/634,267 Notice of Allowance dated Dec. 28, 2018.
U.S. Appl. No. 15/634,666 Office Action dated Oct. 18, 2018.
U.S. Appl. No. 15/830,421 Office Action dated Nov. 13, 2018.
U.S. Appl. No. 15/855,744 Office Action dated Nov. 19, 2018.
U.S. Appl. No. 15/861,553 Office Action dated Dec. 14, 2018.
U.S. Appl. No. 15/870,561 Office Action dated Nov. 19, 2018.
U.S. Appl. No. 15/871,763 Notice of Allowance dated Nov. 5, 2018.
U.S. Appl. No. 15/909,388 Office Action dated Dec. 14, 2018.
U.S. Appl. No. 15/909,806 Office Action dated Dec. 26, 2018.
U.S. Appl. No. 15/937,798 Office Action dated Oct. 26, 2018.
U.S. Appl. No. 15/937,817 Office Action dated Nov. 23, 2018.
Co-pending U.S. Appl. No. 16/248,665, filed Jan. 15, 2019.
Co-pending U.S. Appl. No. 16/253,103, filed Jan. 21, 2019.
Co-pending U.S. Appl. No. 16/291,759, filed Mar. 4, 2019.
Kopeliovich, Dmitri. Electropolishing. SubsTech: Substances & Technologies. Web Article. Dec. 14, 2013. Printed Jan. 13, 2019. 5 pages URL:<http://www.substech.com/dokuwiki/doku.php?id=electropolishing.
Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermo-mechanical model. Additive Manufacturing; vol. 22, Aug. 2018, pp. 869-882.
U.S. Appl. No. 15/634,228 Notice of Allowance dated Feb. 20, 2019.
U.S. Appl. No. 15/634,727 Notice of Allowance dated Feb. 7, 2019.
U.S. Appl. No. 15/719,084 Office Action dated Feb. 8, 2019.

(56) References Cited

OTHER PUBLICATIONS

U.S. Appl. No. 15/803,686 Notice of Allowance dated Feb. 19, 2019.
U.S. Appl. No. 15/855,744 Notice of Allowance dated Feb. 15, 2019.
U.S. Appl. No. 15/861,544 Office Action dated Feb. 15, 2019.
U.S. Appl. No. 15/909,396 Office Action dated Jan. 17, 2019.
U.S. Appl. No. 15/909,406 Notice of Allowance dated Jan. 29, 2019.
U.S. Appl. No. 15/909,784 Office Action dated Jan. 18, 2019.
U.S. Appl. No. 15/909,809 Notice of Allowance dated Feb. 14, 2019.
U.S. Appl. No. 15/909,826 Office Action dated Feb. 13, 2019.
U.S. Appl. No. 15/937,778 Office Action dated Feb. 12, 2019.
U.S. Appl. No. 15/937,790 Office Action dated Jan. 31, 2019.
U.S. Appl. No. 15/937,798 Office Action dated Mar. 7, 2019.
U.S. Appl. No. 15/937,812 Office Action dated Feb. 7, 2019.

\* cited by examiner

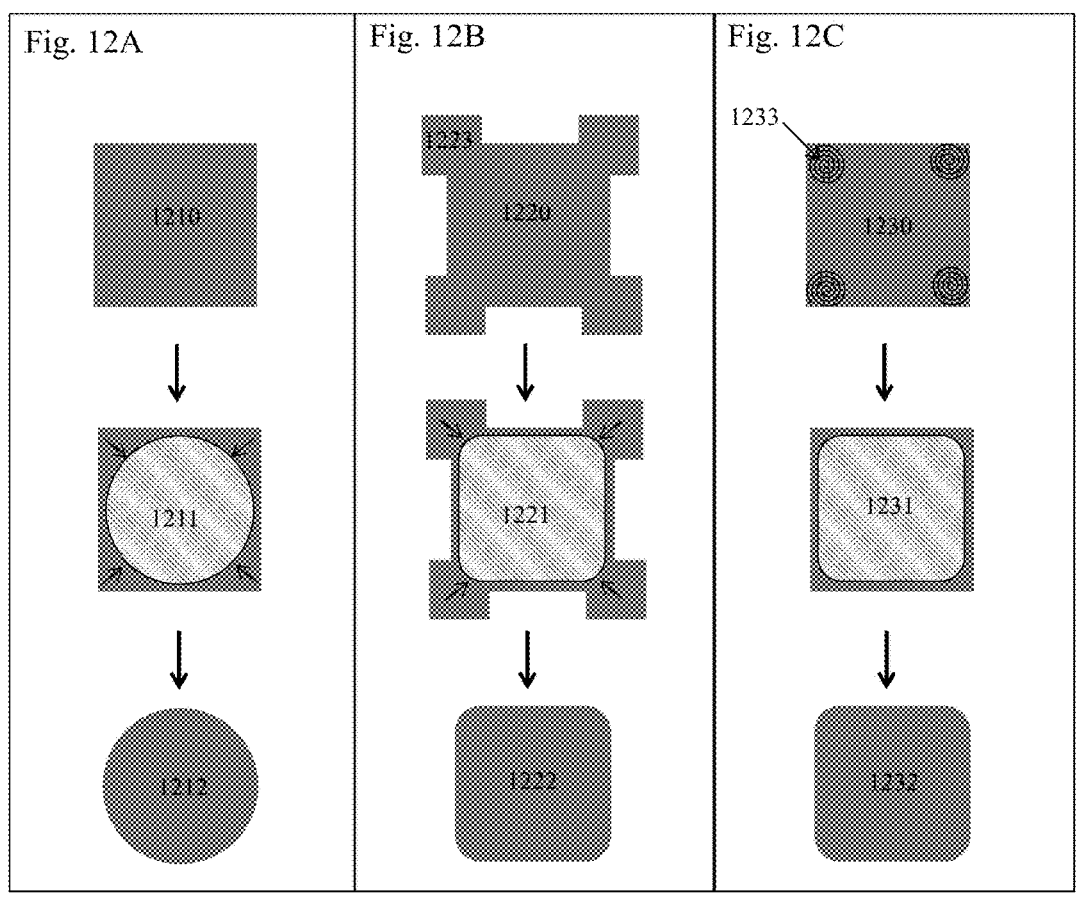

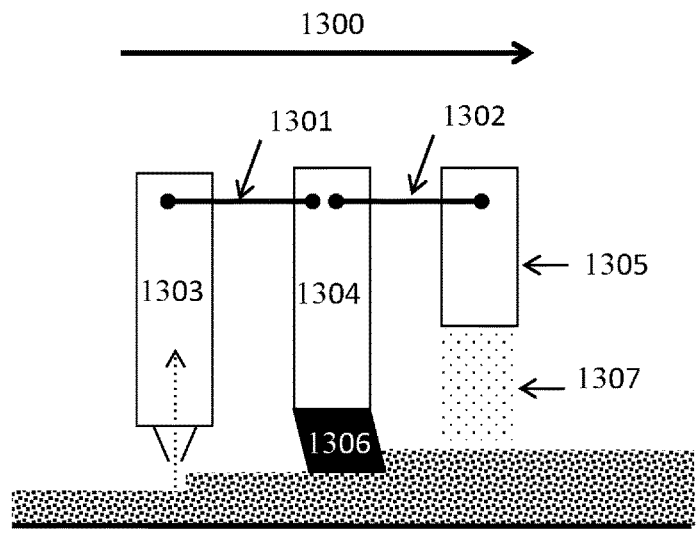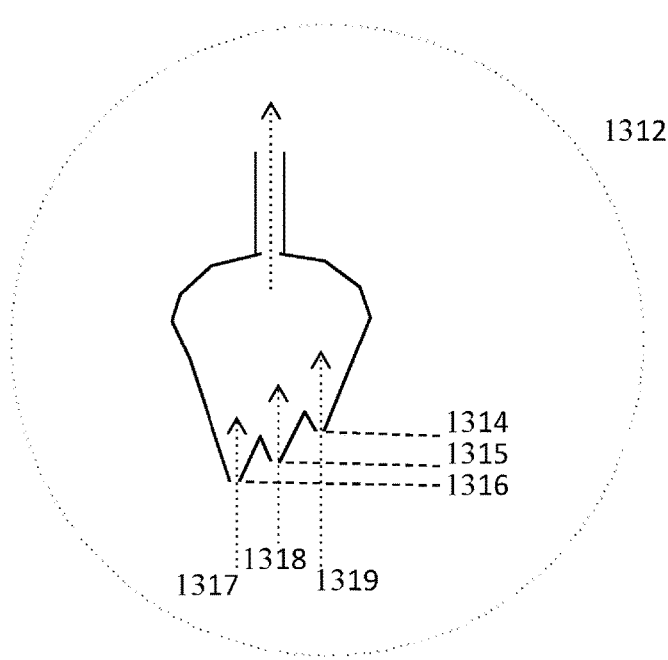
Fig. 13

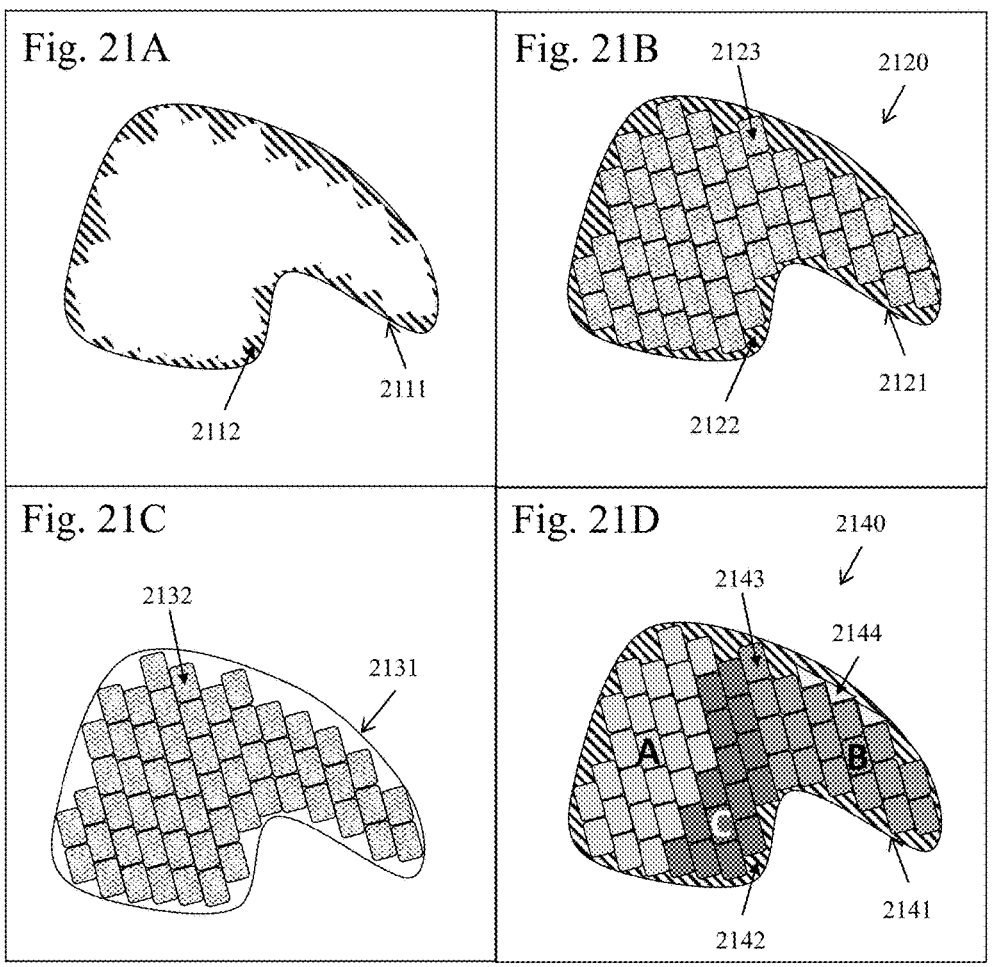

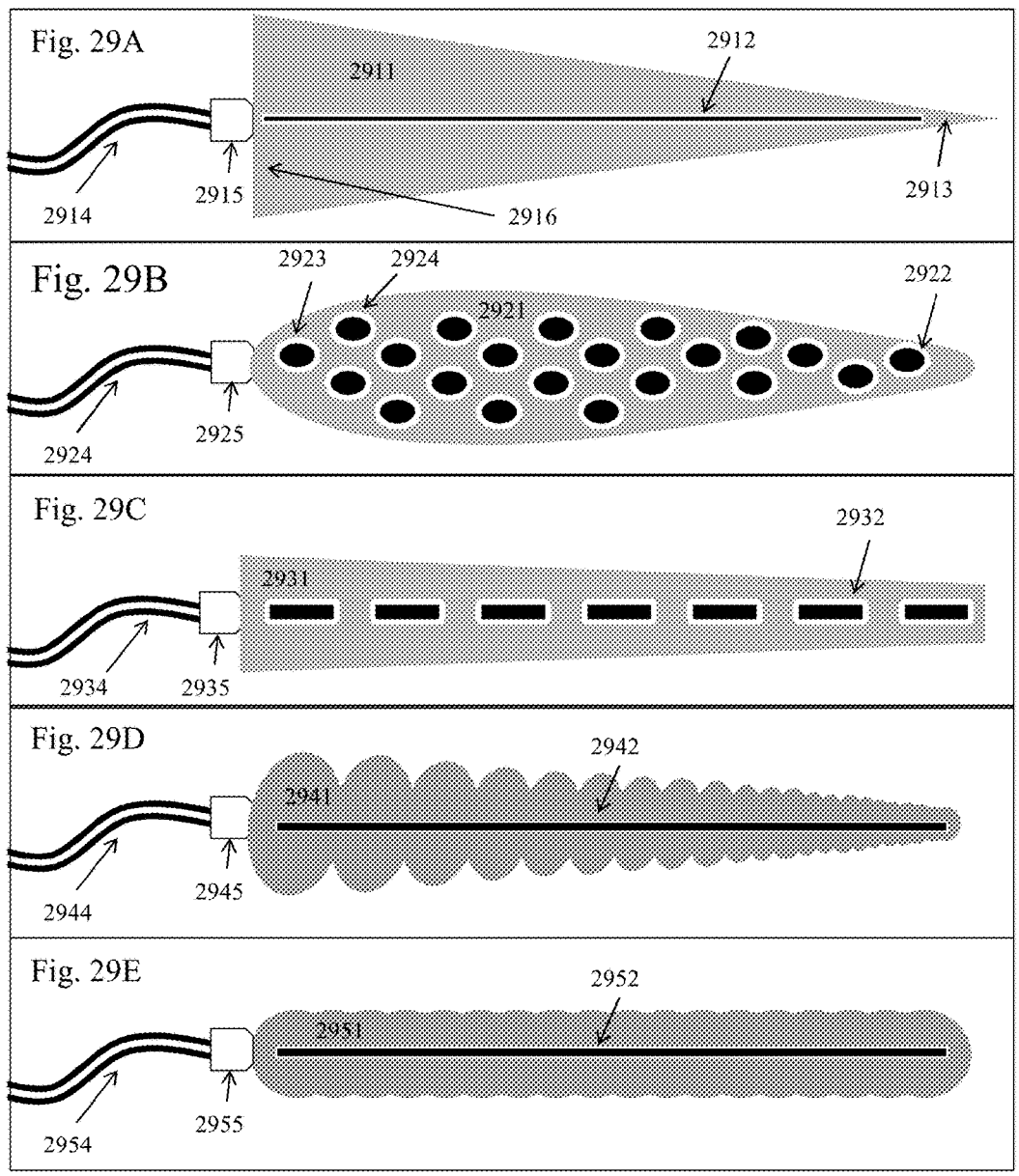

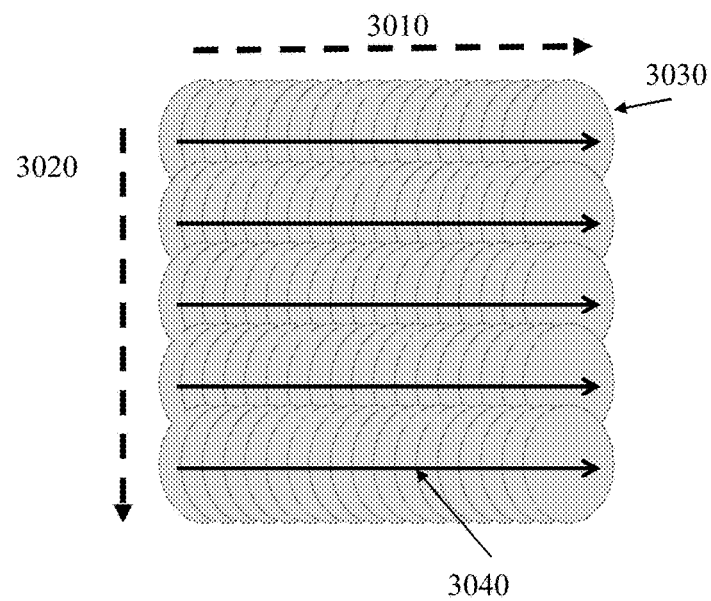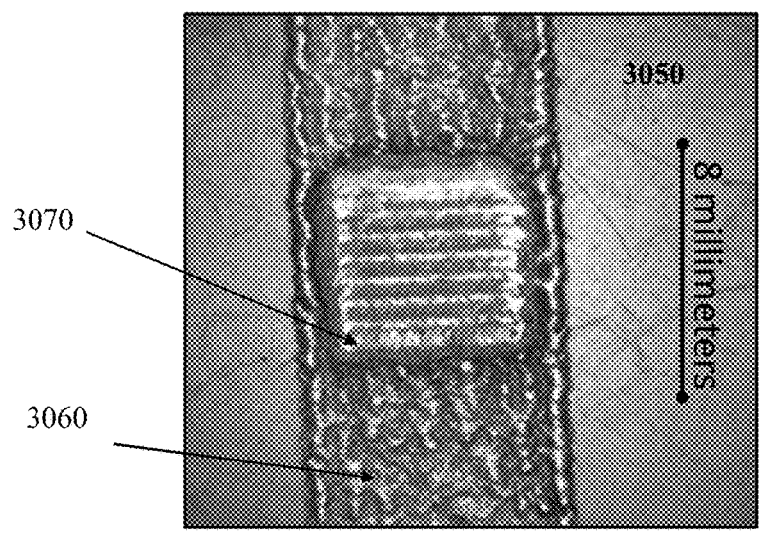
Fig. 30

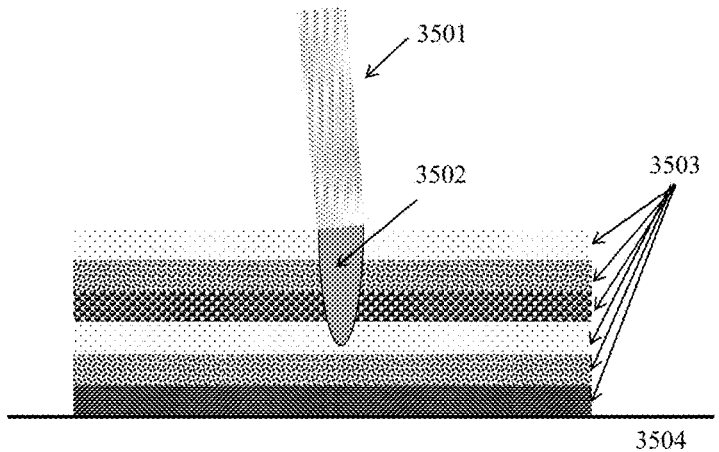
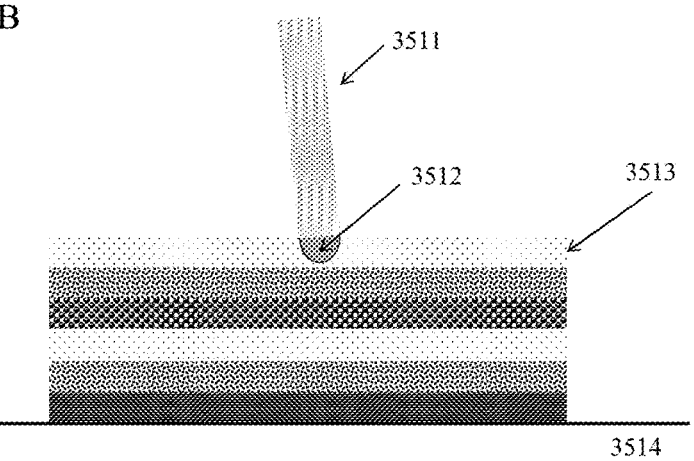

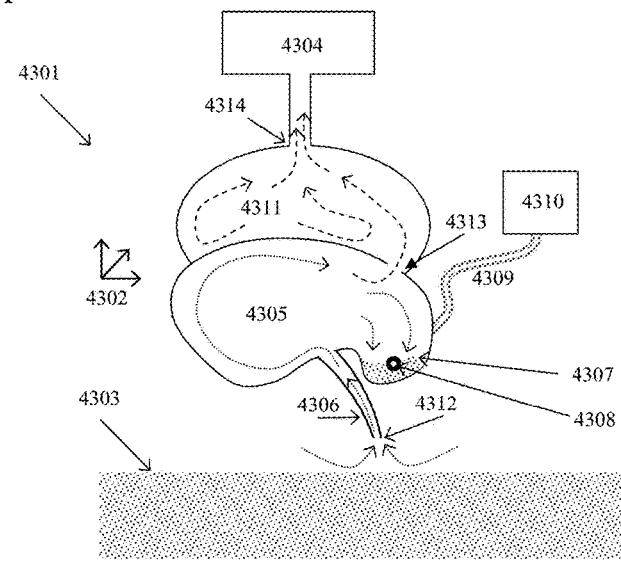
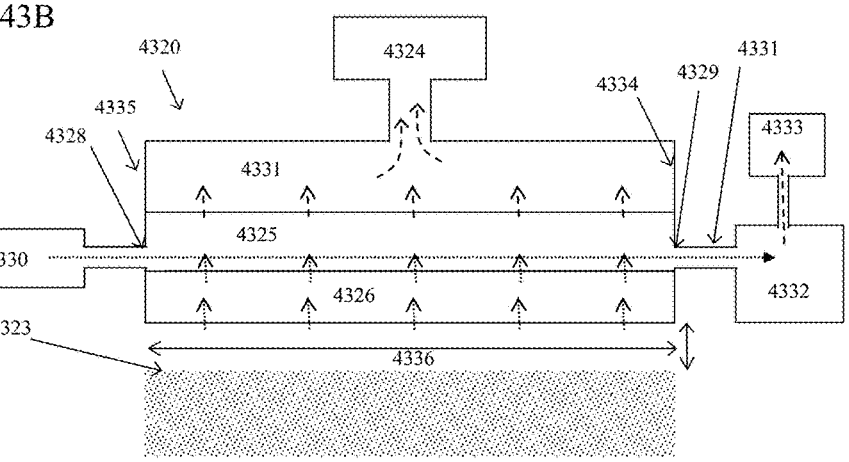

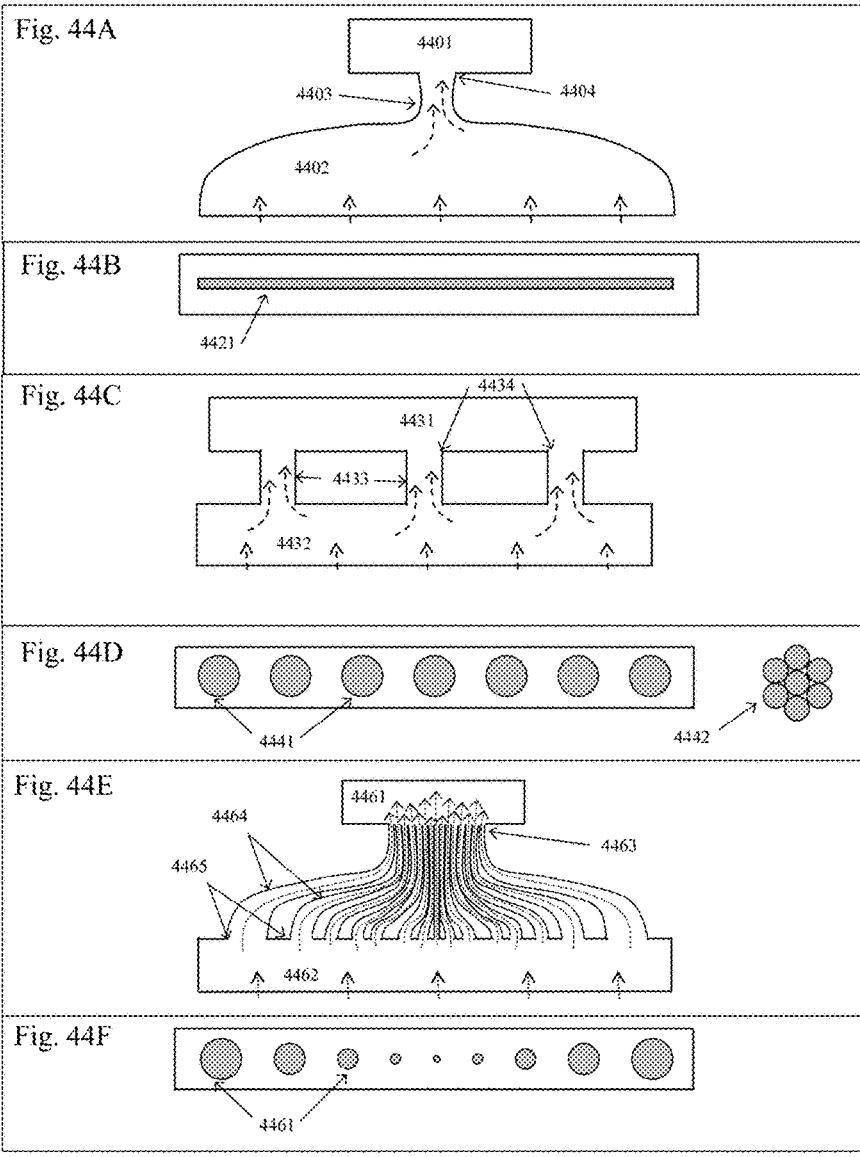

SKILLFUL THREE-DIMENSIONAL PRINTING

CROSS-REFERENCE

This application claims priority to U.S. Provisional Patent Application Ser. No. 62/265,817, filed on Dec. 10, 2015, and U.S. Provisional Patent Application Ser. No. 62/317,070, filed on Apr. 1, 2016, each of which is entirely incorporated herein by reference.

BACKGROUND

Three-dimensional (3D) printing (e.g., additive manufacturing) is a process for making a three-dimensional (3D) object of any shape from a design. The design may be in the form of a data source such as an electronic data source, hard copy, or physical structure (e.g., physical model). The hard copy may be a two-dimensional representation of a 3D object. The data source may be an electronic 3D model. 3D printing may be accomplished through an additive process in which successive layers of material are laid down one on top of each other to formed a layered 3D object (e.g., of hardened material). This process may be controlled (e.g., computer controlled, and/or manually controlled). For example, a 3D printer can be an industrial robot.

3D printing can generate custom parts quickly and efficiently. A variety of materials can be used in a 3D printing process including elemental metal, metal alloy, ceramic, elemental carbon, or a polymeric material. In a typical additive 3D printing process, a first material-layer is formed, and thereafter, successive material-layers (or parts thereof) are added one by one, wherein each new material-layer is added on a pre-formed material-layer, until the entire designed three-dimensional structure (3D object) is materialized.

3D models may be created utilizing a computer aided design package or via 3D scanner. The manual modeling process of preparing geometric data for 3D computer graphics may be similar to plastic arts, such as sculpting or animating. 3D scanning is a process of analyzing and collecting digital data on the shape (e.g., and appearance) of a real object. Based on this data, 3D models of the scanned object can be produced. The 3D models may include computer-aided design (CAD).

Many additive processes are currently available. They may differ in the manner layers are deposited to create the materialized structure. They may vary in the material or materials that are used to generate the designed structure. Some methods melt or soften material to produce the layers.

SUMMARY

At times, the printed three-dimensional (3D) object may bend, warp, roll, curl, or otherwise deform during and/or after the 3D printing process. Auxiliary supports may be inserted to circumvent such deformation. These auxiliary supports may be subsequently removed from the printed 3D object to produce a requested 3D product (e.g., 3D object). The presence of auxiliary supports may increase the cost and/or time required to manufacture the 3D object. At times, the requirement for the presence of auxiliary supports hinders (e.g., prevent) formation of a desired 3D object. For example, the presence of auxiliary support may hinder formation of certain hanging structures (e.g., ledges) and/or cavities as part of the desired 3D object. The requirement for the presence of auxiliary supports may place constraints on the design of 3D objects, and/or on their respective materialization. In some embodiments, the inventions in the present disclosure facilitate the generation of 3D objects with a reduced degree of deformation. In some embodiments, the inventions in the present disclosure facilitate the generation of 3D objects that are fabricated with diminished number (e.g., absence) of auxiliary supports (e.g., without auxiliary supports). In some embodiments, the inventions in the present disclosure facilitate generation of 3D objects with diminished amount of design and/or fabrication constraints (referred to herein as "constraint-less 3D object"). In some embodiments, a layer forming the 3D object is fabricated using large tiles. The tiles may be formed by hatching the tile interior with a small diameter energy beam (e.g., scanning energy beam). The tiles may be formed by irradiating a substantially stationary large diameter energy beam (e.g., tiling energy flux). The tiles may be formed with a low power energy beam that, in some examples, penetrates a portion of a previously formed 3D object layers (e.g., that is disposed below the irradiated portion), and allows these layers to reach an elevated temperature (i) above the solidus temperature and below the liquidus temperature of the bottom skin layer material (e.g., at the liquefying temperature), or (ii) at which a material in the bottom skin layer plastically yields. For example, the previously formed layer can be a bottom skin layer of the entire 3D object, of a hanging structure of the 3D object, or of a crevice ceiling within the 3D object. The energy beam forming the tile can be a defocused beam. The present disclosure delineates methods for forming such a beam using an optical diffuser.

In an aspect described herein are methods, systems, software, and/or apparatuses for generating a 3D object with a reduced degree of deformation (e.g., substantially non-deformed). The 3D object can be devoid of one or more auxiliary supports. The 3D object can be devoid of a mark indicating the prior presence of one or more auxiliary supports. The 3D object can be an extensive 3D object. The 3D object can be a large 3D object. The 3D object may comprise a large hanging structure (e.g., wire, ledge, or shelf). Large may be a 3D object having a fundamental length scale (FLS) of at least about 10 centimeters.

Sometimes, it is desired to control the microstructure of a 3D object to form a specific type of a microstructure (e.g., in at least a portion of the 3D object). Occasionally, it is desired to fabricate a 3D object with varied materials and/or material microstructures in one or more (e.g., specific) portions of the 3D object. For example, there may be a requirement for a motor comprising a dense center, and porous blades. The present disclosure describes formation of such desired 3D objects. In some instances, it is desired to control the way in which at least a portion of a layer of hardened material is formed (e.g., which may affect the material properties of that portion). The layer of hardened material may comprise at least one melt pool. In some instances, it may be desired to control one or more characteristics of that melt pool.

In some instances, the 3D object deforms during the 3D printing process, and protrudes from the material bed. Such phenomenon may make it difficult to form a 3D object that will adhere the customer requests. Such phenomenon may also burden the deposition and/or leveling of a planarized layer of pre-transformed (e.g., particulate) material. The present disclosure delineates methods and apparatuses that cope with a protruding object from an exposed surface of a material bed. For example, by using a material removal member that planarizes the exposed surface material bed without contacting it, for example, using a force that directs (e.g., attracts and/or maneuvers) the pre-transformed material and/or debris away from the target surface.

At times, it is desired to remove any remainder of the material bed that did not form the 3D object, from the printed 3D object, under the same atmosphere in which it was printed. For example, when the pre-transformed material is sensitive to oxygen and/or water and/or otherwise highly reactive in the ambient environment. The present disclosure delineates methods and apparatuses that allow cleaning of the 3D object from a material be remainder in the same environment in which the 3D object is formed.

In another aspect, a method for printing a three-dimensional object comprises: (a) providing a material bed comprising a pre-transformed material; (b) irradiating an exposed surface of the material bed using an energy beam directed at a first position of the exposed surface that is substantially stationary during a first time-period of at least one millisecond, to transform the pre-transformed material at the first position to a transformed material to form a first tile; (c) translating the energy beam to a second position of the exposed surface, which second position is different from the first position, wherein the energy beam is translated without transforming the pre-transformed material; and (d) irradiating the exposed surface of the material bed at the second position with the energy beam that is substantially stationary at the second position during a second time-period of at least about one millisecond, to transform the pre-transformed material at the second position to a transformed material to form a second tile.

The energy beam may have a power density of at most about 8000 W/mm$^2$. The first time-period can be substantially equal to the second time-period. The first time-period can be at least about one millisecond (msec). The energy beam may be translated during a third time-period of at least about 1 msec, 10 msec, 50 msec, 250 msec, or 500 msec. The cross section of the energy beam can be at least about 0.1 millimeter squared (mm$^2$), or 0.2. The diameter of the energy beam can be at least about 300 micrometers. The distance between the first position and the second position can be at least about 100 micrometers, 200 micrometers, or 250 micrometers. The horizontal cross section of the second tile may at least contact the horizontal cross section of the first tile. Contact may comprise overlap. The horizontal cross section of the second tile may at least partially overlap the horizontal cross section of the first tile. The second tile may overlap at least about 40% of the first tile. The horizontal cross section of the second tile may (e.g., completely) overlap the horizontal cross section of the first tile by at least about 40%. The method may further comprise dispensing a layer of the pre-transformed material by removing an excess of pre-transformed material from the exposed surface of the material bed (e.g., by using a gas flow and optionally (e.g., cyclonically) separating the pre-transformed material from the gas flow). The second tile may at least contact the first tile. The second tile may at least partially overlap the first tile. The overlap can be by at least about 40%. The overlap can be any value of the horizontal cross section overlap mentioned herein.

The pre-transformed material may be at least one member selected from the group consisting of elemental metal, metal alloy, ceramic, and an allotrope of elemental carbon. Transform can comprise fuse. Fuse can comprise sinter or melt. Melt can comprise completely melt. The 3D printing may be at an ambient pressure. The 3D printing may be at an atmospheric pressure. The 3D printing may be at an ambient temperature. The 3D printing may be at room temperature. The 3D printing may can comprise additive manufacturing.

In another aspect, a method for printing a three-dimensional object comprises: (a) providing a material bed comprising a pre-transformed material; (b) irradiating an exposed surface of the material bed using an energy beam directed at a first position of the exposed surface that is substantially stationary during a first time-period to transform the pre-transformed material at the first position to a transformed material to form a first tile, which energy beam has a power density of at most about 8000 Watts per millimeter squared; (c) translating the energy beam to a second position of the exposed surface, which second position is different from the first position, which energy beam is translated without transforming the pre-transformed material; and (d) irradiating the exposed surface of the material bed at the second position with the energy beam that is substantially stationary at the second position during a second time-period, to transform the pre-transformed material at the second position to a transformed material to form a second tile.

The power density may be at most 5000 W/mm$^2$. The energy beam may be translated within a time-period of at least about 1 millisecond. The energy beam may be translated within a time-period of at least about one millisecond (msec), 10 msec, 50 msec, 250 msec, or 500 msec. The translation can be during at least about 1 msec, 10 msec, 50 msec, 250 msec, or 500 msec. The cross section of the energy beam can be at least about 0.1 millimeter squared (mm$^2$), or 0.2. The diameter of the energy beam can be at least about 300 micrometers, 500 micrometers, or 600 micrometers. The distance between the first position and the second position can be at least about 100 micrometers, 200 micrometers, or 250 micrometers. The second tile may at least contact (e.g., contact and overlap) the first tile.

Substantially stationary may comprise spatial oscillations that are smaller than the FLS (e.g., diameter) of the energy beam.

In another aspect, a method for printing a three-dimensional object comprises: providing a material bed comprising a pre-transformed material; (c) irradiating an exposed surface of the material bed using a defocused energy beam directed at a first position of the exposed surface that is substantially stationary during a first time-period to transform the pre-transformed material at the first position to a transformed material to form a first tile; (d) translating the defocused energy beam to a second position of the exposed surface, which second position is different from the first position, which defocused energy beam is translated without transforming the pre-transformed material; and (e) irradiating the exposed surface of the material bed at the second position with the defocused energy beam that is substantially stationary at the second position during a second time-period to transform the pre-transformed material in the second position to a transformed material to form a second tile.

A diameter of the defocused energy beam can be at least about 300 micrometers. The at least one of the first time-period and the second time-period can be at least about 1 millisecond. The first time-period can be (e.g., substantially) equal to the second time-period. The energy beam may translate within a third time-period of at least about 1 millisecond. A distance between the first position and the second position can be at least 100 micrometers. The second tile may at least contact the first tile. The second tile may at least partially overlap the first tile. The overlap can be by at least about 40%. The overlap can be any value of the horizontal cross section overlap mentioned herein. The first time-period can be at least about one millisecond (msec), 10 msec, 50 msec, 250 msec, or 500 msec. The translation can be during at least about 1 msec, 10 msec, 50 msec, 250 msec, or 500 msec. The cross section of the defocused energy beam can be at least about 0.1 millimeter squared (mm²), or 0.2. The diameter of the defocused energy beam can be at least about 300 micrometers. The distance between the first position and the second position can be at least about 250 micrometers. The power density of the defocused energy beam may be at most about 6000 W/mm².

In another aspect, a method for printing a three-dimensional object comprises: providing a material bed comprising a pre-transformed material; directing an energy beam to an optical diffuser to generate a diffused energy beam; (c) irradiating an exposed surface of the material bed using the diffused energy beam directed at a first position of the exposed surface that is substantially stationary during a first time-period to transform the pre-transformed material at the first position to a transformed material to form a first tile; (d) translating the diffused energy beam to a second position of the exposed surface, which second position is different from the first position, which translating is without transforming the pre-transformed material; and (e) irradiating the exposed surface of the material bed at the second position with the diffused energy beam that is substantially stationary at the second position during a second time-period to transform the pre-transformed material in the second position to a transformed material to form a second tile.

The optical diffuser may distort the wave front of the energy beam. The optical diffuser may comprise a microlens (e.g., array) or a digital mask. The optical diffuser can be comprised in a diffuser wheel. A diameter of the diffused energy beam can be at least about 300 micrometers. The at least one of the first time-period and the second time-period can be at least about 1 millisecond. The first time-period can be (e.g., substantially) equal to the second time-period. The translation can be during at least about 1 millisecond. A distance between the first position and the second position can be at least 100 micrometers. The second tile may at least contact the first tile. The second tile may at least partially overlap the first tile. The overlap can be by at least about 40%. The overlap can be any value of the horizontal cross section overlap mentioned herein. The first time-period can be at least about one millisecond (msec), 10 msec, 50 msec, 250 msec, or 500 msec. The translation can be during at least about 1 msec, 10 msec, 50 msec, 250 msec, or 500 msec. The cross section of the diffused energy beam can be at least about 0.1 millimeter squared (mm²), or 0.2. The diameter of the energy beam can be at least about 300 micrometers. The distance between the first position and the second position can be at least about 100 micrometers. The power density of the diffused energy beam may be at most about 7000 W/mm².

In another aspect, a system for printing a three-dimensional object comprises: a container configured to enclose a material bed comprising an exposed surface and a pre-transformed material; an energy source configured to generate an energy beam that transforms at least a portion of the exposed surface to a transformed material as part of the three-dimensional object, wherein the energy source is disposed adjacent to the material bed; and one or more controllers operatively coupled to the material bed, and the energy source, which one or more controllers direct the energy beam to: (i) irradiate the exposed surface of the material bed at a first position that is substantially stationary during a first time-period that is at least one millisecond and transform the pre-transformed material in the first position to a transformed material to form a first tile, (ii) translate the energy beam to a second position in the exposed surface, which second position is different from the first position, which translate is without transforming the pre-transformed material; and (iii) irradiate the exposed surface of the material bed at the second position with the energy beam that is substantially stationary at the second position during a second time-period that is at least about one millisecond to transform the pre-transformed material in the first position to a transformed material to form a second tile that overlaps the first tile.

In another aspect, a system for printing a three-dimensional object comprises: a container configured to enclose a material bed comprising an exposed surface and a pre-transformed material; an energy source configured to generate an energy beam that transforms at least a portion of the exposed surface to a transformed material as part of the three-dimensional object, which energy beam has a power density of at most about 8000 Watts per millimeter squared; wherein the energy source is disposed adjacent to the material bed; and one or more controllers operatively coupled to the material bed, and the energy source, which one or more controllers direct the energy beam to: (i) irradiate the exposed surface of the material bed at a first position that is substantially stationary during a first time-period and transform the pre-transformed material in the first position to a transformed material to form a first tile, (ii) translate the energy beam to a second position in the exposed surface, which second position is different from the first position, which translate is without transforming the pre-transformed material; and (iii) irradiate the exposed surface of the material bed at the second position with the energy beam that is substantially stationary at the second position during a second time-period to transform the pre-transformed material in the first position to a transformed material to form a second tile that overlaps the first tile.

In another aspect, a system for printing a three-dimensional object comprises: a container configured to enclose a material bed comprising an exposed surface and a pre-transformed material; a defocused energy source configured to generate the energy beam that transforms at least a portion of the material bed to a transformed material as part of the three-dimensional object, wherein the energy source is disposed adjacent to the material bed; and one or more controllers operatively coupled to the material bed, the energy source, and the optical diffuser, which one or more controllers direct the defocused energy beam to (i) irradiate the exposed surface of the material bed at a first position that is substantially stationary during a first time-period to transform the pre-transformed material in the first position to a transformed material to form a first tile; (ii) translate a second position in the exposed surface, which second position is different from the first position, which translate is without transforming the pre-transformed material; and (iii) irradiate the exposed surface of the material bed at the second position with the energy beam that is substantially stationary at the second position during a second time-period to transform the pre-transformed material in the first position to a transformed material to form a second tile. For example, the first tile at least contacts the second tile.

In another aspect, a system for printing a three-dimensional object comprises: a container configured to enclosure a material bed comprising an exposed surface and a pre-transformed material; an optical diffuser configured to diffuse a first cross section of an energy beam to form a second cross section that is diffused relative to the first cross section; an energy source configured to generate the energy beam that transforms at least a portion of the material bed to a transformed material as part of the three-dimensional object, wherein the energy source is disposed adjacent to the material bed; and one or more controllers operatively coupled to the material bed, the energy source, and the optical diffuser, which one or more controllers (e.g., collectively or individually) direct (I) the energy beam having the first cross section to travel through the optical diffuser to diffuse the first cross section and form the second cross section (II) the energy beam having the second cross section to (i) irradiate the exposed surface of the material bed at a first position that is substantially stationary during a first time-period to transform the pre-transformed material in the first position to a transformed material to form a first tile; (ii) translate a second position in the exposed surface, which second position is different from the first position, which translate is without transforming the pre-transformed material; and (iii) irradiate the exposed surface of the material bed at the second position with the energy beam that is substantially stationary at the second position during a second time-period to transform the pre-transformed material in the first position to a transformed material to form a second tile that overlaps the first tile.

In another aspect, a method for printing a three-dimensional object comprises: (A) providing a first pre-transformed material to a bottom skin layer of hardened material that is disposed above a platform, which bottom skin layer is part of the three-dimensional object; and (B) using an energy beam to: (I) transform the pre-transformed material to a first portion of transformed material as part of the three-dimensional object, which first portion has a first lateral cross section, (II) increase a temperature of a second portion that (a) is part of the bottom skin layer and (b) has a second lateral cross section that at least partially overlaps the first lateral cross section, to at least a target temperature value that is at least one of (i) above the solidus temperature and below the liquidus temperature of the material of the bottom skin layer, and (ii) at a temperature at which the material of the bottom skin layer in the second portion plastically yields.

The bottom skin layer of hardened material may be disposed above the platform along a direction perpendicular to the platform. Above can be directly above (e.g., such that the bottom skin layer contacts the platform). Providing can comprise streaming. The transformation can be above or at the bottom skin layer. The transform can be prior to contact formation between the bottom skin layer and the transformed material. The transformation can be at the bottom skin layer. The center of the first cross section can be above (e.g., aligned with) the second cross section. Above can be along the direction perpendicular to the platform. Above can be in the direction opposing the platform. Above can be in the direction opposite to the gravitational center. Increase can comprise using closed loop or open loop control. Control can comprise temperature control. Increase can comprise using feedback or feed-forward control. The control can comprise using a graphical processing unit (GPU), system-on-chip (SOC), application specific integrated circuit (ASIC), application specific instruction-set processor (ASIPs), programmable logic device (PLD), or field programmable gate array (FPGA). Increase can comprise using a simulation (e.g., The temperature of the second portion may be increased with the aid of a simulation). The simulation can comprise a temperature and/or mechanical simulation of the 3D printing of the 3D object. The simulation may comprise thermo-mechanical simulation. The simulation can comprise a material property of the 3D object (e.g., that is requested by a user). The thermo-mechanical simulation can comprise elastic or plastic simulation. The temperature of the second portion is increased with the aid of a graphical processing unit (GPU), system-on-chip (SOC), application specific integrated circuit (ASIC), application specific instruction-set processor (ASIPs), programmable logic device (PLD), or field programmable gate array (FPGA).

In another aspect, a method for printing a three-dimensional object comprises: (A) providing a material bed comprising a pre-transformed material and a bottom skin layer of hardened material, which material bed is disposed above a platform, wherein the bottom skin layer is part of the three-dimensional object, wherein at least a fraction of the pre-transformed material is disposed above the bottom skin layer; and (B) irradiating a first portion of the planar layer with the energy beam to: (I) transform the pre-transformed material in the first portion to a transformed material as part of the three-dimensional object, which first portion has a first lateral cross section; (II) increase a temperature of a second portion that (a) is part of the bottom skin layer and (b) has a second lateral cross section that overlaps the first lateral cross section, to at least a target temperature value that is at least one of (i) above the solidus temperature and below the liquidus temperature of the material of the bottom skin layer, and (ii) at a temperature at which the material of the bottom skin layer in the second portion plastically yields.

The at least a fraction can comprise a planar exposed surface of the material bed. Above can be along a direction opposite to the platform. Above can be directly above such that the bottom skin layer contacts the platform. Transform can be above or at the bottom skin layer. Transform can be at the bottom skin layer. The center of the first cross section can be above the second cross section. Above can be along the direction perpendicular to the platform. Above can be in the direction opposing the platform. Above can be in the direction opposite to the gravitational center. Increase can comprise using closed loop or open loop temperature control (e.g., the temperature of the second portion can be increased using closed loop or open loop control). Increase can comprise using feedback or feed-forward control (e.g., the temperature of the second portion can be increased using feedback or feed-forward control). Increase can comprise using a simulation. The simulation can comprise a temperature or mechanical simulation of the 3D printing. The simulation may comprise thermo-mechanical simulation (e.g., of the 3D printing and/or of the 3D object during its fabrication in the 3D printing). The simulation can comprise a material property of the requested 3D object. The mechanical simulation can comprise elastic or plastic simulation. The control can comprise using a graphical processing unit (GPU), system-on-chip (SOC), application specific integrated circuit (ASIC), application specific instruction-set processor (ASIPs), programmable logic device (PLD), or field programmable gate array (FPGA). The disposing may comprise dispensing a layer of the pre-transformed material (e.g., by removing an excess of pre-transformed material from the exposed surface of the material bed using a gas flow and optionally cyclonically separating the pre-transformed material from the gas flow). Providing the material bed may comprise dispensing a layer of the pre-transformed material by removing an excess of pre-transformed material from the exposed surface of the material bed using gas flow and cyclonically separating the pre-transformed material from the gas flow.

In another aspect, a method for printing a three-dimensional object comprises: (a) providing a pre-transformed material to a bottom skin layer of hardened material disposed above a platform, wherein the bottom skin layer is part of the three-dimensional object; (b) using an energy beam to transform a portion of the pre-transformed material to a portion of transformed material disposed above the bottom skin layer; and (c) setting at least one characteristic of the energy beam such that a temperature of the three-dimensional object at the bottom skin layer below the portion of transformed material is at least one of (i) above the solidus temperature and below the liquidus temperature of the material of the bottom skin layer, and (ii) at temperature at which a material of the bottom skin layer plastically yields.

The transformed material can be a melt pool. The method may further comprise after operation (c), repeating at least operation (b). The method may further comprise repeating operation (b) subsequent to operation (c). Below the portion can be along a direction perpendicular to the platform and in the direction towards the platform (e.g., the bottom skin layer may be below the portion of transformed along a direction perpendicular to the platform). The at least one characteristic comprises power density, cross sectional area, trajectory, speed, focus, energy profile, dwell time, intermission time, or fluence of the energy beam. The disposing can comprise dispensing a layer of the pre-transformed material by removing an excess of pre-transformed material from the exposed surface of the material bed using a gas flow and cyclonically separating the pre-transformed material from the gas flow. Above can be directly above such that the bottom skin layer contacts the platform. The providing can comprise streaming. The transform can be above or at the bottom skin layer. The transform can be prior to contact formation between the bottom skin layer and the transformed material. The transform can be at the bottom skin layer. The center of the first cross section can be above the second cross section. Above can be along the direction perpendicular to the platform. Above can be in the direction opposing the platform. Above can be in the direction opposite to the gravitational center. Increase can comprise using closed loop or open loop (e.g., temperature) control. The control can be of at least one characteristic of the energy beam (e.g., as disclosed herein). Increase can comprise using feedback or feed-forward control. Increase can comprise using a simulation. The simulation can comprise a temperature or mechanical simulation of the 3D printing. The simulation may comprise thermo-mechanical simulation. The simulation can comprise a material property of the requested 3D object. The thermo-mechanical simulation can comprise elastic or plastic simulation. The control can comprise using a graphical processing unit (GPU), system-on-chip (SOC), application specific integrated circuit (ASIC), application specific instruction-set processor (ASIPs), programmable logic device (PLD), or field programmable gate array (FPGA).

In another aspect, a method for printing a three-dimensional object comprises: (a) providing a material bed comprising a pre-transformed material and a bottom skin layer of hardened material, which material bed is disposed above a platform, wherein the bottom skin layer is part of the three-dimensional object, wherein at least a fraction of the pre-transformed material is disposed above the bottom skin layer, wherein above is along a direction opposite to the platform; (b) using an energy beam to transform a portion of at least a fraction of the pre-transformed material into a transformed material as part of the three-dimensional object; and (c) setting at least one characteristic of the energy beam such that a temperature of the three-dimensional object at the bottom skin layer below the portion is at least one of (i) above the solidus temperature and below the liquidus temperature of the bottom skin layer material, and (ii) at temperature at which a material in the bottom skin layer plastically yields.

The method may further comprise after operation (c), repeating at least operation (b). Below the portion can be along a direction perpendicular to the platform and in the direction towards the platform. The at least a fraction can comprise a planar exposed surface of the material bed. The bottom skin layer can be a first formed layer of (i) the three-dimensional object, (ii) a hanging structure of the three-dimensional object, or (iii) a cavity ceiling of the three-dimensional object. The bottom skin layer may have a sphere of radius XY on a bottom surface of the bottom skin layer, wherein an acute angle between the straight line XY and the direction normal to the average layering plane of the bottom skin layer can be in the range from about 45 degrees to about 90 degrees. The first formed layer of the three-dimensional object can be disconnected from the platform during the 3D printing. The first formed layer of the three-dimensional object can comprise auxiliary support that can be disconnected from (e.g., not anchored to) the platform during the 3D printing. During the 3D printing, the first formed layer of the three-dimensional object may comprise auxiliary support features that are spaced apart by 2 millimeters or more. The hanging structure of the three-dimensional object may comprise at least one side that is not connected to (e.g., disconnected from) the three-dimensional object or to the platform. The hanging structure of the three-dimensional object may comprise at least two sides that are not connected to (e.g., disconnected from) the three-dimensional object or to the platform. The hanging structure of the three-dimensional object may comprise at least three sides that are not connected to (e.g., disconnected from) the three-dimensional object or to the platform. The hanging structure can comprise auxiliary support that is not anchored to the platform. The hanging structure can comprise auxiliary support features that are spaced apart by 2 millimeters or more. The cavity ceiling of the three-dimensional object may comprise at least one side that is not connected to the three-dimensional object or to the platform. The cavity ceiling of the three-dimensional object may comprise at least two sides that are not connected to the three-dimensional object or to the platform. The cavity ceiling of the three-dimensional object may comprise at least three sides that are not connected to the three-dimensional object or to the platform. The cavity ceiling comprises auxiliary support that is not anchored to the platform. The hanging structure comprises auxiliary support features that are spaced apart by 2 millimeters or more.

In another aspect, a system for printing a three-dimensional object comprises: a platform and a bottom skin layer of hardened material that is a part of the three-dimensional object, wherein the bottom skin layer is disposed above the platform; a material dispenser configured to dispense a pre-transformed material towards the platform through an opening, wherein the material dispenser is disposed adjacent to the platform; an energy source configured to generate an energy beam that transforms at least a portion of the pre-transformed material in at or adjacent to the platform, wherein the energy source is disposed adjacent to the platform; and one or more controllers operatively coupled to the material bed, the material dispenser, and the energy source, which one or more controllers are individually or collectively programmed to: (A) direct the material dispenser to dispense a pre-transformed material at or above the bottom skin layer, and (B) direct the energy beam to (I) transform the pre-transformed material and form a first portion at or above the bottom skin layer (e.g., which above is in the direction opposite to the platform), which first portion has a first lateral cross section; and (II) increase a temperature of a second portion that (a) is part of the bottom skin layer and (b) has a second lateral cross section that at least partially overlaps the first lateral cross section, to at least a target temperature value that is at least one of (i) above the solidus temperature and below the liquidus temperature of the material of the bottom skin layer, and (ii) at a temperature at which the material of the bottom skin layer in the second portion plastically yields.

The first portion can be above the bottom skin layer along a direction perpendicular to the platform. Above can be directly above such that the bottom skin layer contacts the platform. Above can be indirectly above such that the bottom skin layer does not connect and/or contact the platform. The bottom skin layer can be separated from the platform by the pre-transformed material. The bottom skin layer can be separated from the platform by a layer of the pre-transformed material. The bottom skin layer may float anchorlessly above the platform. The bottom skin layer can comprise one or more auxiliary supports. The one or more auxiliary supports can be anchored to the platform. The one or more auxiliary supports may float anchorlessly above the platform. The dispenses in operation (b) can comprise streams. The control can comprise using closed loop or open loop control. The increase can comprise using feedback or feed-forward control. The control can comprise using a simulation. The one or more controllers can be individually or collectively programmed to direct the energy beam to increase the temperature of the second portion using a simulation. The simulation can comprise a temperature or mechanical simulation of the 3D printing. The simulation may comprise thermo-mechanical simulation. The simulation can comprise a material property of the requested 3D object. The thermo-mechanical simulation can comprise elastic or plastic simulation. The one or more controllers can be individually or collectively programmed to direct the energy beam to increase the temperature of the second portion using a graphical processing unit (GPU), system-on-chip (SOC), application specific integrated circuit (ASIC), application specific instruction-set processor (ASIPs), programmable logic device (PLD), or field programmable gate array (FPGA). The method may further comprise a cyclonic separator to separate any excess of pre-transformed material that did not transform to form the three-dimensional object.

In another aspect, a system for printing a three-dimensional object comprises: a container configured to support a material bed comprising an exposed surface, a pre-transformed material, and a bottom skin layer of hardened material, wherein at least a fraction of the pre-transformed material is disposed above the bottom skin layer, wherein the bottom skin layer is part of the three-dimensional object; an energy source for generating an energy beam that is configured to transform at least a portion of the at least a fraction of the pre-transformed material to a transformed material as part of the three-dimensional object, wherein the energy source is disposed adjacent to the material bed; and one or more controllers operatively coupled to the material bed, the layer dispensing mechanism and the energy source, which one or more controllers are individually or collectively programmed to direct the energy beam to: (I) transform the at least a portion of the pre-transformed material to a first portion of transformed material, which first portion has a first lateral cross section; and (II) increase a temperature of a second portion that (a) is part of the bottom skin layer and (b) has a second lateral cross section that overlaps the first lateral cross section, to at least a target temperature value that is at least one of (i) above the solidus temperature and below the liquidus temperature of the material of the bottom skin layer, and (ii) at a temperature at which the material of the bottom skin layer in the second portion plastically yields.

The pre-transformed material may comprise a particulate material formed of at least one member selected from the group consisting of elemental metal, metal alloy, ceramic, an allotrope of elemental carbon, polymer, and resin. The pre-transformed material may comprise a particulate material formed of at least one member selected from the group consisting of elemental metal, metal alloy, ceramic, and an allotrope of elemental carbon. The increase in (II) can comprise using feedback or feed-forward control. The one or more controllers can be individually or collectively programmed to direct the energy beam to increase the temperature of the second portion using feedback or feed-forward control. The increase in (II) can comprise using closed loop or open loop (e.g., temperature) control. The one or more controllers are individually or collectively programmed to direct the energy beam to increase the temperature of the second portion using closed loop or open loop control. The increase in (II) can comprise using a graphical processing unit (GPU), system-on-chip (SOC), application specific integrated circuit (ASIC), application specific instruction-set processor (ASIPs), programmable logic device (PLD), or field programmable gate array (FPGA). The one or more controllers can be individually or collectively programmed to direct the energy beam to increase the temperature of the second portion using a graphical processing unit (GPU), system-on-chip (SOC), application specific integrated circuit (ASIC), application specific instruction-set processor (ASIPs), programmable logic device (PLD), or field programmable gate array (FPGA). The material bed may be formed at least by dispensing a (e.g., planar) layer of the pre-transformed material generated by removing an excess of pre-transformed material from the exposed surface of the material bed using a gas flow and cyclonically separating the pre-transformed material from the gas flow. The (e.g., first or second portion of the) transformed material can comprise a melt pool. The system may further comprise repeating at least (B) after (C).

In another aspect, a system for printing a three-dimensional object comprises: a platform and a bottom skin layer of hardened material disposed above the platform; a material dispenser configured to dispense a pre-transformed material towards a target surface through an opening of the material dispenser, wherein the material dispenser is disposed adjacent to the target surface; an energy source configured to generate an energy beam that transforms at least a portion of the pre-transformed material at or adjacent to the target surface, wherein the energy source is disposed adjacent to the target surface; and one or more controllers operatively coupled to the material bed and the energy source, wherein the one or more controllers are individually or collectively programmed to: (I) direct the energy beam to transform the at least a portion of the pre-transformed material at or adjacent to the target surface to a transformed material disposed above the bottom skin layer, and (II) control at least one characteristic of the energy beam such that a temperature of the three-dimensional object at the bottom skin layer below the portion is at least one of (i) above the solidus temperature and below the liquidus temperature of the bottom skin layer material, and (ii) at temperature at which a material in the bottom skin layer plastically yields.

Above in (I) can be directly above such that the transformed material contacts the bottom skin layer. The controller may further direct repeating operation (I). The one or more controllers are individually or collectively programmed to repeat (I) subsequent to (II). Above can be directly above such that the bottom skin layer contacts the platform. Above can be indirectly above such that the bottom skin layer does not connect and/or contact the platform. The bottom skin layer can be separated from the platform by the pre-transformed material. The bottom skin layer can be separated from the platform by a layer of the pre-transformed material. The bottom skin layer may float anchorlessly above the platform. The bottom skin layer can comprise one or more auxiliary supports. The one or more auxiliary supports can be anchored to the platform. The one or more auxiliary supports may float anchorlessly above the platform. The dispenses in operation (b) can comprise streams. The control can comprise closed loop or open loop control. The increase can comprise using feedback or feedforward control. The control can comprise using a simulation. The simulation can comprise a temperature or mechanical simulation of the 3D printing. The simulation may comprise thermo-mechanical simulation. The simulation can comprise a material property of the requested 3D-object. The thermo-mechanical simulation can comprise elastic or plastic simulation. The control can comprise using a graphical processing unit (GPU), system-on-chip (SOC), application specific integrated circuit (ASIC), application specific instruction-set processor (ASIPs), programmable logic device (PLD), or field programmable gate array (FPGA). The method may further comprise a cyclonic separator to separate any excess of pre-transformed material that did not transform to form the three-dimensional object. The transformed material can comprise a melt pool. The system may further comprise repeating at least operation (b) after operation (c). Below the portion may be along a direction perpendicularly towards the platform. The bottom skin layer may be below the portion along a direction perpendicular to the platform. The at least one characteristic can comprise power density, cross sectional area, trajectory, speed, focus, energy profile, dwell time, intermission time, or fluence of the energy beam.

In another aspect, a system for printing a three-dimensional object comprises: a container configured to support a material bed comprising an exposed surface, a pre-transformed material, and a bottom skin layer of hardened material, wherein at least a fraction of the pre-transformed material is disposed above the bottom skin layer, wherein the bottom skin layer is part of the three-dimensional object; an energy source configured to generate an energy beam that transforms at least a portion of the at least a fraction of the pre-transformed material to a transformed material as part of the three-dimensional object, wherein the energy source is disposed adjacent to the material bed; and one or more controllers operatively coupled to the material bed and the energy source, which one or more controllers are individually or collectively programmed to: (I) transform the at least a portion of the pre-transformed material to a first portion of transformed material, and (II) control at least one characteristic of the energy beam such that a temperature of the three-dimensional object at the bottom skin layer below the first portion is at least one of (i) above the solidus temperature and below the liquidus temperature of the bottom skin layer material, and (ii) at temperature at which a material in the bottom skin layer plastically yields.

Below the first portion can be along a direction perpendicular to the average plane of the bottom skin layer. Below the first portion may be towards the bottom skin layer. Control can comprise altering at least one characteristic of the energy beam. The at least one characteristic of the energy beam can comprise power density, cross sectional area, trajectory, speed, focus, energy profile, dwell time, intermission time, or fluence of the energy beam. Disposed in operation (a) can comprise dispensing a layer of the pre-transformed material by removing an excess of pre-transformed material from the exposed surface of the material bed using a gas flow and cyclonically separating the pre-transformed material from the gas flow. During the 3D printing, the bottom skin layer can be the first formed layer of (i) the three-dimensional object, (ii) a hanging structure of the three-dimensional object, or (iii) a cavity ceiling of the three-dimensional object. The bottom skin layer may have a sphere of radius XY on a bottom surface of the bottom skin layer, wherein an acute angle between the straight line XY and the direction normal to the average layering plane of the bottom skin layer is in the range from about 45 degrees to about 90 degrees. During the 3D printing the first formed layer of the three-dimensional object may comprise auxiliary support that are spaced apart by 2 millimeters or more. The hanging structure of the three-dimensional object may have at least one side that is not connected to the three-dimensional object or to the platform. The hanging structure may comprise auxiliary supports that are spaced apart by 2 millimeters or more. The cavity ceiling of the three-dimensional object may have at least one side that is not connected to the three-dimensional object or to the platform. The hanging structure may comprise auxiliary supports that are spaced apart by 2 millimeters or more.

The energy source can comprise an electromagnetic beam or a particle beam. The electromagnetic beam can comprise a laser. The particle beam can comprise an electron beam. The pre-transformed material can comprise a solid, semi solid, or liquid material. The pre-transformed material can comprise a particulate material. The particulate material can comprise powder or vesicles. The powder can comprise solid material. The pre-transformed material may comprise a particulate material formed of at least one member selected from the group consisting of elemental metal, metal alloy, ceramic, an allotrope of elemental carbon, polymer, and resin. The pre-transformed material may comprise a particulate material formed of at least one member selected from the group consisting of elemental metal, metal alloy, ceramic, and an allotrope of elemental carbon. The pre-transformed material can comprise a polymer or resin. The pre-transformed material and the bottom skin layer can comprise (e.g., substantially) the same material. The pre-transformed material and the bottom skin layer can comprise different materials. The three-dimensional object can comprise functionally graded materials.

In another aspect, a method for printing a three-dimensional object comprises: (a) providing a material bed comprising an exposed surface and a pre-transformed material; (b) planarizing the exposed surface by displacing with a first force, the pre-transformed material from the exposed surface into an internal compartment of a material remover; (c) removing the pre-transformed material from the internal compartment with a second force; and (d) using an energy beam to irradiate at least a portion of the exposed surface to transform the pre-transformed material at the at least the portion of the exposed surface into a transformed material, wherein the transformed material is at least a portion of the three-dimensional object.

Displacing the pre-transformed material can comprise attracting the pre-transformed material. Removing the pretransformed material can comprise pushing or attracting the pre-transformed material. The first force can be different from the second force in at least one of force type, force direction, and force amount. Removing can be after the planarizing in operation (b). Removing can be after the using in operation (d). Removing in operation (d) may be contemporaneous with the using in operation (d). A direction of the first force may be substantially perpendicular to a direction of the second force. The second force may be directed (e.g., may run) perpendicular to first force. The pre-transformed material may accumulate in the internal compartment of the material remover (e.g., material removal mechanism). Accumulate may be during the removing in operation (c). While removing the pre-transformed material, the pre-transformed material may accumulate in the internal compartment of the material remover. Accumulate can comprise separating the pre-transformed material from a gas flow that is formed during the displacing (e.g., attracting) operation. Separating can comprise cyclonically separating. The direction of the first force may be substantially perpendicular to the direction of the second force. The first force may be generated by a first force source. The second force may be generated by a second force source. The first force source may be connected to the internal compartment through a first opening. The second force source may be connected to the internal compartment through a second opening. The first opening may be different than the second opening. The first opening may be the same as the second opening. At least one of the first opening and the second opening may comprise a valve. At least one of the first force and second force may be regulated by the valve. The pre-transformed material that is removed in operation (c) may be treated. Treated may comprise separated and/or reconditioned. The pre-transformed material that is removed in (c) may be recycled (e.g., to be used to form the material bed). The method may further comprise, subsequent to operation (b) or contemporaneous with operation (b), recycling the pre-transformed material for use in the material bed. The treatment and/or recycling may be (e.g., continuous) during the 3D printing. The pre-transformed material may be recycled during the 3D printing.

In another aspect, a method for printing a three-dimensional object comprises: (a) providing a material bed comprising an exposed surface and a pre-transformed material; (b) planarizing the exposed surface by displacing the pre-transformed material from the exposed surface into an internal compartment of a material remover, which pre-transformed material accumulates within the internal compartment while planarizing the exposed surface; and (c) using an energy beam to irradiate at least a portion of the exposed surface to transform the pre-transformed material at the at least the portion of the exposed surface into a transformed material, wherein the transformed material is at least a portion of the three-dimensional object.

The accumulation of pre-transformed material can comprise separating the pre-transformed material from a gas flow that is formed while displacing. The pre-transformed material may accumulate at least in part by separating the pre-transformed material from a gas flow that is formed while displacing the pre-transformed material from the exposed surface. The pre-transformed material may be cyclonically separated from the gas flow. Displacing the pre-transformed material may comprise attracting the pre-transformed material (e.g., using electrostatic force, magnetic force, or gas flow). The gas flow may be pressurized gas or vacuum. For example, the gas flow may be due to a vacuum source. The material remover may be disconnected from (e.g., separated from, and/or does not contact) the exposed surface at least while planarizing the exposed surface. The material remover can be separated from the exposed surface by a gaseous gap (e.g., any gap disclosed herein). The displacing can comprise a gas flow. The pre-transformed material may separate from the gas flow in the internal compartment (e.g., as it accumulates within the internal compartment). While planarizing the exposed surface can comprise while planarizing the exposed surface of the material bed one or more times (e.g., one or more planarization runs). For example, while planarizing the exposed surface can comprise while planarizing one exposed surface of the material bed (e.g., a single planarization run of the material remover). The separation of the pre-transformed material from the gas flow can comprise cyclonic separation.

In another aspect, a system for printing a three-dimensional object comprises: container configured to support a material bed comprising an exposed surface and a pre-transformed material; a first force source configured to generate a first force that displaces the pre-transformed material in a direction away from the gravitational center, wherein the first force source is disposed adjacent to the material bed; a second force source configured to generate a second force that maneuvers the pre-transformed material, wherein the second force source is disposed adjacent to the material bed; a material remover comprising an internal compartment, which material remover is configured to displace (e.g., facilitates displacing) a portion of the exposed surface to planarize the exposed surface of the material bed by using the first force, wherein the material remover is operatively coupled to the first force source and to the second force source, wherein the material remover is disposed adjacent to the material bed; an energy source configured to generate an energy beam that transforms at least a portion of the exposed surface to a transformed material as part of the three-dimensional object, wherein the energy source is disposed adjacent to the material bed; and one or more controllers operatively coupled to the material bed, the material remover, the first force source, the second force source, and the energy source, which one or more controllers direct (i) the material remover to planarize the exposed surface by displacing at least the pre-transformed material from the exposed surface to the internal compartment by using the first force, and (ii) the material remover to maneuver the pre-transformed material away from the internal compartment by using the second force, and (iii) the energy source to transform at least a portion of the pre-transformed material with the energy beam to a transformed material as part of the three-dimensional object.

Planarize in operation (i) can comprise additionally displacing a debris from the exposed surface to the internal compartment by using the first force. The debris can comprise a transformed material that is not part of the three-dimensional object. Away from the internal compartment can comprise away from the material remover. The first force may be different from the second force. The first force can be different from the second force in a force type or a force amount. For example, the first force may be vacuum and the second force may be compressed air. The first force source can be different from the second force source. Maneuvering can be in a direction that is (e.g., substantially) perpendicular to the attracting. The first force source can comprise electronic force, magnetic force, pressurized gas, or vacuum. The second force source can comprise electronic force, magnetic force, pressurized gas, or vacuum. Displacing can comprise attracting. Maneuver can comprise repel or push. Operation (ii) may occur after planarizing the material bed in operation (i) to form a planar exposed surface of the material bed.

In some embodiments, the one or more controllers are a plurality of controllers, and wherein at least two operations (e.g., of the controller, the apparatus, the method, or the system) are control with the same controller. For example, the one or more controllers may be a plurality of controllers, and wherein at least two of operations (i), (ii), and (iii) are control with the same controller. In some embodiments, the one or more controllers are a plurality of controllers, wherein at least two operations (e.g., of the controller, the apparatus, the method, or the system) are controlled by different controllers (e.g., that are operatively coupled). For example, the one or more controllers may be a plurality of controllers, and wherein at least two operations (i), (ii), and (iii) are control with different controllers (e.g., that are operatively coupled). In some embodiments, the one or more controllers directs at least one of a plurality of operations (e.g., of the controller, the apparatus, the method, or the system) in real time during the 3D printing. In some embodiments, the one or more controllers directs at least one of a plurality of operations (e.g., of the controller, the apparatus, the method, or the system) in real time during the 3D printing. For example, the one or more controllers directs at least one of operations (i), (ii), and (iii) in real time during the 3D printing.

In another aspect, a system for printing a three-dimensional object comprises: a container configured to support a material bed comprising an exposed surface and a pre-transformed material; a material remover comprising an internal compartment, which material remover is configured to displace a portion of the pre-transformed material from the exposed surface to planarize the exposed surface of the material bed, wherein the material remover is disposed adjacent to the material bed; an energy source that is configured to generate an energy beam that transforms at least a portion of the exposed surface to a transformed material as part of the three-dimensional object, wherein the energy source is disposed adjacent to the material bed; and one or more controllers operatively coupled to the material bed, the material remover, and the energy source, which one or more controllers direct (i) the material remover to planarize the exposed surface by displacing at least the pre-transformed material from the exposed surface to accumulate in the internal compartment, and (ii) the energy source to transform at least a portion of the pre-transformed material with the energy beam to a transformed material as part of the three-dimensional object.

Accumulate may be during the planarize to form a planar exposed surface of the material bed. Planarize in (i) can comprise additionally displacing a debris from the exposed surface to the internal compartment by using the first force. The debris can comprise a transformed material that is not part of the three-dimensional object.

In another aspect, a method for 3D printing comprises: (a) providing a material bed within an enclosure; and (b) irradiating a tiling energy flux onto an exposed surface of the material bed in a first position for a first time-period to form a first heated tile, which tiling energy flux is substantially uniform within a footprint of the first heated tile, wherein the tiling energy flux is substantially stationary within the first time-period, and wherein at least one characteristic of the tiling energy flux is determined using a measurement within (e.g., of) the first heated tile.

In another aspect, a method for printing a three-dimensional object comprises: (a) providing a material bed comprising an exposed surface and a pre-transformed material; (b) planarizing the exposed surface by attracting the pre-transformed material from the exposed surface into an internal compartment of a material remover through a nozzle of the material remover, which nozzle comprises an adjustable volume; and (c) using an energy beam to transform at least a portion of the exposed surface to a transformed material, wherein the transformed material as at least a portion of the three-dimensional object.

Planarizing may be in the absence of contact between the material remover and the exposed surface of the material bed. The pre-transformed material may accumulate in the internal compartment. Accumulate can comprise separating the pre-transformed material from a gas flow that is formed during the attracting. The separating can be cyclonically separating. Attracting can comprise using an electrostatic force, magnetic force, or gas flow. The pre-transformed material may be attracted using an electrostatic force, magnetic force, or gas flow. The gas flow can comprise vacuum or compressed gas. The adjustable volume can be the internal volume of the nozzle. The nozzle can comprise at least one adjustable part. The part can be a mechanical part. The nozzle can comprise at least two, three or four adjustable parts. The nozzle can comprise a Venturi nozzle. The adjustable volume of the nozzle can be asymmetric. The method may further comprise adjusting the nozzle to regulate the volume (e.g., area and/or depth) from which the pre-transformed material is attracted from the material bed into the nozzle. The method may further comprise adjusting the nozzle to regulate a rate at which the pre-transformed material is attracted from the material bed into the nozzle. The method may further comprise adjusting the nozzle to regulate the fidelity at which the exposed surface is planarized.

In another aspect, a method for printing a three-dimensional object comprises: (a) providing a material bed comprising an exposed surface and a pre-transformed material; (b) planarizing the exposed surface by attracting the pre-transformed material from the exposed surface through a nozzle of a material remover, which attracting comprises using an attractive force that is substantially equal along a horizontal cross-section of the nozzle, which nozzle spans at least a portion of a width of the material bed that is perpendicular to the direction of movement of the material remover; and (c) using an energy beam to transform the at least the portion of the width of the material bed into a transformed material, wherein the transformed material is at least a portion of the three-dimensional object.

The at least a portion may be greater than 50%, 80%, 90%, or 100% of the width of the material bed. For example, the at least the portion of the width of the material bed may be greater than 50% of the width of the material bed. The pre-transformed material that is attracted through the nozzle may accumulate in an internal compartment of the material remover. Accumulate can comprise separate the pre-transformed material from a gas flow that may be formed during the attracting. The pre-transformed material may accumulate in the internal compartment at least in part by separating the pre-transformed material from a gas flow that is formed upon attracting the pre-transformed material from the exposed surface through a nozzle of a material remover. The separation may be cyclonic separation. In some embodiments, a vertical cross sectional area of the internal compartment is greater by at least about three times, ten times, thirty times, or fifty times a horizontal cross sectional area of the opening of the nozzle. For example, a vertical cross sectional area of the internal compartment is greater by at least three times the horizontal cross sectional area of the nozzle opening. The method may further comprise controlling the attractive force to regulate the volume from which the pre-transformed material is attracted from the material bed into the nozzle. The method may further comprise controlling the attractive force to regulate the rate at which the pre-transformed material is attracted from the material bed into the nozzle. The method may further comprise controlling the attractive force to regulate the fidelity at which the material remover planarizes the exposed surface. The method may further comprise controlling the translational speed of the material remover across the material bed to regulate the fidelity at which the material remover planarizes the exposed surface.

In another aspect, A method for printing a three-dimensional object, comprising: (a) providing a material bed comprising an exposed surface and a pre-transformed material; (b) planarizing the exposed surface by displacing (e.g., attracting) the pre-transformed material from the exposed surface into an internal compartment of a material remover, which internal compartment has a narrowing horizontal cross-section; and (c) using an energy beam to irradiate at least a portion of the exposed surface to transform the pre-transformed material at the at least the portion of the exposed surface into a transformed material, wherein the transformed material is at least a portion of the three-dimensional object.

The narrowing horizontal cross section may have a long axis that is (e.g., substantially) perpendicular to a direction of movement of the material remover (e.g., along the exposed surface). The pre-transformed material may accumulate in the internal compartment of the material remover. The material remover may comprise an opening that is directed towards the exposed surface of the material bed (e.g., and toward a platform on which the material bed is disposed). The opening may be the opening through which the pre-transformed material enters the material removal (e.g., and into the internal compartment thereof). Accumulate can comprise separating the pre-transformed material from a gas flow that may be formed during the attracting. Separating may comprise cyclonically separating. The material bed can be disposed above a platform. The narrowing horizontal cross-section may be (e.g., substantially) parallel to the platform. The internal compartment may comprise a narrowing (e.g., conical) shape (e.g., having its long axis parallel to the platform). The attracting may be from a position in the larger cross sectional vertical face of the cone (e.g., base of the cone). For example, the attracting may be from a position in the larger circular cross section of the cone (e.g., base of the cone). The narrowing horizontal cross section may have an axis that is (e.g., substantially) perpendicular to the direction of movement. The pre-transformed material is displaced using a force that is distributed (e.g., substantially) homogenously along the horizontal cross section (e.g., wherein substantially is relative to the operation of the material remover, for example, relative to the resulting planarity of the exposed surface). The planarizing may form a (e.g., substantially) planar exposed surface of the material bed within a height error range of at most about 500 micrometers, 300 micrometers, 200 micrometers, 150 micrometers, 100 micrometers, 50 micrometers, 30 micrometers, or 20 micrometers. For example, the planarizing may form a (e.g., substantially) planar exposed surface of the material bed within a height error range of at most about 200 micrometers.

In another aspect, a system for printing a three-dimensional object comprises: a container configured to support a material bed comprising an exposed surface and a pre-transformed material; a material remover comprising a nozzle through which pre-transformed material is displaced (e.g., attracted) away from the exposed surface, which nozzle comprises an adjustable volume, wherein the material remover is disposed adjacent to the material bed; an energy source configured to project an energy beam that transforms a portion of the pre-transformed material into a transformed material as part of the three-dimensional object, wherein the energy source is disposed adjacent to the material bed; and one or more controllers operatively coupled to the material bed, the material remover, and the energy source, which one or more controllers direct (i) the material remover to adjust the volume of the nozzle, (ii) the material remover to planarize the exposed surface, and (iii) the energy source to transform at least a portion of the pre-transformed material with the energy beam to a transformed material as part of the three-dimensional object.

The one or more controllers may be a plurality of controllers. At least two of operations (i), (ii), and (iii) may be controlled by the same controller. At least two of operations (i), (ii), and (iii) may be controlled by different controllers (e.g., that are operatively coupled). The one or more controllers may direct at least one of operations (i), (ii), and (iii) in real time during the 3D printing. Adjust may be during the 3D printing. Adjust may be before the 3D printing.

In another aspect, a system for printing a three-dimensional object comprises: a container configured to support a material bed comprising an exposed surface and a pre-transformed material; a force source that is configured to generate an attractive force that attracts the pre-transformed material, wherein the force source is disposed adjacent to the material bed; a material remover comprising a nozzle that spans at least a portion of the width of the material bed that is perpendicular to the direction of movement of the material remover, which material remover planarizes the exposed surface by attracting a portion of the pre-transformed material; an energy source that is configured to generate an energy beam that transforms at least a portion of the exposed surface to a transformed material as part of the three-dimensional object, wherein the energy source is disposed adjacent to the material bed; and one or more controllers operatively coupled to the material bed, the material remover, the force source, and the energy source, which one or more controllers direct (i) the material remover to planarize the exposed surface by attracting the pre-transformed material from the exposed surface through the nozzle, which attracting comprises using an attractive force that is substantially equal along the horizontal cross section of the nozzle entrance opening through which the pre-transformed material enters the material-removal mechanism, and (ii) the energy source to transform at least a portion of the pre-transformed material with the energy beam to a transformed material as part of the three-dimensional object.

The one or more controllers may be one controller. The one or more controllers may be a plurality of controllers. Each of operations (i), and (ii), may be controlled by different controllers (e.g., that are operatively coupled).

In another aspect, a system for printing a three-dimensional object comprises: a container configured to enclose a material bed comprising an exposed surface and a pre-transformed material; a material remover comprising an internal compartment having a narrowing horizontal cross section, which material remover is configured to attract a portion of the pre-transformed material from the exposed surface to planarize the exposed surface of the material bed, wherein the material remover is disposed adjacent to the material bed; an energy source configured to generate an energy beam that transforms at least a portion of the exposed surface to a transformed material as part of the three-dimensional object, wherein the energy source is disposed adjacent to the material bed; and one or more controllers operatively coupled to the material bed, the material remover, and the energy source, which one or more controllers direct (i) the material remover to planarize the exposed surface by attracting the pre-transformed material from the exposed surface through the nozzle, which attracting comprises using an attractive force that is substantially equal along the horizontal cross section of the nozzle, and (ii) the energy source to transform at least a portion of the pre-transformed material with the energy beam to a transformed material as part of the three-dimensional object.

The one or more controllers may be one controller. The one or more controllers may be a plurality of controllers. Each of operations (i), and (ii), may be controlled by different controllers (e.g. that are operatively coupled).

In another aspect, a method for printing a three-dimensional object comprises: providing a material bed comprising a pre-transformed material above a platform; generating a layer of transformed material as part of the three-dimensional object, which generating comprises irradiating a first portion of the material bed with a first energy beam to transform the pre-transformed material in the first portion into a first transformed material as part of the three-dimensional object, which first energy beam travels along a first trajectory; and controlling at least one of (i) a temperature and (ii) a shape of the first transformed material, wherein said controlling is in real time (e.g., during formation of the first transformed material).

The first transformed material can comprise a melt pool. The method may further comprise irradiating a second portion of the material bed with a second energy beam to transform the pre-transformed material into a second transformed material as part of the three-dimensional object. The second energy beam may travel along a second trajectory that can be different from the first trajectory. The second energy beam can be different from the first energy beam by at least one characteristics. The at least one characteristics can comprise power density, cross sectional area, trajectory, speed, focus, energy profile, dwell time, intermission time, or fluence of the energy beam. Controlling may further comprise controlling at least one of (i) a temperature and (ii) a shape, of the first transformed material. The control can be in real time (e.g., during formation of the second transformed material). The second transformed material can be a melt pool. The providing may comprise dispensing a layer of the pre-transformed material by removing an excess of pre-transformed material from the exposed surface of the material bed using a gas flow (e.g., and cyclonically separating the pre-transformed material from the gas flow).

In another aspect, a system for printing a three-dimensional object comprises: a container configured to enclose material bed comprising an exposed surface and a pre-transformed material; a first energy source configured to generate a first energy beam that transforms at least a portion of the material bed to a transformed material as part of the three-dimensional object, wherein the first energy source is disposed adjacent to the material bed; and one or more controllers operatively coupled to the material bed, and the first energy source, which one or more controllers (e.g., individually or collectively) (I) direct the first energy beam to generate a first transformed material from a first portion of the material bed, which first energy beam travels along a first trajectory, and (II) control at least one of (i) a temperature and (ii) a shape, of the first transformed material, which control is in real time (e.g., during formation of the first transformed material to form the three-dimensional object).

The first transformed material can comprise a first melt pool. The system may further comprise a second energy source generating a second energy beam that transforms at least a portion of the material bed to a transformed material as part of the three-dimensional object. The second energy source can be disposed adjacent to the material bed. The one or more controllers may further be operatively coupled to the second energy source. The one or more controllers may direct the second energy beam to generate a second transformed material from a second portion of the material bed. The second portion of the material bed can be different from the first portion of the material bed. The second energy beam may travel along a second trajectory. The second trajectory can be different from the first trajectory. The one or more controllers may control at least one of (i) a temperature and (ii) a shape, of the second transformed material. The control can be in real time (e.g., during formation of the second transformed material to form the 3D object). The second energy beam can be different from the first energy beam by at least one characteristic. The at least one characteristic can comprise power density, cross sectional area, trajectory, speed, focus, energy profile, dwell time, intermission time, or fluence of the energy beam. The second transformed material can comprise a second melt pool (e.g., that is different from the first melt pool).

In another aspect, a method for 3D printing comprises: (a) providing a material bed within an enclosure; and (b) irradiating a tiling energy flux onto an exposed surface of the material bed in a first position for a first time period to form a first heated tile, which tiling energy flux is substantially uniform within a footprint of the first heated tile, wherein the tiling energy flux is substantially stationary within the first time period, and wherein at least one characteristic of the tiling energy flux is determined using a measurement within (e.g., of) the first heated tile.

The at least one characteristic can comprise wavelength, power, amplitude, trajectory, footprint, intensity, energy, fluence, Andrew Number, hatch spacing, scan speed, or charge. The measurement can be a temperature measurement. The method may further comprise: (c) translating the tiling energy flux to a second position on the exposed surface of the material bed; and (d) irradiating the tiling energy flux for a second time-period to form a second heated tile, wherein the tiling energy flux is substantially stationary within the second time-period. The tiling energy flux may be substantially uniform within (e.g., within the area of) the second heated tile. The material bed may comprise one or more layers of material. The material bed be may be a powder bed. The material bed may comprise particulate material that is selected from the group consisting of an elemental metal, metal alloy, ceramic, and an allotrope of elemental carbon. A shape of the first heated tile may be (e.g., substantially) identical to a shape of the second heated tile. A shape of the first heated tile may be different from a shape of the second heated tile. The first heated tile may border the second heated tile. The second heated tile may at least partially overlap the first heated tile. The second heated tile may be separated from the first heated tile by a gap. The irradiating can comprise heating. The heating may substantially exclude transforming. The heating may comprise transforming. The method may further comprise transforming at least a fraction of a material within the first heated tile. The method may further comprise transforming at least a fraction of a material within the second heated tile. Transforming may comprise fusing. Fusing may comprise melting or sintering. The exposed surface of the material bed may comprise an exposed surface of a 3D object that includes the first position and the second position. The method may further comprise cooling the material bed using a heat sink disposed above the exposed surface of the material bed. The cooling may be before, during, and/or after step (b). The cooling may be before, during, and/or after step (c). The energy flux may be substantially off (e.g., shut down) between the first position and the second position. The energy flux may be substantially off at least when translating between the first position and the second position. The method may further comprise irradiating at least a portion of the exposed surface of the material bed using a scanning energy beam that is different from the tiling energy flux. The at least a portion of the exposed surface may be disposed within the exposed surface of a 3D object (e.g., embedded within the material bed). The velocity (e.g., speed) of the scanning energy beam can be at least 50 mm/sec. The exposure time (e.g., dwell time) of the tiling energy beam may be at least one millisecond. The power per unit area (e.g., power density) of the tiling energy beam may be at most 1000 Watt per millimeter squared. The power per unit area of the tiling energy beam may be at most 10000 Watt per millimeter squared. The fundamental length scale (abbreviated herein as "FLS") of a cross section of the tiling energy beam may be at least 0.3 millimeter. The FLS (e.g., diameter) of a cross section of the scanning energy beam is at most 250 micrometers. FLS may be a diameter, spherical equivalent diameter, diameter of a bounding circle, or the largest of: height, width, and length. The method may further comprise controlling a rate at which the first heated tile cools down. The controlling can comprise imaging the first heated tile. The imaging can comprise analyzing a spectrum. The imaging can comprise image processing. The controlling can comprise sensing the temperature of the first heated tile. The sensing can comprise imaging. The sensing can comprise analyzing a spectrum. The controlling can comprise using feedback control. The controlling can comprise using open loop control.

In another aspect, an apparatus for 3D printing comprises: (a) an enclosure comprising a material bed; and (b) a tiling energy source that generates a tiling energy flux that irradiates an exposed surface of the material bed to form a heated tile, which tiling energy flux is substantially uniform within the first heated tile; and (c) a controller operatively coupled to the enclosure and to the tiling energy source and directs the tiling energy beam to irradiate a first position of the exposed surface for a first time-period to form a first heated tile, wherein the tiling energy flux is substantially stationary within the first time-period, wherein at least one characteristic of the tiling energy flux is determined using a measurement of the first heated tile.

In another aspect, a method for 3D printing comprises: (a) providing a material bed within an enclosure; (b) irradiating a tiling energy flux onto an exposed surface of the material bed in a first position for a first time-period to form a first heated tile, wherein the irradiating comprises altering the power density of the tiling energy flux during the first time-period, and wherein the spatial distribution of the power density is substantially uniform within a footprint of the tile (e.g., on the exposed surface).

The irradiating may be related to a temperature measurement within (e.g., of) the first heated tile. The method can further comprise translating the tiling energy flux to a second position on the exposed surface of the material bed; and irradiating the tiling energy flux for a second time-period to form a second heated tile with the tiling energy flux, which tiling energy flux has a power density during the second time-period that is substantially uniform within an area of the second heated tile. The altering can comprise increasing the power density followed by decreasing the power density. In some embodiments, at least one of the increasing and decreasing is controlled. The tiling energy flux can be substantially stationary within the first time-period. At least one characteristic of the tiling energy flux may be determined using a measurement of the first heated tile.

In another aspect, an apparatus for 3D printing comprises: (a) an enclosure comprising a material bed; and (b) a tiling energy source that generates a tiling energy flux that irradiates an exposed surface of the material bed for a first time-period to form a heated tile; and (c) a controller operatively coupled to the enclosure and to the tiling energy source and directs the tiling energy beam to irradiate a first position of the exposed surface for a first time-period to form a first heated tile, wherein the irradiate comprises alter the power density of the tiling energy flux during the first time-period, and wherein the spatial distribution of the power density is substantially uniform within a footprint of the tile (e.g., on the exposed surface).

In another aspect, a method for 3D printing comprises: (a) providing a material bed within an enclosure; (b) irradiating a tiling energy flux to portion of an exposed surface of the material bed in a first position for a first time-period to form a first heated tile, wherein a power density of the tiling energy flux during the first time-period is substantially uniform within an area of the first heated tile on the exposed surface of the material bed, which forming comprises: (i) increasing a power density of the tiling energy flux monotonously across an area of the first heated tile up to a power density peak; and (ii) decreasing the power density of the tiling energy flux monotonously across the area of the first heated tile, wherein the time at which the power density peak is reached for two points within the area of the first heated tile is substantially simultaneous.

The area can be a cross section of the tile in the exposed surface of the material bed. The at least one of the increasing and the decreasing may be related to a temperature measurement within the first heated tile. Within the first heated tile may comprise one or more positions within the first heated tile. Within the first tile may be of the first heated tile. The method can further comprise translating the tiling energy flux to a second position on the exposed surface of the material bed; and irradiating the tiling energy flux for a second time-period to form a second heated tile with the tiling energy flux, which tiling energy flux has a power density during the second time-period that is substantially uniform within an area of the second heated tile.

In another aspect, an apparatus for 3D printing comprises: (a) an enclosure comprising a material bed; and (b) a tiling energy source that generates a tiling energy flux that irradiates an exposed surface of the material bed for a first time-period to form a heated tile, wherein a power density of the tiling energy flux during the first time-period is substantially uniform within an area of a first heated tile on an exposed surface of the material bed; and (c) a controller operatively coupled to the enclosure and to the tiling energy source and directs the tiling energy beam to irradiate a first position in the exposed surface of the material be for a first time-period to form the heated tile, which form comprises: (i) increase a power density of the tiling energy flux monotonously across an area of the first heated tile up to a power density peak; and (ii) decrease the power density of the tiling energy flux monotonously across the area of the first heated tile, wherein the time at which the power density peak is reached for two points within the area of the first heated tile is substantially simultaneous.

In another aspect, a method for 3D printing comprises: (a) providing a material bed within an enclosure; (b) transforming at least a portion of the material bed to form a transformed material by forming one or more successive melt pools, which transformed material subsequently hardens to form a hardened material as at least a portion of the 3D object; and (c) controlling the one or more melt-pools in real-time.

The transforming may be related to a temperature measurement within (e.g., at various position within, or of) the first heated tile. Controlling the one or more successive melt-pools can comprise controlling the volume of the one or more successive melt-pools. Controlling the one or more successive melt-pools can comprise controlling the average fundamental length scale of the one or more successive melt-pools. Controlling the one or more successive melt-pools can comprise controlling the microstructure of the one or more successive melt-pools. Controlling the one or more successive melt-pools can comprise controlling the cooling rate of the one or more successive melt-pools. Controlling the one or more successive melt-pools can comprise controlling the heating rate of the one or more successive melt-pools. Controlling the one or more successive melt-pools can comprise controlling the temperature variation within the one or more successive melt-pools. Controlling the one or more successive melt-pools can comprise controlling the overall shape of the one or more successive melt-pools. Controlling the one or more successive melt-pools can comprise controlling the overall shape of a cross section of the one or more successive melt-pools. The cross section can comprise a vertical cross section. The cross section can comprise a horizontal cross section. Controlling can comprise sensing the temperature of the one or more successive melt-pools. Sensing can comprise imaging (e.g., using a camera). Controlling can comprise evaluating the volume of the melt pool based on the sensing. Controlling can comprise regulating by a controller.

In another aspect, a method for generating a three-dimensional object by tiling comprises: a) depositing a layer of pre-transformed material to form a material bed; b) providing a first energy beam to a first portion of the layer of pre-transformed material at a first location to transform the pre-transformed material at the first portion to form a first tile of transformed material; c) moving the first energy beam to a second location at the layer of pre-transformed material, wherein the moving is at a speed of at most about 500 millimeters per second; and d) providing the first energy beam to a second portion of the layer of pre-transformed material at the second location to transform the pre-transformed material at the second portion to form a second tile of transformed material; wherein the first tile of transformed material and second tile of transformed material harden to form at least a portion of the three-dimensional object.

The moving can be at a speed of at most about 200 millimeters per second. The moving can be at a speed of at most about 100 millimeters per second. The moving can be at a speed of at most about 50 millimeters per second. The moving can be at a speed of at most about 30 millimeters per second. The first energy beam may have a power density of at most about 5000 watts per millimeter square. The first energy beam may have a power density of at most about 3000 watts per millimeter square. The first energy beam may have a power density of at most about 1500 watts per millimeter square. The first energy beam may have a diameter of at least about 200 micrometers. The first energy beam may have a diameter of at least about 300 micrometers. The first energy beam may have a diameter of at least about 400 micrometers.

Another aspect of the present disclosure provides a system for effectuating the methods disclosed herein.

Another aspect of the present disclosure provides an apparatus for effectuating the methods disclosed herein. The apparatus can be any of the system described above that omit the one or more controllers. The apparatus can be any of the system described above that include (e.g., only include) the one or more controllers.

Another aspect of the present disclosure provides an apparatus comprising a controller that directs effectuating one or more steps in the method disclosed herein, wherein the controller is operatively coupled to the apparatuses, systems, and/or mechanisms that it controls to effectuate the method.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods above or elsewhere herein.

Another aspect of the present disclosure provides an apparatus for printing one or more 3D objects comprises a controller that is programmed to direct a mechanism used in a 3D printing methodology to implement (e.g., effectuate) any of the method disclosed herein, wherein the controller is operatively coupled to the mechanism.

Another aspect of the present disclosure provides a computer software product, comprising a non-transitory computer-readable medium in which program instructions are stored, which instructions, when read by a computer, cause the computer to direct a mechanism used in the 3D printing process to implement (e.g., effectuate) any of the method disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

FIGS. 12A-12C schematically illustrate various top views of portions of 3D objects;

FIG. 13 schematically illustrates a side view of a layer dispensing mechanism and various components thereof;

FIGS. 21A-21D show schematic top views of 3D objects

FIGS. 29A-29E show various schematic bottom views of powder removal mechanisms;

FIG. 30 shows top views of 3D objects;

FIGS. 35A-35B schematically illustrate steps in forming a 3D object;

FIGS. 43A-43B show various views of a material removal mechanisms; and

FIGS. 44A-44F show various views of material removal mechanism parts.

Figure 1:
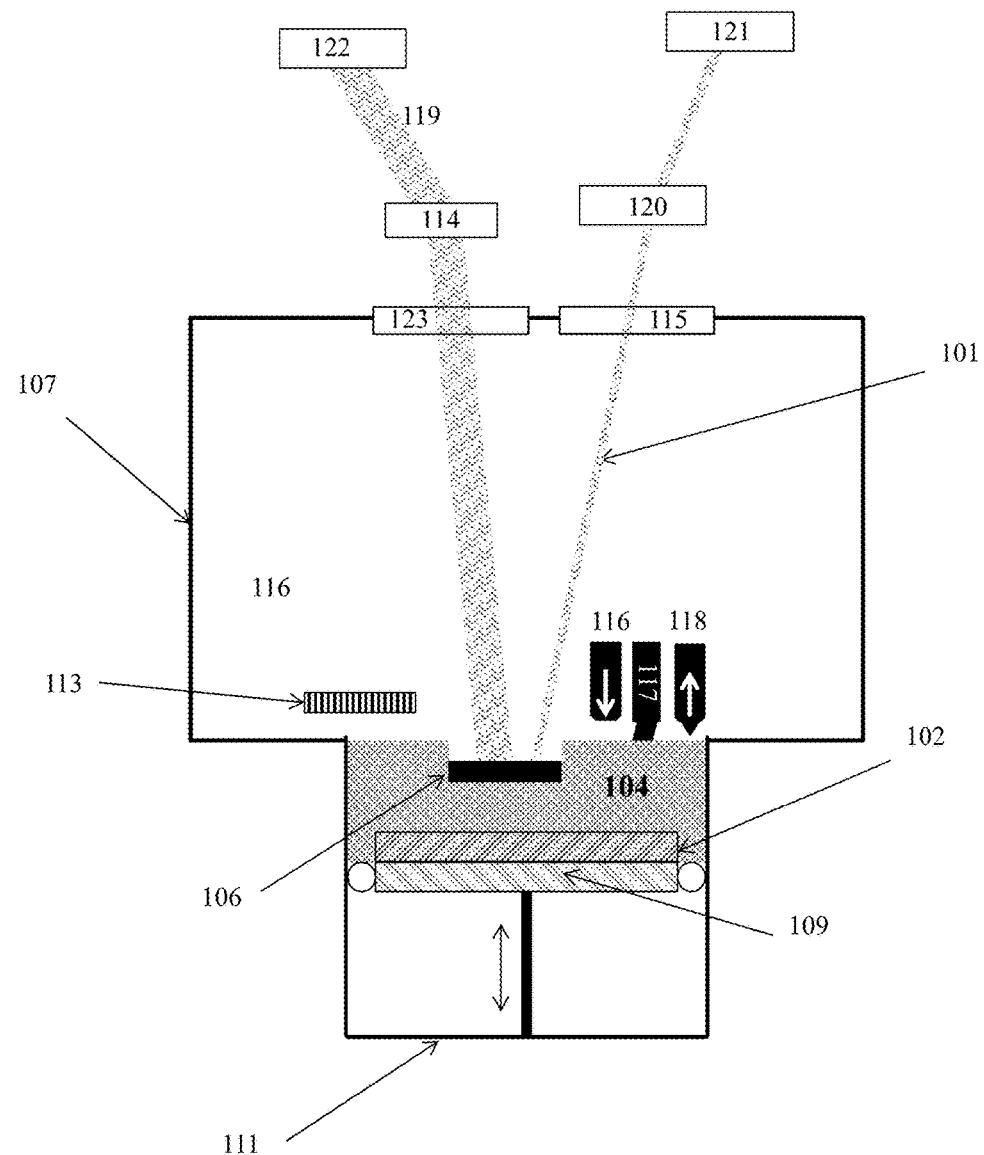
FIG. 1 shows a schematic side view of a 3D printing system and apparatuses.
Figure 2:
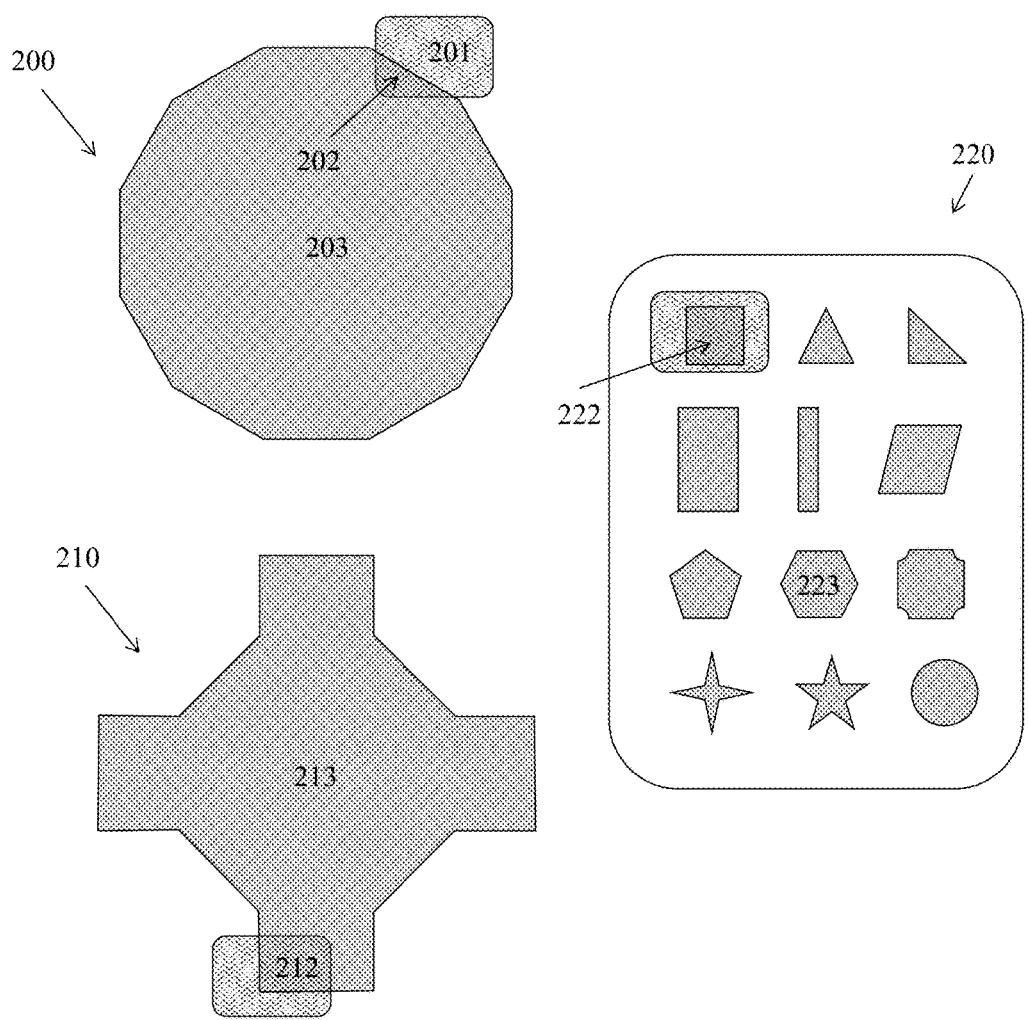
FIG. 2 illustrates a top view of various apertures.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an" and "the" are not intended to refer to only a singular entity, but include the general class of which a specific example may be used for illustration. The terminology herein is used to describe specific embodiments of the invention, but their usage does not delimit the invention. When ranges are mentioned, the ranges are meant to be inclusive, unless otherwise specified. For example, a range between value 1 and value 2 is meant to be inclusive and include value 1 and value 2. The inclusive range will span any value from about value 1 to about value 2.

The term "adjacent" or "adjacent to," as used herein, includes 'next to', 'adjoining', 'in contact with,' and 'in proximity to.' In some instances, adjacent to may be 'above' or 'below.'

The term "between" as used herein is meant to be inclusive unless otherwise specified. For example, between X and Y is understood herein to mean from X to Y.

The term "operatively coupled" or "operatively connected" refers to a first mechanism that is coupled (or connected) to a second mechanism to allow the intended operation of the second and/or first mechanism.

Three-dimensional printing (also "3D printing") generally refers to a process for generating a 3D object. For example, 3D printing may refer to sequential addition of material layer or joining of material layers (or parts of material layers) to form a 3D structure, in a controlled manner. The controlled manner may include automated and/or manual control. In the 3D printing process, the deposited material can be transformed (e.g., fused, sintered, melted, bound, or otherwise connected) to subsequently harden and form at least a part of the 3D object. Fusing (e.g., sintering or melting) binding, or otherwise connecting the material is collectively referred to herein as transforming the material (e.g., transforming the powder material). Fusing the material may include melting or sintering the material. Binding can comprise chemical bonding. Chemical bonding can comprise covalent bonding. Examples of 3D printing include additive printing (e.g., layer by layer printing, or additive manufacturing). 3D printing may include layered manufacturing. 3D printing may include rapid prototyping. 3D printing may include solid freeform fabrication. The 3D printing may further comprise subtractive printing.

There are many different 3D printing methodologies. For example, 3D printing methodologies can comprise extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition.

In some embodiments, the 3D printing method is an additive method in which a first layer is printed, and thereafter a volume of a material is added to the first layer as separate sequential layer (or parts thereof). In some examples, each additional sequential layer (or part thereof) is added to the previous layer by transforming (e.g., fusing (e.g., melting)) a fraction of the pre-transformed (e.g., powder) material and subsequently hardening the transformed material to form at least a portion of the 3D object. The hardening can be actively induced (e.g., by cooling) or can occur without intervention (e.g., naturally by temperature equilibration with the surrounding).

In some embodiments, 3D printing methodologies differ from methods traditionally used in semiconductor device fabrication (e.g., vapor deposition, etching, annealing, masking, or molecular beam epitaxy). For example, 3D printing methodologies can differ from vapor deposition methods such as chemical vapor deposition, physical vapor deposition, or electrochemical deposition. In some instances, 3D printing further comprises one or more printing methodologies that are traditionally used in semiconductor device fabrication. For example, 3D printing may further include vapor deposition methods.

The methods, apparatuses, and systems of the present disclosure can be used to form 3D objects for various uses and applications. Such uses and applications include, without limitation, electronics, components of electronics (e.g., casings), machines, parts of machines, tools, implants, prosthetics, fashion items, clothing, shoes, or jewelry. The implants may be directed (e.g., integrated) to a hard, a soft tissue, or to a combination of hard and soft tissues. The implants may form adhesion with hard and/or soft tissue. The machines may include a motor or motor part. The machines may include a vehicle. The machines may comprise aerospace related machines. The machines may comprise airborne machines. The vehicle may include an airplane, drone, car, train, bicycle, boat, or shuttle (e.g., space shuttle). The machine may include a satellite or a missile. The uses and applications may include 3D objects relating to the industries and/or products listed herein.

The present disclosure provides systems, apparatuses, software, and/or methods for 3D printing of a requested (e.g., desired) 3D object from a pre-transformed material (e.g., powder material). The 3D object (or portions thereof) can be pre-ordered, pre-designed, pre-modeled, or designed in real time (e.g., during the process of 3D printing). For example, the object may be designed as part of the print preparation process of the 3D printing. For example, various portion of the object may be designed as other parts of that object are being printed. Real time is during formation of at least one of: 3D object, a layer of the 3D object, dwell time of an energy beam along a path, dwell time of an energy beam along a hatch line, dwell time of an energy beam forming a tile, and dwell time of an energy beam forming a melt pool.

Pre-transformed material, as understood herein, is a material before it has been first transformed (i.e., once transformed) by an energy beam and/or flux during the 3D printing process. The pre-transformed material may be a material that was, or was not, transformed prior to its use in the 3D printing process. The pre-transformed material may be liquid, solid, or semi-solid (e.g., gel). The pre-transformed material may be a particulate material. The particulate material may be a powder material. The powder material may comprise solid particles of material. The particulate material may comprise vesicles (e.g., containing liquid or semi-solid material). The particulate material may comprise solid or semi-solid material particles.

The fundamental length scale (e.g., the diameter, spherical equivalent diameter, diameter of a bounding circle, or the largest of height, width and length; abbreviated herein as "FLS") of the printed 3D object can be at least about 50 micrometers (μm), 80 μm, 100 μm, 120 μm, 150 μm, 170 μm, 200 μm, 230 μm, 250 μm, 270 μm, 300 μm, 400 μm, 500 μm, 600 μm, 700 μm, 800 μm, 1 millimeter (mm), 1.5 mm, 2 mm, 5 mm, 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the printed 3D object can be at most about 1000 m, 500 m, 100 m, 80 m, 50 m, 10 m, 5 m, 4 m, 3 m, 2 m, 1 m, 90 cm, 80 cm, 60 cm, 50 cm, 40 cm, 30 cm, 20 cm, 10 cm, or 5 cm. In some cases, the FLS of the printed 3D object may be in between any of the afore-mentioned FLSs (e.g., from about 50 μm to about 1000 m, from about 120 μm to about 1000 m, from about 120 μm to about 10 m, from about 200 μm to about 1 m, or from about 150 μm to about 10 m).

Figure 27:
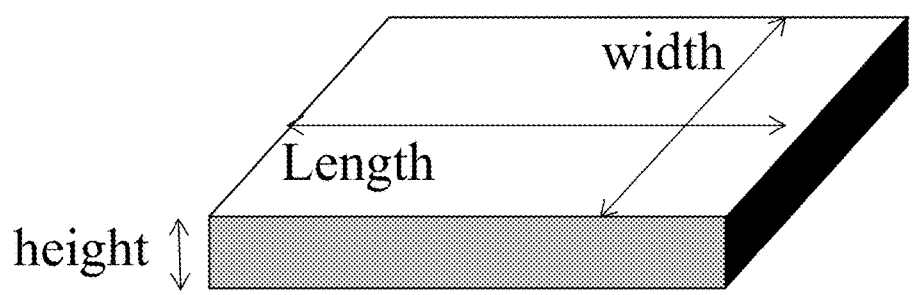
FIG. 27 shows a schematic example of a 3D plane.

In some examples, the 3D object is a large 3D object. In some embodiments, the 3D object comprises a large hanging structure (e.g., wire, ledge, or shelf). Large may be a 3D object having a fundamental length scale of at least about 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The hanging structure may be a thin structure. The hanging structure may be a plane like structure (referred to herein as "three-dimensional plane," or "3D plane"). The 3D plane may have a relatively small width as opposed to a relatively large surface area. For example, the 3D plane may have a small height relative to a large horizontal plane. FIG. 27 shows an example of a 3D plane that is planar. The 3D plane may be planar, curved, or assume an amorphous 3D shape. The 3D plane may be a strip, a blade, or a ledge. The 3D plane may comprise a curvature. The 3D plane may be curved. The 3D plane may be planar (e.g., flat). The 3D plane may have a shape of a curving scarf.

Figure 41:
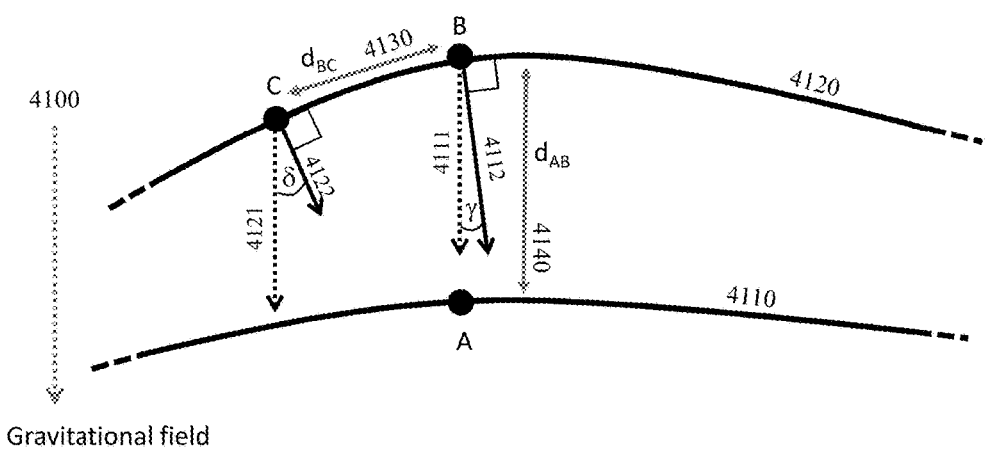
FIG. 41 schematically shows a cross section in portion of a 3D object.

In some embodiments, the 3D object comprises a first portion and a second portion. The first portion may be connected to the rest of the 3D object at one, two, or three sides (e.g., as viewed from the top). The second portion may be connected to the rest of the 3D object at one, two, or three sides (e.g., as viewed from the top). For example, the first and second portion may be connected to a (e.g., central) column, post, or wall of the 3D object. For example, the first and second portion may be connected to an external cover that is a part of the 3D object. The first and/or second portion may be a wire or a 3D plane. The first and/or second portion may be different from a wire or 3D plane. The first and/or second portion may be a blade (e.g., turbine or impeller blade). The first portion may comprise a top surface. Top may be in the direction away from the platform and/or opposite to the gravitational field. The second portion may comprise a bottom surface (e.g., bottom skin surface). Bottom may be in the direction towards the platform and/or in the direction of the gravitational field. FIG. 41 shows an example of a first (e.g., top) surface 4110 and a second (e.g., bottom) surface 4120. At least a portion of the first and second surfaces are separated by a gap. At least a portion of the first surface is separated by at least a portion of the second surface (e.g., to constitute a gap). The gap may be filled with pre-transformed or transformed (e.g., and subsequently hardened) material during the formation of the 3D object. The second surface may be a bottom skin layer. FIG. 41 shows an example of a vertical gap distance 4140 that separates the first surface 4110 from the second surface 4120. The vertical gap distance may be equal to the distance disclosed herein between two adjacent 3D planes. The vertical gap distance may be equal to the vertical distance of the gap as disclosed herein.

Point A may reside on the top surface of the first portion. Point B may reside on the bottom surface of the second portion. The second portion may be a cavity ceiling or hanging structure as part of the 3D object. Point B may reside above point A. The gap may be the (e.g., shortest) distance (e.g., vertical distance) between points A and B. FIG. 41 shows an example of the gap 4140 that constitutes the shortest distance $d_{AB}$ between points A and B. There may be a first normal to the bottom surface of the second portion at point B. FIG. 41 shows an example of a first normal 4112 to the surface 4120 at point B. The angle between the first normal 4112 and a direction of the gravitational acceleration vector 4100 (e.g., direction of the gravitational field) may be any angle γ. Point C may reside on the bottom surface of the second portion. There may be a second normal to the bottom surface of the second portion at point C. FIG. 41 shows an example of the second normal 4122 to the surface 4120 at point C. The angle between the second normal 4122 and the direction of the gravitational acceleration vector 4100 may be any angle δ. Vectors 4111, and 4121 are parallel to the gravitational acceleration vector 4100. The angles γ and δ may be the same or different. The angle between the first normal 4112 and/or the second normal 4122 to the direction of the gravitational acceleration vector 4100 may be any angle alpha. The angle between the first normal 4112 and/or the second normal 4122 with respect to the normal to the substrate may be any angle alpha. The angles γ and δ may be any angle alpha. For example, alpha may be at most about 45°, 40°, 30°, 20°, 10°, 5°, 3°, 2°, 1°, or 0.5°. The shortest distance between points B and C may be any value of the auxiliary support feature spacing distance mentioned herein. For example, the shortest distance BC (e.g., $d_{BC}$) may be at least about 0.1 millimeters (mm), 0.5 mm, 1 mm, 1.5 mm, 2 mm, 3 mm, 4 mm, 5 mm, 10 mm, 15 mm, 20 mm, 25 mm, 30 mm 35 mm, 40 mm, 50 mm, 100 mm, 200 mm, 300 mm, 400 mm, or 500 mm. As another example, the shortest distance BC may be at most about 500 mm, 400 mm, 300 mm, 200 mm, 100 mm, 50 mm, 40 mm, 35 mm, 30 mm, 25 mm, 20 mm, 15 mm, 10 mm, 5 mm, 4 mm, 3 mm, 2 mm, 1.5 mm, 1 mm, 0.5 mm, or 0.1 mm. FIG. 41 shows an example of the shortest distance BC (e.g., 4130, $d_{BC}$).

In some instances, it is desired to control the way at least a portion of a layer of hardened material is formed. The layer of hardened material may comprise a multiplicity of melt pools. The FLS (e.g., depth, or diameter) of the melt pool may be at least about 0.5 μm, 1 μm, 5 μm, 10 μm, 20 μm, 30 μm, 40 μm, or 50 μm. The FLS of the melt pool may be at most about 0.5 μm, 1 μm, 5 μm, 10 μm, 20 μm, 30 μm, 40 μm, or 50 μm. The FLS of the melt pool may be any value between the afore-mentioned values (e.g., from about 0.5 μm to about 50 μm, from about 0.5 μm to about 10 μm, from about 10 μm to about 30 μm, or from about 30 μm to about 50 μm.

In some instances, it is desired to control one or more characteristics of the fabricated 3D object (e.g., or portions thereof). For example, it may be desired to control a hanging structure (e.g., ceiling of a cavity or ledge) as part of the 3D object. The 3D printing methods described herein may utilize at least one of a tiling energy flux and a scanning energy beam (collectively referred to herein as "irradiated energy"). The tiling energy flux and the scanning energy beam may differ by at least one irradiated energy characteristics. For example, the tiling energy flux and the scanning energy beam differ in their cross section (e.g., with the tiling energy flux having a larger cross section than the scanning energy beam). For example, the tiling energy flux and the scanning energy beam differ in their power density (e.g., with the tiling energy flux having a lower power density than the scanning energy beam). For example, the tiling energy flux and the scanning energy beam differ in their focus (e.g., with the scanning energy source being more focused than the tiling energy flux). For example, the tiling energy flux and the scanning energy beam differ in their path trajectory while generating (e.g., directly or indirectly) a layer of hardened material (e.g., with the tiling energy flux traveling along the path of tile trajectory, whereas the scanning energy beam hatches along another trajectory). For example, the tiling energy flux and the scanning energy beam differ in the portions of transformed and/or hardened material they generate on forming a layer of transformed and/or hardened material as part of the 3D object (e.g., with the tiling energy flux forming a first portion of transformed material, whereas the scanning energy beam forms a second portion of transformed material that may or may not connect, or overlap). Both the tiling energy flux and the scanning energy be collimated. Both tiling energy flux and scanning energy source may be generated by the same (e.g., type of) energy source. Both tiling energy flux and scanning energy source may be directed by the same (e.g., type of) scanner. Both tiling energy flux and scanning energy source may travel through by the same (e.g., type of) optical window.

In some instances, it is desired to control one or more characteristics of the melt pools that forms the layer of hardened material. The characteristics may comprise the depth of a melt pool, microstructure, or the repertoire of microstructures of the melt pool. The microstructure of the melt pool may comprise the crystalline structure, or crystalline structure repertoire that is included in the melt pool. In some instances, a greater control over the one or more characteristics of the melt pool makes use of (i) a technique that will be referred to herein as "flash heating," (ii) a technique that is referred to herein as "deep tiling," (iii) a technique that is referred to herein as "shallow tiling." The flash heating and/or deep tiling methods allows, for example, control of microstructure(s) formed by cooling of a locally heated and/or transformed material. Flash heating is focused on the lateral (e.g., horizontal) spread of the irradiated energy in the material bed (e.g., and the 3D objet within). Deep tiling focuses on the depth to which the irradiating energy penetrates the material bed (e.g., and 3D object within). The irradiation methodology may comprise flash heating or deep tiling. In an embodiment, the irradiation method includes both deep tiling and flash heating (e.g., the irradiation energy penetrates deep into the 3D object and considerably spreads laterally around the melt pool). In some examples, considerably is at least about 2, 3, 4, 5, 6, 7, or 10 melt pool fundamental length scales (e.g., diameters) away from the melt pool center formed by the irradiating energy.

Figure 36:
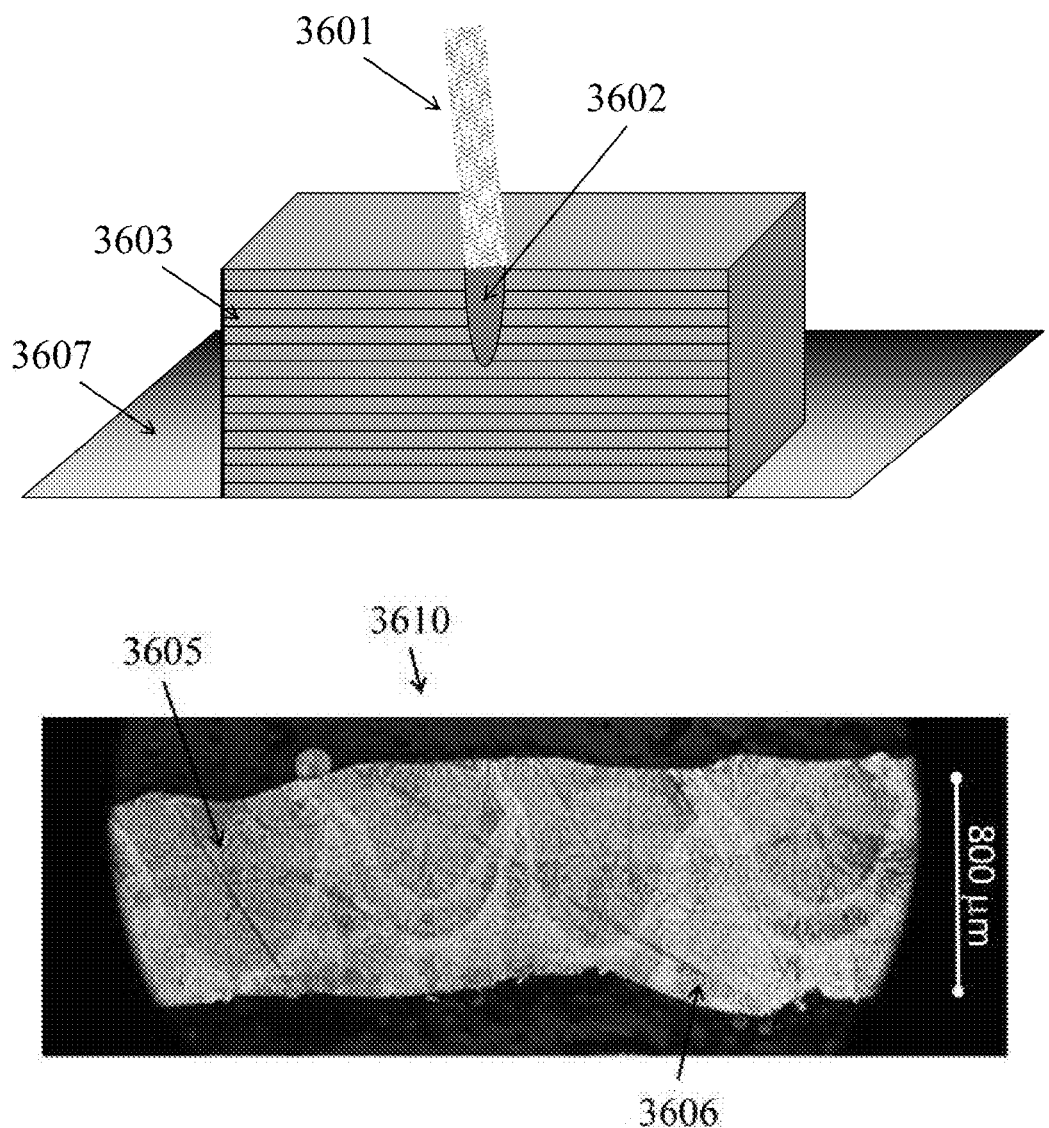
FIG. 36 shows examples of 3D objects.

In some embodiments, the tiling method (e.g., deep tiling and/or shallow tiling) comprises heating at least a portion of a material bed, and/or a previously formed area of hardened material using at least one energy source which will be referred to herein as the "tiling energy source." FIG. 36 shows an example of an energy beam 3601 that irradiates layers of hardened material that were previously formed (e.g., 3603 represents a layer of hardened material), which together make up a 3D object that is disposed on a platform 3607. The heated area is schematically shown in the example of 3602. In some embodiments, the heated area may comprise an area of transformed material. The heated area may encompass the bottom skin layer. The heated area may comprise a heat affected zone. The heated area may allow a parallel position at the bottom skin layer to reach an elevated temperature that is above the solidus temperature (e.g., and at or below the liquidus temperature) of the material at the bottom skin layer, transform (e.g., sinter or melt), become liquidus, and/or plastically yield. For example, the heated area may allow the layers comprising the bottom skin layer to reach an elevated temperature that is above the solidus temperature of the material (e.g., and at or below the liquidus temperature of the material at the previously formed layer such as the bottom skin layer), transform, become liquidus, and/or plastically yield (e.g., in the deep tiling process). Flash heating may be done with the tiling energy beam.

A tile, as understood herein, is a portion of material (e.g., transformed and/or hardened) that is generated or heated by the tiling energy flux or by the scanning energy beam. In some examples, the tiling energy source generates the tiling energy flux. The tiling energy source may generate an energy beam. The tiling energy source may be a radiative energy source. The tiling energy source may be a dispersive energy source. The tiling energy source may generate a substantially uniform (e.g., homogenous) energy stream. The tiling energy source may generate a substantially uniform (e.g., homogenous) energy stream at least across the beam area that forms the tile. The tiling energy source may comprise at least a portion of a cross section (e.g., and/or footprint on a target surface) having a substantially homogenous fluence. The energy generated by the tiling energy source is referred herein as the "tiling energy flux." The tiling energy flux may heat a portion of a 3D object (e.g., an exposed surface of the 3D object). The tiling energy flux may heat a portion of the material bed. The portion of the material bed may comprise an exposed surface portion of the material bed and/or a deeper portion of the material bed that is not exposed). Heating by the tiling energy flux may be substantially uniform at least in the beam area that forms the tile. In an example, the material bed is a powder bed.

In an embodiment, the tilling energy flux irradiates (e.g., flashes, flares, shines, or streams to) a position on the target surface for a time-period (e.g., predetermined time-period).

The time in which the tiling energy flux (e.g., beam) irradiates is referred to herein as a "dwell time" of the tiling energy flux. The heat irradiation may be further transmitted form the heated tile, for example, to adjacent portions of the material bed. During this time-period (e.g., of irradiating the tile), the tiling energy flux may be (e.g., substantially) stationary. During that time-period, the tiling energy may (e.g., substantially) not translate (e.g., neither in a raster form nor in a vector form). During this time-period the energy density of the tiling energy flux may be (e.g., substantially) constant. In some embodiments, during this time-period the energy density of the tiling energy flux may vary. The variation may be predetermined. The variation may be controlled (e.g., by a controller and/or manually). The controller may determine the variation based on a signal received by one or more sensors. The controller may determine the variation based on an algorithm. The controlled variation may comprise a closed loop or open loop control. For example, the variation may be determined based on temperature and/or imaging measurements, among other sensed signals. The variation may be determined by melt pool FLS (e.g., size) evaluation. The variation may be determined based on height measurements of the forming 3D object.

In some embodiments, substantially stationary comprise spatial oscillations that are smaller than the FLS (e.g., diameter) of the energy beam. The spatial oscillation may be in a range that is smaller than (i) the diameter of the cross section of the energy beam, and/or (ii) of the diameter equivalent of the footprint of the energy beam on the target surface. For example, the spatial oscillation range of the energy beam can be at most 90%, 80%, 60%, 50%, 40%, 30%, 20%, 10%, 5%, 1% or 0.5% of the diameter (i) of the cross section of the energy beam, and/or (ii) of the diameter equivalent of the footprint of the energy beam on the target surface. The energy beam may be the tiling energy flux and/or the scanning energy beam. Spatial oscillation is an oscillation in space (e.g., with respect to the target surface). Spatial oscillation may be oscillations in the location of the energy beam (e.g., with respect to the target surface). The spatial oscillation may be in the location of the irradiated beam. The spatial oscillations may be along the general movement direction of the irradiated energy (e.g., along the hatch. E.g., along the path of tiles); for example, the spatial oscillations may comprise back and forth movement of the irradiated energy; for example, the spatial oscillations may be in an axis parallel to the general direction of movement of the irradiated energy. The spatial oscillations may be along a direction that is perpendicular to the general movement direction of the irradiated energy; for example, side to side movement (e.g., FIG. 7, 702) with respect to the general direction of movement of the irradiated energy (e.g., 701); for example, the spatial oscillations may be in an axis perpendicular to the general direction of movement of the irradiated energy. The spatial oscillations may be along an axis forming any angle (e.g., that is not perpendicular or parallel) with the general movement direction of the irradiated energy, for example, side to side movement with respect to the general direction of movement of the irradiated energy.

In an example, the tilling energy flux irradiates a position on the target surface for a time-period (e.g., predetermined) to form the heated tile with (e.g., having) a constant or variable power density (i.e., power per unit area) of the tiling energy flux. The target surface may be an exposed surface of the material bed, platform, 3D object (e.g., forming 3D object), or any combination thereof. In some embodiments, the variation in the power density comprises an initial increase in power density of the tiling energy flux, followed by a decrease in the power density. For example, the variation may comprise initial increase in the power density of the tiling energy flux, followed by a plateau, and a subsequent decrease in the power density. The increase and/or decrease in the power density of the tiling energy flux may be linear, logarithmic, exponential, polynomial, or any combination or permutation thereof. The plateau may comprise of a (e.g., substantially) constant energy density. The manner of (e.g., function used in) the variation in the power density of the tiling energy flux may be influenced by (i) a measurement (e.g., a signal of the one or more sensors), (ii) theory (e.g., by simulation), (iii) or any combination thereof. The duration and/or peak of the power density plateau of the tiling energy flux may be influenced by (i) a measurement (e.g., a signal of the one or more sensors), (ii) theory (e.g., by simulations), (iii) or any combination thereof.

In some embodiments, the tiling energy flux has an extended cross section. For example, the tiling energy flux has a FLS (e.g., cross section) that is larger than the scanning energy beam. The FLS of a cross section of the tiling energy flux may be at least about 0.2 millimeters (mm), 0.3 mm, 0.4 mm, 0.5 mm, 0.8 mm, 1 mm, 1.5 mm, 2 mm, 2.5 mm, 3 mm, 3.5 mm, 4 mm, 4.5 mm, or 5 mm. The FLS of a cross section of the tiling energy flux may be between any of the afore-mentioned values (e.g., from about 0.2 mm to about 5 mm, from about 0.3 mm to about 2.5 mm, or from about 2.5 mm to about 5 mm). The cross section of the energy beam can be at least about 0.1 millimeter squared (mm2), or 0.2. The diameter of the energy beam can be at least about 300 micrometers, 500 micrometers, or 600 micrometers. The distance between the first position and the second position can be at least about 100 micrometers, 200 micrometers, or 250 micrometers. The FLS may be measured at full width half maximum intensity of the energy beam. In some embodiments, the tiling energy flux is a focused energy beam. In some embodiments, the tiling energy flux is a defocused energy beam. The energy profile of the tiling energy flux may be (e.g., substantially) uniform (e.g., in the beam cross sectional area that forms the tile). The energy profile of the tiling energy flux may be (e.g., substantially) uniform during the exposure time (e.g., also referred to herein as tiling time, or dwell time). The exposure time (e.g., at the target surface) of the tiling energy flux may be at least about 0.1 milliseconds (msec), 0.5 msec, 1 msec, 10 msec, 20 msec, 30 msec, 40 msec, 50 msec, 60 msec, 70 msec, 80 msec, 90 msec, 100 msec, 200 msec, 400 msec, 500 msec, 1000 msec, 2500 msec, or 5000 msec. The exposure time (e.g., at the target surface) of the tiling energy flux may be at most about 10 msec, 20 msec, 30 msec, 40 msec, 50 msec, 60 msec, 70 msec, 80 msec, 90 msec, 100 msec, 200 msec, 400 msec, 500 msec, 1000 msec, 2500 msec, or 5000 msec. The exposure time may be between any of the above-mentioned exposure times (e.g., from about 0.1 msec to about 5000 msec, from about 0.1 to about 1 msec, from about 1 msec to about 50 msec, from about 50 msec to about 100 msec, from about 100 msec to about 1000 msec, from about 20 msec to about 200 msec, or from about 1000 msec to about 5000 msec). The exposure time may be the dwell time. The power per unit area of the tiling energy flux may be at least about 100 Watts per millimeter square (W/mm2), 200 W/mm2, 300 W/mm2, 400 W/mm2, 500 W/mm2, 600 W/mm2, 700 W/mm2, 800 W/mm2, 900 W/mm2, 1000 W/mm2, 2000 W/mm2, 3000 W/mm2, 5000 W/mm2, or 7000 W/mm2. The power per unit area of the tiling energy flux may be at most about 100 W/mm2, 200 W/mm2, 300 W/mm2, 400 W/mm2, 500 W/mm2, 600 W/mm2, 700 W/mm2, 800 W/mm2, 900 W/mm2, 1000 W/mm2, 2000 W/mm2, 3000 W/mm 2, 5000 W/mm2, 7000 W/mm2, 8000 W/mm2, 9000 W/mm2, or 10000 W/mm2. The power per unit area of the tiling energy flux may be any value between the afore-mentioned values (e.g., from about 100 W/mm2 to about 3000 W/mm2, from about 100 W/mm2 to about 5000 W/mm2, from about 100 W/mm2 to about 9000 W/mm2, from about 100 W/mm2 to about 500 W/mm2, from about 500 W/mm2 to about 3000 W/mm2, from about 1000 W/mm2 to about 7000 W/mm2, or from about 500W/mm2 to about 8000 W/mm2). The tiling energy flux may emit energy stream towards the target surface in a step and repeat sequence.

In some embodiments, the tiling energy flux emits an energy stream towards the target surface in a step and repeat type sequence to effectuate the tile forming process. The tiling energy flux may comprise radiative heat, electromagnetic radiation, charge particle radiation (e.g., e-beam), or a plasma beam. The tiling energy source may comprise a heater (e.g., radiator or lamp), electromagnetic radiation generator (e.g., laser), charge particle radiation generator (e.g., electron gun), or a plasma generator. The tiling energy source may comprise a diode laser. The tiling energy source may comprise s light emitting diode array (or LED array). The tiling energy source may be any radiation source disclosed herein. The tilling energy beam may be any energy beam disclosed herein.

In some embodiments, the tiling energy flux irradiates a pre-transformed material, a transformed material, and/or a hardened material. The pre-transformed material may be disposed in a material bed (e.g., a powder bed). The pre-transformed material may be ejected onto the target surface. In some examples, the tiling energy flux irradiates a target surface. The tiling energy flux may additionally irradiate the pre-transformed material as it travels towards the target surface (e.g., using a direct material deposition type 3D printing). The target surface may comprise a pre-transformed material, a transformed material, or a hardened material. The tiling energy source may generate a tiling energy flux direct (e.g., using an optical system) it on the target surface. The tiling energy flux may heat a portion of the target surface. The tiling energy flux may transform a portion (e.g., fraction) of the target surface. The tiling energy flux may preheat the target surface (e.g., to be followed by the scanning energy beam that optionally transforms at least a portion of the preheated surface). The tiling energy flux may post heat the target surface (e.g., following a transformation of the target surface). The tiling energy flux may post heat the target surface (e.g., to reduce a cooling rate of the target surface). The heating may be at a specific location (e.g., where the tile is formed from pre-transformed material).

In some examples, the tile forming procedure comprises a wide exposure space of the tiling energy flux (e.g., a wide footprint on the target surface). In some examples, the tile forming procedure comprises a long dwell time (e.g., exposure time) of the tiling energy flux, which dwell time may be at least about 0.5 millisecond, 1 millisecond, 0.5 second, 1 second, 0.5 minute, or 1 minute. The tiling energy flux may irradiate the target surface for even longer periods of time (e.g., for example, 1 hour, or 1 day). In principle, the tiling energy flux may have a dwell time that is infinity. The tiling energy flux (e.g., FIG. 36, 3601) may emit a low energy flux for a long time-period to transform portions of pre-formed layers of hardened material (e.g., 3602). These pre-formed layers of hardened material may be deep layers within the 3D object (e.g., FIG. 36, layer 3603). The tiling energy flux may emit a low energy flux to control the cooling rate of a position within a layer of transformed material. The low cooling rate may control the solidification (e.g., rate and/or microstructure) of the transformed (e.g., molten) material. For example, the low cooling rate may allow formation of crystals (e.g., single crystals) at specified location within the layer that is included in the 3D object.

In some examples, the tiling energy flux transforms (e.g., melts) a portion of a 3D object (e.g., comprising an exposed surface of the 3D object), at a time-period. In some embodiments, the transformation may be substantially uniform (e.g., in rate and/or microstructure). In some embodiments, the transformation may vary (e.g., in rate and/or microstructure). The substantially uniform heating may be akin to heat stamping of the target surface (e.g., a layer of hardened material and/or of pre-transformed material) by the tiling energy flux. A cross section of the heat stamp (also herein "heat tile") may be (e.g., substantially) similar to the footprint of the tiling energy flux, on the target surface. The (e.g., substantially uniform) irradiation by the tiling energy flux may form heat tiles on the target surface.

FIG. 1 shows an example of a 3D printing system and apparatuses, including a tiling energy source 122 that emits a tiling energy flux 119. The tiling energy flux may travel through an optical system (e.g. 114. E.g., comprising an aperture, lens, mirror, or deflector) and/or an optical window (e.g., 123) to irradiate a target surface. The optical system may comprise a scanner. The target surface may be a portion of a hardened material 106 that was formed by transforming at least a portion of a pre-transformed material (e.g., disposed in a material bed 104, or streamed towards a platform) by a scanning energy beam 101. The scanning energy beam 101 is generated by an energy source 121. The generated energy beam may travel through an optical mechanism 120 (e.g., scanner) and/or an optical window 115.

Figure 25:
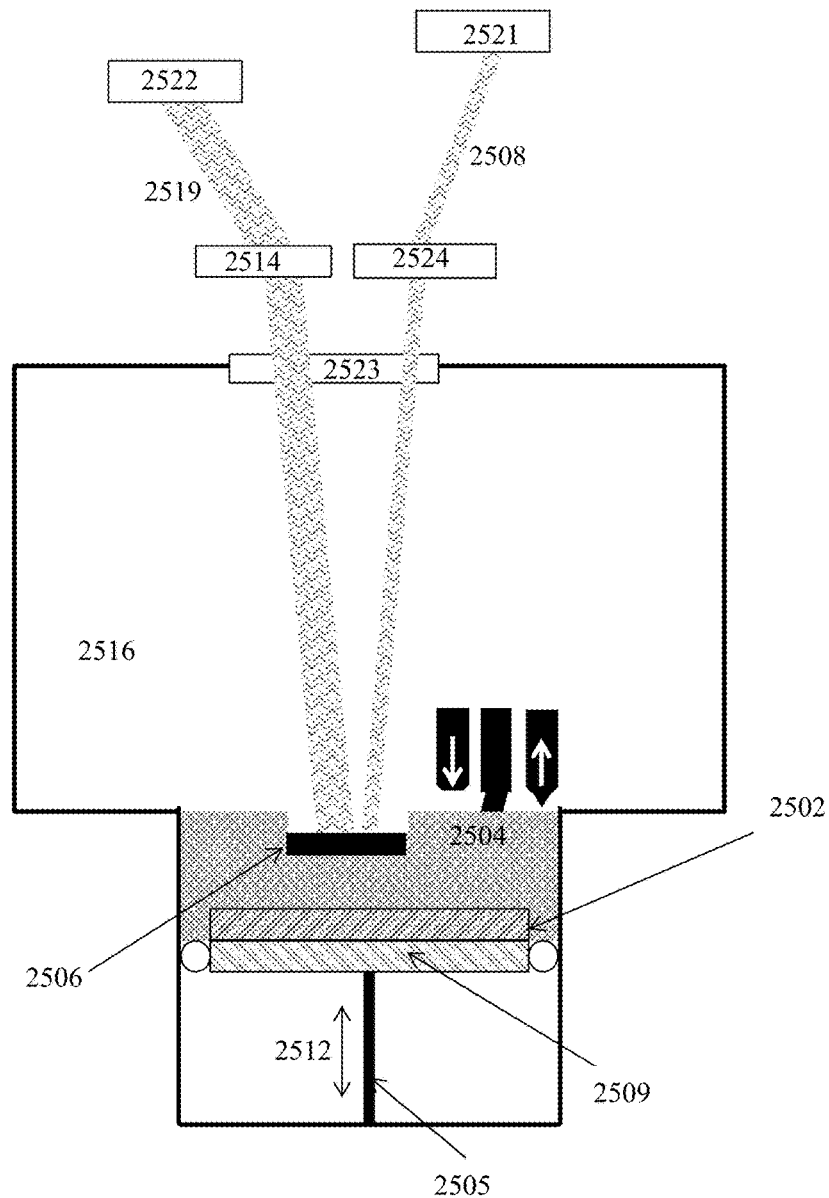
FIG. 25 shows a schematic side view of a 3D printing system and apparatuses.

In some examples, the tiling energy flux and the scanning energy beam travel through the same optical window and/or through the same optical system. FIG. 25 shows an example where the tiling energy flux 2519 is generated by an energy source 2522, and travels through an optical system 2514; the scanning energy source 2521 generates a scanning energy beam 2508 which travels through an optical system 2524 and both travel through same optical window 2523 into the processing chamber 2516 to form the 3D object 2506 from a material bed 2504, while irradiating the exposed surface of the material bed, which material bed rests on a platform comprising a substrate 2509 and a base 2502, which substrate is vertically translatable 2512 by an actuator 2505. The tiling energy flux 2519 in the example of FIG. 25, has a larger cross section than the scanning energy beam 2508. In some embodiments, the tiling energy flux and the scanning energy beam both travel through the same optical system, albeit through different components within the optical system and/or at different instances. In some embodiments, the tiling energy flux and the scanning energy beam travel through different optical systems (e.g., and through the same optical window). The tiling energy flux and the scanning energy beam may travel through the same or different optical windows.

In some embodiments, the emitted radiative energy (e.g., FIG. 1, 119) travels through an aperture, deflector and/or other parts of an optical system (e.g., schematically represented as FIG. 1, 114). At times, the aperture restricts the amount of energy generated by the tiling energy source which reaches the target surface. The aperture restriction may redact (e.g., cut off, block, obstruct, or discontinue) the energy beam to form a desired shape of a footprint (e.g., that may form the tile). Redaction of the energy beam may comprise redaction of a cross-section or footprint of the energy beam. The restriction may redact the energy beam to form a redacted tile cross section. Examples of apertures are shown in FIGS. 2, 200, 210, and 220. The aperture may allow only a portion of the emitted tiling energy flux from the tiling energy source (e.g., 202, 212, or 222) to reach the target surface. Examples of aperture holes are represented in 203, 213, and 223. The aperture may include one opening or several openings (e.g., geometric shapes in 220). The cross section of the tiling energy flux may be seen in FIGS. 2, 201 and 202, wherein 202 is the portion of the footprint that is blocked by the aperture, and the section 202 is the part of the energy flux that is free to travel past the aperture.

Figure 9:
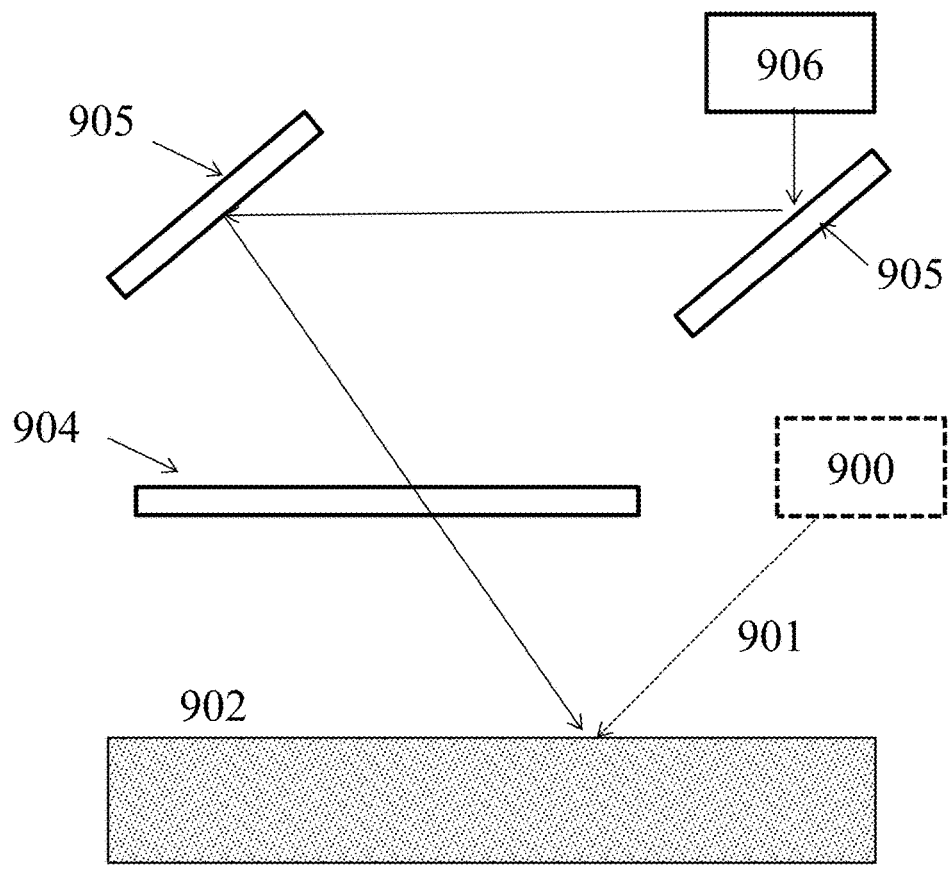
FIG. 9 schematically illustrates an optical system.

FIG. 9 shows an example of an optical mechanism within a 3D printing system: an energy source 906 irradiates energy (e.g., emits an energy beam) that travels between mirrors 905 that direct it through an optical window 904 to a position on the target surface 902 (e.g., exposed surface of a material bed). The irradiated energy may also be directly projected on the target surface, for example, irradiated energy (e.g., and energy beam) 901 can be generated by an energy source 900 (e.g., that may comprise an internal optical mechanism, such as within a laser) and be directly projected onto the target surface.

The hardened material may comprise at least a portion of one or more (e.g., a few) layers of hardened material disposed above a platform and/or a pre-transformed material (e.g., powder) disposed in the material bed. The one or more layers of hardened material may be susceptible to deformation during formation, or not susceptible to deformation during formation. The deformation may comprise bending, warping, arching, curving, twisting, balling, cracking, or dislocating. In some examples, the at least a portion of the one or more layers of hardened material may comprise a ledge or a ceiling of a cavity. The deformation may arise, for example, when the formed 3D object (or a portion thereof) lacks auxiliary support structure(s), during the cooling process of the transformed material. The deformation may arise, for example, when the formed structure (e.g., 3D object or a portion thereof) floats anchorless in the material bed), during the cooling process of the transformed material.

The tiling energy flux may comprise (i) an extended exposure area, (ii) extended exposure time, (iii) low power density (e.g., power per unit area) or (iv) an intensity profile that can fill an area with a flat (e.g., top head) energy profile. Extended may be in comparison with the scanning energy beam. The extended exposure time may be at least about 1 millisecond and at most 100 milliseconds. In some embodiments, an energy profile of the tiling energy source may exclude a Gaussian beam or round top beam. In some embodiments, an energy profile of the tiling energy source may include a Gaussian beam or round top beam. In some embodiments, the 3D printer comprises a first and/or second scanning energy beams. In some embodiments, an energy profile of the first and/or second scanning energy may comprise a Gaussian energy beam. In some embodiments, an energy profile of the first and/or second scanning energy may exclude a Gaussian energy beam. The first and/or second scanning energy may have any cross-sectional shape comprising an ellipse (e.g., circle), or a polygon (e.g., as disclosed herein). The scanning energy beam may have a cross section with a diameter of at least about 50 micrometers ($\mu m$), 100 $\mu m$, 150 $\mu m$, 200 $\mu m$, or 250 $\mu m$. The scanning energy may have a cross section with a diameter of at most about 60 micrometers ($\mu m$), 100 $\mu m$, 150 $\mu m$, 200

μm, or 250 μm. The scanning energy may have a cross section with a diameter of any value between the afore-mentioned values (e.g., from about 50 μm to about 250 μm, from about 50 μm to about 150 μm, or from about 150 μm to about 250 μm). The power density (e.g., power per unit area) of the scanning energy beam may at least about 5000 W/mm$^2$, 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The power density of the scanning energy beam may be at most about 5000 W/mm$^2$, 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The power density of the scanning energy beam may be any value between the afore-mentioned values (e.g., from about 5000 W/mm$^2$ to about 100000 W/mm$^2$, from about 10000 W/mm$^2$ to about 50000 W/mm$^2$, or from about 50000 W/mm$^2$ to about 100000 W/mm$^2$). The scanning speed of the scanning energy beam may be at least about 50 milli-meters per second (mm/sec), 100 mm/sec, 500 mm/sec, 1000 mm/sec, 2000 mm/sec, 3000 mm/sec, 4000 mm/sec, or 50000 mm/sec. The scanning speed of the scanning energy beam may be at most about 50 mm/sec, 100 mm/sec, 500 mm/sec, 1000 mm/sec, 2000 mm/sec, 3000 mm/sec, 4000 mm/sec, or 50000 mm/sec. The scanning speed of the scanning energy beam may any value between the afore-mentioned values (e.g., from about 50 mm/sec to about 50000 mm/sec, from about 50 mm/sec to about 3000 mm/sec, or from about 2000 mm/sec to about 50000 mm/sec). The scanning energy beam may be continuous or non-continuous (e.g., pulsing). In some embodiments, the scanning energy beam compensates for heat loss at the edges of the target surface after the heat tiling process (e.g., forming the tiles by utilizing the tiling energy flux).

In some embodiments, the tiling energy source is the same as the scanning energy source. In some embodiments, the tiling energy source is different than the scanning energy source. FIG. 1 shows an example where the tiling energy source 122 is different from the scanning energy source 121. The tiling energy source may travel through an identical, or a different optical window than the scanning energy source. FIG. 1 shows an example where the tiling energy flux travels through one optical window 123, and the scanning energy 101 travels through a second energy window 115 that is different. The tiling energy source and/or scanning energy source can be disposed within the enclosure, outside of the enclosure (e.g., as in FIG. 1), or within at least one wall of the enclosure. The optical mechanism through which the tiling energy flux and/or the scanning energy beam travel can be disposed within the enclosure, outside of the enclo-sure, or within at least one wall of the enclosure (e.g., as in FIGS. 1, 123 and 115)

Figure 24:
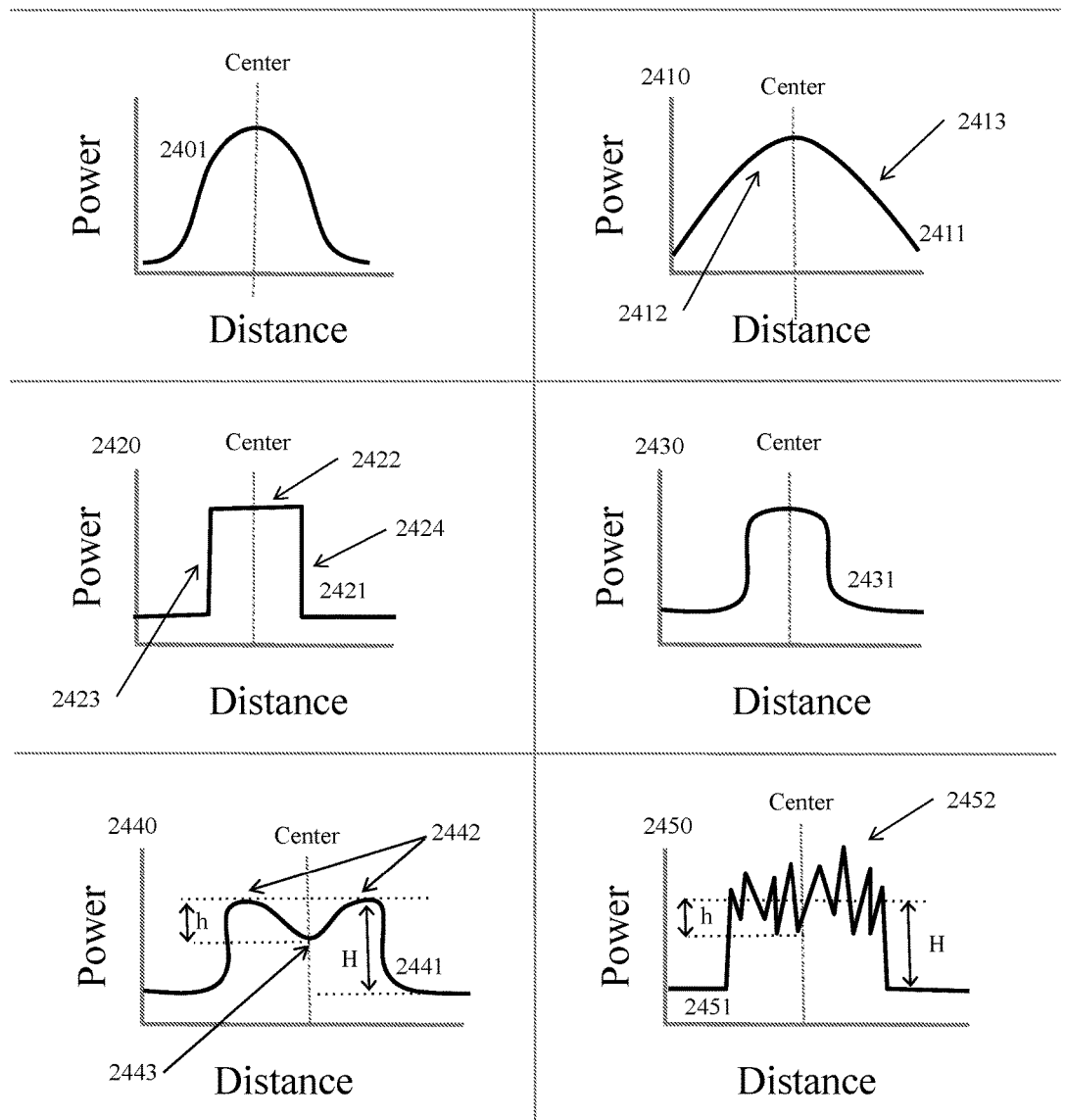
FIG. 24 schematically illustrates spatial intensity profiles of various energy beams and/or fluxes.

The energy profile of the energy flux (e.g. beam) may represent the spatial intensity profile of the energy flux (e.g., beam) at a particular plane transverse to the beam propaga-tion path. FIG. 24 shows examples of energy flux profiles (e.g., energy as a function of distance from the center of the energy flux (e.g., beam)). The energy flux profile (e.g., energy beam profile) may be represented as the power or energy of the energy flux plotted as a function of a distance within its cross section (e.g., that is perpendicular to its propagation path). The energy flux profile of the tiling energy flux may be substantially uniform (e.g., homog-enous). The energy flux profile may correspond to the tiling energy flux. The energy beam profile may correspond to the energy profile of the first scanning energy beam and/or the second scanning energy beam.

The system and/or apparatus may comprise an energy profile alteration device that evens (e.g., smooths, pla-narizes, or flattens) out any irregularities in the energy flux profile. The system and/or apparatus may comprise an energy profile alteration device that creates a more uniform energy flux profile, in at least a portion of the energy profile cross section (e.g., relative to the center of the beam). The energy profile alteration device may comprise an energy flux (e.g., beam) homogenizer. The homogenizer can comprise a mirror. The mirror may be multifaceted. The mirror may comprise square facets. The mirror may reflect the energy flux at various (e.g., different) angles to create a beam with a more uniform power across at least a portion (e.g., the entire) of the beam profile (e.g., resulting in a "top hat" profile), as compared to the original (e.g., incoming) energy flux. The energy profile alteration device may output a substantially evenly distributed power/energy of the energy flux across an energy beam cross section (e.g., forming an energy flux profile), instead of its original non-evenly dis-tributed energy flux profile shape (e.g., Gaussian shape). The energy profile alteration device may comprise an energy flux profile shaper (e.g., beam shaper). The energy profile altera-tion device may create a certain (e.g., predetermined) shape to the energy flux profile. The energy profile alteration device may spread the central concentrated energy within the energy flux profile along the energy flux cross section (e.g., FLS of the energy flux, or FLS of the tile (a.k.a "stamp")). The energy profile alteration device may output a grainy energy flux profile. The energy profile alteration device may comprise a dispersive or partially transparent glass. The glass can be a frosted, milky, or murky glass. The energy profile alteration device may generate a blurry energy flux. The energy profile alteration device may generate a defocused energy flux, after which the energy flux that entered the energy profile alteration device will emerge as an energy flux having a more homogenized energy flux profile.

In some examples, the apparatus and/or systems disclosed herein include an optical diffuser. The optical diffusion may create wave front distortion of an irradiated beam. The optical diffuser may comprise a digital phase mask. The optical diffuser may diffuse light substantially homog-enously. The optical diffuser may remove high intensity energy (e.g., light) distribution and form a more even distribution of light across the footprint of the energy beam and/or flux. The optical diffuser may reduce the intensity of the energy beam and/or flux (e.g., act as a screen). For example, the optical diffuser may alter an energy beam with Gaussian profile, to an energy beam having a top-hat profile. The optical diffuser may comprise a diffuser wheel assem-bly. The energy profile alteration device may comprise a diffuser-wheel (a.k.a., diffusion-wheel). The diffuser-wheel may comprise a filter wheel. The diffuser-wheel may com-prise a filter or diffuser. The diffuser-wheel may comprise multiple optical filters or multiple optical diffusers. The filters and/or diffusers in the diffuser-wheel may be arranged linearly, non-linearly, or any combination thereof. The energy profile alteration device and/or any of its components may be controlled (e.g., monitored and/or regulated) by the controller, and be operatively coupled thereto. The diffuser-wheel may comprise one or more ports (e.g., opening and/or exit ports) from/to which an energy ray (e.g., beam and/or flux) can travel. The diffuser-wheel may comprise a panel. The panel may block (e.g., entirely or partially) the energy ray. The energy profile alteration device may comprise a shutter wheel. In some examples, the diffuser-wheel rotates. In some examples, the diffuser-wheel switches (e.g., alter-nate) between several positions. A position of the diffuser-wheel may correspond to an optical filter. The filter may be maintained during the formation of a layer of hardened material. The filter may change during the formation of a layer of hardened material. The diffuser-wheel may change between position during the formation of a layer of hardened material (e.g., change between at least 2, 3, 4, 5, 6, 7 positions). The diffuser-wheel may maintain a position during the formation of a layer of hardened material. At times, during the formation of a 3D object, some positions of the diffuser-wheel may not be used. At times, during the formation of a 3D object, all the positions of the diffuser-wheel may be used. During the formation of the 3D object comprises during the formation of a layer of hardened material.

In some embodiments, the energy profile alteration device comprises a Micro Lens Array. The micro lens (also herein "microlens") may have a FLS (e.g., diameter) of at most about 5 µm, 10 µm, 50 µm, 100 µm, 250 µm, 500 µm, 750 µm, 1 mm, 5 mm, or 10 mm. The micro lens (also herein "microlens") may have a FLS of at least about 5 µm, 10 µm, 50 µm, 100 µm, 250 µm, 500 µm, 750 µm, 1 mm, or 5 mm. The micro lens (also herein "microlens") may have a FLS of any value between the afore-mentioned values (e.g., from about 5 µm to about 5 mm, from about 5 µm to about 750 µm, from about 750 µm to about 1 mm, or from about 1 mm to about 5 mm). The microlens may include an element comprising a plane surface and/or a spherical convex surface (e.g., that refracts the light). The microlens may comprise an aspherical surface. The microlens may comprise one or more layers of optical material (e.g., to achieve a design performance). The microlens may comprise one, two, or more flat and parallel surfaces. In some instances, the focusing action of the energy profile alteration device is obtained by a variation of a refractive index across the micro lens (e.g., gradient-index (GRIN) lens). The microlens may comprise a variation in refractive index and/or a surface shape that allows focusing of the energy flux. The microlens may focus the energy flux by refraction in a set of concentric curved surfaces (e.g., micro-Fresnel lenses). The microlens may focus the energy flux by diffraction (e.g., binary-optic microlens). The microlens may comprise one or more grooves. The one or more grooves may comprise stepped edges or multi-levels. The stepped edges or multi-levels may afford approximation of the desired energy flux profile shape. Microlens arrays can contain multiple lenses formed in a one-dimensional, two-dimensional, or three-dimensional array (e.g., on a supporting substrate). When the individual micro lenses have circular apertures, and are not allowed to overlap, they may be placed in a hexagonal array to obtain maximum coverage of the substrate. The energy profile alteration device may comprise non-circular apertures (e.g., to reduce effects formed by any gaps between the lenses). The microlens (e.g., microlens array) may focus and/or concentrate the energy flux onto a target surface.

Figure 40:
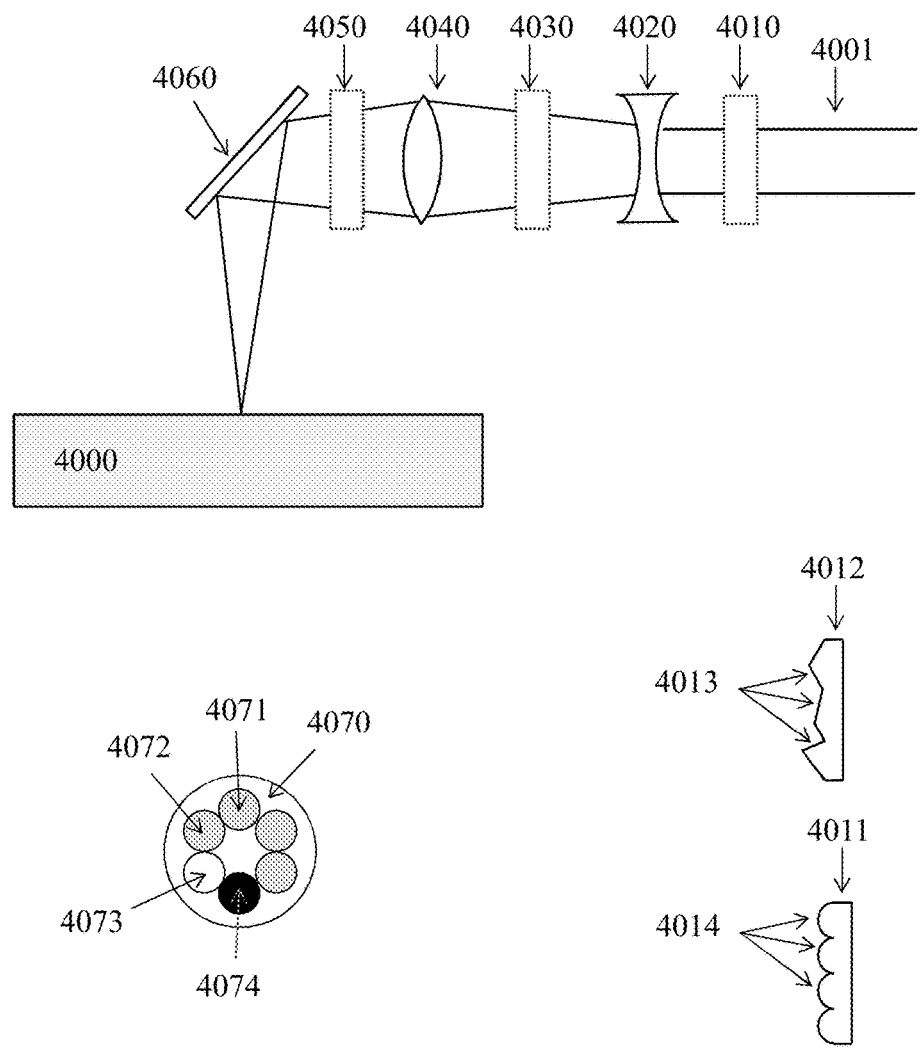
FIG. 40 schematically illustrates an optical system.

FIG. 40 shows an example of an optical path comprising an irradiated energy beam 4001 that travels through a diverging lens 4020, is consequently focused by a focusing lens 4040, and reflected by a mirror 4060 to project on a target surface 4000. Along the beam path from its projection until the mirror 4060, one or more optical diffusers (e.g., 4010, 4030, or 4050). FIG. 40, 4012 shows a vertical cross section of an optical diffuser comprising planes disposed in various (e.g., different) angles 4013 that cause a beam to diffuse. FIG. 40, 4011 shows a vertical cross section of an optical diffuser comprising microlenses 4014. FIG. 40, 4070 shows a cross section of an optical diffuser comprising various optical diffusers (e.g., 4071, and 4072), an open slot 4073 that allows the irradiated energy to pass through without being diffused, and a closed slot 4074 that does not allow the irradiated energy to pass through. The diffuser wheel may comprise one or more filters. The optical diffuser may create wave front distortion of the irradiated energy.

The energy flux has an energy profile. The energy flux (e.g., tiling energy flux and/or scanning energy beam) may have any of the energy flux profiles in FIG. 24, wherein the "center" designates the center of the tile. The energy flux profile may be substantially uniform. The energy flux profile may comprise a substantially uniform section. The energy flux profile may deviate from uniformity. The energy flux profile may be non-uniform. The energy flux profile may have a shape that facilitates substantially uniform heating of the tile (e.g., substantially all points within the tile (e.g., including its rim)). The energy flux profile may have a shape that facilitates substantially uniform temperature variation of the tile (e.g., at substantially all points within the tile (e.g., including its rim)). The energy flux profile may have a shape that facilitates substantially uniform phase of the tile (e.g., substantially all points within the tile (e.g., including its rim)). For example, the phase can be liquid or solid. Substantially uniform may be substantially similar, even, homogenous, invariable, consistent, and/or equal.

In an example, the energy flux profile of the tiling energy flux comprises a square shaped beam. In some instances, the tiling energy flux may deviate from a square shaped beam. In some examples, the tiling energy flux excludes a Gaussian shaped beam (e.g., 2401). The shape of the energy flux (e.g., beam) may be the energy profile of the energy flux with respect to a distance from its center. The center can be a center of the energy footprint, cross section, and/or tile. The footprint may on the target surface. The energy flux profile may comprise one or more planar sections. FIG. 24, 2420 is an example of two planar sections of energy profile 2421. FIG. 24, 2430 is an example of a planar section of energy profile 2431. FIG. 24, 2440 is an example of two planar sections of energy profile 2441. The energy flux profile may comprise of a gradually increasing and/or decreasing section. FIG. 24, 2410 shows an example of an energy profile 2411 comprising a gradually increasing section 2412, and a gradually decreasing section 2413. The energy flux profile may comprise an abruptly increasing and/or decreasing sections. FIG. 24, 2420 shows an example of an energy profile 2421 comprising an abruptly increasing section 2423 and an abruptly decreasing section 2424 The energy flux profile may comprise a section wherein the energy flux profile deviates from planarity. FIG. 24, 2440 shows an example of an energy profile 2441 comprising an energy flux profile comprising a section 2443 that deviates from planarity (e.g., by a distance "h" of average flux profile 2440). The energy profile of the energy flux may comprise a section of fluctuating energy (e.g., power) profile. The fluctuation may deviate from an average planar energy (e.g., power) profile of the energy flux profile. FIG. 24, 2450 shows an example of an energy flux profile 2451 comprising a fluctuating power section 2452. The fluctuating section 2452 deviates from the average flat power profile. The average planar power profile may be referred to using the average power of that surface from an average baseline (e.g., FIG. 24, "H" of energy flux profile 2450), by a +/−distance of "h" of energy flux profile 2450. The deviation (e.g., type and/or amount) from planarity of the energy flux profile may relate to the temperature of the target surface (e.g., and/or material bed). The deviation (e.g., a percentage of deviation) may be calculated with respect to an average top surface of the energy beam profile. The percentage deviation may be calculated according to the mathematical formula 100*(H- h)/H), where the symbol "*" designates the mathematical operation "multiplied by." In some examples, when the material bed is at a temperature of below 500° C., the deviation may be at most 1%, 5%, 10%, 15%, or 20%. In some examples, the first scanning energy beam and/or the second scanning energy beam may have energy flux profile characteristics of the tiling energy flux (e.g., as delineated herein).

In some examples, when the material bed is at a temperature of below 500° C., the deviation may be by any value between the afore-mentioned values (e.g., from about 1% to about 20%, from about 10% to about 20%, or from about 5% to about 15%). When the material bed is from about 500° C. to below about 1000 ° C., the deviation may be at most 10%, 15%, 20%, 25%, or 30%). When the material bed is from about 500° C. to below about 1000 ° C., the deviation may be by any value between the afore-mentioned values (e.g., from about 10% to about 30%, from about 20% to about 30%, or from about 15% to about 25%). When the material bed is above about 1000 ° C., the deviation may be at most 20%, 25%, 30%, 35%, or 40%). When the material bed is of above about 1000° C., the deviation may be by any value between the afore-mentioned values (e.g., from about 20% to about 40%, from about 30% to about 40%, or from about 25% to about 35%). Below 500° C. comprises ambient temperature, or room temperature (R.T.). Ambient refers to a condition to which people are generally accustomed. For example, ambient pressure may be 1 atmosphere. Ambient temperature may be a typical temperature to which humans are generally accustomed. For example, from about 0° C. to about 50° C., from about 15° C. to about 30° C., from 16° C. to about 26° C., from about 20° C. to about 25° C. "Room temperature" may be measured in a confined or in a non-confined space. For example, "room temperature" can be measured in a room, an office, a factory, a vehicle, a container, or outdoors. The vehicle may be a car, a truck, a bus, an airplane, a space shuttle, a space ship, a ship, a boat, or any other vehicle. Room temperature may represent the small range of temperatures at which the atmosphere feels neither hot nor cold, approximately 24 ° C. It may denote 20 ° C., 25 ° C., or any value from about 20 ° C. to about 25 ° C.

In some examples, the cross section of the tiling energy flux comprises a vector shaped scanning beam (VSB). The energy flux may comprise a variable energy flux profile shape. The energy flux may comprise a variable cross sectional shape. The energy flux may comprise a substantially non-variable energy flux profile shape. The energy flux may comprise a substantially non-variable cross sectional shape. The energy flux (e.g., VSB) may translate across the target surface (e.g., directly) to one or more locations specified by vector coordinates. The energy flux (e.g., VSB) may irradiate once over those one or more locations. The energy flux (e.g., VSB) may substantially not irradiate (or irradiated to a considerably lower extent) once between the locations.

In some examples, a cross sectional shape of the tiling energy flux is (e.g., substantially) the shape of the tile. The shape of the tiling energy flux cross section may substantially exclude a curvature. For example, the circumference of the tiling energy flux cross section, also known as the edge of its cross section, or beam edge) may substantially exclude a curvature. The shape of an edge of the tiling energy flux may (e.g., substantially) comprise non-curved circumference. The shape of the tiling energy flux edge may comprise non-curved sides on its circumference. The tiling energy flux edge can comprise a flat top beam (e.g., a top-hat beam). The tiling energy flux may have a substantially uniform energy density within its cross section. The beam may have a substantially uniform fluence within its cross section. Substantially uniform may be nearly uniform. The beam may be formed by at least one (e.g., a multiplicity of) diffractive optical element, lens, deflector, aperture, or any combination thereof. The tiling energy flux that reaches the target surface may originate from a Gaussian beam. The target surface may be an exposed surface of the material bed and/or an exposed surface of a 3D object (or a portion thereof). The target surface may be an exposed surface of a layer of hardened material, or a platform. The tiling energy flux may comprise a beam used in laser drilling (e.g., of holes in printed circuit boards). The tiling energy flux may be similar to (e.g., of) the type of energy beam used in high power laser systems (e.g., which use chains of optical amplifiers to produce an intense beam). The tiling energy flux may comprise a shaped energy beam such as a vector shaped beam (VSB). The tiling energy flux may be similar to (e.g., of) the type used in the process of generating an electronic chip (e.g., for making the mask corresponding to the chip).

Figure 3:
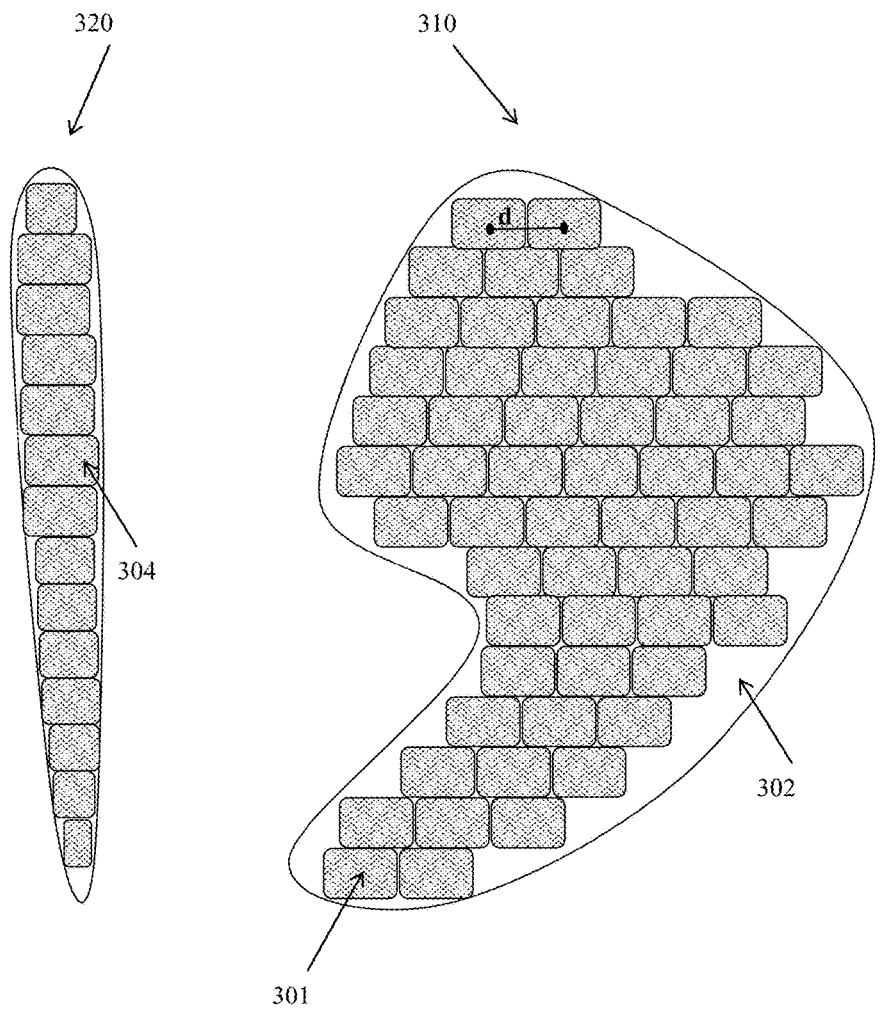
FIG. 3 illustrates schematic top view of 3D objects.

In some embodiments, the tiling energy source emits tiling energy flux that may slowly heat a tile within the exposed surface of a 3D object (e.g., FIG. 1, 106). Slowly may be in comparison to the scanning energy beam. The tile may correspond to a cross section (e.g., or footprint) of the tiling energy flux. The footprint may be on the target surface. The radiative energy source may emit radiative energy that (e.g., substantially) evenly heats a tile in the target surface (e.g., of a 3D object, FIG. 1, 106). FIG. 3 shows an example of a top view of two target surfaces 310 and 320 respectively. The target surface 310 is filled with tiles that have been formed by irradiation (e.g., heating) by the tiling energy flux (e.g., 301). The target surface 320 is filled with tiles that have been formed by irradiation (e.g., heating) by the tiling energy flux (e.g., 304).

The dimension (e.g., FLS) and/or shape of the tile may be varied within the target surface (e.g., a layer of powder material), and/or between target surfaces (e.g., layers of powder material which are irradiated by the tiling energy beam). The variation in the dimension and/or shape of the tile may depend on the geometry of the desired 3D object, deformation of at least a portion of the layer of hardened material that is being formed, deformation of a previously formed layer of hardened material, or any combination thereof. The variation in the dimension and/or shape of the tile may depend on the degree of a desired deformation within the forming layer of hardened material. The degree of desired deformation may consider the ability of the layer of hardened material (e.g., that is forming) to resist future deformation (e.g., by formation of subsequent layers).

Figure 4:
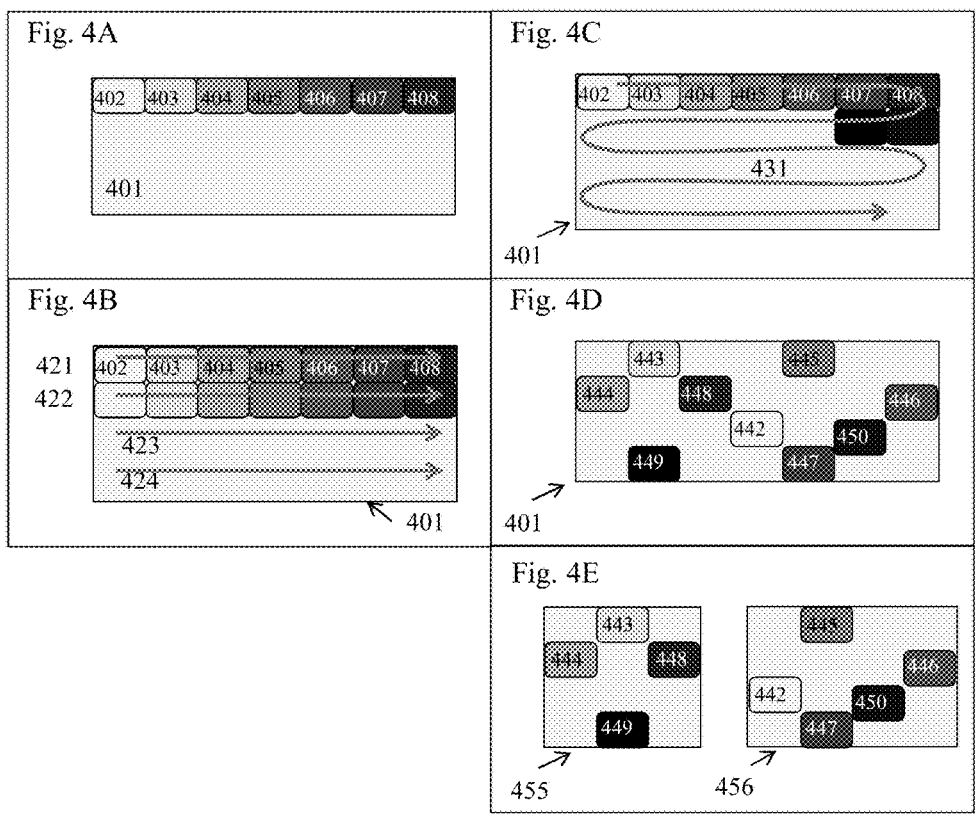
FIGS. 4A-4E illustrate schematic top view of various 3D objects.

In some examples, the gradual irradiation by the (e.g., low power density) tiling energy flux cause at least a portion of hardened material within the irradiated area (e.g., 301) to transform (e.g., melt). In some instances, a uniformly heated area may be generated (e.g., 301). In some instances, a uniformly transformed (e.g., molten) area may be generated within the heated area. The tiles in the target surface may be heated sequentially, non-sequentially, at random, or in a series. The sequence of heating may be determined for a single target surface or for several target surfaces (e.g., forming layers, or forming layer portions). FIG. 4E shows an example of two surfaces which comprise heated tiles. In some examples, the sequence of heating (e.g., generating) the tiles may correspond to the number sequence of the tiles. The heating sequence may consider the two target surfaces.

For example, after tile 444 (in FIG. 4) is formed on surface 455, tile 445 is formed on surface 456; then tile 447 is formed on surface 456, followed by forming tile 448 on surface 455.

At times, when transforming at least a fraction of the exposed surface within (e.g., including the rim of) the tiles, the tiling energy flux may heat (e.g., transform) a corresponding fraction of the material at the target surface and/or in an area beneath the target surface. The heating may allow reaching an elevated temperature that is above the solidus temperature of the material (e.g., and at or below its liquidus temperature), transforming (e.g., melting), liquefying, becoming liquidus, and/or plastic yielding of the heated layer of hardened material and/or one or more layers beneath the heated layer (e.g., the bottom skin layer). For example, the heating may penetrate one, two, three, four, five, six, seven, eight, nine, ten, or more layers of the hardened material (e.g., not only the layer that is exposed, but also deeper layers within the 3D object), or the entire 3D object (e.g., or unsupported portion thereof) reaching the bottom skin layer. For example, heating may penetrate one, two, three, four, five, six, seven, eight, nine, ten, or more layers of the pre-transformed material (e.g., not only the layer that is exposed in the material bed, but also deeper layers within the material bed), or the entire depth of the material bed (e.g., fuse the entire depth of the material bed). The very first formed layer of hardened material in a 3D object is referred to herein as the "bottom skin." In some embodiments, the bottom skin layer is the very first layer in an unsupported portion of a 3D object. The unsupported portion may not be supported by auxiliary supports. The unsupported portion may be connected to the center (e.g., core) of the 3D object and may not be otherwise supported by, or anchored to, the platform. For example, the unsupported portion may be a hanging structure (e.g., a ledge) or a cavity ceiling.

In some embodiments, as the tile is being heated by the tiling energy flux, at least a fraction of the material within the tile area is being transformed. The transformed material fraction may contract into a shape that is different from the shape of the tile. FIG. 12A shows an example of a heated tile 1210 that is heated to a point at which the area within the tile is transformed. The transformed material contracts (as shown by the four small arrows that point towards 1211), which contracted fraction deviates from the tile structure 1210. The resulting transformation will be the hardened material 1212. The tiles may be rectangular, triangular, hexagonal, or any combination thereof. The rectangular tiles may comprise a parallelogram, a quadrilateral, an orthotope, or a square (e.g., a geometric shape).

In some embodiments, the tiles are arranged in a space-filling pattern. The space-filling pattern may comprise a herringbone, stacked bond, running bond, or basket weave pattern. The tile may be a polyform. For example, the tile may be a polyomino (i.e., a plane geometric shape formed by joining one or more equal squares edge to edge). The tile may be a polyabolo (i.e., a plane geometric shape composed of isosceles right triangles joined along edges of the same length, also known as a polytan). The tiles may have a shape of a space-filling polygon. The tiles may comprise a rectangle.

Figure 26:
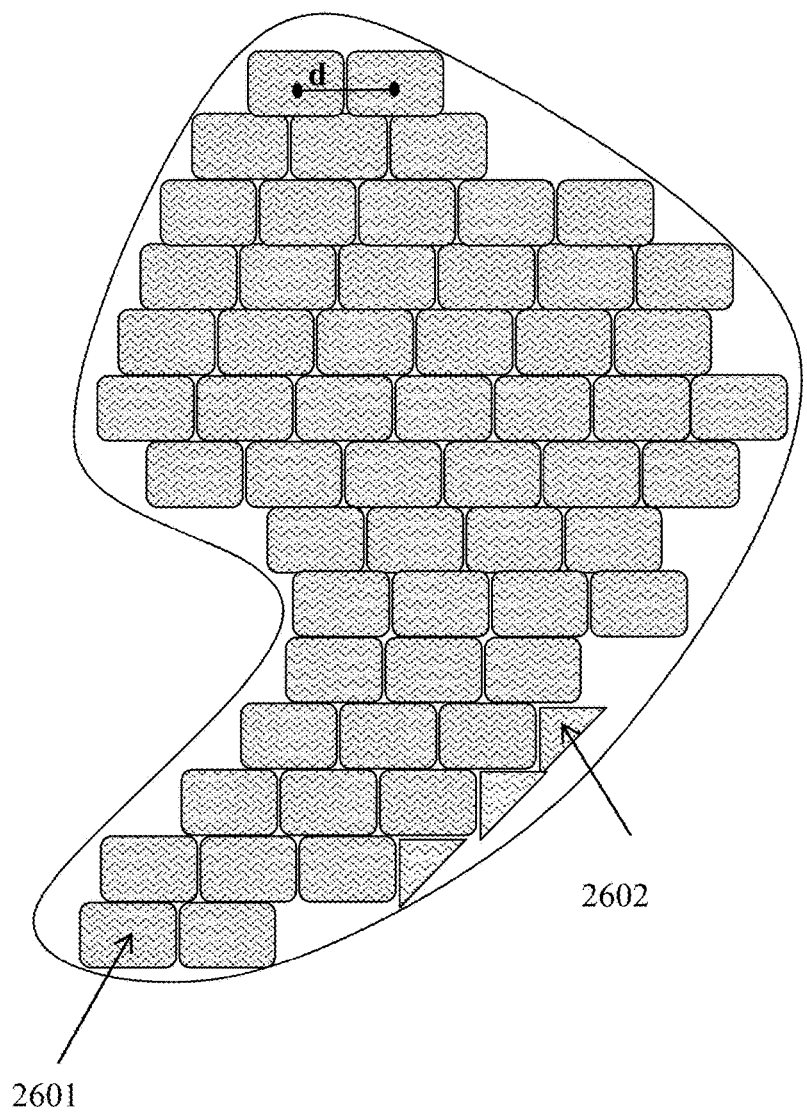
FIG. 26 shows a schematic top view of a 3D object.

In some examples, the irradiated tiles deviate from the intended shape of the hardened material tiles. For example, the tiles may comprise additional expansions at each edge of the polygon. The expansions may have any shape (e.g., geometrical shape or a random shape). The expansion may experience a greater heat concentration at the edges of the polygon, as compared to a tile that does not have the edge expansions. FIG. 12B shows an example of a tile 1220 with expansions at its edges (e.g., 1223). The tile in FIG. 12B is composed of a main space filing polygonal tile (e.g., similar to the rectangular tile 1210), having smaller shapes at each of its edges (e.g., square 1223). The heat at the expanded edges may alter the shape of the transformed material (e.g., 1221) and facilitate a formation of a polygonal tile (or closer to that shape) of transformed and/or hardened material having the desired polygonal shape (e.g., space filling polygon, 1222). The tile may have a polygonal shape (e.g., space filling polygon). All the tiles within an exposed surface may comprise a (e.g., substantially) identical shape (e.g., FIG. 3). At least two of the tiles within an exposed surface may comprise varied (e.g., different) shapes (e.g., FIG. 26, tiles 2601 and 2602).

In some examples, after, subsequent, or contemporaneous to the time when the tile is generated (e.g., heated to a predetermined temperature and/or for a certain (e.g., predetermined) time) using the tiling energy flux, the scanning energy beam irradiates the areas adjacent to the edges of the tiles to increase the concentration of heat at the edges. FIG. 12C shows example of a tile 1230 that was heated by the tiling energy flux, which edges were additionally heated with the scanning energy beam (e.g., in a spiral shaped path 1233) to allow a greater heat density to accumulate (e.g., be present) at the edges of the polygonal tile. The greater heat at the edges may at least in part reduce the contraction of the transformed material (e.g., 1231) and allow the formation of a polygonal tile (or closer to that shape) of transformed and/or hardened material (e.g., 1232) that has the desired cross sectional shape. The tile may comprise a curvature. The tile may comprise an ellipse (e.g., round) shape.

In some instances, the tiles at least partially overlap each other in a target surface. At times, the tiles may substantially overlap. The overlapped area may be at least about 10%, 20%, 30%, 40%, 50%, 60%, 70%, 80% or 90% of the average or mean tile area. The overlapped area may be at most about 10%, 20%, 30%, 40%, 50%, 60%, 70%, 80% or 90% of the average or mean tile area. The overlapped area may between any of the afore-mentioned values (e.g., from about 10% to about 90%, from about 10% to about 50%, or from about 40% to about 90%) of the average or mean tile area. The percentage of overlapped area may be substantially identical along the path of the tiling energy flux. The percentage of overlapped area may be substantially identical in a generated layer of hardened material. FIG. 30 shows examples of paths along which the tiling energy flux may travel (also herein "path-of-tiles." E.g., 3040), forming tiles that partially overlap each other (e.g., 3030). Arrow 3010 designates the direction along the path-of-tiles. Arrow 3020 designates the direction perpendicular to the path-of-tiles. The 3D object in frame 3050 shows a top view of a 3D object that includes a bottom skin layer 3060 on which a second layer (e.g., having tiles 3070) is generated with the tiling energy flux traveling along the path-of-tiles, which direction of path-of-tile is visible by the lines formed in the second layer (e.g., having tiles 3070). The 3D object in frame 3050 is made of Inconel 718 and is formed from an Inconel powder bed by melting a portion thereof. The percentage of overlapped area may be substantially identical along the path-of-tiles and between these paths (e.g., in the direction 3020). The percentage of overlapped area may be substantially identical along the path of the tiling energy flux (e.g., path-of-tiles) and perpendicular to that path. The percentage of overlapped area may be varied along the path of the tiling energy flux. The percentage of overlapped area may be varied along the path of the tiling energy flux and between paths. The percentage of overlapped area may be varied along the path of the tiling energy flux and perpendicular to that path. The percentage of overlapped area may be different along the path of the tiling energy flux. The percentage of overlapped area may be different along the path of the tiling energy flux and between paths. The percentage of overlapped area may be different along the path of the tiling energy flux and perpendicular to that path. For example, along the path, the tiles may overlap by at least about 60%, and between paths or perpendicular to that path, the tiles may overlap by at least about 30%. At times, the tiles may overlap more along the path, than between paths. At times, the tiles may overlap more along the path, than perpendicular to that path. At times, the tiles may overlap less along the path, than between paths. At times, the tiles may overlap less along the path, than perpendicular to that path. FIG. 30 shows an example where the overlap of the formed tiles along the path is substantially identical, the overlap of the formed tiles in a direction perpendicular to the path is substantially identical, and the overlap of the formed path along the path is different from the overlap of the formed tiles perpendicular to the path. FIG. 30 shows an example where the overlap of the formed path along the path is greater than the overlap of the formed tiles perpendicular to that path. The path-of-tiles may be any path described herein for the energy beam (e.g., FIG. 8).

Figure 32:
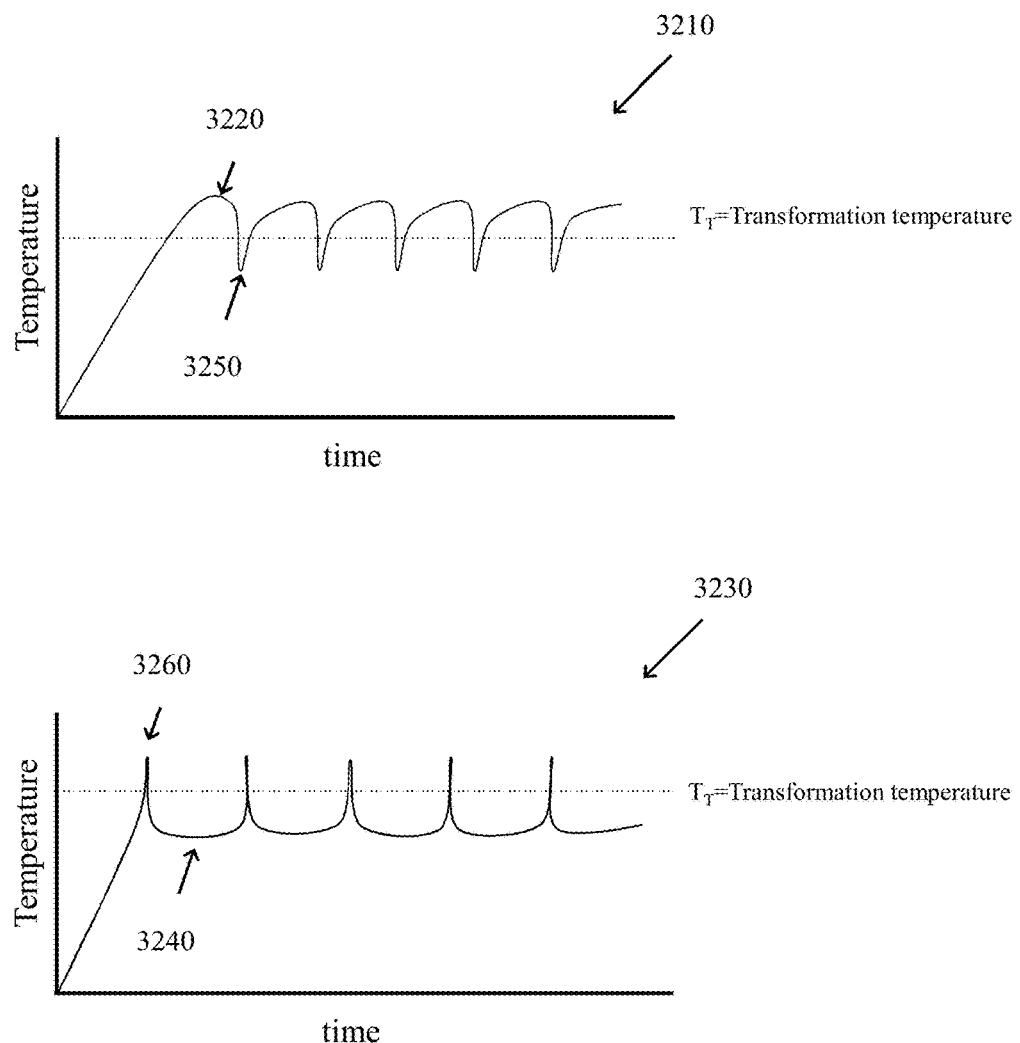
FIG. 32 shows temperature dependence timelines.

The adjacent and/or overlapping tiles may be formed using the tiling energy flux. The sequence by which the tiling energy flux emits energy to the target surface as it proceeds along the path-of-tiles, may comprise a dwell and intermission time. The intermission may be a relative intermission. For example, the intermission may comprise a period where a reduced amount of radiation (e.g., no radiation) is emitted by the tiling energy flux on the target surface along the path-of-tiles. FIG. 32 shows two examples of a temperature profiles of a target surface over time. In temperature profile 3210, the time at which a position 3220 of a target surface is at a temperature above the transformation temperature Tt is greater than the intermission time 3250, where the temperature of a position on the target surface is below Tt. In temperature profile 3230, the time at which a position 3260 of a target surface is at a temperature above the transformation temperature Tt is smaller than the intermission time 3240, where the temperature of a position on the target surface is below Tt. The temperature profile depicts the temperature of the target surface during the time in which the tiling energy flux travels along the path-of-tiles. The temperature of the material at a particular position may be at or above the transformation temperature of the material during the exposure time of the tiling energy flux (e.g., dwell time) when the tile is formed. The temperature of the material at a particular position may be below the transformation temperature of the material during the intermission (e.g., "off time") of the tiling energy flux, at which no tile is formed.

At least a portion of the target surface can be heated by the energy source (e.g., of the scanning energy beam and/or tiling energy flux). The portion of the material bed can be heated to a temperature that is greater than or equal to a temperature wherein at least a portion of the target surface (e.g., comprising a pre-transformed material) is transformed. For example, the portion of the powder bed can be heated to a temperature that is greater than or equal to a temperature wherein at least a portion of the powder material is transformed to a liquid state (referred to herein as the liquefying temperature) at a given pressure (e.g., ambient pressure). The liquefying temperature can be equal to a liquidus temperature where the entire material is at a liquid state at a given pressure (e.g., ambient). The liquefying temperature of the powder material can be the temperature at or above which at least part of the powder material transitions from a solid to a liquid phase at a given pressure (e.g., ambient). A powder material comprises a solid particulate material.

The temperature and/or energy profile over time of the path-of-tiles may comprise intermissions in which the path is irradiated with the tiling energy flux with an energy that is insufficient to transform the respective portion of the target surface. For example, the path may comprise intermissions in which the path is not irradiated with the tiling energy flux. During the intermission time, the tiling energy flux may travel elsewhere in the material bed and irradiate a different portion of the target surface than along the subject path-of-tiles. That different position may be a different tile or a different path-of-tiles. The different portion may be distant or adjacent to the path-of-tiles.

In some embodiments, the tiling energy flux may irradiate (e.g., substantially) one position during the dwell time (within the path-of-tiles) to form the tile. In some examples, the tiling energy flux remains along the path-of-tiles during the intermission. In some examples, the tiling energy flux translates during the intermissions (e.g. off time) until it reaches a second dwell (e.g., irradiative) position. For example, during the intermission time, the tiling energy flux may travel elsewhere in the material bed and irradiate a different portion of the material bed than the recently tiled position. The different portion may be distant or adjacent to the recently tiled position (e.g., the tile that has just been formed). The tiling energy flux may dwell in substantially one position during the dwell time within the forming tile, and translate during the intermissions (e.g. off time) until it reaches the second dwell (e.g., irradiative) position. Melting may comprise complete melting into a liquid state.

The intermission time may allow the first formed tile to harden (e.g., completely harden), prior to forming the second tile along the path of tiles. The intermission may allow at least the exposed surface of the first tile to harden (e.g., while its interior is still in a liquid state), prior to forming the second tile along the path of tiles. The intermission may allow at least the outer rim of the first tile to harden, prior to forming the second tile along the path of tiles. The intermission may allow at least the exposed surface of the overlapping portion of the first tile to harden, prior to forming the second tile along the path of tiles. In some examples, there is substantially no intermission between the dwell times. In some examples, the dwell time of the tiling energy flux is continuous. The intermissions may comprise a reduced amount of radiation of the tiling energy flux. The reduced amount of radiation may not be sufficient to transform the portion of the material bed that is irradiated by the tiling energy flux during the intermission. The intermission can last at least about 1 msec, 10 msec, 50 msec, 250 msec, or 500 msec. The intermission can last any time-period between the afore-mentioned time-periods (e.g., from about 1 msec to about 500 msec).

Figure 39A:
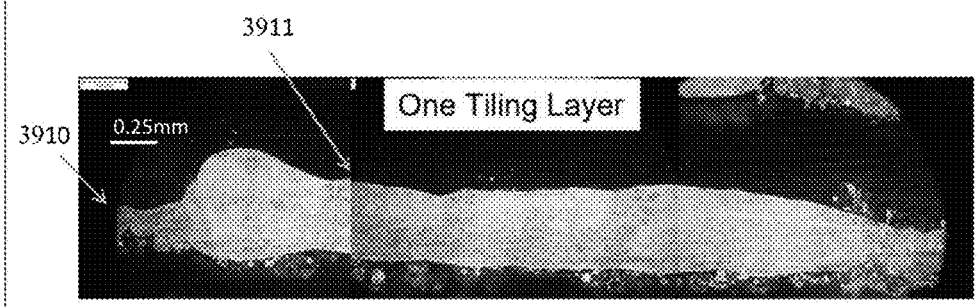
FIGS. 39A-39B show examples of 3D objects.
Figure 39B:
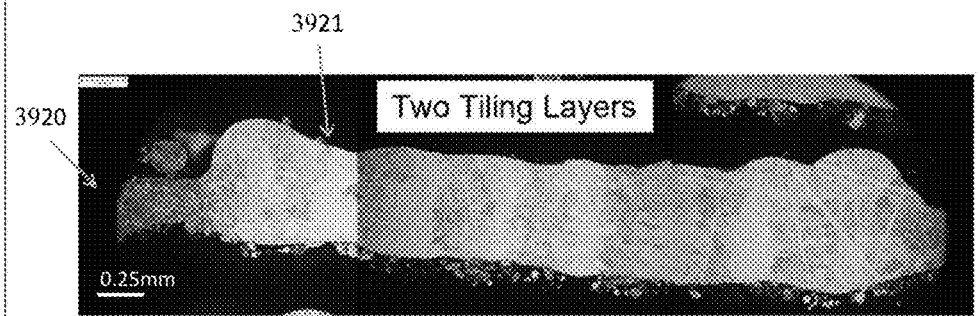

In some examples, the melt pool that is generated by the tiling energy flux is larger (e.g., have a larger FLS) than the melt pool generated by the scanning energy beam. Larger may be in the horizontal and/or vertical direction. The melt pool that is generated by the tiling energy flux may have a FLS that is larger than the FLS of the melt pool generated by the energy beam by about 10%, 20%, 30%, 40%, 50%, 60%, 70%, 70%, 80%, 90%, or 95%. The melt pool that is generated by the tiling energy flux may have a FLS that is larger than the FLS of the melt pool generated by any value between the afore-mentioned values (e.g., from about 10% to about 95%, from about 10% to about 60%, from about 50% to about 95%). The tiling energy flux may transform portions of previously formed layers. The tiling energy beam may form melt pools that span into previously formed layers (e.g., bottom skin). FIG. 36 shows an example of a vertical cross section of a 3D object made of Inconel 718, which 3D object includes a multiplicity of layers of hardened material formed by the methods disclosed herein, wherein the melt pools that are lastly formed (e.g., 3605), penetrate to previously formed layers; for example, to the bottom skin layer (e.g., 3606). FIGS. 39A-39B show examples of a vertical cross section of various 3D objects formed of Inconel 718, which 3D object includes a multiplicity of layers of hardened material formed by the methods disclosed herein. FIG. 39A shows an example of a two-layered object that includes a bottom skin layer 3910 and a second layer 3911. The melt pools in the 3D object of FIG. 39A are hardly visible, since the entire 3D object is formed of very large melt pools and reach the bottom skin layer. FIG. 39B shows an example of a three-layered objects that includes a bottom skin layer 3920 and two additional layers 3921. The melt pools in the 3D object of FIG. 39B are very broad and reach the bottom skin layer.

In some examples, the tiling energy flux injects energy into one or more pre-formed layers (e.g., deeper layers) of hardened material that are disposed below the target layer (e.g., layer of pre-transformed material) that is irradiated by the tiling energy flux. The injection of energy into the one or more deeper layers may heat those deeper layers up. Heating of the deeper layers may allow those deeper layers to release stress (e.g., elastically and/or plastically). For example, the heating of the deeper layers allows those layers to deform beyond the stress point. For example, the heating of the deeper layers may allow a position of the deeper layer that is parallel to the irradiated position to reach an elevated temperature that is above the solidus temperature (e.g., and at or below the liquidus temperature), liquefy (e.g., become partially liquid), transform (e.g., melt), become liquidus (e.g., fully liquid), and/or plastically yield (e.g., stress-yield).

In some embodiments, the tiling energy flux is used at least in part in forming the layers of hardened material that form the 3D object (e.g., all the layers). In some embodiments, the tiling energy flux is used at least in part in forming at least a portion of the layers of hardened material that form the 3D object (e.g., all the layers). The portion may be the initial portion (e.g., layers in the first 1 or 2 millimeters of the 3D object). The portion may be up to a certain accumulated thickness of the 3D object, referred to herein as the "critical layer thickness." The certain critical layer thickness may be at least about 500 µm, 600 µm, 700 µm, 800 µm, 900 µm, 1000 µm, 1200 µm, 1500 µm, 1800 µm, or 2000 µm. The critical layer thickness may be of any value between the afore-mentioned values (e.g., from about 500 µm to about 2000 µm, from 500 µm to 1000 µm, or from 800 µm to 2000 µm). The critical layer thickness may be a critical thickness above which at least an additionally accumulated layer of hardened material will not contribute substantial deformation of the 3D object (or portion thereof). Substantial deformation is relative to the intended purpose of the 3D object. The at least a portion may be devoid of auxiliary supports. The at least a portion may float anchorlessly in the material bed during its formation.

In some embodiments, the scanning energy beam is used at least in part in forming the layers of hardened material that form the 3D object (e.g., all the layers). The portion may be the later portion (e.g., beyond the critical thickness). In some embodiments, the energy beam is used (e.g., at least in part) to form the bottom skin layer. In some embodiments, the energy beam is used to form the bottom skin layer without the use of the tiling energy flux. The portion may be from a certain accumulated thickness of the 3D object onwards. The energy beam may be using in forming a layer of hardened material in combination with the tiling energy flux, alone, or without the aid of the tiling energy flux.

In some examples, the scanning energy beam forms a contour (e.g., FIG. 21C, 2131; or FIG. 21A, 2111) of hardened material around at least a portion of the area to be filled with the path-of-tiles (e.g., FIG. 21C, 2132) generated by the tiling energy flux and/or hatches made by the scanning energy beam (e.g., FIG. 21A, 2112). In some examples, the scanning energy beam propagates in hatches along the target surface. The contour may be a closed line or an open line (e.g., comprising intermissions). The contour may be a continuous line or a discontinuous line. The contour may precede, supersede, or be formed contemporaneously with the formation of the interior tiles. FIGS. 21A-21D show examples of top view of a layer of hardened material illustrating various possible stages in the formation of a layer of hardened material. FIG. 21A shows an example where the contour 2111 and the hatches made by the scanning energy beam (e.g., 2112) are made prior to forming the path-of-tiles. FIG. 21B shows an example of a completed layer of hardened material 2120 comprising a contour 2121, hatching made by the scanning energy beam (e.g., 2122), and tiles may by the tiling energy flux (e.g., 2123). FIG. 21C shows an example where the contour 2131 and the tiles (e.g., 2132) made by the tiling energy flux are made prior to forming the hatches. FIG. 21D shows an example of a completed layer of hardened material 2140 comprising a contour 2141, hatches made by the scanning energy beam (e.g., 2142), and tiles may by the tiling energy flux that include complete tiles (e.g., 2143) and redacted tiles (e.g., 2144). The path of tiles may sequentially fill the entire target layer of hardened material (e.g., corresponding to a target slice of the 3D object model). In some examples, the area to be filled with tiles may be separated to patches. The path of tiles may fill the entire target layer in patches. The patches may separate the sequence of filling the target space (e.g. corresponding to a target slice of the 3D object model) FIG. 21D can be used to illustrate an example of patch filling. For example, the tiles in patch B may be formed first, followed by forming tiles in patch A, then followed by forming the tiles in patch C, and finally followed by the redacted patches (e.g., 2144). In the example of FIG. 21D, the lighter tiles belong to patch A, darkest tiles belong to patch C, and intermediate gray tile belong to patch B. Forming the tiles may follow any ordering combination of patches. Forming the layer of hardened material may comprise forming a contour, hatches made by the scanning energy beam, one or more patches of path-of-tiles, redacted tiles (e.g., partial tiles, see FIG. 2), individual tiles, or any permutation or combination thereof. In some examples, most of the area of the layer of hardened material is formed from tiles (e.g., FIG. 21B, 2123). The tiles may be formed by the tiling energy flux. In some embodiments, most of the area of the layer (e.g., horizontal cross section thereof) may be at least about 51%, 60%, 70%, 80%, 90%, or 95% of the area of the layer. In some examples, a minor part of the layer of hardened material is formed by hatching (e.g., 2122). The hatching may be formed by the scanning energy beam. A minor part of the layer (e.g., horizontal cross section thereof) may be at most about 49%, 40%, 30%, 20%, 10%, 5%, or 1% of the area of the layer.

In some examples, the tiles have a geometric shaped cross section. The tile can comprise a cross-section (e.g., horizontal cross section) that is circular, triangular, square, rectangular, pentagonal, hexagonal, partial shapes thereof, and/or combinations thereof. The tile can comprise a polygonal cross-section. The tile cross section may be a parallelogram. The tiles on the target surface may comprise any combination of tile shapes (e.g., that would tightly fill a space). For example, a combination of triangle and hexagon shaped tiles. The tiles in a first target surface and in a second target surface that is adjacent (e.g., above or below) to the first target surface may be substantially aligned. The tiles in a first target surface and in a second target surface that is adjacent (e.g., above or below) to the first target surface, may be substantially mis-aligned (e.g., may be arranged in a face centered cubic (FCC) or hexagonal closed packed (HCP) arrangement).

In some embodiments, the tiling methodology includes a step and repeat process. In some embodiments, the tiling methodology includes heating a first area in a target surface, moving to a second area in the target surface, and heating the second area. The areal heating may utilize a tiling energy flux that irradiates the area while (e.g., substantially) not moving, or a scanning energy beam that irradiates the area while hatching it. The sequential heating of the target surface using the tiling methodology may follow a path. The path may include a path of the tiles in the layer (herein also "path-of-tiles"), which corresponds to the sequence in which the portions (e.g., tiles) are heated. The tiles may follow a vectorial path (e.g., a predesigned path). The tiles may follow a rasterized path. Heating may be to a temperature below, at, or above a transformation temperature.

The path-of-tiles can be linear, rectilinear, curved, staggered, stochastic, or any combination thereof. The sequence may be assigned according to an algorithm. The algorithm may exclude a random number generator. The algorithm may comprise the area-of-preclusion as described herein. FIG. 4B shows an example of a sequence of several paths-of-tiles numbered 421-424. The direction of the arrows in each of 421-424 designates the sequence in which a single file of individual tiles (e.g., 402-408) are heated (e.g., generated) in the layer 401. For example, the path-of-tiles 421 illustrates that tile 402 was heated first, tiles 403, 404, 405, 406, and 407 were formed in sequence one after another, and 408 was heated last (e.g., the tiles were generated in a single file). FIG. 4C shows an example of a path 431 that designates the sequence in which individual portions (e.g., 402-408) are sequentially formed in the layer 401. FIG. 4D shows an example of individual portions (e.g., 402-408) generated in the layer 401 in a manner that excludes an area in the sequence of tile heating. The sequence of tile forming may be the path-of-tiles. The excluded area may be designated as "area of preclusion." The path-of-tiles may be any path described herein for the energy beam.

In some examples, the cross sections of the tiles are heated sequentially. At least two of the sequentially heated tiles (e.g., all the sequential tiles) may touch each other, border each other, overlap each other, or any combination thereof. The sequentially generated tiles may touch or overlap each other at least at one of their edges. At least two of the sequentially heated tiles (e.g., all the sequential portions of material) may overlap. At least two of the sequentially generated tiles (e.g., all the sequential tiles) may be separated by a gap. The generated tiles may be formed in a random or non-random sequence. The generated tiles may be formed in a manner that avoids an area of preclusion. The area of preclusion may comprise three or more tile areas that are heated sequentially and are arranged on a straight line. The determination of the area of preclusion may comprise characteristics of a gap between at least two tiles (or lack thereof). The gap characteristics may include the height, length, width, or volume of the gap. The determination of the area of preclusion may comprise characteristics of the first layer of hardened material and any previously formed layers of hardened material, which characteristics may include the height, length, width, volume, shape, or material of these layer(s). The determination of the area of preclusion may comprise energy characteristics of the first layer and any previously formed layers, for example, energy depletion characteristics. FIG. 4A shows an example of a first layer 401, on which sequential tiles are heated (e.g., generated), numbered 402-408, such that at least one of their edges (e.g., two edges) are touching each other, forming a row comprising single file of tiles. The number sequence represents the sequence in which the tiles were heated, with 402 being the first tile heated in layer 401, and 408 the last respectively (e.g., 402, followed by 403, followed by 404, . . . followed by 408). FIG. 4D shows an example of a first layer 401 in which tiles 442-450 are heated in a manner that avoids an area of preclusion, wherein the number sequence designates the sequence in which the tiles were disposed, with 442 being the first tile formed on layer 401, and 450 the last.

Figure 31:
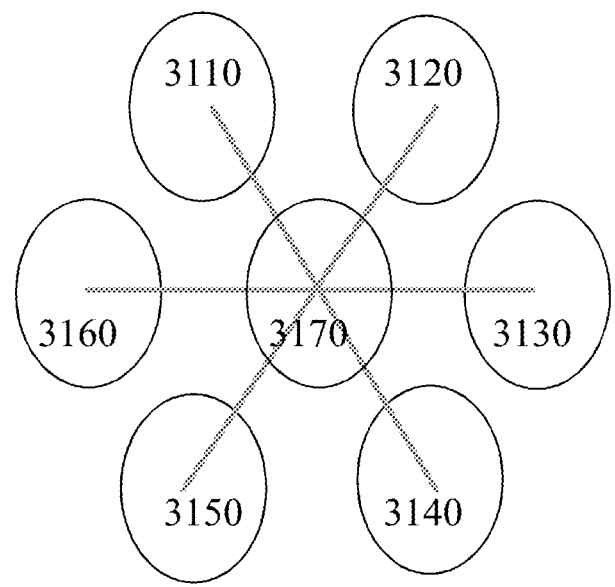
FIG. 31 illustrates tiling patterns.

The layer of hardened material that comprises the heated (e.g., formed) tiles may utilize a symmetric or asymmetric path (e.g., path-of-tiling) for their heating. The tiling energy flux may form the tiles in a symmetric or asymmetric manner from a layer of pre-transformed material. During the generation of a layer of hardened material, the tiling energy flux may heat (e.g., form) the tiles in a symmetric or asymmetric manner. For example, the symmetric manner comprises using a point, axis or plane of symmetry disposed substantially in the center of the area of the material bed to be transformed. FIG. 31 shows an example of a tile formation sequence. Per a point symmetry sequence, the tiling can be formed in the following order: 3110, 3140, 3120, 3150, 3130, and finally 3160. Per a mirror symmetry sequence, the tiling can be formed in the following order: 3110, 3150, 3120, 3140, 3160, and finally 3130. Per a rotational symmetry, the tiling can be formed in the following order: 3110, 3150, 3120, 3140, 3160, and finally 3130. An asymmetric sequence may be formed when all the vectrorial paths point towards a single direction (e.g., FIG. 8, 814). Per a directional asymmetric tiling sequence, the tiling can be formed in the following order: 3110, 3120, 3160, 3170, 3130, 3150, and finally 3140. In some examples, an asymmetric sequence results in a layer of hardened material (e.g., 3D plane) that is bent (e.g., warped). In some examples, a symmetric tiling sequence results in a layer of hardened material (e.g., 3D plane) that is substantially planar. The usage of symmetric tiling sequence may reduce the amount of curvature (e.g., warping) in the formed layer of hardened material. An example of a symmetric path may be a path-of-tiles that comprises opposing vector paths (e.g., FIG. 8, 815), or a serpentine path (e.g., FIG. 8, 810). In some examples, the path-of-tiles is heated (e.g., formed) from the edge of the area to be tiled, towards the center of the area to be tiles (e.g., the edge of the formed layer of hardened material, towards its center). The inward bound path-of-tiles sequence may reduce the curvature of the resulting layer of hardened material. The inward bound path-of-tiles may comprise symmetric or asymmetric tiling sequence. Tile number 3170 in the example of FIG. 31, may be formed last following an inward bound path-of tile sequence, whereas the tiles 3110-3160 may be formed prior to the formation of tile 3170.

The heating (e.g., generation) of a tile may utilize irradiation of a (e.g., low power density) wide cross sectional tiling energy flux at (e.g., substantially) one position. Alternatively or additionally, the generation of a tile may utilize a (e.g., high power density) narrow cross sectional energy beam (e.g., scanning energy beam) that travels along hatches to generate the shape of the tile. In some embodiments, the path traveled by the tiling energy flux or by a first scanning energy beam may be heated (to a temperature below transformation temperature of the material) by a second scanning energy beam. The second scanning energy beam may the same scanning energy beam that is used to generate the tile of transformed material. The second scanning energy beam may a different scanning energy beam from the one used to form the tiles of transformed material (e.g., first scanning energy beam, or tiling energy flux). The second scanning energy beam may be generated by a second scanning energy source. The second scanning energy source may be the same scanning energy source that is used to generate the first scanning energy beam, or may be a different energy source. The second scanning energy source may be the same scanning energy source that is used to generate the tiling energy flux, or be a different energy source. In some embodiments, the tiling energy flux may heat (but not transform) portions of the target surface, and the second energy beam may transform material within the heated tiles. The pre or post transformation heating may reduce temperature gradients in the target surface, reduce deformation, and/or generate certain microstructure(s). The second scanning energy beam may be a substantially collimated beam (e.g., an electron beam or a laser). The second scanning energy beam may not be a dispersed beam. The second scanning energy beam may follow a path. The path may form an internal path (e.g., vectorial path) within target surface portions during the formation of a layer of transformed material (e.g., in a similar manner to the first energy beam). The path may form material-filled portions along the target surface.

In some embodiments, the tiling energy flux is used to heat portions of the target surface (i.e., tiles) to a temperature below the transformation temperature, while the (e.g., second) energy beam is used to transform material in these target surface portions (e.g., tiles). In some embodiments, the scanning energy beam is used to heat portions of the target surface (i.e., tiles) to a temperature below the transformation temperature, while the tiling energy flux is used to transform material in these target surface portions (e.g., tiles). The heating to a temperature below the transformation temperature may be before by one energy radiation, after, and/or contemporaneous to transformation by the other energy radiation.

Figure 6:
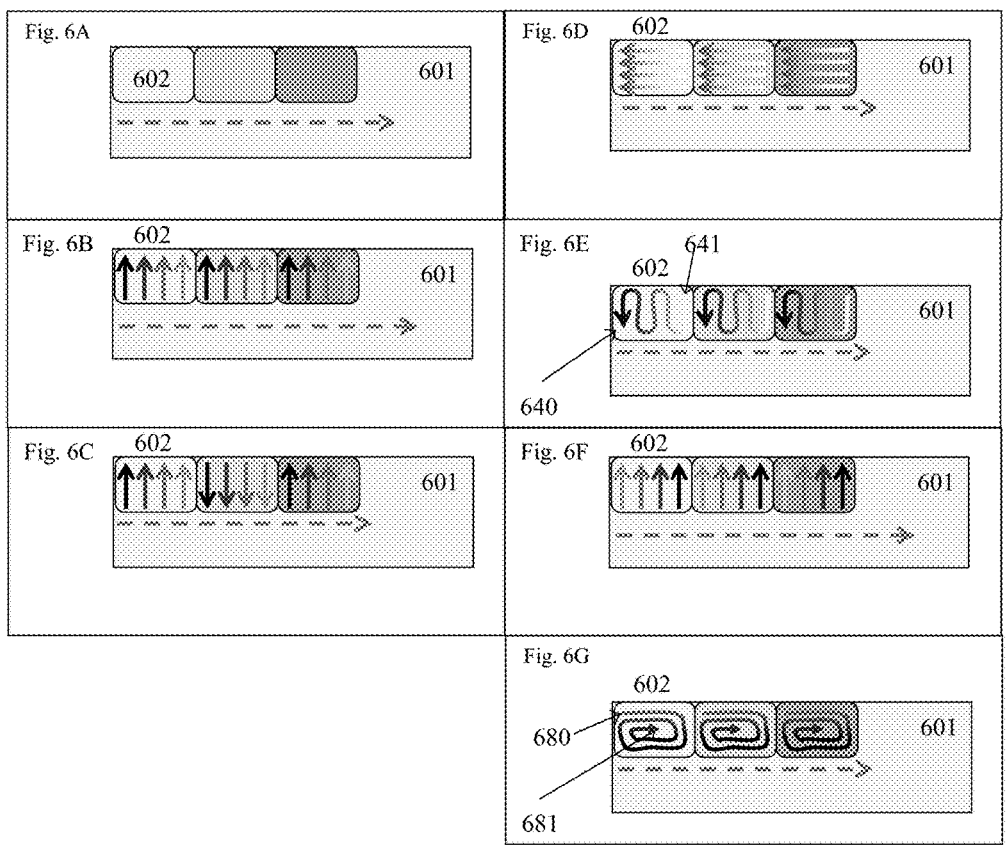
FIGS. 6A-6G illustrate schematic top view of various 3D objects.

The path of the scanning energy beam within the tile cross section is designated herein as the "internal path" within the tiles. The internal path within the tile cross section may be of substantially the same general shape as the shape of the path-of-tiles (e.g., both sine waves). The internal path within the tiles may be of a different general shape than the shape of the path-of-tiles (e.g., vector lines vs. a sine wave). FIG. 6E shows examples of the internal path within the tiles 641 that follows a curved shape, and is disposed within a heated tile 640 in an exposed surface 601. FIG. 6D shows examples of the internal path within the heated tile 602 in the exposed surface 601, which internal path follows a non-curved (e.g., vectorial) shape. The path may follow a spiraling shape, or a random shape (e.g., FIG. 8, 811). FIG. 6G shows examples of the internal path within the heated tile 602 in the exposed surface 601 that has a spiraling shape (e.g., starting at position 680 and ending at position 681). The path may be overlapping (e.g., FIG. 8, 816) or non-overlapping. The path may comprise at least one overlap. The path may be substantially devoid of overlap (e.g., FIG. 8, 810).

Figure 7:
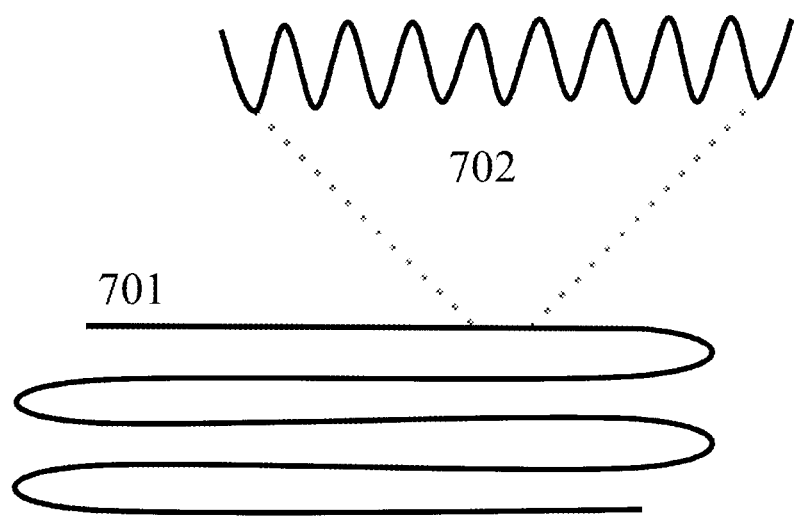
FIG. 7 illustrates a path.

The path of the scanning energy beam may comprise a finer path (e.g., sub-path). The finer path may be an oscillating path. FIG. 7 shows an example of a path of the scanning energy beam 701. The path 701 is composed of an oscillating sub-path 702. The oscillating sub path can be a zigzag or sinusoidal path. The finer path may include or substantially exclude a curvature.

Figure 8:
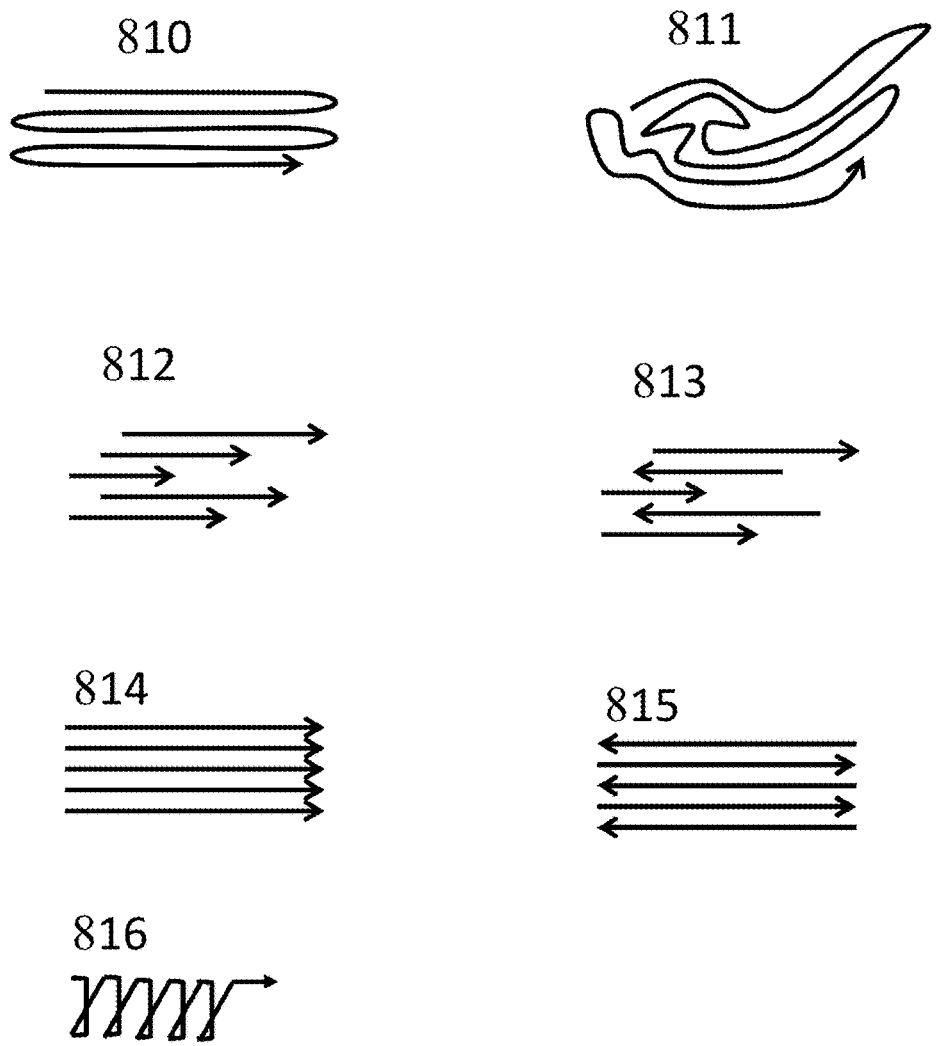
FIG. 8 illustrates various paths.

The scanning energy beam may travel in a path that comprises or excludes a curvature. FIG. 8 shows various examples of paths. The scanning energy beam may travel in each of this type of paths. The path may substantially exclude a curvature (e.g., 812-815). The path may include a curvature (e.g., 810-811). The path may comprise hatching (e.g., 812-815). The hatching may be directed in the same direction (e.g., 812 or 814). Every adjacent hatching may be directed in an opposite direction (e.g., 813 or 815). The hatching may have the same length (e.g., 814 or 815). The hatching may have varied length (e.g., 812 or 813). The spacing between two adjacent path sections may be substantially identical (e.g., 810) or non-identical (e.g., 811). The path may comprise a repetitive feature (e.g., 810), or be substantially non-repetitive (e.g., 811). The path may comprise non-overlapping sections (e.g., 810), or overlapping sections (e.g., 816). The tile may comprise a spiraling progression (e.g., 816). The non-tiled sections of the target surface (e.g., FIG. 21A, 2112) may be irradiated by the scanning energy beam in any of the path types (e.g., hatch types) described herein.

In some instances, it is not desired to allow the heated tiles to exceed the rim of the exposed surface. At times, when the heated tiles exceed the rim of the target surface (e.g., surface of a 3D object), the irradiated energy flux may heat the pre-transformed material (e.g., powder) within the material bed adjacent to the target surface. That irradiated pre-transformed material may transform and/or adhere to the 3D object. The irradiated pre-transformed material may form a sintered structure (e.g., that is unwanted) adjacent to (e.g., connected or disconnected from) the 3D object. Heating the pre-transformed material within the material bed may cause the pre-transformed material to at least partially transform (e.g., melt, sinter, or cake).

The tiling process (e.g., deep tiling, shallow tiling, or flash heating) may be used to heat and/or transform at least a portion of an exposed layer of a 3D object (e.g., comprising a hanging plane and/or wire). FIG. 3 shows an example of a top view of a plane 310 and a wire 320.

Some of the portion (e.g., heated portions, or tiles of hardened material) can be separated by a gap, touch each another heated tile, overlap each other, or any combination thereof. At least two tiles may fuse to each other. One tile may be separated from a second tile by a gap, while overlapping a third tile. For example, all the tiles may be separated from each other by gaps. At least two gaps may be substantially identical or different (e.g., in its FLS). Identical or different can be in length, width, height, volume, or any combination thereof. The gap size (e.g., height, length, and/or width) may be at most about 30 μm, 35 μm, 40 μm, 50 μm, 60 μm, 70 μm, 80 μm, 90 μm, 100 μm, 150 μm, or 200 μm. The gap size may be any value between the afore-mentioned values (e.g., from about 30 µm to about 200 µm, from about 100 µm to about 200 µm, from about 30 µm to about 100 mm, from about 80 mm to about 150 mm).

In some instances, the process of heating portions of the target surface continues until (e.g., substantially) all the gaps have been filled by tiles (e.g., except for the edge areas. E.g., FIG. 3, 302). Such process may be referred herein as "Pointillism." Any gaps and/or edges can be filled by an energy beam (e.g., following a path). The pointillism method may comprise an area of preclusion (e.g., exclude heating three tiles that are adjacently situated and form a line).

The heating can be done by the one or more energy sources. At least two of the energy sources may heat target surface portions (i.e., tiles) simultaneously, sequentially, or a combination thereof. At least two target surface portions can be heated sequentially. At least two target surface portions can be heated (e.g., substantially) simultaneously. The time and/or special sequence of heating at least two of the target surface portions may overlap.

In some embodiments, the second heated tile area may be distant from the first heated tile area. The area can be a cross section. The heat from the first tile can negligently increase the temperature of the second tile (e.g., before it is heated). Heating the first target surface portion may elevate the temperature of the second tile (e.g., before it is heated) in at most about 0.1%, 0.5%, 1%, 5%, 10%, 15%, or 20%. Heating the first tile may elevate the temperature of the second tile (e.g., before it is heated) by any percentage between the afore-mentioned percentages (e.g., from about 0.1% to about 20%, or from about 0.1% to about 10%). The heat from the first tile can negligently alter the dimension of the second tile (e.g., expand in length, width, height, and/or volume). Heating the first tile may alter the form (e.g., dimension) of the target surface to be occupied by the second tile (e.g., before it is heated) by at most about 0.1%, 0.5%, 1%, 5%, 10%, 15%, or 20%. Heating the first tile may alter the form of the target surface to be occupied by the second tile (e.g., before it is heated) by any percentage between the afore-mentioned percentages (e.g., from about 0.1% to about 20%, or from about 0.1% to about 10%). The tile may be a portion of pre-transformed material, or a transformed material tile.

In some embodiments, no sequence of three tile is formed in a straight line (e.g., single file). The three tile can be heated (e.g., transformed) sequentially such that the heating of the first tile is immediately followed by the heating of the second tile, that is in turn immediately followed by the heating of the third tile. In some embodiments, at least two of the three tiles are heated in parallel. In some embodiments, at least two of the three tiles are heated in an overlapping sequence. An example for an overlapping sequence of deposition of transformed material can be a first tile that is being formed on the exposed surface (e.g., layer), and while it is being formed, the second tile is beginning to form. The first tile can end its formation before, during, or after the formation of the second tile. In some embodiments, no sequence of three or more tiles that are situated close to each other (e.g., touching each other, or forming a gap (e.g., as described herein) with each other) is heated (and/or generated) in a straight line. The three or more tiles can include at least 4, 5, 6, 7, 8, 9, 10, 50, or 100 tiles. The three or more tiles can be any value between the afore-mentioned values (e.g., from 4 tiles to 100 tiles, from 5 tiles to 10 tiles, from 10 tiles to 100 tiles, or from 7 tiles to 50 tiles). "Between" as understood herein, is meant to be inclusive. The three or more tiles can exclude tiles that reached temperature equilibrium (e.g., with the environment). The three or more tiles can include hot tiles (e.g., comprising transformed material). The three or more tiles can comprise tiles that include transformed material and did not completely harden (e.g., solidify). The three or more tiles can exclude tiles that comprised transformed material that hardened into a hardened (e.g., solid) material (e.g., after their heating). The three or more tiles can include tiles that are disposed on a hot portion of the target surface. The three or more tiles can include tiles that are disposed on a portion of the exposed target surface that did not reach temperature equilibrium. The three or more tiles can exclude tiles that are disposed on a portion of the hardened material that is no longer susceptible to deformation (e.g., since it is sufficiently cold). In some embodiments, the area of preclusion may comprise a straight tile between two or more sequentially deposited tiles (e.g., when the two sequentially deposited tiles are in close proximity to each other separated by a gap, border each other, or overlap each other). The methods, systems, and/or apparatuses describe herein may aim to at least form successively (e.g., one after another) heated tiles in an area that is outside the area of preclusion. In some embodiments, the area of preclusion may include two tiles that are disposed sequentially one next to each other. Next to each other may be direct or indirect. For example, next to each other includes directly next to each other. Next to each other comprises next to a tile face, vertex, or edge of the tile. Next to each other may comprise touching a file face, vertex, or edge. Next to each other may comprise indirectly next to each other having a gap between the two tiles (e.g., any gap value disclosed herein).

In some examples, the area of preclusion depends on the temperature at various portions of the target surface, the time elapsed from heating at least one of two or more previously heated tiles of the first layer, the temperature at the potential area to be heated, the temperature gradient from at least one of the two or more prior tiles to the potential area to be heated, the temperature at the previously heated two or more portions, the heat deformation susceptibility of the exposed area to be heated by a third tile, or any combination thereof. In some examples, the area of preclusion depends on the physical state of matter within the heated two or more tile (e.g., liquid, partially liquid, or solid). The two or more tiles and the third tile to be heated (and/or formed) may be situated on a straight line.

In some embodiments, successively heating three or more tiles of the first layer disposed in a straight line will cause the layer (e.g., comprising the exposed surface) to deform (e.g., bend). The deformation may be disruptive (e.g., for the intended purpose of the 3D object). Such straight line may form (e.g., generate, create) a line of weakness in the first layer (e.g., layer of hardened material that is at least a portion of the 3D object). In some embodiments, successively heating at least three portions of the first layer in a pattern that differs from a straight line (e.g., FIG. 4D) will substantially lessen the degree of deformation of the layer of hardened material as compared to a straight-line heating and/or generation pattern (e.g., FIG. 4A). In some embodiments, successively heating and/or generating at least three tiles of the first layer in a pattern that differs from a straight line will substantially not cause the first layer to deform (e.g., bend). In some embodiments, successively heating at least three portions of the first layer in a pattern that differs from a straight line will retard (or prevent) the formation of lines of weakness. In some embodiments, successively heating at least three tiles of material in the layer of hardened material in a pattern that differs from a straight line (e.g., single file) will substantially not cause the first layer to deform (e.g., bend). In some embodiments, successively heating at least three tiles of material on the first layer in a pattern that differs from a straight line will retard (or prevent) the formation of lines of weakness.

Figure 5:
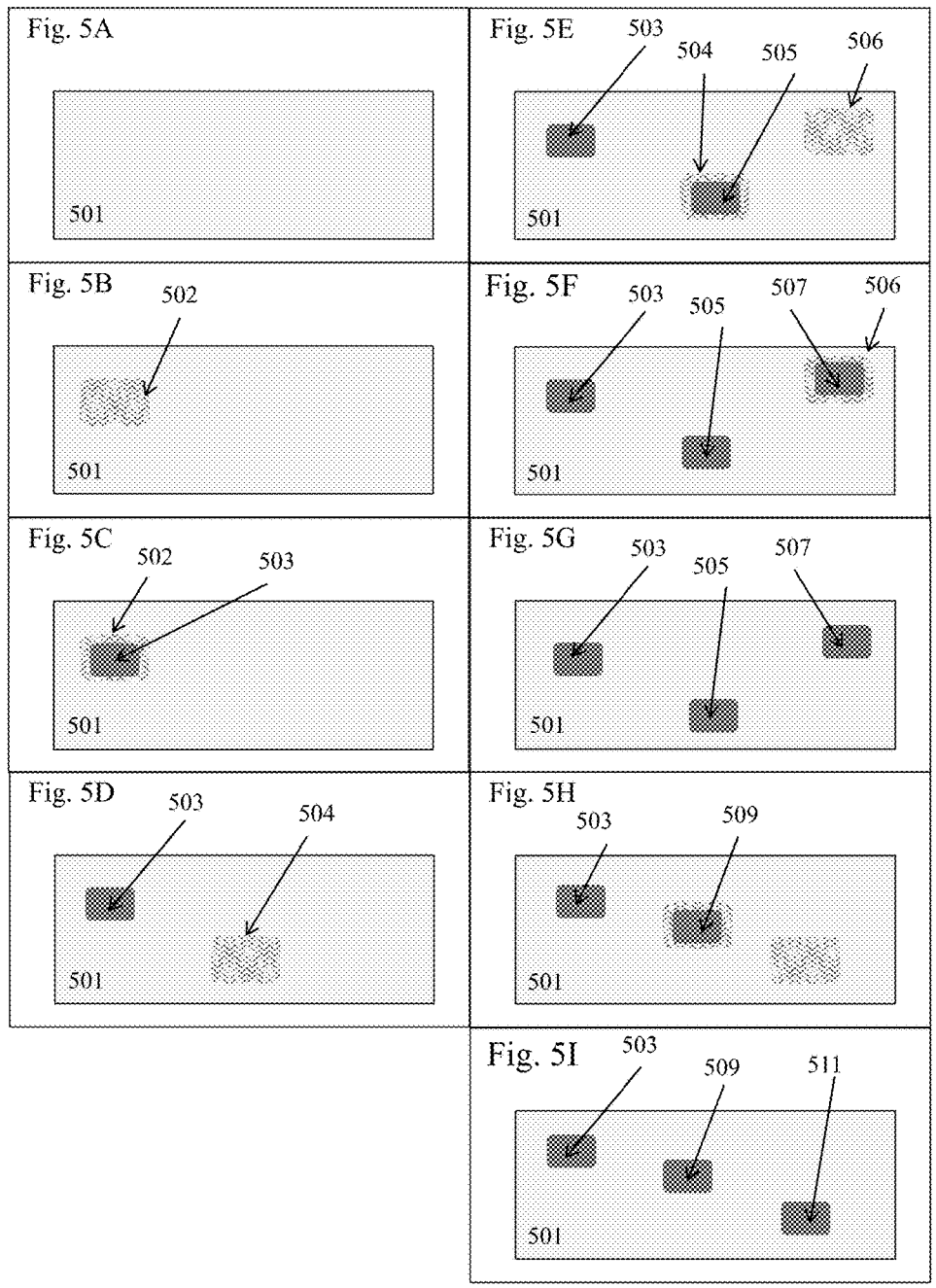
FIGS. 5A-5I illustrate schematic top view of various 3D objects.

FIGS. 5A-5F schematically show examples of a top view of parts of a version of the Pointillism process. In this version, a tile of transformed material is formed within a tile of heated material to a temperature below the transformation temperature. FIG. 5A shows an example of a target surface (e.g., the exposed layer of a material bed) 501. FIG. 5B shows an example of a tile of the target surface 501 that that is heated (i.e., 502) below the transformation temperature of the material. FIG. 5C shows an example of a fraction of material 503 that is transformed within the heated tile 502. FIG. 5D shows an example of a second heated tile 504, and the previously formed tiles of transformed material 503. FIG. 5E shows an example of a second fraction of transformed material 505 within the heated tile 504, a third heated tile 506, and the previously formed tiles of transformed material 503. FIG. 5F shows an example of a third fraction of transformed material 507 within the heated tile 506, and the previously formed tiles of transformed material (503 and 505). FIG. 5G shows an example of the previously formed tiles 503, 505, and 507 disposed on the target surface 501, which tiles are not arranged on a straight line. As a comparative example, FIGS. 5H and 5I show examples of alternative continuation steps to the process shown in FIGS. 5A-5C, in which the heated tiles (e.g., patches) and/or fractions of transformed material are deposited in a straight-line configuration. FIG. 5I shows an example of three transformed material tiles 503, 509, and 511 disposed in a straight-line configuration. Such straight-line configuration may form a line of weakness, for example, that propagates through fractions 503, 509, and 511, or propagates adjacent to fractions 503, 509, and 511. In another version of the pointillism process, the tiles or transformed material are formed without pre-heating the tile area.

In some instances, the methods, systems and/or apparatuses may comprise sensing (e.g., measuring) the temperature and/or the shape of the transformed (e.g., molten) fraction within the heated tile. The temperature measurement may comprise real time temperature measurement (e.g., during the formation of the 3D object, during the formation of a layer of the 3D object, or during the formation of the tile). The FLS (e.g., depth) of the transformed fraction may be estimated (e.g., based on the temperature measurements). The temperature measurements and/or estimation of the FLS of the transformed fraction (e.g., depth) may be used to control (e.g., regulate and/or direct) at least one characteristic of the energy irradiated at a particular portion. The at least one characteristic may comprise the power, dwell time, cross section, or footprint of the energy irradiated on the target surface. The control may comprise reducing (e.g., halting) the irradiated energy flux on reaching a target depth. The dwell time (e.g., exposure time) may be at least a few tenths of millisecond (e.g., from about 0.1), or at least a few milliseconds (e.g., from about 1 msec). The exposure time (e.g., dwell time) may be any dwell time disclosed herein. The control may comprise reducing (e.g., halting) the irradiated energy while considering the rate at which the heated portions cool down. The rate may depend on the ambient temperature (e.g., environmental temperature). The rate of heating and/or cooling the portions may facilitate formation of a desired microstructure (e.g., in particular areas). The desired microstructures may be formed in an area within the layer of hardened material, or in (e.g., substantially) the entire layer of hardened material.

The temperature at the heated (e.g., heat tiled) area may be measured. The temperature measurements may comprise spectroscopy, visually, or using expansion properties of a known material (e.g., thermocouple or thermometer). The visual measurement may comprise using a camera (e.g., CCD camera, or video camera) or a spectrometer. The visual measurements may comprise using image processing. The transformation of the heated tile may be monitored (e.g., visually and/or electronically). The overall shape of the transforming fraction of the tile may be monitored (e.g., visually and/or in real-time). The FLS of the transformed (ing) fraction may be used to indicate the depth and/or volume of the transformed material (e.g., melt pool). The monitoring (e.g., of the heat and/or FLS of the transformed fraction within the tile) may be used to control one or more parameters (e.g., characteristics) of the tiling energy source, tiling energy flux, scanning energy source, and/or scanning energy beam. The parameters may comprise (i) power density, (ii) dwell time, (iii) travel speed, or (iv) cross section. The parameters may be during heating to a temperature below the transformation temperature, or during transformation of the material to form a tile of transformed material.

In some embodiments, the tiling energy flux is used, at least in part, to form at least the bottom skin layer. For example, the tiling energy flux is used to form at least the first 20, 25, 30, 35, or 40 layers of hardened material, or all the layers of hardened material in the 3D object. A subsequent layer of hardened material (e.g., second layer) is a layer that is formed on (e.g., directly on) a previously formed layer of hardened material as part of the 3D object. The tiling energy flux may be used at least in part to form the second layer of hardened material of the 3D object and/or any subsequent layer of hardened material of the 3D object. In some instances, a layer of pre-transformed (e.g., powder) material is dispensed above (e.g., on) a layer of hardened material (that is a part of the 3D object).

In some embodiments, the tiling energy flux forms a second layer of hardened material by transforming (e.g., melting) at least a portion of the newly dispensed layer of pre-transformed material. The tiling energy flux may heat (e.g., and transform) a portion of the newly deposited layer of pre-transformed material and a portion of at least one previously formed layer (or layers) of hardened material that is disposed beneath the newly dispensed layer of pre-transformed material. The tiling energy flux may transform a portion of at least one newly deposited layer of pre-transformed material and a portion of at least one previously formed layers of hardened material that is disposed beneath the newly dispensed layer of pre-transformed material. The previously formed layers may or may not comprise the bottom skin layer. The tiling energy flux may heat (e.g., transform) tiles by transforming a portion of the pre-transformed material in the material bed, by transforming (e.g., melting) a portion of the hardened material within at least one previously formed layer of hardened material. For example, by transforming (e.g., melting) a portion of the hardened material within a multiplicity of previously formed layer of hardened material. For example, the tiling energy flux may transform a portion of the hardened material that is disposed in the bottom skin layer of hardened material of the 3D object. Melting can be complete melting of the material (e.g., to a liquid state).

The first layer of hardened material may comprise fully dense hardened material. The first layer of hardened material may comprise hardened material that is not fully dense (e.g., that is porous). For example, the first layer of hardened material may comprise holes (e.g., pores). The tiling energy flux may be utilized to reduce the FLS of the holes. The tiling energy flux may be utilized to substantially reduce the number, FLS, and/or volume of the holes (e.g., eliminate the holes). The tiling energy flux may be used to cure the layer of hardened material to provide a (e.g., substantially) high density layer of hardened material. For example, a fully dense layer of hardened material. The external surface of the layer of hardened material (e.g., external surface of the 3D object) may comprise a pattern of the tiles. For example, the pattern may resemble a checkerboard pattern. The tiling energy flux may alter the microstructure within the tile (e.g., by heating and/or transforming at least a portion of the 3D object).

In some instances, it is desired to have a 3D object (or portion thereof) that has a certain amount of porosity. The hardened material may have a porosity of at most about 0.05 percent (%), 0.1% 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The hardened material may have a porosity of at least about 0.05 percent (%), 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The hardened material may have a porosity between any of the afore-mentioned porosity percentages (e.g., from about 0.05% to about 0.2%, from about 0.05% to about 0.5%, from about 0.05% to about 20%, from about from about 0.05% to about 50%, or from about 30% to about 80%). In some instances, a pore may transverse the formed 3D object. For example, the pore may start at a face of the 3D object and end at the opposing face (e.g., bottom skin) of the 3D object. The pore may comprise a passageway extending from one face of the 3D object and ending on the opposing face of that 3D object (e.g., 3D plane). In some instances, the pore may not transverse the formed 3D object. The pore may form a cavity in the formed 3D object. The pore may form a cavity on a face of the formed 3D object (e.g., the face of the 3D plane). For example, pore may start on a face of the 3D plane and not extend to the opposing face of that 3D plane.

The first layer of hardened material may be originally formed from successively deposited melt pools having a first average FLS. The tiling energy flux that subsequently heats and/or transforms at least portions of the first layer of hardened material, may cause an alteration of the microstructure of the first layer of hardened material (e.g., alteration in melt pool FLS, melt pool orientation, material density distribution across the melt pool, degree of compound segregation to grain (e.g., melt pool) boundaries, degree of element segregation to grain boundaries, material phase, metallurgical phase, material porosity, crystal phase, crystal structure, or any combination thereof). For example, when the first layer of hardened material is originally formed from successively deposited melt pools having a first average FLS; the tiling energy flux (that subsequently heats and/or transforms at least portions of the first layer of hardened material) may cause an alteration of the microstructure of that first layer such that the newly formed melt pools in this first layer are larger than the first average FLS (e.g., original melt pool FLS). Larger may be larger by at least 1.5*, 2*, 3*, 5*, 10*, 20*, or 50* from the first average FLS of the melt pools. In some instances, the first layer will substantially comprise a single melt pool after subsequent heating by the tiling energy flux. The 3D object may be a 3D plane or a wire.

The subsequent layers of hardened material may be formed by using the tiling energy flux, the energy beam, or any combination thereof. In some examples, the bulk areas that form the layer of hardened material are formed using the tiling energy flux (e.g., larger cross section energy flux), and the fine features are formed using the energy beam (e.g., smaller cross section energy beam). The energy beam and/or flux may be focused or defocused.

The hardened material may be substantially planar (e.g., flat), or may be curved after its formation and/or heating by the tiling energy flux. The curvature may be positive or negative. The curvature may be any value of curvature and/or radius of curvature disclosed herein. The curvature may be of the layer of hardened material or of a portion thereof (e.g., of a single tile). Heating a layer of hardened material with the tiling energy flux may introduce curvature to that layer (or to a portion thereof). The manner of heating a layer of hardened material (or a portion thereof) with the irradiated energy may influence the degree and/or direction of the curvature. The manner of heating a layer of hardened material (or a portion thereof) with the irradiated energy may influence the stress at the top surface of the layer of hardened material (or the portion thereof). The manner of heating a layer of hardened material (or a portion thereof) may comprise controlling and/or altering the height of the powder layer, the density of the powder layer, the dwell time of the irradiated energy, the power density of the irradiated energy, the temperature of the material bed (e.g., or the exposed surface thereof), the temperature of the layer of hardened material, the temperature of the bottom skin layer, or any combination thereof. The control may depend on the temperature at the area that is heated (e.g., tiled), or an area at the vicinity of the heated area, or at the bottom skin layer. In some exhales, the vicinity is at most about 2, 3, 4, 5, 6, 7, or 10 melt pool FLS (e.g., diameters) away from the melt pool center. The control may depend on a FLS of the melt pool. The irradiated energy may comprise the tiling energy flux or the scanning energy beam.

In some instances, a layer of pre-transformed material may have a substantially fixed height. At times, the tiling energy flux and/or the energy beam may transform several substantially fixed height layers of pre-transformed material at once. At times, several layers of pre-transformed material of a substantially fixed height may be deposited sequentially in a material bed, followed by an energy irradiation that transforms a portion of the multiplicity of layers of powder material in one scanning of the irradiated energy. In this manner, several layers of pre-transformed material may be transformed together (referred to herein as "deep transformation"). The deep transforming can comprise deep melting (e.g., deep welding). Deep transformation may comprise deep tiling. The multiplicity of pre-transformed material layers may be of a single type of material, or of different types of material.

FIG. 35A shows an example of deep transformation. The irradiated energy 3501 may transform a portion of a material bed (e.g., formed of layers of pre-transformed material 3503) to form a melt pool 3502, which melt pool spans several layers of pre-transformed material. In the example shown in FIG. 35B, the layers of pre-transformed material are disposed above a platform 3504. In the example shown in FIG. 35A, the layers of pre-transformed material are disposed above a platform 3514.

FIG. 35B shows an example of shallow transformation. In some embodiments, a multiplicity of layers of pre-transformed material is sequentially deposited, and the top layer (or optionally at least 2, or 3 top layers) is transformed, wherein the bottom layers remain loose (i.e., uncompact) and flowable (e.g., flowable powder material). This process is referred to herein as "shallow transformation." Shallow transformation may comprise shallow melting. FIG. 35B shows an example of shallow transformation. The irradiated energy 3511 may transform a portion of a material bed (e.g., formed of layers of pre-transformed material (e.g., 3513)) to form a melt pool 3512, which melt pool is confined in the uppermost layer of pre-transformed material (e.g., 3513). Shallow tiling excludes plastically deforming the bottom skin layer, while deep tiling includes at least reaching an elevated temperature that is above the solidus temperature, transforming (e.g., melting), becoming liquidus, and/or plastically yielding (e.g., deforming) the bottom skin layer. In some embodiments, deep tiling also includes transforming the bottom skin layer.

The shallow transformation may be effectuated by a shorter dwell times, and/or lower power density of the irradiated energy (e.g., shorter exposure times). The exposure time during the shallow transformation may be at least about 0.1 milliseconds (msec), 0.5 msec, 1 msec, 3 msec, 5 msec, 10 msec, 20 msec, 30 msec, 40 msec, or 50 msec. The exposure time during the shallow transformation may be at most about 3 msec, 5 msec, 10 msec, 20 msec, 30 msec, 40 msec, or 50 msec. The exposure time may be between any of the above-mentioned exposure times (e.g., from about 0.1 msec to about 50 msec, from about 0.1 to about 1 msec, from about 1 msec to about 10 msec, from about 10 msec to about 10 msec, from about 1 msec to about 1 msec, or from about 1 msec to about 20 msec).

The deep transformation may be effectuated by longer dwell times, and/or higher power density of the tiling energy flux and/or scanning energy beam (e.g., shorter exposure times). The exposure time during the deep transformation may be at least about 50 msec, 60 msec, 70 msec, 80 msec, 90 msec, 100 msec, 200 msec, 400 msec, 500 msec, 1000 msec, 2500 msec, or 5000 msec. The exposure time during the deep transformation may be at most about 60 msec, 70 msec, 80 msec, 90 msec, 100 msec, 200 msec, 400 msec, 500 msec, 1000 msec, 2500 msec, or 5000 msec. The exposure time may be between any of the above-mentioned exposure times (e.g., from about 50 msec to about 5000 msec, from about 100 msec to about 200 msec, from about 50 msec to about 400 msec, from about 100 msec to about 1000 msec, or from about 1000 msec to about 5000 msec).

The manner of heating the one or more layers of pre-transformed material (or a portion thereof) may comprise controlling and/or altering the height of the pre-transformed material layer, the density of the pre-transformed material layer, the dwell time of the irradiated energy, the power density of the irradiated energy, the temperature of the material bed, or any combination thereof. The temperature of the material bed may comprise the temperature of the exposed surface of the material bed, bottom of the material bed (e.g., at the platform), average material bed temperature, middle material bed temperature, or any combination thereof. The control may depend on the temperature at the area of the material bed that is heated (e.g., tiled), or an area at the vicinity of the heated area. Vicinity may be at most about 2, 3, 4, 5, 6, 7, 8, 9, or 10 times the FLS of the tile.

The control of the irradiating energy (e.g., beam and/or flux) may comprise substantially ceasing (e.g., stopping) to irradiate the target area when the temperature at the bottom skin reached a target temperature. The target temperature may comprise a temperature at which the material (e.g., pre-transformed or hardened) reaches an elevated temperature that is above the solidus temperature, transforms (e.g., re-transforms, e.g., re-melts), become liquidus, and/or plastically yields. The control of the irradiating energy may comprise substantially reducing the energy supplied to (e.g., injected into) the target area when the temperature at the bottom skin reached a target temperature. The control of the irradiated energy may comprise altering the energy profile of the energy beam and/or flux respectively. The control may be different (e.g., may vary) for layers that are closer to the bottom skin layer as compared to layers that are more distant from the bottom skin layer (e.g., beyond the critical layer thickness as disclosed herein). The control may comprise turning the irradiated energy on and off. The control may comprise reducing the power per unit area, cross section, focus, power, of irradiated energy. The control may comprise altering at least one property of the irradiated energy, which property may comprise the power, power per unit area, cross section, energy profile, focus, scanning speed, pulse frequency (when applicable), or dwell time of the irradiated energy. During the "off" times (e.g., intermission), the power and/or power per unit area of the energy beam and/or flux may be substantially reduced as compared to its value at the "on" times (e.g., dwell times). Substantially may be in relation to the transformation of the material at the target surface. During the intermission, the irradiated energy may relocate away from the area which was tiled, to a different area in the material bed that is substantially distant from area which was tiled (see examples 1). During the dwell times, the irradiated energy may relocate back to the position adjacent to the area which was just tiled (e.g., as part of the path-of-tiles).

As understood herein: The solidus temperature of the material is a temperature wherein the material is in a solid state at a given pressure. The liquefying temperature of the material is the temperature at which at least part of the pre-transformed material transitions from a solid to a liquid phase at a given pressure. The liquefying temperature is equal to a liquidus temperature where the entire material is in a liquid state at a given pressure.

Figure 37:
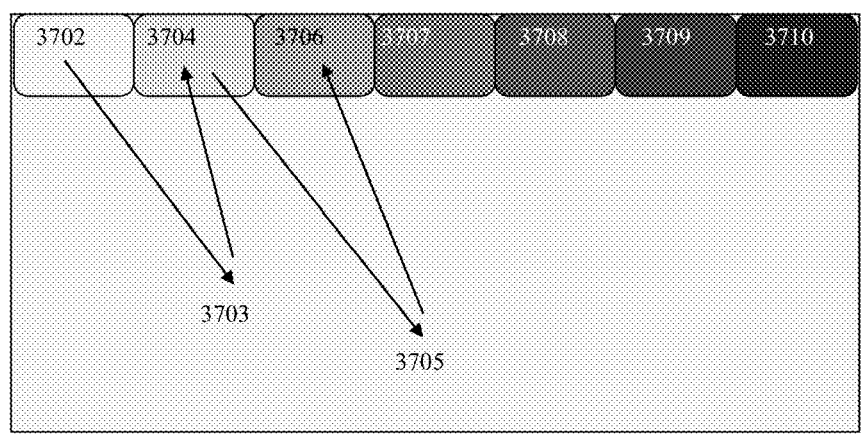
FIG. 37 schematically illustrates steps in forming a 3D object viewed from the top.

FIG. 37 shows an example of a top view of a target surface. The path of tiles in the example of FIG. 37 includes tiles 3702, 3704, and 3706-3710. The first tile formed by the irradiated energy is 3702 during a first dwell time, during the first intermission, the irradiated energy relocated to position 3703; during the second dwell time, the irradiated energy relocated back to the path-of-tiles and formed tile 3704; during the second intermission, the irradiated energy relocated to position 3705; during the third dwell time, the irradiated energy relocates back to the path-of-tiles and formed tile 3706. During the intermission, the irradiated energy may be heat and/or transform the material bed at the relocated position (e.g., 3703) that is distant from the path-of-tiles. The irradiated energy may form two distant paths-of-tiles by using the intermission time during the formation of the first path-of-tiles, to form the second path-of-tiles. The intermission of the first path of tiles can be a dwell time of the irradiated energy in the second path of tiles.

Figure 38:
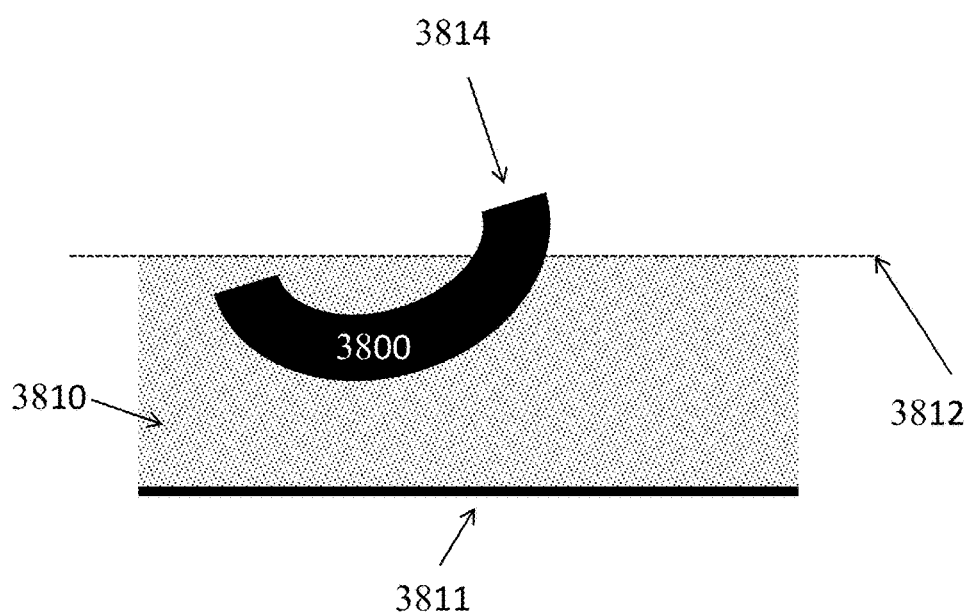
FIG. 38 schematic illustrates a side view of a 3D object in a material bed.

At times, hardened material may protrude from the exposed surface of the powder bed. FIG. 38 shows an example of a hardened material 3800 within the material bed 3810 that is located above a platform 3811. The material bed 3810 includes an exposed surface 3812. The hardened material 3800 protrudes from the exposed surface 3812 at a location 3814. The area of protrusion (e.g., horizontal cross section thereof) may be masked from the irradiated energy. In some instances, the irradiated energy may not irradiate the area (e.g., horizontal cross section thereof) which comprises the protruding hardened material. In some instances, the irradiated energy may irradiate the exposed surface of the material bed that is free of protruding objects (e.g., does not comprise protruding objects). In some instances, the irradiated energy may not irradiate the area which comprises the protruding object, and irradiate the exposed surface of the material bed that is free of protruding objects. The path in which the irradiated energy travels may exclude areas of protruding hardened material. The exclusion of the protrusion areas can be done before the irradiated energy transforms portions in a layer of pre-transformed material. The exclusion of the protrusion areas can be done in-real time (e.g., while the irradiated energy transforms portions in a layer of pre-transformed material (referred to herein as "dynamic path adjustment")) The path of the energy beam and/or flux can be adjusted dynamically as the irradiated energy travels along the exposed surface of the material bed. The adjustment of the path may consider a (e.g., optical) detection of the protruding object. For example, a real time (e.g., and in situ) optical detection as disclosed in U.S. Provisional Patent Application Ser. No. 62/297,067 that was filed on Feb. 18, 2016, and U.S. Provisional Patent Application Ser. No. 62/401,534 that was file on Sep. 29, 2016, both of which are incorporated herein by reference in their entirety.

The tiling of the target surface may follow a step and repeat sequence. The tiling of the target surface may follow a step and tile heating process to a temperature below the transformation temperature of the material at the target surface. The tiling of the target surface may follow a step and tile transforming (e.g., "filling") process. The "step" may designate the distance from a first tile to a second tile (e.g., the distance "d" shown in the example of target surface 310 in FIG. 3). The distance may be constant within a layer of hardened material. At times, the distance may vary within a layer. The "repeat" may designate the repeated heating (e.g., transforming) the target surface by a tiled area (e.g., tile 301 shown in the example of target surface 310 in FIG. 3).

The flash heating and/or deep tiling process may regulate the deformation of at least one layer of hardened material. The flash heating and/or deep tiling process may reduce the magnitude of deformation of the at least one layer of hardened material. The flash heating and/or deep tiling process, in certain conditions, may increase the deformation at least one layer of hardened material (e.g., in a desired direction). For example, the flash heating and/or deep tiling process may form at least one layer of hardened material that is negatively warped (e.g., comprises a negative curvature, FIG. 17, 1712, layer number 6). Examples for methods forming a negatively warped object can be found in U.S. Provisional Patent Application Ser. No. 62/252,330, filed on Nov. 6, 2015; U.S. Provisional Patent Application Ser. No. 62/396,584 filed on Sep. 19, 2016; and in PCT patent application Ser. No. PCT/US16/59781 filed on Oct. 31, 2016; all three of which are fully incorporated herein by reference. The certain conditions may comprise the geometry of the 3D object, the geometry of the at least one layer of hardened material, the power of the irradiated energy, the dwell time of the irradiated energy (e.g., time to make a tile), or the speed of the irradiated energy (e.g., along the path).

Figure 17:
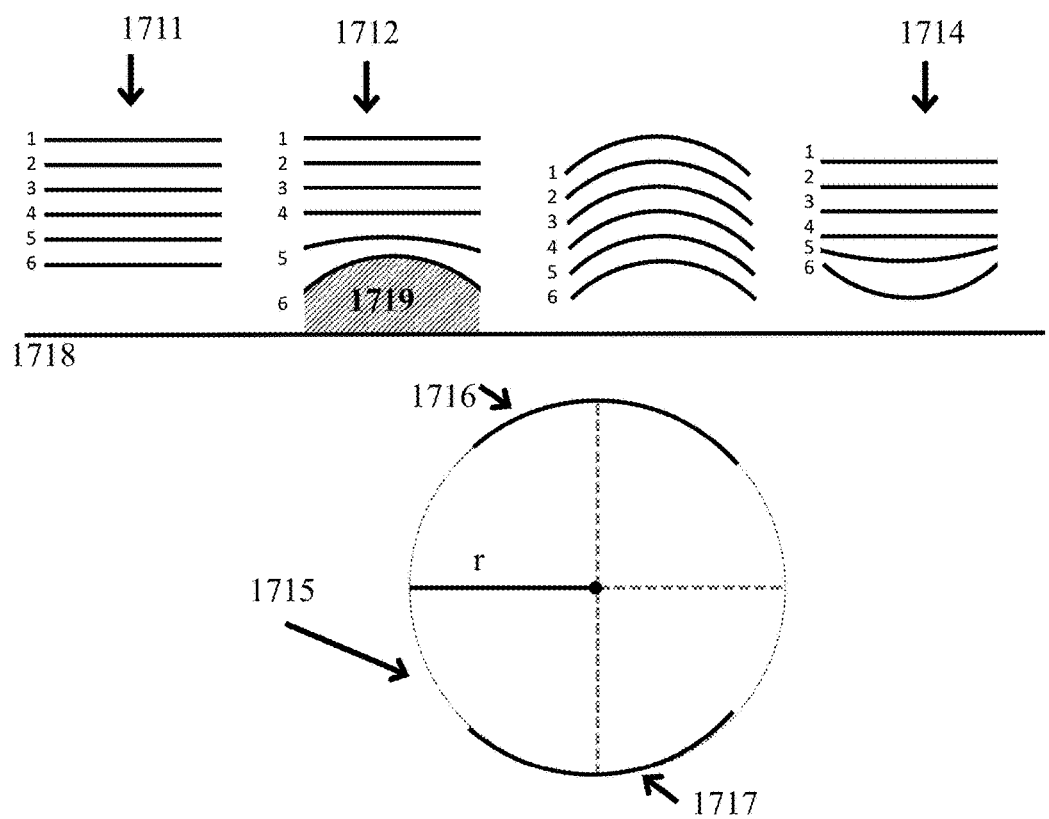
FIG. 17 shows various vertical cross sectional views of different 3D objects.

The layer of hardened material may have a curvature. The curvature can be positive or negative with respect to the platform and/or the exposed surface of the material bed. FIG. 17 shows examples of a vertical cross sections in various layered structures. For example, layered structure 1712 comprises layer number 6 that has a curvature that is negative, as the volume (e.g., area in a vertical cross section of the volume) bound from the bottom of it to the platform 1718 is a convex object 1719. Layer number 5 of 1712 has a curvature that is negative. Layer number 6 of 1712 has a curvature that is more negative (e.g., has a curvature of greater negative value) than layer number 5 of 1712. Layer number 4 of 1712 has a curvature that is (e.g., substantially) zero. Layer number 6 of 1714 has a curvature that is positive. Layer number 6 of 1712 has a curvature that is more negative than layer number 5 of 1712, layer number 4 of 1712, and layer number 6 of 1714.

In some embodiments, the curvature of all the layers within the 3D object is from at most about 0.02 millimeters$^{-1}$ (i.e., 1/millimeters). In some embodiments, the layers within the 3D object are substantially planar (e.g., flat). In some embodiments, all the layers of hardened material can have a curvature of at least about zero (i.e., a substantially planar layer) to at most about 0.02 millimeters$^{-1}$. The curvature can be at most about $-0.05$ mm$^{-1}$, $-0.04$ mm$^{-1}$, $-0.02$ mm$^{-1}$, $-0.01$ mm$^{-1}$, $-0.005$ mm$^{-1}$, $-0.001$ mm$^{-1}$, substantially zero mm$^{-1}$, 0.001 mm$^{-1}$, 0.005 mm$^{-1}$, 0.01 mm$^{-1}$, 0.02 mm$^{-1}$, 0.04 mm$^{-1}$, or 0.05 mm$^{-1}$. The curvature can be any value between the afore-mentioned curvature values (e.g., from about $-0.05$ mm$^{-1}$ to about 0.05 mm$^{-1}$, from about $-0.02$ mm$^{-1}$ to about 0.005 mm$^{-1}$, from about $-0.05$ mm$^{-1}$ to substantially zero, or from about substantially zero to about 0.05 mm$^{-1}$). The curvature may refer to the curvature of a surface. The surface can be of the layer of hardened material (e.g., first layer). The surface may be of the 3D object (or any layer thereof).

The radius of curvature, "r," of a curve at a point is a measure of the radius of the circular arc (e.g., FIG. 17, 1716) which best approximates the curve at that point. The radius of curvature is the inverse of the curvature. In the case of a 3D curve (also herein a "space curve"), the radius of curvature is the length of the curvature vector. The curvature vector can comprise of a curvature (e.g., the inverse of the radius of curvature) having a particular direction. For example, the particular direction can be the direction to the platform (e.g., designated herein as negative curvature), or away from the platform (e.g., designated herein as positive curvature). For example, the particular direction can be the direction towards the direction of the gravitational field (e.g., designated herein as negative curvature), or opposite to the direction of the gravitational field (e.g., designated herein as positive curvature). A curve (also herein a "curved line") can be an object similar to a line that is not required to be straight. A line can be a special case of curve wherein the curvature is substantially zero. A line of substantially zero curvature has a substantially infinite radius of curvature. The curve may represent a cross section of a curved plane. A line may represent a cross section of a flat (e.g., planar) plane. A curve can be in two dimensions (e.g., vertical cross section of a plane), or in three-dimension (e.g., curvature of a plane).

In some embodiments, cooling the tiles comprises introducing a cooling member (e.g., heat sink) to the heated area. FIG. 1 shows an example of a cooling member 113 that is disposed above the exposed (e.g., top) surface of the material bed 104. The cooling member may be translatable vertically, horizontally, or at an angle (e.g., planar or compound). The translation may be controlled manually and/or by a controller. The translation may be during the 3D printing. The cooling member may be operatively coupled to the controller. The tiling energy source, first scanning energy source, second scanning energy source, and/or cooling member may be translatable vertically, horizontally, or at an angle (e.g., planar or compound). The translation may be controlled manually and/or by a controller. The translation may be during at least a portion the 3D printing. In some embodiments, the energy sources are stationary. The tiling energy source, first scanning energy source, and/or second scanning energy source may be operatively coupled to the controller. The tiling energy source, first scanning energy source, second scanning energy source, and/or cooling member may be translated by a scanner. The cooling member may control (e.g., prevent) accumulation of heat in certain portions of the exposed 3D object (e.g., exposed layer of hardened material). Heating a tile on the target surface in a particular area may control (e.g., regulate) accumulation of heat in certain portions of the exposed 3D object (e.g., exposed layer of hardened material).

The flash heating, deep tiling, and/or shallow tiling method may further comprise preheating the material bed. Preheating the material bed may subsequently require less power to transform at least a portion of the exposed surface of the target surface with the aid of the tiling energy flux and/or scanning energy beam (e.g., first and/or second). Preheating and/or cooling the material bed may be from above, below, and/or sides of the material bed. The cooling member may assist in maintaining the temperature of the material bed and/or prevent transforming (e.g., fusing or caking) the pre-transformed material within the material bed and/or (e.g., within any cavities of the 3D object).

The control may comprise a closed loop control, or an open loop control (e.g., based on energy calculations comprising an algorithm). The closed loop control may comprise feed-back or feed-forward control. The algorithm may consider one or more temperature measurements (e.g., as disclosed herein), metrological measurements, geometry of at least part of the 3D object, heat depletion/conductance profile of at least part of the 3D object, or any combination thereof. The controller may modulate the irradiative energy and/or the energy beam. The algorithm may consider pre-correction of an object (i.e., object pre-print correction, OPC) to compensate for any distortion of the final 3D object. The algorithm may comprise instructions to form a correctively deformed object. The algorithm may comprise modification applied to the model of a desired 3D object. Examples of modifications (e.g., corrective deformations such as object pre-print correction) can be found in U.S. Provisional Patent Application Ser. No. 62/239,805, that was filed on Oct. 9, 2015, and in PCT patent application Ser. No. PCT/US16/34857 that was filed on May 27, 2016, both of which are entirely incorporated herein by reference. The control may be any control disclosed in U.S. Provisional Patent Application Ser. Nos. 62/297,067 and 62/401,534, both of which are incorporated herein by reference in their entirety.

The methods for generating one or more 3D objects described herein may comprise: depositing a layer of pre-transformed material (e.g., powder) in an enclosure; providing (e.g., irradiating) energy to a portion of the layer of material (e.g., according to a path); transforming at least a section of the portion of the layer of pre-transformed material to form a transformed material by utilizing the energy; optionally allowing the transformed material to harden into a hardened material; and optionally repeating steps a) to d) to generate the one or more 3D objects. The enclosure may comprise a platform (e.g., a substrate and/or base). The enclosure may comprise a container. The 3D object may be printed adjacent to (e.g., above) the platform. The pre-transformed material may be deposited in the enclosure by a material dispensing system to form a layer of pre-transformed material within the enclosure. The deposited material may be leveled by a leveling mechanism. The deposition of pre-transformed material in the enclosure may form a material bed. The leveling mechanism may comprise a leveling step where the leveling mechanism does not contact the exposed surface of the material bed. The material dispensing system may comprise one or more dispensers (e.g., FIG. 1, 116). The material dispensing system may comprise at least one material (e.g., bulk) reservoir. The material may be deposited by a layer dispensing mechanism (e.g., recoater). The layer dispensing mechanism may level the dispensed material without contacting the powder bed (e.g., the top surface of the powder bed). The layer dispensing mechanism may include any layer dispensing mechanism (e.g., FIG. 1, 116), material removal mechanism (e.g., 118), and/or leveling mechanism (e.g., 117) that are disclosed in patent application Ser. No. PCT/US15/36802 titled "APPARATUSES, SYSTEMS AND METHODS FOR 3D PRINTING" that was filed on Jun. 19, 2015 and that is incorporated herein by reference in its entirety. The layer dispensing mechanism may comprise a material dispensing mechanism, material leveling mechanism, material removal mechanism, or any combination thereof. In some embodiments, the pre-transformed material may be added and leveled by the layer dispensing mechanism sequentially during the same run (e.g., as it levels a layer of material in the material bed). For example, during one progression of the layer dispensing mechanism along the material bed, the layer dispenser may dispense material into (or to form) the material bed, which dispensed material is subsequently leveled (e.g., without contacting the top surface of the material bed), more material is dispensed (e.g., as the layer dispensing mechanism is translating along the material bed), and the more material is subsequently leveled, etc. The layer dispensing mechanism can perform one, two, or more material dispensing steps as it completes one lateral sweep of the material bed. The layer dispensing mechanism can perform one, two, or more material leveling steps as it completes one lateral sweep of the material bed. The layer dispensing mechanism can perform one, two, or more material removal steps as it completes one lateral sweep of the material bed. The layer dispensing mechanism can perform one, two, or more material dispensing steps as it completes one lateral sweep of the material bed. The lateral sweep of the material bed can be a sweep of the material bed from one edge of the material bed to an opposite (e.g., laterally opposing) edge of the material bed.

Figure 10A:
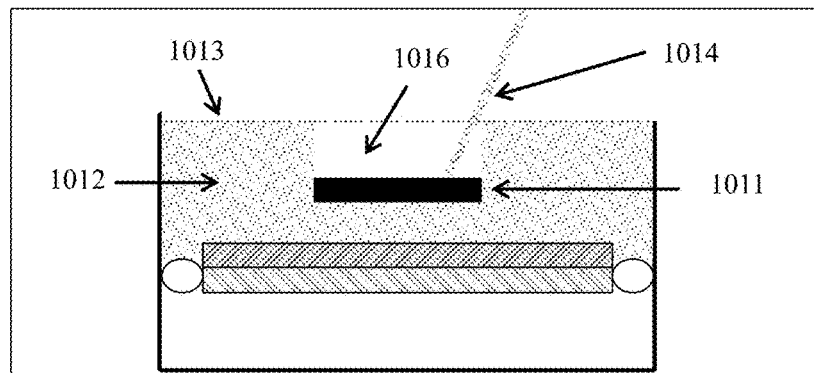
FIGS. 10A-10C illustrate various vertical cross sections of a material bed.

FIG. 10A shows an example of a material bed 1012 comprising a substantially planar exposed surface 1013 in which at least a portion of a 3D object 1011 is formed by transforming a portion of the material bed using an energy beam 1014, and subsequently forming a void 1016. The layer dispensing mechanism may comprise at least two of: a material dispensing mechanism (e.g., dispenser), a leveling mechanism, and a material removal mechanism. FIG. 1 shows an example of a layer dispensing mechanism comprising a material dispensing mechanism 116, a leveling mechanism 117, and a material removal mechanism 118 (The white arrows in 116 and 118 designate the direction in which the pre-transformed material flows into/out of the material bed 104). FIG. 13 shows another example of a layer dispensing mechanism comprising a material dispensing mechanism 1305, a leveling mechanism (including 1306 and 1304), and a material removal mechanism 1303, in which the three mechanism 1305, 1306 & 1304 and 1303 are connected (e.g., 1301 and 1302). The layer removal mechanism and/or the layer dispensing mechanism may comprise one or more nozzles. In the example of FIG. 13, 1312 depicts an example of a nozzle comprising three openings 1314, 1315, and 1316 through which material (e.g., pre-transformed material) may be attracted (e.g., pulled, or flow) into the nozzle (e.g., along arrows 1317, 1318 and 1319). The flow of the material into the layer removing mechanism may comprise laminar flow. The flow of the material from the material bed into the layer removal mechanism may be in the upwards direction (e.g., against the gravitational center, and/or away from the platform).

Figure 14:
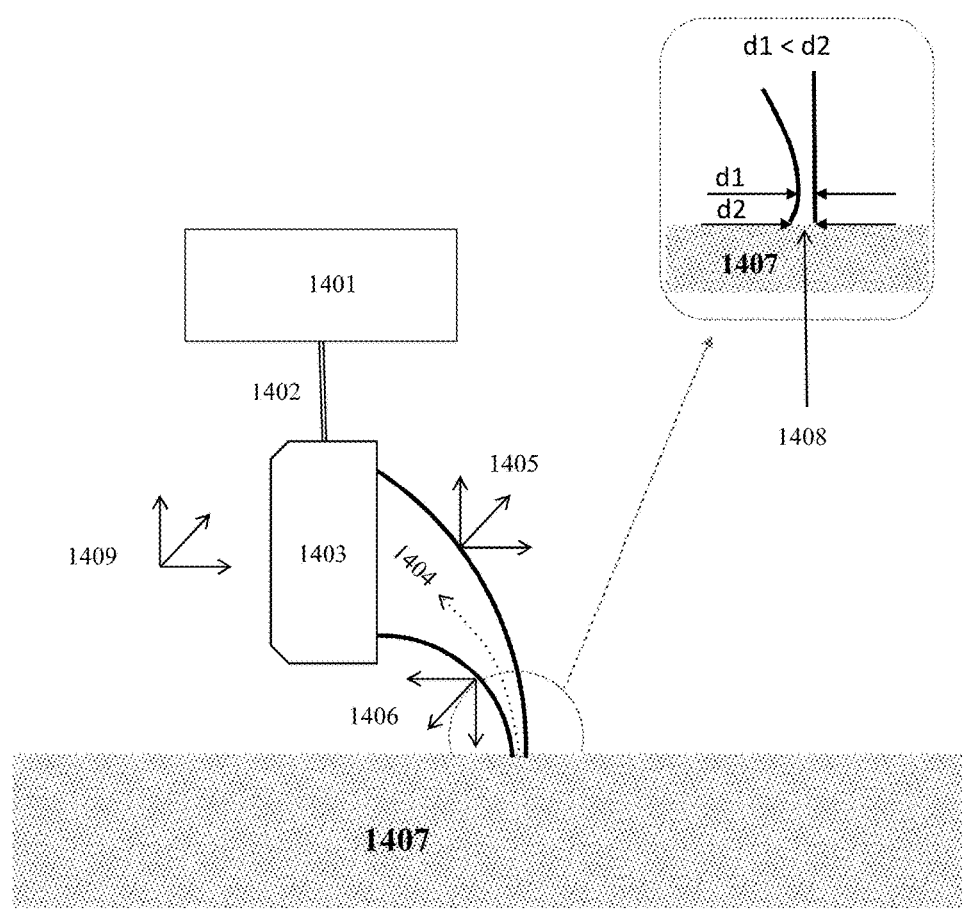
FIG. 14 schematically illustrates vertical cross sectional view of a material removal mechanism.

The layer dispensing mechanism may comprise a material (e.g., powder) removal mechanism (e.g., 1303) that comprises one or more openings. The one or more openings may be included in a nozzle. The nozzle may comprise an adjustable opening (e.g., regulated by a controller). The height of the nozzle opening relative to the exposed surface of the material bed may be adjustable (e.g., regulated by a controller). The material removal mechanism may comprise a reservoir in which the material may at least temporarily accumulate. The evacuated material may comprise a pre-transformed material that is evacuated by the material removal mechanism. The evacuated material may comprise a transformed material that did not form the 3D object. FIG. 14 shows an example of a material removal mechanism comprising a nozzle 1404 through which material flows from the material bed 1407 into a reservoir 1403. In the example in FIG. 14, the reservoir is connected to an attractive force source 1401 (such as a vacuum pump) through a channel (e.g., tube) 1402. At least one portion of the nozzle body may be adjustable. In some embodiments, at least one part of the nozzle body is adjustable at a vertical, horizontal, or angular direction (e.g., with respect to the exposed surface of the material bed, and/or the building platform). The nozzle may be formed of one or two thick portions (e.g., of which at least one is movable). The thick section(s) may allow an internal volume of the nozzle to be sealed (e.g., without forming a gap) by two opposing side walls that are disposed parallel to the movement axis of the material removal mechanism and span the maximum allowed movement of the at least one thick section (e.g., along 1405 and/or 1406). The material removal mechanism (e.g., comprising the nozzle and the internal reservoir) may translate vertically, horizontally, and/or at an angle (e.g., along 1409). The translation may be before, after, and/or during at least a portion of the 3D printing (e.g., to planarize the exposed surface of the material bed). In the example of FIG. 14, one or two parts of the nozzle body are adjustable at a vertical, horizontal, or angular direction (e.g., with respect to the exposed surface of the material bed, and/or the building platform) as indicated by arrows 1405 and 1406. The nozzle may comprise an adjustable opening (e.g., controlled by a controller). The height of the nozzle opening relative to the exposed surface of the material bed may be adjustable (e.g., controlled by a controller). The material removal mechanism may comprise a reservoir in which the material (that is evacuated by the material removal mechanism) may at least temporarily accumulate. Control may include regulate and/or direct.

The FLS of the opening (e.g., cross section thereof) of the material removal mechanism (e.g., nozzle diameter) may be at least about 0.1 mm, 0.4 mm, 0.7 mm, 0.9 mm, 1.1 mm, 1.3 mm, 1.5 mm, 2 mm, 2.5 mm, 3 mm, 3.5 mm, 5 mm, 7 mm, or 10 mm. The FLS of the opening of the material removal mechanism (e.g., nozzle diameter) may be at most about 0.1 mm, 0.4 mm, 0.7 mm, 0.9 mm, 1.1 mm, 1.3 mm, 1.5 mm, 2 mm, 2.5 mm, 3 mm, 3.5 mm, 5 mm, 7 mm, or 10 mm. The FLS of the opening of the material removal mechanism (e.g., nozzle diameter) may be of any value between the afore-mentioned values (e.g., from about 0.1 mm to about 7 mm, from about 0.1 mm to about 0.6 mm, from about 0.6 mm to about 0.9 mm, from about 0.9 mm to about 3 mm, or from about 3 mm to about 10 mm).

The nozzle may comprise a material entrance opening through which material enters from the material bed (e.g., 1408) into the nozzle (e.g., along arrow 1404). The nozzle can be a Venturi nozzle. The opening may comprise a narrow portion (e.g., a "bottle neck"). Sometimes, the narrow portion is at the entrance of the nozzle (e.g., FIG. 15, 1520). At times, the narrow portion is away from the opening (e.g., FIG. 14, 1408, the narrow opening is designated by "d1"). At time, the FLS (e.g., diameter) of the opening is larger than the FLS of the narrow portion within the nozzle. At time the FLS of the opening is the narrows portion of the nozzle. The FLS of the narrow portion may be constant or variable. The FLS of the narrow portion may be varied mechanically, electronically, thermally, hydraulically, magnetically, or any combination thereof.

Figure 15:
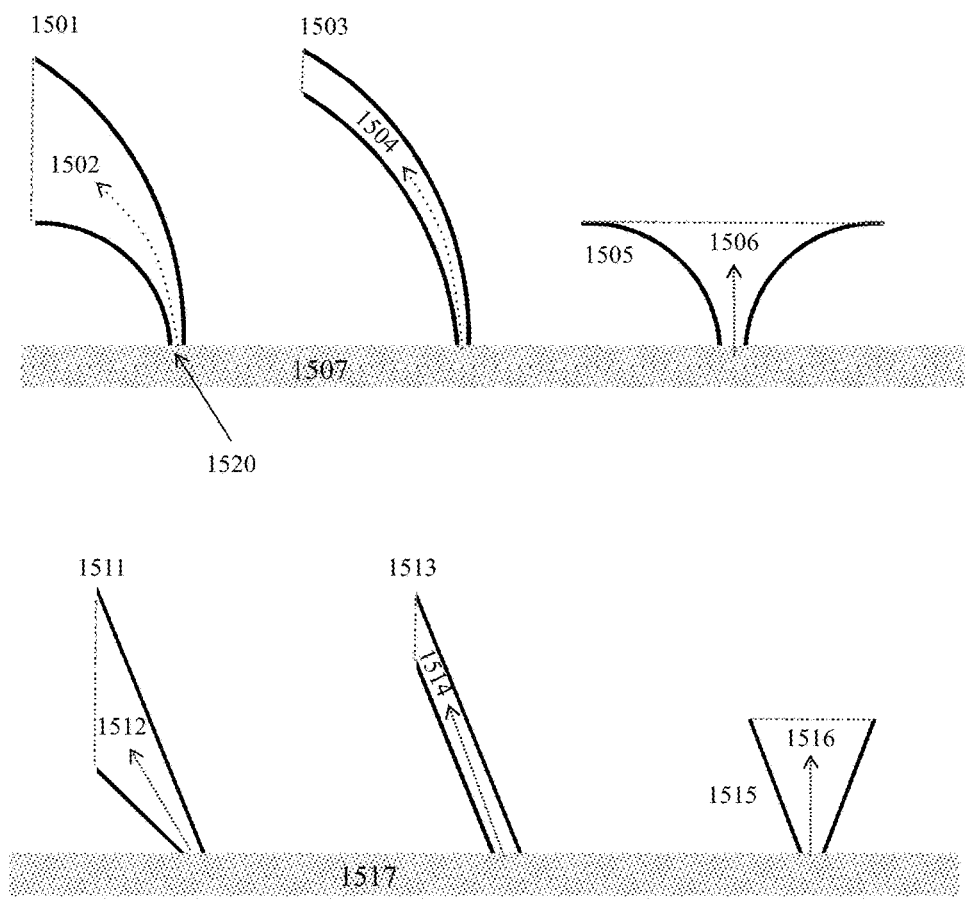
FIG. 15 schematically illustrates vertical cross sectional view of various nozzles.

The nozzle may be symmetric or asymmetric. A vertical and/or horizontal cross section of the nozzle may be asymmetric. For example, a vertical cross section of the nozzle interior may reveal its asymmetry. The asymmetry can be in the materials from which the nozzle is composed. The asymmetry can be manifested by a lack of at least one symmetry axis. For example, a lack of n fold rotational axis (e.g., lack of $C_n$ symmetry axis, wherein n equals at least 2, 3, or 4). For example, a lack of at least one symmetry plane. For example, a lack of inversion symmetry. In some embodiments, the nozzle comprises a symmetry plane, but lack rotational symmetry. In some embodiments, the nozzle lacks both a rotational symmetry axis, and a symmetry plane. The axis of symmetry may be substantially perpendicular to the average surface of the exposed surface of the material bed, to the building platform, or to a plane normal to the direction of the gravitational force. The axis of symmetry may be at an angle between 0 degrees and 90 degrees relative to the average surface of the exposed surface of the material bed, to the building platform, to a plane normal to the direction of the gravitational force, to any combination thereof. The nozzle may have a bent shape. The nozzle can have a crooked shape. The bent shape may follow a function. The function may be exponential or logarithmic. The function may be a portion of a circle or a parabola. The bent shape can roughly resemble the letter "L" or "J." The bent shape can be a smoothly bent shape. The bent shape can be a curved shape. FIG. 15 shows an example of vertical cross section of various nozzles 1501, 1503, 1505, 1511, and 1513. In some examples, material flows into or out of the nozzles. Arrows 1502, 1504, 1506, 1512, 1514, and 1516 show an example of the direction in which material flows from the material bed (e.g., 1507 or 1517 respectively) into the appropriate nozzles. Nozzles 1505 and 1515 show examples of symmetrical cross sections of nozzles, with a mirror axis of symmetry along the arrows 1506 and 1516 respectively. Nozzles 1503, 1501, show examples of non-symmetrical cross sections of nozzles as this cross section lacks an axis of symmetry. The nozzle may be a long nozzle (e.g., vacuum nozzle) in the horizontal and/or vertical direction. The nozzle may be symmetric or asymmetric. The symmetry axis may be in a horizontal and/or vertical cross-section of the nozzle. FIG. 15 shows examples of nozzles depicted as vertical cross sections. Nozzle 1503 shows an example of a nozzle that is long in the vertical direction. The axis of symmetry for nozzle 1515 can be along the arrow 1516. The nozzle may be a vacuum nozzle. The nozzle may comprise laminar or turbulent flow during its operation (e.g., suction). The magnitude of laminar flow between two sides of the nozzle (e.g., two vertical sides of the nozzle) can be the same or different. The magnitude of laminar flow between two sides of the asymmetric nozzle (e.g., the two asymmetric vertical sides of the nozzle) can be the same or different. The gas flow within the nozzle (e.g., during its operation) may comprise laminar flow. The gas flow within the nozzle (e.g., during its operation) may comprise turbulence. The gas flow between the exposed surface and the nozzle entrance (e.g., during its operation) may comprise laminar flow. The gas flow between the exposed surface and the nozzle entrance (e.g., during its operation) may comprise turbulence. The turbulence may be a desired turbulence. The flow rate of the gas within the nozzle (e.g., suction power) may depend on the size and/or mass of the particulate material (e.g., particles forming the powder bed).

Figure 33:
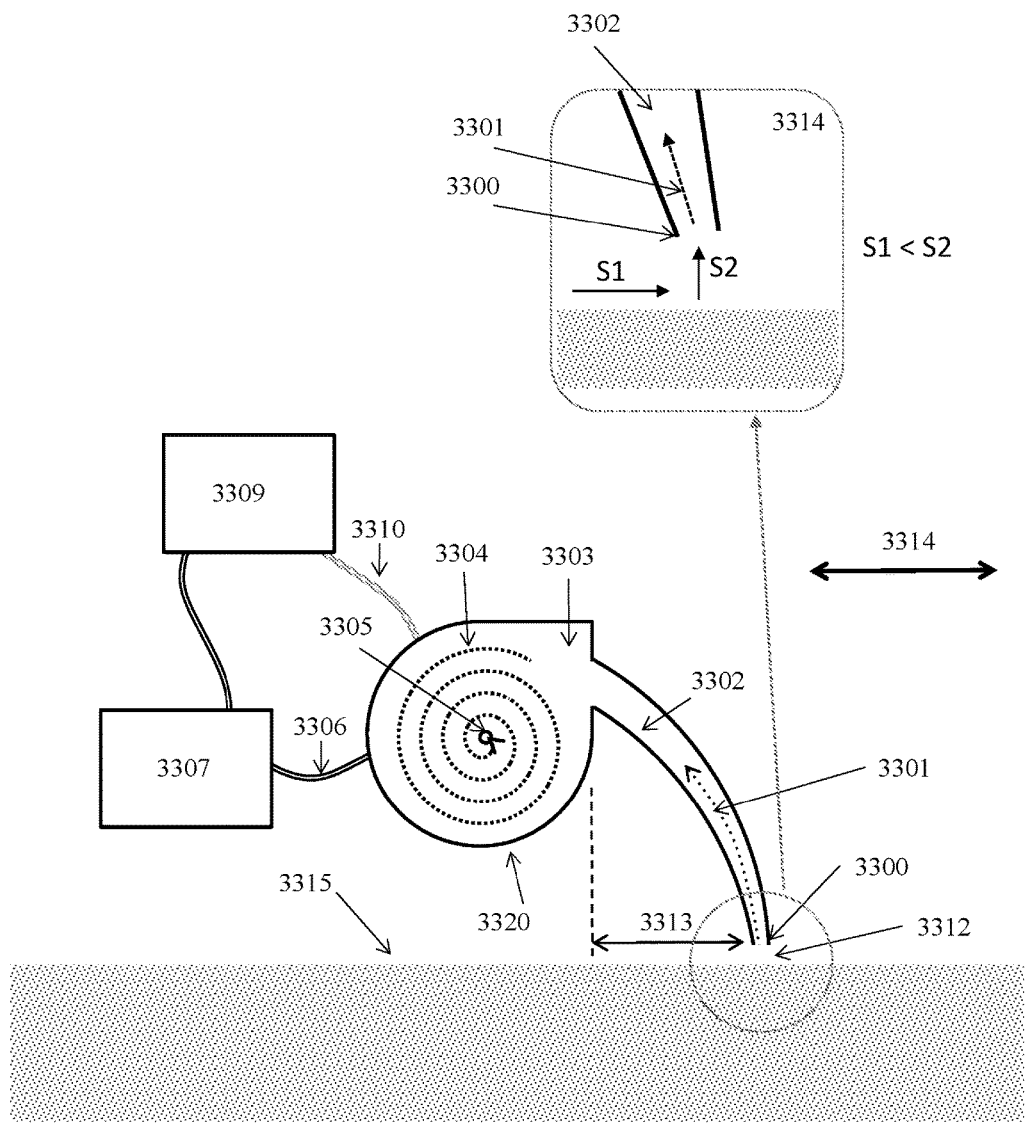
FIG. 33 schematically illustrates side view of a material removal mechanism.

In some embodiments, the pre-transformed material (e.g., powder) is attracted utilizing the force source to the opening port of the material removal mechanism and flows above the material bed in a substantially horizontal flow. FIG. 33 shows an example of a material removal mechanism, and illustrates a horizontal flow S1 of the pre-transformed material toward the opening port 3300. The substantially horizontal flow of the pre-transformed material above the material bed may be relative to the position of the material bed (e.g., relative speed). The relative speed (e.g., velocity) of substantially horizontal flow towards the opening port of the material removal member may be at least 0.5 meter per second (m/sec), 1 m/sec, 2 m/sec, 3 m/sec, 4 m/sec, 5 m/sec, 6 m/sec, 7 m/sec, 8 m/sec, 9 m/sec, 10 m/sec, 20 m/sec, 30 m/sec, 40 m/sec, or 50 m/sec. The relative speed of substantially horizontal flow towards the opening port of the material removal member may be any speed between the afore-mentioned speed values (e.g., from about 0.5 m/sec to about 50 m/sec, from about 1.5 m/sec to about 3 m/sec, from about 3 m/sec to about 6 m/sec, from about 6 m/sec to about 10 m/sec, or from about 10 m/sec to about 50 m/sec).

In some embodiments, the particulate material (e.g., powder) is attracted to the opening port of the material removal mechanism and flows toward a position above the material bed in a substantially vertical flow. FIG. 33 shows an example of a material removal mechanism, and illustrates a vertical flow S2 of the pre-transformed material toward the opening port 3300. The speed of substantially vertical flow towards the opening port of the material removal member may be at least 30 meter per second (m/sec), 40 m/sec, 50 m/sec, 60 m/sec, 70 m/sec, 80 m/sec, 90 m/sec, 100 m/sec, 200 m/sec, 300 m/sec, 400 m/sec, 500 m/sec, 600 m/sec, or 700 m/sec. The speed of substantially vertical flow towards the opening port of the material removal member may be any speed between the afore-mentioned speed values (e.g., from about 30 m/sec to about 700 m/sec, from about 30 m/sec to about 60 m/sec, from about 60 m/sec to about 500 m/sec, from about 60 m/sec to about 100 m/sec, or from about 100 m/sec to about 700 m/sec).

In some embodiments, the speed of the vertical flow is greater than the speed of the horizontal flow. The speed of the vertical flow may be greater by at least about 1.5*, 2*, 2.5*, 3*, 4*, 5*, 6*, or 10* (i.e., times) the speed of the horizontal flow. The speed of the vertical flow may any value between the afore-mentioned values (e.g., from about 1.5* to about 10*, from about 1.5* to about 2.5*, from about 2.5* to about 5*, or from about 5* to about 10* (i.e., times) the speed of the horizontal flow).

The (e.g., laminar) flow of pre-transformed (e.g., powder) material into the (e.g., vacuum) nozzle may create an area of low pressure, which may in turn generate a vertical force which would result in a horizontal force acting on the pre-transformed (e.g., particulate) material (e.g., at the exposed surface of the material bed). Due to the operation of the nozzle, the pre-transformed material in the material bed (e.g., exposed surface thereof) may be subject to the Bernoulli principle.

In some embodiments, the nozzle is separated from the exposed surface of the material bed by a gap (e.g., vertical distance, FIG. 33, 3312). The gap may comprise a gas. The gas may be an atmospheric gap. The extent of the gap and/or the FLS of the opening port (e.g., diameter) of the nozzle may be changeable (e.g., before, after, and/or during the 3D printing). For example, that change in the nozzle opening port may occur during the operation of the material removal mechanism. For example, that change may occur before the initiation of the 3D printing. For example, that change may occur during the formation of the 3D object. For example, that change may occur during the formation of a layer of hardened material. For example, that change may occur after transforming a portion of a layer of pre-transformed (e.g., powder) material. For example, that change may occur before deposition a subsequent layer of pre-transformed material. For example, that change may occur during the progression of the layer dispensing mechanism (e.g., of which the material removal mechanism is a part of) along the exposed surface of the material bed. The progression may be parallel to the exposed surface of the material bed. The progression may be a lateral progression (e.g., from one side of the material bed to the opposite side of the material bed). In some embodiments, the extent of the gap and/or the FLS of the opening port (e.g., diameter) of the nozzle may be unchanged before, after, and /or during the formation of: the 3D object, layer of hardened material, transformed material, or any combination thereof. The extent of the gap and/or the FLS of the opening port (e.g., diameter) of the nozzle may be unchanged during the formation of: the 3D object, layer of hardened material, transformed material, or any combination thereof. The vertical distance of the gap from the exposed surface of the target surface to the entrance opening of the nozzle (e.g., 3312) may be at least about 0.05 mm, 0.1 mm, 0.25 mm, 0.5mm, 1 mm, 2 mm, 3 mm, 4 mm, 5 mm, 6 mm, 7 mm, 8 mm, 9 mm, or 10 mm. The vertical distance of the gap from the exposed surface of the powder bed may be at most about 0.05mm, 0.1 mm, 0.25 mm, 0.5mm, 1 mm, 2 mm, 3 mm, 4 mm, 5 mm, 6 mm, 7 mm, 8 mm, 9 mm, 10 mm, or 20 mm. The vertical distance of the gap from the exposed surface of the powder bed may be any value between the afore-mentioned values (e.g., from about 0.05 mm to about 20 mm, from about 0.05 mm to about 0.5 mm , from about 0.2 mm to about 3 mm, from about 0.1 mm to about 10 mm, or from about 3 mm to about 20 mm).

The velocity (e.g., speed) of the material removal mechanism may be altered. The velocity by which a pre-transformed (e.g., powder) material is removed from the material bed by the material removal system may be altered. The force exerted by the material removal mechanism (e.g., through the nozzle) on the pre-transformed material (e.g., powder) disposed in the material bed, may be altered. The alteration may be before, after, and/or during the formation of: the 3D object, layer of hardened material, transformed material, or any combination thereof. The alteration may be during the formation of the 3D object, layer of hardened material, transformed material, or any combination thereof.

Figure 28A:
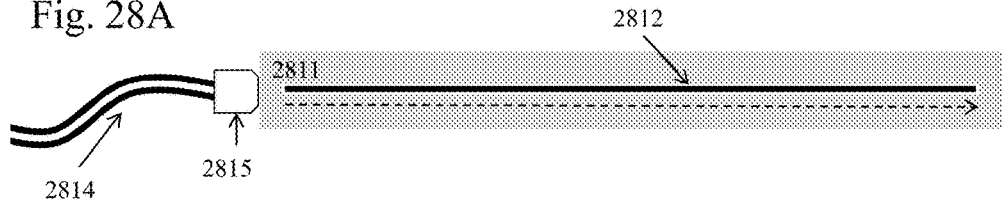
FIGS. 28A-28C show various schematic bottom views of powder removal mechanisms.
Figure 28B:
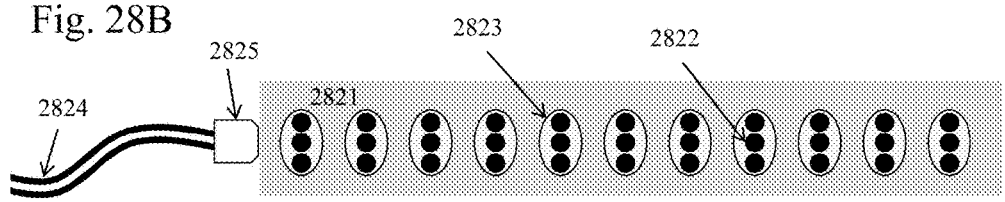
Figure 28C:
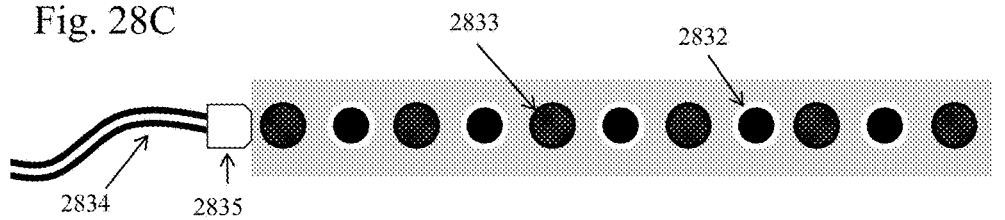

FIGS. 28A-C and 29A-E schematically depict bottom views of various mechanisms for removing the pre-transformed material as part of the material removal mechanism. FIG. 28A schematically depicts a bottom view of a material removal mechanism 2811 having an elongated material entrance opening port 2812, which material removal mechanism is connected 2815 to channel 2814 through which the pre-transformed material leaves the material removal mechanism. FIG. 28B schematically depicts a bottom view of a material removal member having manifolds (e.g., 2823) of multiple pre-transformed material (e.g., powder) entrance opening ports (e.g., 2822). FIG. 28C schematically depicts an integrated material dispensing-removal member having material entrance opening ports (e.g., 2832), and material exit opening ports (e.g., 2833). Other examples of material removal mechanisms can be found in patent application Ser. No. PCT/US15/36802 which is fully incorporated herein by reference in its entirety.

FIG. 29A schematically depicts a bottom view of a material removal mechanism having an elongated material entrance opening port 2912 and an internal compartment having a triangular horizontal cross section 2911. FIG. 29B schematically depicts a bottom view of a material removal member having a multiplicity of pre-transformed material entrance opening ports (e.g., 2922) and an internal compartment having an egg-like cross section 2921. FIG. 29C schematically depicts a bottom view of a material removal member having multiple pre-transformed material (e.g., powder) entrance opening ports (e.g., 2932) and an internal compartment having a trapezoid horizontal cross section 2931. FIG. 29D schematically depicts a bottom view of a material removal member having a pre-transformed material entrance opening port (2942) and an internal compartment having cross section 2941 of a narrowing helix (e.g., narrowing screw). In some embodiments, the cross section is a horizontal cross section. In some examples, the horizontal cross section spans (e.g., approximately) the width or length of the target surface (e.g., FIG. 27). In some examples, the horizontal cross section is less than (e.g., approximately) the width or length of the target surface. In some examples, the horizontal cross section exceeds (e.g., approximately) the width or length of the target surface. FIG. 29E schematically depicts a bottom view of a material removal member having a pre-transformed material entrance opening port (2952) and an internal compartment having a horizontal cross section 2941 of a tubular helix (e.g., Archimedean screw).

The nozzle may be a long nozzle (e.g., vacuum nozzle) in the horizontal direction. The long nozzle may be referred herein as an elongated nozzle. FIG. 28A shows an example of an elongated nozzle in the horizontal direction, having a horizontally elongated material entry port 2812. In some examples, the nozzle spans at least a portion of the width or length of the material bed. In some examples, the nozzle spans less than the width or length of the material bed. FIG. 27 shows examples of a width and a length. The nozzle may span approximately the width or length of the material bed. The nozzle may be symmetric or asymmetric. The symmetry axis may be horizontal and/or vertical (e.g., substantially parallel to the platform).

A cross section of the material removal member opening port (e.g., nozzle entrance) may be rectangular (e.g., 2912, 2932), or elliptical (e.g., 2922). The rectangular opening may be a square. The elliptical opening may be a circle (e.g., 2832). A cross section of the material removal member opening port (e.g., nozzle entrance) may comprise a curvature (e.g., curved edge) or a straight line (e.g., straight edge). The FLS (e.g., width to length) of the opening port cross section may have an aspect ratio of at least 1:2, 1:10, 1:100, 1:1000, 1:10000.

The material removal member may comprise a connector. The connector may be to a power source (herein referred to as "power source connector"). The connector may be to a reservoir. The connector may be both to a reservoir and to the power source connection. FIG. 28B shows an example of a connector 2825. The power source may be a source of gas flow (e.g., compressed gas, or vacuum), electrostatic force, and/or magnetic force. The connector may allow a fluid connection (e.g., such that the pre-transformed material may flow through). FIG. 28C show an example of a fluid connection 2834 (e.g., to the power source). The connector may allow pre-transformed and/or small bits of transformed material to flow through (e.g., FIG. 28B, 2824). The connector may allow gas to flow through. The connector may comprise connection to a channel (e.g., FIG. 28A, 2814). The channel (e.g., tube) may be flexible or non-flexible. Examples of connectors are shown in 2815, 2825, 2835, 2915, 2925, 2935, 2945, and 2955. Examples of channels are shown in 2814, 2824, 2834, 2914, 2924, 2934, 2944, and 2954.

In some examples, the material removal member comprises an internal compartment. The internal compartment may be a pre-transformed material collection compartment. For example, the internal compartment may be a powder collection compartment, or a liquid collection compartment. The internal compartment may connect (e.g., fluidly connect) to the power source (e.g., through the connector and the channel). The internal compartment may comprise the connector. FIG. 28A shows an example of a connector 2815. The internal compartment may connect (e.g., fluidly) to the one or more nozzles. The internal compartment may connect (e.g., fluidly) to the one or more nozzles and to the power source and/or reservoir. The internal compartment may be symmetric or asymmetric. The symmetry or asymmetry may be in the horizontal and/or vertical direction. The internal compartment may comprise the shape of a cylinder, cone, box, ellipsoid, egg, or a spiral. The cross section (e.g., horizontal and/or vertical) may comprise the shape of a triangle (e.g., 2911), ellipse, rectangle (e.g., 2811), parallelogram, trapezoid (e.g., 2931), egg cross section (e.g., 2921), spiral cross section (e.g., 2941 or 2951), star, sickle, or crescent. The cross section (e.g., horizontal and/or vertical) may comprise a concave shape or a convex shape. FIG. 28B shows an example of an internal compartment having a cross section of a rectangle 2821. The long axis of the internal compartment may be substantially parallel to the platform. A short axis of the internal compartment may be substantially perpendicular to the platform. The internal compartment may comprise a curvature. The internal compartment may comprise a curved plane. The internal compartment may comprise a planar (e.g., non-curved, or flat) plane. A horizontal cross section of the internal compartment may be symmetric (e.g., a rectangle) or asymmetric (e.g., a triangle). The internal compartment may be wider (e.g., 2916) towards the connector (e.g., 2915). The internal compartment may be narrower (e.g., 2913) away from the connector. The shape of the internal compartment may allow substantial uniform removal (e.g., suction) of the pre-transformed material by the nozzle(s) of the material removal member along its horizontal span. The internal shape of the internal compartment may narrow towards a distant position from the connector. The narrowing may be gradual or non-gradual. The narrowing may be linear, logarithmic, or exponential. The internal compartment of the material removal member may have a shape that allows movement of the pre-transformed material within the compartment. The movement of the pre-transformed material within the compartment may comprise laminar or curved movement. The curved movement may comprise a spiraling movement. The curved movement may comprise a helical movement. The internal compartment may have an internal shape of a helix, spiral, or screw. The screw may be a narrowing screw, a cylindrical screw, or any combination thereof (e.g., a household type screw, or an Archimedean screw). Viewed from below, the opening port of the nozzle may horizontally overlap the internal compartment (e.g., centered below as shown for example in FIG. 28A), or not overlap. In some embodiments, the opening port of the nozzle is horizontally separated from the internal compartment by a gap (e.g., FIG. 33, 3313). The power source, reservoir, and/or internal compartment may be stationary or translational with respect to the material bed. The material removal mechanism (or any of its components) may translate relative to the material bed. For example, the material removal mechanism may be stationary, and the material bed may be translating. For example, the material removal mechanism may translate, and the material bed may be stationary. For example, both the material removal mechanism and the material bed may be translating (e.g., in the same direction, in opposite directions and/or at different speeds).

In some embodiments, the shape of the internal compartment, opening port, and/or nozzle reduces turbulence of the pre-transformed material as it travels towards the power source. The shape of the internal compartment, opening port, and/or nozzle may substantially prevent turbulence of the pre-transformed material as it travels towards the power source. The shape of the internal compartment, opening port, and/or nozzle may promote a spiral and/or helical flow of the pre-transformed material as it travels towards the power source. The shape of the internal compartment, opening port, and/or nozzle may promote a laminar flow of the pre-transformed material as it travels towards the power source.

In some embodiments, pre-transformed material from the material bed relocates into the material removal mechanism through a material entrance port. The relocation may be induced by an attractive force (e.g., vacuum, electrostatic force, and/or magnetic force). The relocation may be actively induced. The active inducement may be by a gas flow (e.g., positive or negative), magnetic force, and/or electrostatic force. The relocated pre-transformed material entering through the entrance port (e.g., nozzle opening) may travel into an internal compartment. The relocated pre-transformed material may travel through the internal compartment towards the power source. The relocated pre-transformed material may travel through the opening (e.g., entrance) port towards the power source. The relocated pre-transformed material may travel through the opening (e.g., entrance) port towards the power source, into a reservoir. The relocated pre-transformed material may accumulate in the reservoir. The relocated pre-transformed material in the reservoir may be recycled and re-used (e.g., by the material dispensing mechanism) to provide at least a portion of the material bed. The recycling may be before, after, and/or during the formation of: the 3D object, layer of hardened material, transformed material, or any combination thereof. The reservoir can be disposed horizontally above, on the same plane, or below the entrance opening port (e.g., nozzle entrance opening) of the material removal member.

The multiplicity of opening ports (e.g., material entrance ports, or nozzle opening ports) of the material removal mechanism may be arranged in groups (e.g., 2823), in an array, in a single file (e.g., 2932), staggered file (e.g., 2923 and 2924), randomly, or any combination thereof. The opening port of the material removal mechanism may be a single opening port or a multiplicity of opening ports.

In some embodiments, the pre-transformed material accumulates in the internal compartment of the material removal mechanism. The opening port through which material enters the material removal mechanism, may be away from the position in which the pre-transformed material accumulates in the internal compartment. Away may be vertically and/or horizontally away. Away may be distant. Away may be in a position that substantially prevents the pre-transformed material to flow back into the opening port through which it entered (e.g., and back into the material bed). Away may be in a position that allows the pre-transformed material to be trapped in the internal compartment and not fall back to the material bed (e.g., through the opening port). Away may be in a position that allows the pre-transformed material to flow into the reservoir. FIG. 33 shows an example of a side view of a material removal mechanism having a nozzle 3302 through which pre-transformed material flows inwards 3301 towards the internal compartment of the material removal mechanism 3303. Nozzle 3302 is but one example that represents any nozzle (e.g., FIG. 15). In the example shown in FIG. 33, the pre-transformed material is flowing (e.g., in a spiraling motion 3304) toward a connection 3305. The connection can connect the internal compartment to a reservoir 3307 (e.g., through a channel (e.g., hose) 3306). The connection can connect the internal compartment to a force source 3309 (e.g., through a channel (e.g., hose) 3310). Internal compartment 3310 is but one example that represents any internal compartment (e.g., FIGS. 28A-C, or FIGS. 29A-E). The force source can connect to the internal compartment, to the reservoir, or to both. The reservoir can connect directly or indirectly to the internal compartment. The internal compartment can connect directly or indirectly to the nozzle. In some examples, the nozzle has an entrance port 3300 through which the pre-transformed material enters the material removal mechanism. The material removal mechanism may be separated from the exposed surface of the material bed (e.g., 3315) by a gap (e.g., 3312). In some examples, the material removal mechanism contacts the material bed. For example, the opening port may contact the exposed surface of the material bed. The material removal mechanism may translate laterally (e.g., 3314) along the material bed. For example, in some embodiments, the pre-transformed material (e.g., and/or debris) in the internal compartment of the material removal mechanism is evacuated (e.g., using a second force source) while the material dispensing mechanism is outside of the area occupied by the target surface (e.g., the material bed). The first force source may be chosen such that it may not (e.g., substantially) evacuate the pre-transformed material (e.g., and/or debris) in the internal compartment. In some embodiments, the dimensions and/or shape of the internal compartment are chosen such that the pre-transformed material (e.g., and/or debris) that is evacuated from the target surface while planarizing it, will not overburden the evacuation operation by the first force source. In some embodiments, the second force (e.g., and/or second force source) is chosen such that the pre-transformed material (e.g., and/or debris) that is evacuated from the target surface while planarizing it, will not overburden the evacuation operation by the first force source. In some embodiments, the first force (e.g., and/or first force source) is chosen such that the pre-transformed material (e.g., and/or debris) that is evacuated from the target surface while planarizing it, will not overburden the evacuation operation by the first force source. The second force may comprise compressed and reduced pressure. For example, when a force source is a pump (e.g., peristaltic pump), the pump pressurized gas on one of its ends, and a reduced pressure at another of its ends. One pump end (e.g., forming pressurized gas) may operatively couple to one side of the internal compartment (e.g., 4328), while the other pump end may operatively couple to the other side of the internal compartment (e.g., 4329). The coupling may be direct or indirect.

FIG. 43A shows an example of a side view of a material removal mechanism 4301 that can translate vertically, horizontally, and/or at an angle (e.g., 4302). Pre-transformed material and/or debris from the target surface 4303 is attracted by a force source 4304 (e.g., vacuum pump) into an internal compartment 4305, through a nozzle 4306, as depicted by the dotted arrows. The attracted pre-transformed material and/or debris accumulates in a portion of the internal compartment 4307 during the planarization operation of the material removal member. After at least one planarization operation by the material removal mechanism, the accumulated pre-transformed material and/or debris can be removed. Their removal may utilize a second force source (e.g., 4310), such as for example, a pressurized gas that is injected through an entrance opening (e.g., 4308), and expelled through an exit opening (e.g., that is opposing this entrance opening) and allow outflow of the accumulated pre-transformed material through a channel (e.g., 4309).

FIG. 43B shows an example of a front view of a material removal mechanism 4320 that can translate according vertically, horizontally, and/or at an angle 4302. Pre-transformed material and/or debris from the target surface 4323 is attracted by a source force 4324 into an internal compartment 4325, through a nozzle 4326, as depicted by the dotted upward pointing arrows. After at least one planarization operation by the material removal mechanism, the accumulated pre-transformed material and/or debris can be removed. Their removal may utilize a second force source (e.g., 4330), such as for example, a pressurized gas that is injected through an entrance opening (e.g., 4328), and expelled through an exit opening (e.g., 4329, e.g., that is opposing this entrance opening) and allow outflow of the accumulated pre-transformed material through a channel (e.g., 4331). Their removal may optionally or additionally utilize a third force source opposite to the second force source (e.g., in type and/or amount) that removes (e.g., or aids in removal of) the accumulated pre-transformed material from the internal compartment. For example, the third force source may be (e.g., directly or indirectly) coupled to the opening 4329. The expelled pre-transformed material and/or debris may be treated in a treatment station 4332. The treatment station may comprise separation, sorting, or reconditioning. For example, it may be separated (e.g., using a material separator). The material separator may comprise a filter (e.g., sieve, and/or membrane), separation column, and/or cyclonic separator. For example, it may be sorted as to material type and/or size. For example, it may be sorted using a gas classifier that classifies gas-borne material (e.g., liquid or particulate) material. For example, using an air-classifier. For example, using a powder gas classifier. The reconditioning may comprise removing of an oxide layer forming on any particulate material. Reconditioning may comprise physical and/or chemical reconditioning. The physical reconditioning may comprise ablation, spattering, blasting, or machining. The chemical reconditioning may comprise reduction. The expelled (and/or treated) pre-transformed material may be accumulated in a reservoir 4333. The accumulated material in the reservoir 4333 may be recycled and/or reused in the 3D printing (e.g., by the material dispensing mechanism).

The material removal mechanism may optionally comprise an equilibration chamber (e.g., shown as side view 4311 and front view 4331). The equilibration chamber may equilibrate the gas pressure within the equilibration chamber to be (e.g., substantially) equal from one of its sides (e.g., 3355) to its opposing side (e.g., 4334), such that when the material removal member attracts pre-transformed material from the target surface, the force excreted on this pre-transformed material will be (e.g., substantially) equal along (i) the width (e.g., 4336) of the material dispensing mechanism nozzle (e.g., 4336) opening and/or (ii) the width of the target surface (e.g., 4323).

The force source may be connected to the internal compartment (e.g., optionally through the equilibration chamber) through one or more openings. The connection may be through rigid and/or flexible channels. The channels may have a narrowing or constant cross section. The connection may be through one or more slits. The openings may be (e.g., substantially) constant and/or varied. For example, positions closer to the force source may have narrower openings, than positions farther away from the force source.

FIG. 44A shows an example of a front view of a force source 4401 that is connected to a chamber 4402 (e.g., equilibration chamber, or internal compartment) of the material removal mechanism through a channel 4403. The flow of attracted material and/or gas is schematically shown by the dotted arrows in FIG. 44A. The chamber may comprise an aerodynamic shape (e.g., 4402). The upward flowing gas and/or material may flow upward in a direction opposite to the target surface and/or the gravitational center through one (e.g., shown in FIG. 44B, 4421) or more (e.g., FIG. 44D, 4441) material and/or gas openings. The material and/or gas openings may be slits. The one or more material and/or gas openings may be (i) the opening of the nozzle (e.g., FIG. 43, 4312), (ii) the opening (e.g., 4313) between the internal compartment (e.g., 4305) and the pressure equilibration chamber (e.g., 4311), (iii) the opening (e.g., 4314) between the gas equilibration chamber (e.g., 4311) and the force source (e.g., 4304), (iv) the opening between the internal compartment (e.g., FIG. 14, 1403) and the force source (e.g., 1401) (e.g., in case there is no pressure equilibration chamber).

FIG. 44C shows an example of a front view of a force source 4431 that is connected to a chamber 4432 (e.g., equilibration chamber, or internal compartment) of the material removal mechanism through a plurality of channels (e.g., 4433). The flow of attracted material and/or gas is schematically shown by the dotted arrows in FIG. 44C. The cross section of the channel may be rectangular (e.g., 4421, e.g., square), or elliptical (e.g., round, e.g., 4441). The cross section of the channel may be oval. FIG. 44D show an example of a bottom view of material and/or gas openings that are equal in cross section. FIG. 44F show an example of a bottom view of material and/or gas openings that are unequal in cross section. The force source may comprise one (e.g., 4404) or more (e.g., 4434) openings. The force source may connect to a channel bundle. FIG. 44E shows an example of a channel bundle cross section 4442. The channels in the bundle may separate further away from the force source, and connect (e.g., separately) to the internal compartment and/or pressure equilibration chamber of the material removal mechanism. FIG. 44E shows an example of a force source 4461 that has an exit opening 4463 to which a channel bundle is connected, which channels are separated (e.g., 4464) and connect to the internal compartment or pressure equilibration chamber 4462 in material and/or gas openings 4465 respectively. In FIG. 44E, the material and/or gas openings are varied in cross section. FIG. 44F shows a bottom view of the material and/or gas openings that are varied in cross section. The gas equilibration chamber and/or varied location, and/or shape (e.g., FLS) of the material and/or gas openings may facilitate a homogenous pressure distribution along the nozzle opening. The area of the horizontal cross section of the nozzle entrance opening (e.g., FIG. 29A, 2912) is greater by at least about 2 times ("*"), 3*, 5*, 10*, 15*, 30*, or 50* the vertical cross section of the internal compartment of the material removal mechanism (e.g., FIG. 33, 3303). The nozzle entrance opening is shown, for example, in FIG. 33, 3300.

In some embodiments, the internal compartment can connect to one or more force sources. For example, the internal compartment can connect to two force sources. For example, the internal compartment can connect to a vacuum source and to a pressurized air source. The transformed material that is attracted into the internal compartment can rest there (e.g., be trapped there). For example, the curved surface 3320 may facilitate concentrating the pre-transformed material within the internal compartment. This concentrated material may be disposed in a manner that will minimally (e.g., not) hinder attracting subsequent pre-transformed material from entering the internal compartment. In some embodiments, the pre-transformed material (and/or debris) that enters the internal compartment occupies at most about 50%, 40%, 20%, 10%, or 10% of the internal compartment volume. In some embodiments, the pre-transformed material is attracted into the internal compartment using a first force source, and is evacuated from the internal compartment using a second source force that is different from the first force source in its intensity and/or type. The evacuation of the pre-transformed material (and/or debris) from the internal compartment can be during, before, and/or after the planarization operation of the target surface by the material removal mechanism. For example, the material removal mechanism may planarize a powder bed layer while sucking powder material using vacuum, which sucked powder material accumulates in the internal compartment; and after the planarization operation a pressurized air flows into the internal compartment (e.g., with or without blocking the nozzle opening) and evacuates the accumulated powder material (e.g., through the opening 3305). The pressurized air may be directed towards the exit opening (e.g., 3305). In some embodiments, after the accumulated powder material has been removed from the internal compartment, the material removal mechanism is ready to suck and planarize a new layer of powder material.

Figure 42:
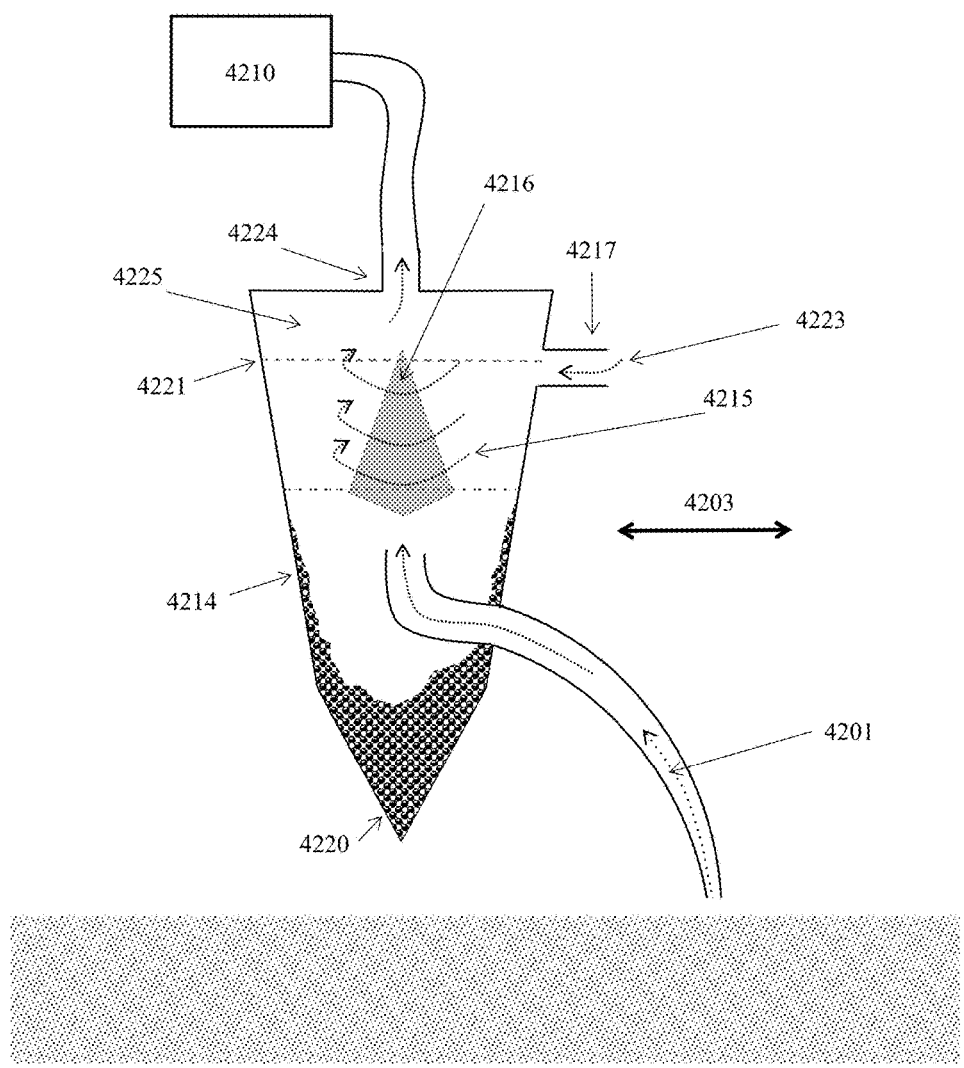
FIG. 42 schematically illustrates side view of a material removal mechanism.

In some embodiments, the operation of the material removal mechanism comprises separating the pre-transformed material (e.g., particulate material) from a gas (e.g., in which the pre-transformed material is carried in) without the use of one or more filters. For example, the operation of the material removal mechanism comprises can comprise a vortex separation (e.g., using a cyclone). For example, the operation of the material removal mechanism can comprise a centrifugal separation (e.g., using a cyclone). FIG. 42 shows an example of an internal compartment 4225 of the material removal mechanism. In some embodiment, the internal compartment of the material removal member comprises a cyclone. In some embodiments, the material removal mechanism comprises a cyclonic separator. In some embodiments, the material removal mechanism comprises cyclonic separation. The operation of the material removal mechanism can comprise gravitational separation. The operation of the material removal mechanism can comprise rotation of the pre-transformed material and/or debris (e.g., in the internal compartment of the material removal mechanism).

In some embodiments, the pre-transformed material that is attracted to the force source rests at the bottom of the internal compartment of the material removal mechanism. Bottom may be towards the gravitational center, and/or towards the target surface. The force source can be a vacuum source that may be connected to internal compartment (e.g., at a top position, e.g., 4224). The pre-transformed material may be sucked into the internal compartment from the target surface (e.g., 4420) through the nozzle (e.g., 4201) into the internal compartment (e.g., 4225). The gas(es) that is sucked with the pre-transformed material into the internal compartment (e.g., 4215) may rotate within at a rotational speed to form a cyclone. The internal compartment may comprise a cone having its long axis perpendicular to the target surface and/or its narrow end pointing towards the target surface. Alternatively, the internal compartment may comprise a cone having its long axis parallel to the target surface and/or its narrow end pointing towards a side wall of the enclosure. The gas may flow in the internal compartment in a helical pattern along the long axis of the cyclone. During the process, the pre-transformed material (and/or debris) sucked into the cyclone, may concentrate at the walls of the cyclone (e.g., 4214) and gravitate to and accumulate at its bottom (e.g., 4220). The accumulated pre-transformed material (e.g., and/or debris) may be removed from the bottom of the cyclone. For example, after one or more operation of planarizing a layer of pre-transformed material in the material bed, the bottom of the cyclone may be opened and the accumulated pre-transformed material (e.g., and/or debris) within may be evacuated. In some examples, the pre-transformed material that enters the internal compartment of the material removal member is of a first velocity, and is attracted towards the force source (e.g., 4210), that is connected to the internal compartment through a connector 4224. On its way to the connector, the pre-transformed material may lose its velocity in the internal compartment and precipitate at the bottom of the cyclone. In some examples, the gas(es) material that enters the internal compartment of the material removal member from the nozzle is of a first velocity, and is attracted towards the force source (e.g., 4210), that is connected to the internal compartment through a connector 4224. On its way to the connector, the gas(es) material may lose its velocity in the internal compartment, for example, due to an expansion of the cross section of the internal compartments (e.g., diameter 4422 is smaller than diameter 4221). An optional hurdle (e.g., 4216) may be placed to exacerbate the volume difference between portions of the cyclone that are closer to the exit opening (e.g., 4224) relative to those further from the exit opening.

In some examples, a secondary air flow can flow into the cyclone (e.g., 4223) from an optional gas opening port (e.g., 4217). The gas opening port may dispose adjacent to the nozzle (e.g., at the same side of the nozzle with respect to the direction of travel (e.g., 4203). The gas opening port may be disposed at a direction relative to the direction of travel, that is different from the direction where the nozzle is disposed. The secondary air flow may reduce abrasion of the internal surface of the internal compartment walls (e.g., 4214). The secondary air flow may push the pre-transformed material from the walls of the internal compartment towards the narrow end of the cyclone (e.g., where it is collected). The secondary The layer dispensing mechanism may comprise a planarizing (e.g., flattening) mechanism. The planarizing mechanism may comprise a leveling mechanism (e.g., FIGS. 13, 1306 and 1304) or a material removal mechanism (e.g., 1303). The layer dispensing mechanism may comprise a material dispensing mechanism (e.g., FIG. 13, 1305) and a planarizing mechanism. The layer dispensing mechanism may be movable (e.g., in the direction 1300). The layer dispensing mechanism may be movable horizontally, vertically or at an angle. The layer dispensing mechanism may be movable manually and/or automatically (e.g., controlled by a controller). The movement of the layer dispensing mechanism may be programmable. The movement of the layer dispensing mechanism may be predetermined. The movement of the layer dispensing mechanism may be according to an algorithm. The layer dispensing mechanism may travel laterally (e.g., substantially) from one end of the material bed, to the opposite end to effectuate disposal of a planarized layer of pre-transformed material on the exposed surface of the material bed or platform.

In some examples, the layer dispensing mechanism comprises at least one material dispensing mechanism and at least one planarizing mechanism. The at least one material dispensing mechanism and at least one planarizing mechanism may be connected or disconnected. The blade of the leveling mechanism may be tapered. Examples of tapered blades are disclosed in Ser. No. PCT/US15/36802, which is incorporated herein by reference in its entirety.

The material dispensing mechanism can operate in concert with the planarizing mechanism (e.g., shearing blade and/or vacuum suction) and/or independently with the planarizing mechanism. At times, the material dispensing mechanism (e.g., powder dispenser) proceed before the leveling mechanism, that proceeds before the material removal mechanism, as they progress along the material bed (e.g., laterally). At times, the material dispensing mechanism may proceed before the material removal mechanism, as they progress along the material bed. At times, the material dispensing mechanism may proceed before the leveling mechanism as they progress along the material bed. The planarizing mechanism may include the material removal mechanism and/or the leveling mechanism. The material dispensing mechanism or any part thereof (e.g., its internal reservoir) may freely vibrate. The vibrations may be induced by one or more vibrators. The material dispensing mechanism or any part thereof may vibrate without substantially vibrating the planarizing mechanisms. The material dispensing mechanism or any part thereof may vibrate without substantially vibrating the material removal mechanism and/or the leveling mechanism. The material dispensing mechanism may be connected to the planarizing mechanism by a compliant mounting. The compliant mounting may allow the planarizing mechanism to attach and/or detach from the material dispensing mechanism. FIGS. 34A-D show side view examples of layer dispensing mechanisms comprising a material dispensing mechanism (e.g., 3411) attached to a planarizing mechanism (e.g., material removal mechanism 3413, or leveling mechanism 3423); attached through compliant mounting (e.g., FIG. 34A, 3412 and 3414; and FIG. 34B, 3422 and 3424). In some examples, the compliant mounting comprises two separate parts that are intertwined with each other. FIG. 34D shows an example of two configurations of compliant mountings: the first including 3442 and 3444, and the second including 3446 and 3448. In an embodiment where the planarizing mechanism comprises two components (e.g., the leveling mechanism and the material removal mechanism), at least one of the components may be connected by a compliant mounting. For example, each one of the components may be connected by a compliant mounting (e.g., FIG. 34D), or one of the component may be connected by a compliant mounting (e.g., FIG. 34C).

Figure 34A:
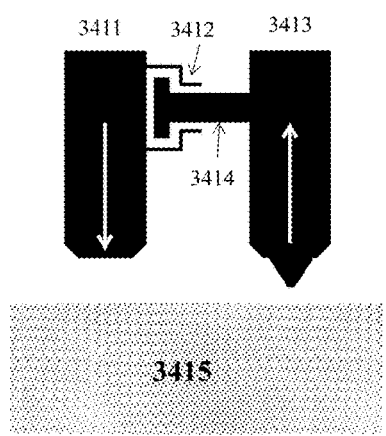
FIGS. 34A-34D schematically illustrate side views of layer dispensing mechanisms and various components thereof.
Figure 34B:
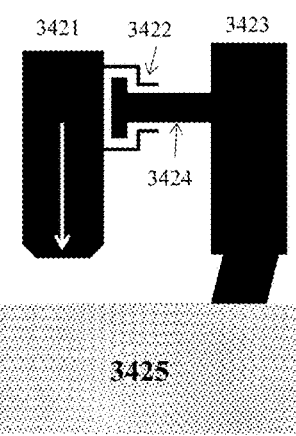
Figure 34C:
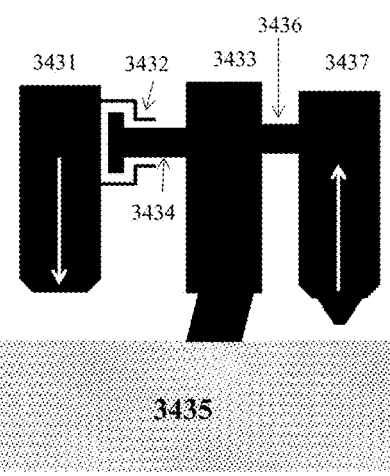
Figure 34D:
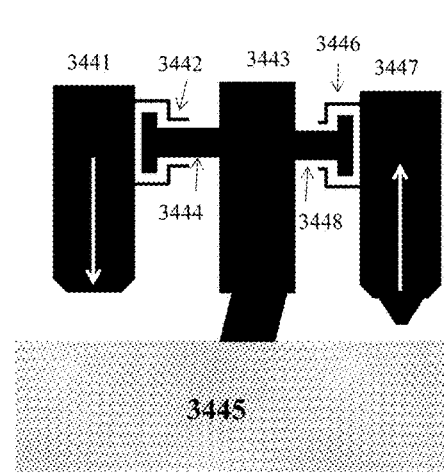

FIG. 34A shows an example of a layer dispensing mechanism comprising: a material dispensing mechanism 3411 which is connected by a compliant mounting 3412 and 3414 to a material removal mechanism 3413; which layer dispensing mechanism is disposed above the material bed 3415. FIG. 34B shows an example of a layer dispensing mechanism comprising: a material dispensing mechanism 3421 which is connected by a compliant mounting 3422 and 3424 to a leveling mechanism 3423; which layer dispensing mechanism is disposed above the material bed 3425. FIG. 34C shows an example of a layer dispensing mechanism comprising: a material dispensing mechanism 3431 which is connected by a compliant mounting 3432 and 3434 to a leveling mechanism 3433, which in turn is (e.g., directly) connected (e.g., 3436) to a material removal member 3437; which layer dispensing mechanism is disposed above the material bed 3435. FIG. 34D shows an example of a layer dispensing mechanism comprising: a material dispensing mechanism 3441 which is connected by a compliant mounting 3442 and 3444 to a leveling mechanism 3443, which in turn is connected by a compliant mounting 3446 and 3448 to a material removal mechanism 3447; which layer dispensing mechanism is disposed above the material bed 3445.

The distance between the functionalities of the various components of the layer dispensing mechanism is referred to herein as the "distance-between-functionalities." The distance-between-functionalities can be at least about 100 µm, 150 µm, 200 µm, 300 µm, 400 µm, 500 µm, 600 µm, 700 µm, 800 µm, 900 µm, or 1000 µm. The distance-between-functionalities can be at most about 1000 µm, 900 µm, 800 µm, 700 µm, 60 µm, 500 µm, 450 µm, 400 µm, 350 µm, 300 µm, 250 µm, 200 µm, or 150 µm. The distance-between-functionalities can be of any value between the aforementioned values (e.g., from about 100 µm to about 1000 µm, 100 µm to about 500 µm, 300 µm to about 600 µm, 500 µm to about 1000 µm). In some examples, the distance between the blade (e.g., tip thereof) of the leveling mechanism and the opening port of the material removal mechanism is equal to the distance-between-functionalities. In some examples, the distance between the blade (e.g., tip thereof) of the leveling mechanism and the opening port of the material dispensing mechanism (or of the material fall) is equal to the distance-of-functionalities. In some examples, the distance between the opening port of the material dispensing mechanism (or of the material fall) and the opening port of the material removal mechanism is equal to the distance-of-functionalities. The material fall (e.g., FIG. 13, 1307) is formed when the material is dispensed from the material dispensing mechanism through the opening port (e.g., exit opening port) towards the platform (e.g., towards the material bed). The components of the layer dispensing mechanism (e.g., material dispensing mechanism, material removal mechanism, and/or leveling mechanism) can be evenly or non-evenly spaced. For example, the blade (e.g., tip hereof), entrance opening port of the material removal mechanism, and exit opening port of the material dispensing mechanism may be evenly or non-evenly spaced.

The force exerted by the force source through the material removal mechanism may cause at least a portion of the pre-transformed material (e.g., powder particles) to lift (e.g., become airborne) from the material bed, and travel (e.g., influx) towards the entrance port of the material removal mechanism (e.g., nozzle entrance). The lifted pre-transformed material (or at times, unwanted transformed material) may further travel (e.g., flow) within the material removal mechanism (e.g., within the internal compartment and/or within the nozzle). The influx may comprise laminar, turbulent, or curved movement of the lifted pre-transformed material. The influx may be towards the reservoir. The influx may be towards the force source. The gap between the exposed surface of the material bed and the entrance port of the material removal mechanism (e.g., nozzle entrance) may depend on the average FLS and/or mass of the pre-transformed material sections (e.g., particulate material). The gap between the exposed surface of the material bed and the entrance port of the material removal mechanism (e.g., nozzle entrance) may depend on the mean FLS and/or mass of the particulate material. The structure of the internal compartment and/or nozzle enables uniform removal of pre-transformed material from the material bed. In some examples, the amount of force generated by the force source and/or its distribution through the internal compartment and/or nozzle of the material removal mechanism enables uniform removal of pre-transformed material from the material bed. For example, the structure of the internal compartment and/or nozzle enables uniform suction of pre-transformed material from the material bed. The structure of the internal compartment and/or nozzle may influence the velocity of the influx of pre-transformed material into the material removal mechanism. The amount of force generated by the force source and/or its distribution through the internal compartment and/or nozzle of the material removal mechanism may influence the homogeneity of the influx velocity along the entrance port(s) and/or along the material bed.

The layer dispensing mechanism (e.g., recoater) may dispense a portion of a layer of pre-transformed material. The dispensed portion of a layer of pre-transformed material may comprise an exposed surface that is (e.g., substantially) planar (e.g., horizontal, flat, smooth, and/or unvaried). FIG. 10A shows an example of a material bed 1012 comprising a substantially planar exposed surface 1013 in which at least a portion of a 3D object 1011 was generated from a portion of the material bed 1012 by irradiation of the energy beam 1014, thus forming a depression 1016 in the material bed.

Figure 10B:
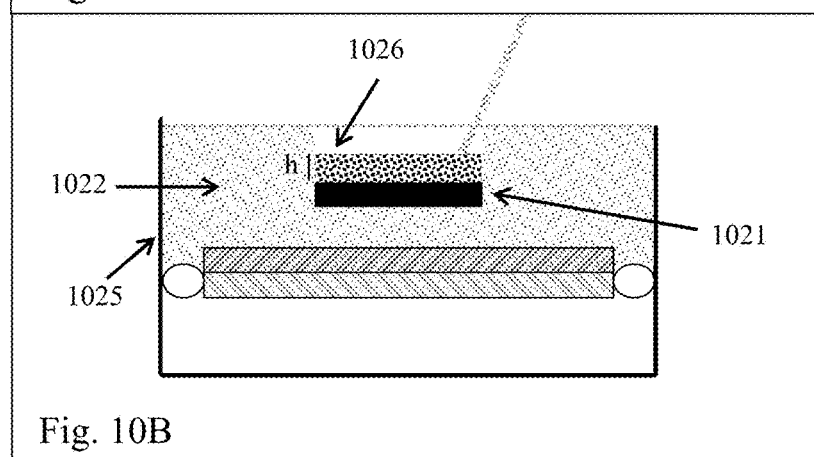
Figure 10C:
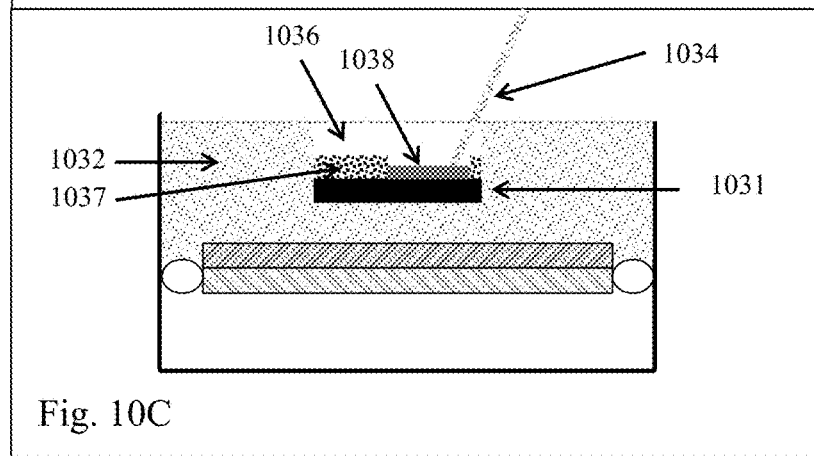
Figure 11A:
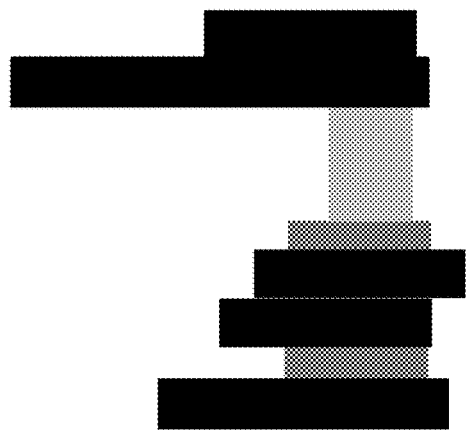
FIGS. 11A-11B illustrate schematic vertical cross sections of 3D objects.
Figure 11B:
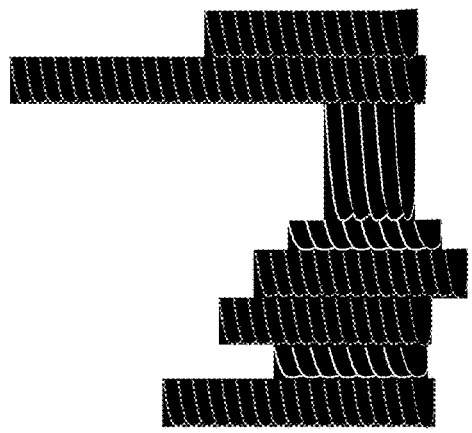

In some embodiments, a sub layer may be formed in the material bed. A sub layer has a height that is less than a height of a (e.g., typical) layer of hardened material in of the 3D object. A sub-layer may be formed from the same (e.g., first) or from a different (e.g., second) pre-transformed material, as compared to the layer of hardened material. FIG. 10B shows an example of a material bed 1022 disposed in an enclosure 1025, in which a layer of hardened material 1021 is disposed in a material bed 1022 comprising a first pre-transformed material, and a sub-layer of a second pre-transformed material 1026 is disposed in the depression formed in the material bed upon formation of the hardened material 1021. At least a portion of the second pre-transformed material may be irradiated by an energy beam to form a transformed material. FIG. 10C shows an example of a layer of transformed material 1031 that was formed from a first pre-transformed material of the material bed 1032, thus forming a depression 1036, that was filled in part by a sub-layer of a second pre-transformed material 1037, a part of which was transformed by the energy beam 1034 to form a sub-layer of transformed material 1038 that is of a different type than the transformed material of the layer 1031. The different pre-transformed material may differ in its microstructure, FLS, overall physical structure, chemical composition, or any combination thereof. The different may be in the height of the layers and sub-layers. For example, the sub layer comprising the second pre-transformed material may have a smaller height (e.g., FIG. 10B "h") as compared to the layer of the first pre-transformed material. The first pre-transformed material may be substantially identical or different than the second pre-transformed material. The difference in microstructure may comprise difference in melt pool metrology, crystal structure, or crystal structure repertoire (e.g., relative abundance and placement of various crystal structures within a melt pool). The melt pool metrology may comprise their FLS, and/or depth. By repeating such process, 3D objects may be formed in which various layers, or portions of layers, differ. FIG. 11A shows an example of a vertical cross section of a 3D object comprising layers of different material types according to color coding (e.g., each color represents one type of material). FIG. 11B shows an example of a vertical cross section of a 3D object comprising layers of substantially the same material, but having different microstructure (e.g., melt pool sizes).

A substantially planar exposed surface of the material bed may comprise a substantially uniform pre-transformed material (e.g., powder) height of the exposed surface. The layer dispensing mechanism (e.g., leveling member) can provide material uniformity height (e.g., powder uniformity height) across the exposed layer of the material bed such that portions of the bed that are separated from one another by at least about 1 mm, 2 mm, 3 mm, 4 mm, 5 mm, or 10 mm, have a height deviation of at most about 10 mm, 9 mm, 8 mm, 7 mm, 6 mm, 5 mm, 4 mm, 3 mm, 2 mm, 1 mm, 500 µm, 400 µm, 300 µm, 200 µm, 100 µm, 90 µm, 80 µm, 70 µm, 60 µm, 50 µm, 40 µm, 30 µm, 20 µm, or 10 µm. The layer dispensing mechanism can provide material uniformity across the exposed layer of the material bed such that portions of the bed that are separated from one another by any value between the afore-mentioned height deviation values (e.g., from about 1 mm to about 10 mm) have a height deviation from about 10 mm to about 10 µm. The layer dispensing mechanism may achieve a deviation from a planar uniformity of the exposed layer of the material bed (e.g., horizontal plane) of at most about 20%, 10%, 5%, 2%, 1% or 0.5%, as compared to an ideal planarity. The layer dispensing mechanism may achieve a deviation from a planar uniformity of the exposed layer of the material bed (e.g., horizontal plane) of at most about 150 µm, 130 µm, 100 µm, 70 µm, 50 µm, 40 µm, 30 µm, 2 µm, 10 µm or 5 µm. The layer dispensing mechanism may achieve a deviation from a planar uniformity of the exposed layer of the material bed between any of the afore-mentioned values (e.g., from about 5 µm to about 150 µm, from about 5 µm to about 50 µm, from about 30 µm to about 100 µm, or from about 100 µm to about 150 µm).

The material removal mechanism may remove at least a portion (e.g., the entire) of at least the exposed surface of the material bed. The at least a portion may be at a designated location (e.g., controlled manually or by the controller). For example, the material removal mechanism may form depressions (e.g. voids) in a material bed comprising a first pre-transformed material, which depressions may be subsequently filed with a layer or sub-layer of a second pre-transformed material. The second pre-transformed material may be substantially identical, or different from the first pre-transformed material. The sub layer may be smaller from a layer with respect to their height and/or horizontal cross section.

The layer dispensing mechanism (e.g., material removal mechanism) may facilitate the formation of a 3D object that has a locally different microstructure. The locally different microstructure can be between different layers, or within a given layer. For example, at least one portion of a layer within the 3D object may differ from another portion within that same layer, in terms of its microstructure. The microstructure difference may be any difference recited above.

Figure 16:
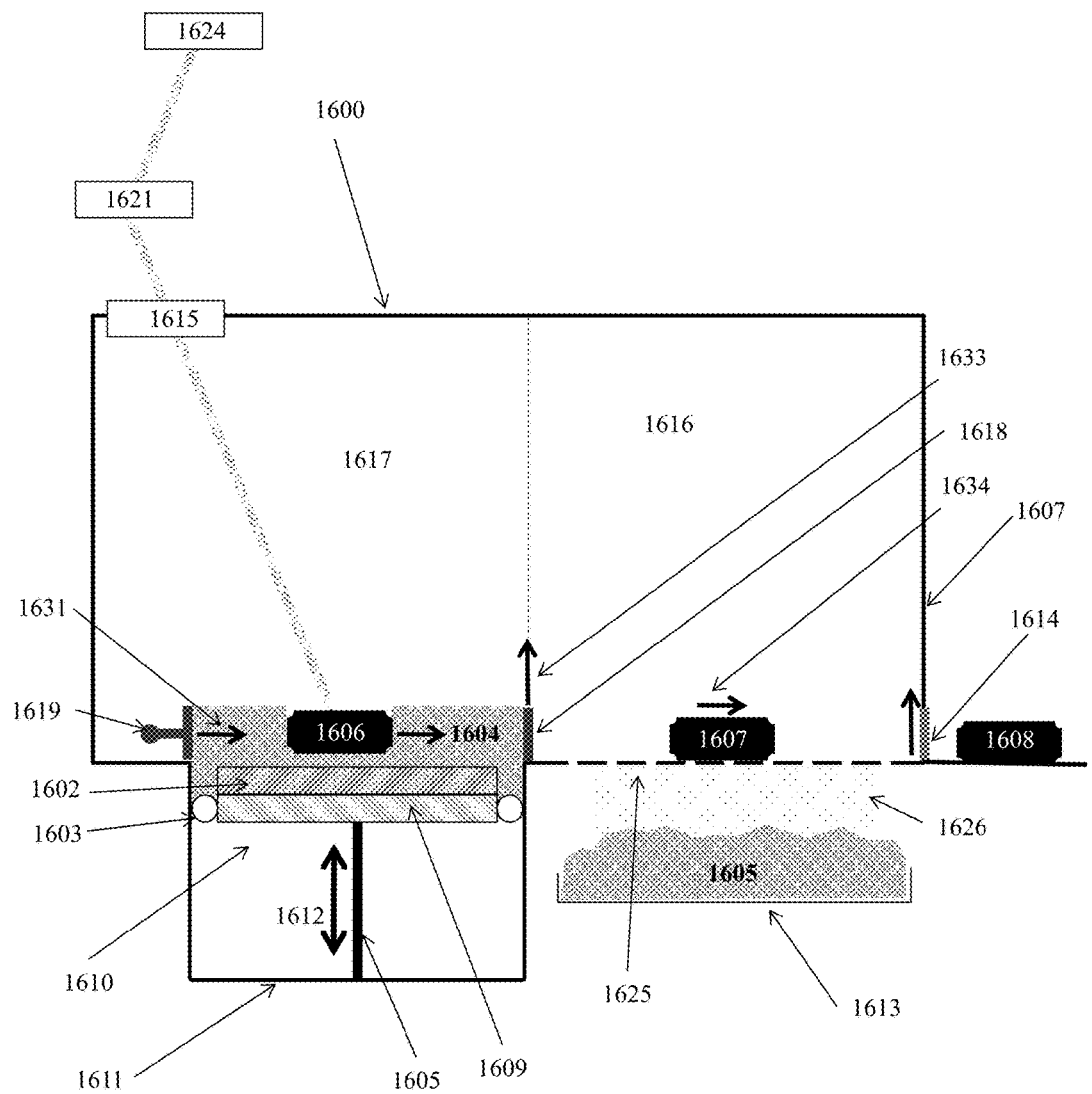
FIG. 16 shows a schematic side view of a 3D printing system and apparatuses.

In another aspect, the system and apparatuses for generating the 3D object(s) comprises a mechanism for separating the 3D object(s) from the remainder of the material bed that is not the 3D object, and/or cleaning the 3D object (e.g., within the enclosure). In some embodiments, both the material bed and the mechanism for separating the 3D object(s) from the remainder of the material bed that is not the 3D object are enclosed in the same atmosphere. The atmosphere can be an inert, non-reactive, oxygen depleted, humidity depleted, or passive atmosphere with respect to the material bed, pre-transformed material, and/or 3D object. FIG. 16 shows an example of a system and apparatuses to clean a 3D object 1606 that is formed in a material bed 1604 in a first portion of the enclosure (e.g., 1617), by pushing the 3D object with the remainder of the material bed (or a portion thereof that surrounds the 3D object) by a pushing mechanism 1619 through an opening 1618 to a second portion of the enclosure (e.g., 1616) along a direction indicated by the bold arrows 1631, 1604 respectively. The 3D object is separated (e.g., released or relieved) from the remainder of the material bed (or a pushed portion thereof) at the second portion of the enclosure. The 3D object may be subsequently cleaned and/or cooled within the enclosure (e.g., at the second enclosure portion), and/or exit the enclosure through an exit 1614 along the direction indicated by the bold arrow 1634, to a position 1608 outside of the enclosure 1600. The cleaning may comprise using gas pressure (e.g., positive and/or negative), vibration, and/or surface friction (e.g., brush). The cleaning may comprise a post processing procedure as disclosed in Ser. No. PCT/US15/36802, which is incorporated herein by reference in its entirety. FIG. 16 shows and example of a material bed 1604 disposed on a platform comprising a substrate 1609, a base 1602, sealant 1603 that encloses the material within the material bed, a vertical actuator 1605 that is enables vertical travel 1612 of the platform. The sealant 1603 prevents the material within the material bed 1604 to penetrate the environment 1610 where the actuator is operational, and reach the bottom of the enclosure 1611. The 3D object is formed in the example of FIG. 16, by using an energy source 1624 that irradiates an energy beam, which energy beam travels through an optical system 1621 and an optical window 1615 into the enclosure environment, and interacts with the material bed to transform a portion thereof as part of the 3D object 1606.

In some embodiments, the 3D object is devoid of surface features that are indicative of the use of a post printing process. In some embodiments, the 3D object is including surface features that are indicative of the use of a post printing process. The post printing process may comprise a trimming process (e.g., to trim auxiliary supports). The trimming process may comprise ablation by an energy beam (e.g., laser), mechanical, or chemical trimming. The trimming process may be an operation conducted after the completion of the 3D printing process (e.g., using the pre-transformed material). The trimming process may be a separate operation from the 3D printing process. The trimming may comprise cutting (e.g., using a piercing saw). The trimming can comprise polishing or blasting. The blasting can comprise solid blasting, gas blasting, or liquid blasting. The solid blasting can comprise sand blasting. The gas blasting can comprise air blasting. The liquid blasting can comprise water blasting. The blasting can comprise mechanical blasting.

In some embodiments, the cooling of the 3D object (e.g., in the second enclosure portion, e.g., 1616) comprises using a cooling agent, or a cooling mechanism. The cooling mechanism may be active or passive. The cooling may comprise any cooling mechanism or agent as disclosed in Ser. No. PCT/US16/59781, and in U.S. 62/252,330, both of which are incorporated herein by reference in their entirety. The enclosure may comprise a mesh (e.g., 1625). The mesh may prevent the 3D object from passing through, and allow at least the pre-transformed material to go through (e.g., 1626). The at least pre-transformed material that passes through the mesh may accumulate 1605 in the reservoir 1613. The cleaning and/or cooling mechanisms may be coupled and controlled by a controller, and/or manually. The mesh may be disposed adjacent to the material bed. Adjacent may comprise above, below, or to the side (e.g., 1625). In some examples, the material bed (e.g., and the platform (1609 and 1602) on which the material bed rests) may be translatable vertically (e.g., 1612). In some examples, the mesh may be translated vertically. The platform and/or mesh may be translatable vertically, horizontally, and/or in an angle (e.g., planar or compound). The translation may be before, after, and/or during at least a portion of the 3D printing. In some examples, the mesh aligns with the platform of the material bed. In some examples, the mesh aligns with a positing at or below the bottom skin layer of the 3D object. In some examples, the mesh aligns while considering the vertical position of the platform and/or bottom skin layer of the 3D object. The movement of the platform and/or mesh may be controlled by the controller, and/or be operatively coupled thereto. The controller may direct alignment of the platform and/or mesh at the end, before and/or during at least a portion of the 3D printing process. The material bed may border by sides (e.g., planes, planks, or slates) that prevent the material within the material bed from spilling. At least two of the (e.g., opposing) sides may comprise side openings, or may be translational (e.g., horizontally (e.g., 1619 and 1631), vertically (e.g., 1618 and 1633) or at an angle). The side openings may be opened, closed, or translated automatically and/or manually. The side openings may be controlled by the controller. The side openings may be situated opposite to each other (e.g., along a line). At least one of the side openings may comprise a first gate (e.g., 1618). The enclosure may comprise a second gate (e.g., 1614) disposed as part of its confining face (e.g., wall, 1607). The gate (e.g., first and/or second) may open horizontally, vertically, at an angle (e.g., planar or compound), or any combination thereof. The gate may be a rolling gate. The gate may be mounted to a roller, hinge, and/or rail. At least one of the side openings may be pushed to open or comprise a pushing mechanism (e.g., a pusher, 1619) comprising a surface. The pushing mechanism (e.g., 1619) may comprise at least one slate, blade, ram, or shovel. The surface (e.g., blade) can comprise a stiff or flexible material. The material may be any material disclosed herein. The pushing mechanism may translate towards the gate opening (e.g., along a straight line). Examples of gate openings are shown in FIGS. 16, 1618 and 1614. The pushing mechanism may push at least a portion of the material bed that is between the pushing surface and the opening that opposes the pushing mechanism. The at least a portion of the material bed that is pushed through the opening (e.g., 1618) may comprise one or more printed 3D objects (e.g., 1606) embedded within the material bed (e.g., 1604). In some examples, the 3D object(s) may not be anchored to (e.g., connected to) at least one of the platform and the side surfaces of the material bed (e.g., during the generation of the 3D object(s)). In some examples, the 3D object(s) may not be contact (e.g., touch) at least one of the platform and the side surfaces of the material bed (e.g., 1606). The 3D object(s) may comprise auxiliary supports that do not connect to and/or contact the platform and/or the side surfaces of the material bed (e.g., during the generation of the 3D object(s)). The 3D object(s) may comprise auxiliary supports that float anchorlessly in the material bed. The 3D object(s) may be devoid of auxiliary supports during (e.g., and after) its generation.

In some examples, the at least a portion of the material bed that is pushed through the gate opening (e.g., of the side opening) rests on a stage (e.g., deck, balcony, ledge, shelf, slate, slab, plate, or plank). The stage may be substantially planar and/or horizontal. In some instances, the stage may be non-planar. The stage may comprise one or more holes. The one or more holes can be open or openable holes. The holes may be choke holes. The holes can be closed and opened automatically and/or manually. The opening and/or closing of the holes can be controlled by a controller (e.g., before, during, and/or after the 3D printing). The holes can be opened at least in part (e.g., to allow at least the pre-transformed material to flow through). The open holes may prevent the 3D object from passing through. The holes may be closed by a slab of material that is translatable and/or pivotable. The translation and/or pivoting may be to a position away from the holes and/or stage. The translation and/or pivoting may be towards the bottom of the enclosure. The translation and/or pivoting may be towards the reservoir that collects the material that is separated from the 3D object (e.g., 1613). The translation and/or pivoting may allow for at least partial opening and/or closing of the holes. The one or more holes may be included in a mesh (e.g., 1625). The holes may allow the pre-transformed material (e.g., of the type in the material bed) to flow there through (e.g., 1626). The holes may prevent the 3D object to fall there through (e.g., 1607). The flowing pre-transformed material (or other content of the material bed that is not part of the 3D object(s)) may flow through the mesh into a collection-reservoir (e.g., 1613). The stage may comprise two or more meshes. At least one of the meshes may be translatable (e.g., horizontally). The translation of the at least one of the meshes may be from a position which closes the holes, to a position in which the holes are at least partially open. The translation of the at least one of the meshes may be from a position which opens to holes, to a position in which the holes are at least partially closed. The translation may be a translation of one mesh with respect to a second mesh. The translation may be a lateral (e.g., horizontal) translation. The translation may be horizontal, vertical, and/or in an angle (e.g., compound or planar angle).

In some instances, the stage (e.g., comprising the mesh 1625) vibrates. For example, the one or holes (e.g., mesh) may be vibrated (e.g., by one or more vibrator mechanisms). In some instances, the 3D object that is encased by at least the pre-transformed material may be shaken (e.g., vibrated). In some instances, vibration waves (e.g., ultrasonic waves) may be projected into the 3D object after it has been pushed from the powder bed (e.g., rests on the stage). The waves may vibrate the pre-transformed material that surrounds the 3D object. The projection of the waves may be from a position above, below, or at the vertical position of the stage. The one or more vibrator mechanism may be situated above, below, or at the vertical position of the stage. The one or more vibrator mechanism (e.g., vibrator) may be attached to the stage. The one or more vibrator mechanism (e.g., vibrator) may contact or be connected to the stage. The vibrating mechanism (e.g., vibrator or shaker) can be any vibrator mechanism disclosed herein.

The 3D object that is substantially devoid of pre-transformed material (e.g., 1607) may be further cleaned by a gas flow. The gas cleaning may take place within the enclosure (e.g., 1616), or outside of the reservoir. The pusher (e.g., 1619) may continue and push the 3D objects towards an exit opening of the enclosure (e.g., 1614), where the 3D object can be retrieved (e.g., 1608).

In some instances, one, two, or more 3D objects may be generated in a material bed (e.g., a single material bed; the same material bed). The multiplicity of 3D object may be generated in the material bed simultaneously or sequentially. For example, at least two 3D objects may be generated side by side. For example, at least two 3D objects may be generated one on top of the other. For example, at least two 3D objects generated in the material bed may have a gap between them (e.g., gap filled with pre-transformed material). For example, at least two 3D objects generated in the material bed may contact (e.g., and not connect to) each other. In some embodiments, the 3D objects are independently built one above the other. The generation of a multiplicity of 3D objects in the material bed may allow continuous generation of 3D objects.

In some embodiments, the at least one portion of the material bed that is pushed through the first opening (e.g., 1618) may be disposed in a moving stage. The moving stage may comprise a hole (e.g., it may be a mesh). The moving stage may be devoid of a mesh. The moving stage may rotate. The moving stage may comprise a tumbler mechanism. The moving stage may comprise a rotating drum. The rotating drum may be a centrifuge. The moving stage may allow the pre-transformed material to slide towards a position that is different from the position of the 3D object(s) (e.g., due to the relative small weight of the particulate material). The stage may translate such that the pre-transformed material may move in a relatively higher velocity (e.g., faster) than the 3D object (e.g., that may move negligently). In some embodiments, the stage may not be planar. In some embodiments, the stage may be of a soft material. The stage may comprise a net. For example, the stage may comprise a flexible net. The 3D object may be cradled by the stage. In some embodiments, the stage may be absent. In some examples, the system may comprise a reservoir (e.g., 1613) for collecting the pre-transformed material that is separated from the 3D object (e.g., 1626). The stage may comprise a shingle. The shingle may allow at least a pre-transformed material to flow (e.g., seep, or drain) through a hole in the stage, and prevent the 3D object from falling through. The shingles may be randomly situated or be substantially organized in a pattern (e.g., in rows and/or columns, and/or relative to the hole(s)). The shingle may be plates or boxes. The shingles may be porous or non-porous. The shingles may comprise a soft or a hard material. The shingles may be semi-hard (e.g., gel like substance). The shingles may be of a material that prevents damage to the 3D object if it falls on the shingles during its release from the material bed (e.g., after being pushed out of the first opening e.g., 1618).

The FLS of the holes may be adjustable or fixed. In some embodiments, the stage comprises a mesh. The mesh may be movable. The movement of the mesh may be controlled manually or automatically (e.g., by a controller). The relative position of the two or more meshes with respect to each other may determine the rate at which at least the pre-transformed material passes through the hole (or holes). The FLS of the holes may be electrically controlled. The fundamental length scale of the holes may be thermally controlled. The mesh may be heated or cooled. The stage may vibrate (e.g., controllably vibrate). The temperature and/or vibration of the stage may be controlled manually or by the controller. The holes of the stage can shrink or expand as a function of the temperature and/or electrical charge of the stage. The stage can be conductive. The mesh may comprise a mesh of standard mesh number 50, 70, 90, 100, 120, 140, 170, 200, 230, 270, 325, 550, or 625. The mesh may comprise a mesh of standard mesh number between any of the afore-mentioned mesh numbers (e.g., from 50 to 625, from 50 to 230, from 230 to 625, or from 100 to 325). The standard mesh number may be US or Tyler standards. The two meshes may have at least one position where no pre-transformed material can pass through the holes. The two meshes may have a least one position where a maximum amount of material can pass through the holes. The two meshes can be identical or different. The size of the holes in the two meshes can be identical or different. The shape of the holes in the two meshes can be identical or different. The shape of the holes can be any hole shape described herein.

In some embodiments, the 3D object comprises layers of hardened material. The layered structure of the 3D object can be a substantially repetitive layered structure. In some examples, each layer of the layered structure has an average layer thickness greater than or equal to about 5 micrometers (μm). In some examples, each layer of the layered structure has an average layer thickness less than or equal to about 1000 micrometers (μm). The layered structure can comprise individual layers of the successive solidified melt pools. The layer can be formed by depositing droplets or a continuous stream of transformed material. At least two of the successive solidified melt pools can comprise a substantially repetitive material variation selected from the group consisting of variation in grain orientation, variation in material density, variation in the degree of compound segregation to grain boundaries, variation in the degree of element segregation to grain boundaries, variation in material phase, variation in metallurgical phase, variation in material porosity, variation in crystal phase, and variation in crystal structure. At least one of the successive solidified melt pools can comprise a crystal. The crystal can comprise a single crystal. The layered structure can comprise one or more features indicative of solidification of melt pools during the three-dimensional printing process. The layered structure can comprise a feature indicative of the use of the three-dimensional printing process (e.g., as disclosed herein). The three-dimensional printing process can comprise selective laser melting. In some embodiments, a fundamental length scale of the three-dimensional object can be at least about 120 micrometers.

In some embodiments, the layer of hardened material layer (or a portion thereof) has a thickness (e.g., layer height) of at least about 50 μm, 100 μm, 150 μm, 200 μm, 300 μm, 400 μm, 500 μm, 600 μm, 700 μm, 800 μm, 900 μm, or 1000 μm. In some examples, the hardened material layer (or a portion thereof) has a thickness of at most about 1000 μ, 900 μm, 800 μm, 700 μm, 600 μm, 500 μm, 450 μm, 400 μm, 350 μm, 300 μm, 250 μm, 200 μm, 150 μm, 100 μm, 75 μm, or 50 μm. A hardened material layer (or a portion thereof) may have any value in between the afore-mentioned layer thickness values (e.g., from about 50 μm to about 1000 μm, from about 500 μin to about 800 μm, from about 300 μm to about 600 μm, from about 300 μm to about 900 μm, or from about 50 μm to about 200 μm). In some instances, the bottom skin layer may be thinner than the subsequent layers. In some instances, the bottom skin layer may be thicker than the subsequent layers. The bottom skin layer may have any value disclosed herein for the layer of hardened material. In some instances, the layer comprising the path-of-tiles is thinner than the layers formed without using the path-of-tiles (e.g., formed by the energy beam). In some instances, the layer comprising the path-of-tiles is thicker than the layers formed without using the path-of-tiles (e.g., formed by the energy beam).

The material (e.g., pre-transformed material, transformed material, and/or hardened material) may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball or a carbon nanotube. The ceramic material may comprise cement. The ceramic material may comprise alumina. The material may comprise sand, glass, or stone. In some embodiments, the material may comprise an organic material, for example, a polymer or a resin. The organic material may comprise a hydrocarbon. The polymer may comprise styrene. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon based polymer or a resin. The material may comprise an organosilicon-based material. The material may comprise silicon and hydrogen atoms. The material may comprise silicon and carbon atoms. In some embodiments, the material may exclude a silicon-based material. The solid material may comprise powder material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) or wires.

The material may comprise a powder material. The material may comprise a solid material. The material may comprise one or more particles or clusters. The term "powder," as used herein, generally refers to a solid having fine particles. The powder may also be referred to as "particulate material." Powders may be granular materials. The powder particles may comprise micro particles. The powder particles may comprise nanoparticles. In some examples, a powder comprising particles having an average fundamental length scale of at least about 5 nanometers (nm), 10 nm, 20 nm, 30 nm, 40 nm, 50 nm, 100 nm, 200 nm, 300 nm, 400 nm, 500 nm, 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, or 100 μm. The particles comprising the powder may have an average fundamental length scale of at most about 100 μm, 80 μm, 75 μm, 70 μm, 65 μm, 60 μm, 55 μm, 50 μm, 45 μm, 40 μm, 35 μm, 30 μm, 25 μm, 20 μm, 15 μm, 10 μm, 5 μm, 1 μm, 500 nm, 400 nm, 300 nm, 200 nm, 100 nm, 50 nm, 40 nm, 30 nm, 20 nm, 10 nm, or 5 nm. In some cases, the powder may have an average fundamental length scale between any of the values of the average particle fundamental length scale listed above (e.g., from about 5 nm to about 100 µm, from about 1 µm to about 100 µm, from about 15 µm to about 45 µm, from about 5 µm to about 80 µm, from about 20 µm to about 80 µm, or from about 500 nm to about 50 µm).

The powder can be composed of individual particles. The individual particles can be spherical, oval, prismatic, cubic, or irregularly shaped. The particles can have a fundamental length scale. The powder can be composed of a homogenously shaped particle mixture such that all the particles have substantially the same shape and fundamental length scale magnitude within at most 1%, 5%, 8%, 10%, 15%, 20%, 25%, 30%, 35%, 40%, 50%, 60%, or 70%, distribution of fundamental length scale. In some cases, the powder can be a heterogeneous mixture such that the particles have variable shape and/or fundamental length scale magnitude.

At least parts of the layer can be transformed to a transformed material that may subsequently form at least a fraction (also used herein "a portion," or "a part") of a hardened (e.g., solidified) 3D object. At times a layer of transformed or hardened material may comprise a cross section of a 3D object (e.g., a horizontal cross section). At times a layer of transformed or hardened material may comprise a deviation from a cross section of a 3D object. The deviation may include vertical or horizontal deviation. A pre-transformed material may be a powder material. A pre-transformed material layer (or a portion thereof) can have a thickness (e.g., layer height) of at least about 0.1 micrometer (µm), 0.5 µm, 1.0 µm, 10 µm, 50 µm, 100 µm, 150 µm, 200 µm, 300 µm, 400 µm, 500 µm, 600 µm, 700 µm, 800 µm, 900 µm, or 1000 µm. A pretransformed material layer (or a portion thereof) can have a thickness of at most about 1000 µm, 900 µm, 800 µm, 700 µm, 600 µm, 500 µm, 450 µm, 400 µm, 350 µm, 300 µm, 250 µm, 200 µm, 150 µm, 100 µm, 75 µm, 50 µm, 40 µm, 30 µm, 20 µm, 10 µm, 5 µm, or 0.5 µm. A pre-transformed material layer (or a portion thereof) may have any value in between the afore-mentioned layer thickness values (e.g., from about 0.1 µm to about 1000 µm, from about 1 µm to about 800 µm, from about 20 µm to about 600 µm, from about 30 µm to about 300 µm, or from about 10 µm to about 1000 µm).

In some embodiments, the material composition of at least one layer within the material bed differs from the material composition within at least one other layer in the material bed. The difference (e.g., variation) may comprise difference in crystal or grain structure. The variation may comprise variation in grain orientation, variation in material density, variation in the degree of compound segregation to grain boundaries, variation in the degree of element segregation to grain boundaries, variation in material phase, variation in metallurgical phase, variation in material porosity, variation in crystal phase, or variation in crystal structure. The microstructure of the printed object may comprise planar structure, cellular structure, columnar dendritic structure, or equiaxed dendritic structure.

In some examples, the pre-transformed materials of at least one layer in the material bed differs in the FLS of its particles (e.g., powder particles) from the FLS of the pre-transformed material within at least one other layer in the material bed. A layer may comprise two or more material types at any combination. For example, two or more elemental metals, two or more metal alloys, two or more ceramics, two or more allotropes of elemental carbon. For example, an elemental metal and a metal alloy, an elemental metal and a ceramic, an elemental metal and an allotrope of elemental carbon, a metal alloy and a ceramic, a metal alloy and an allotrope of elemental carbon, a ceramic and an allotrope of elemental carbon. In some embodiments, all the layers of pre-transformed material deposited during the 3D printing process are of the same material composition. In some instances, a metal alloy is formed in situ during the process of transforming at least a portion of the material bed. In some instances, a metal alloy is not formed in situ during the process of transforming at least a portion of the material bed. In some instances, a metal alloy is formed prior to the process of transforming at least a portion of the material bed. In a multiplicity (e.g., mixture) of pre-transformed (e.g., powder) materials, one pre-transformed material may be used as support (i.e., supportive powder), as an insulator, as a cooling member (e.g., heat sink), or as any combination thereof The cooling member can be any cooling member disclosed in U.S. 62/252,330, U.S. 62/317,070, U.S. 62/396,584, Ser. Nos. PCT/US15/36802, or PCT/US16/59781, all of which are entirely incorporated herein by reference.

In some instances, adjacent components in the material bed are separated from one another by one or more intervening layers. In an example, a first layer is adjacent to a second layer when the first layer is in direct contact with the second layer. In another example, a first layer is adjacent to a second layer when the first layer is separated from the second layer by at least one layer (e.g., a third layer). The intervening layer may be of any layer size disclosed herein.

At times, the pre-transformed material is chosen such that the material is the desired and/or otherwise predetermined material for the 3D object. In some cases, a layer of the 3D object comprises a single type of material. For example, a layer of the 3D object can comprise a single elemental metal type, or a single metal alloy type. In some examples, a layer within the 3D object may comprise several types of material (e.g., an elemental metal and an alloy, an alloy and a ceramic, an alloy and an allotrope of elemental carbon). In certain embodiments, each type of material comprises only a single member of that type. For example: a single member of elemental metal (e.g., iron), a single member of metal alloy (e.g., stainless steel), a single member of ceramic material (e.g., silicon carbide or tungsten carbide), or a single member (e.g., an allotrope) of elemental carbon (e.g., graphite). In some cases, a layer of the 3D object comprises more than one type of material. In some cases, a layer of the 3D object comprises more than one member of a material type.

The elemental metal can be an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium, or Osmium. The transition metal can be mercury. The rare-earth metal can be a lanthanide, or an actinide. The lanthanide metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth.

The metal alloy can be an iron based alloy, nickel based alloy, cobalt based alloy, chrome based alloy, cobalt chrome based alloy, titanium based alloy, magnesium based alloy, copper based alloy, or any combination thereof. The alloy may comprise an oxidation or corrosion resistant alloy. The alloy may comprise a super alloy (e.g., Inconel). The super alloy may comprise Inconel 600, 617, 625, 690, 718, or X-750. The metal (e.g., alloy or elemental) may comprise an alloy used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The metal (e.g., alloy or elemental) may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, i-pad), air conditioning, generators, furniture, musical equipment, art, jewelry, cooking equipment, or sport gear. The metal (e.g., alloy or elemental) may comprise an alloy used for products for human or veterinary applications comprising implants, or prosthetics. The metal alloy may comprise an alloy used for applications in the fields comprising human or veterinary surgery, implants (e.g., dental), or prosthetics.

The alloy may include a superalloy. The alloy may include a high-performance alloy. The alloy may include an alloy exhibiting at least one of excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy (e.g., Haynes 282), Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron alloy may include cast iron, or pig iron. The steel may include Bulat steel, Chromoly, Crucible steel, Damascus steel, Hadfield steel, High speed steel, HSLA steel, Maraging steel (e.g., M300), Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless steel, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316L, 316LN, 317L, 2205, 409, 904L, 321, 254SMO, 316Ti, 321H, 17-4, 15-5, 420, or 304H. The steel may comprise stainless steel of at least one crystalline structure selected from the group consisting of austenitic, superaustenitic, ferritic, martensitic, duplex, and precipitation-hardening martensitic. Duplex stainless steel may be lean duplex, standard duplex, super duplex, or hyper duplex. The stainless steel may comprise surgical grade stainless steel (e.g., austenitic 316, martensitic 420, or martensitic 440). The austenitic 316 stainless steel may include 316LVM. The steel may include 17-4 Precipitation Hardening steel (also known as type 630, a chromium-copper precipitation hardening stainless steel, 17-4PH steel).

The titanium-based alloys may include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38, or higher. In some instances, the titanium base alloy includes Ti-6Al-4V or Ti-6Al-7Nb.

The Nickel alloy may include Alnico, Alumel, Chromel, Cupronickel, Ferronickel, German silver, Hastelloy, Inconel, Monel metal, Nichrome, Nickel-carbon, Nicrosil, Nisil, Nitinol, Hastelloy-X, Cobalt-Chromium, or Magnetically "soft" alloys. The magnetically "soft" alloys may comprise Mu-metal, Permalloy, Supermalloy, or Brass. The brass may include Nickel hydride, Stainless or Coin silver. The cobalt alloy may include Megallium, Stellite (e.g. Talonite), Ultimet, or Vitallium. The chromium alloy may include chromium hydroxide, or Nichrome.

The aluminum alloy may include AA-8000, Al—Li (aluminum-lithium), Alnico, Duralumin, Hiduminium, Kryron Magnalium, Nambe, Scandium-aluminum, or Y alloy. The magnesium alloy may be Elektron, Magnox, or T-Mg—Al—Zn (Bergman phase) alloy.

The copper alloy may comprise Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo, or Tumbaga. The Brass may include Calamine brass, Chinese silver, Dutch metal, Gilding metal, Muntz metal, Pinchbeck, Prince's metal, or Tombac. The Bronze may include Aluminum bronze, Arsenical bronze, Bell metal, Florentine bronze, Guanin, Gunmetal, Glucydur, Phosphor bronze, Ormolu, or Speculum metal. The copper alloy may be a high-temperature copper alloy (e.g., GRCop-84).

In some examples, the material (e.g., powder material) comprises a material wherein its constituents (e.g., atoms or molecules) readily lose their outer shell electrons, resulting in a free-flowing cloud of electrons within their otherwise solid arrangement. In some examples, the material is characterized in having high electrical conductivity, low electrical resistivity, high thermal conductivity, or high density (e.g., as measured at ambient temperature (e.g., R.T., or 20° C.)). The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times," or "multiplied by." The high electrical conductivity can be any value between the afore-mentioned electrical conductivity values (e.g., from about $1*10^5$ S/m to about $1*10^8$ S/m). The low electrical resistivity may be at most about $1*10^{-5}$ ohm times meter ($\Omega*m$), $5*10^{-6}$ $\Omega*m$, $1*10^{-6}$ $\Omega*m$, $5*10^{-7}$ $\Omega*m$, $1*10^{-7}$ $\Omega*m$, $5*10^{-8}$, or $1*10^{-8}$ $\Omega*m$. The low electrical resistivity can be any value between the aforementioned electrical resistivity values (e.g., from about $1 \times 10^{-5} \Omega \cdot m$ to about $1 \times 10^{-8} \Omega \cdot m$). The high thermal conductivity may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be any value between the aforementioned thermal conductivity values (e.g., from about 20 W/mK to about 1000 W/mK). The high density may be at least about 1.5 grams per cubic centimeter ($g/cm^3$), $2 g/cm^3$, $3 g/cm^3$, $4 g/cm^3$, $5 g/cm^3$, $6 g/cm^3$, $7 g/cm^3$, $8 g/cm^3$, $9 g/cm^3$, $10 g/cm^3$, $11 g/cm^3$, $12 g/cm^3$, $13 g/cm^3$, $14 g/cm^3$, $15 g/cm^3$, $16 g/cm^3$, $17 g/cm^3$, $18 g/cm^3$, $19 g/cm^3$, $20 g/cm^3$, or $25 g/cm^3$. The high density can be any value between the afore-mentioned density values (e.g., from about $1 g/cm^3$ to about $25 g/cm^3$).

In some examples, a metallic material (e.g., elemental metal or metal alloy) comprises small amounts of non-metallic materials, such as, for example, oxygen, sulfur, or nitrogen. In some cases, the metallic material comprises the non-metallic material in a trace amount. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (based on weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (based on weight, w/w) of non-metallic material. A trace amount can be any value between the afore-mentioned trace amounts (e.g., from about 10 parts per trillion (ppt) to about 100000 ppm, from about 1 ppb to about 100000 ppm, from about 1 ppm to about 10000 ppm, or from about 1 ppb to about 1000 ppm).

The one or more layers within the 3D object may be substantially planar (e.g., flat). The planarity of the layer may be substantially uniform. The height of the layer at a particular position may be compared to an average plane. The average plane may be defined by a least squares planar fit of the top-most part of the surface of the layer of hardened material. The average plane may be a plane calculated by averaging the material height at each point on the top surface of the layer of hardened material. The deviation from any point at the surface of the planar layer of hardened material may be at most 20% 15%, 10%, 5%, 3%, 1%, or 0.5% of the height (e.g., thickness) of the layer of hardened material. The substantially planar one or more layers may have a large radius of curvature. FIG. 17 shows an example of a vertical cross section of a 3D object 1712 comprising planar layers (layers numbers 1-4) and non-planar layers (e.g., layers numbers 5-6) that have a radius of curvature. FIGS. 17, 1716 and 1717 are super-positions of curved layer on a circle 1715 having a radius of curvature "r." The one or more layers may have a radius of curvature equal to the radius of curvature of the layer surface. The radius of curvature may equal infinity (e.g., when the layer is planar). The radius of curvature of the layer surface (e.g., all the layers of the 3D object) may have a value of at least about 0.1 centimeter (cm), 0.2 cm, 0.3 cm, 0.4 cm, 0.5 cm, 0.6 cm, 0.7 cm, 0.8 cm, 0.9 cm, 1 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, or 100 m. The radius of curvature of the layer surface (e.g., all the layers of the 3D object) may have any value between any of the afore-mentioned values of the radius of curvature (e.g., from about 10 cm to about 90 m, from about 50 cm to about 10 m, from about 5 cm to about 1 m, from about 50 cm to about 5 m, from about 5 cm to infinity, or from about 40 cm to about 50 m). In some embodiments, a layer with an infinite radius of curvature is a layer that is planar. In some examples, the one or more layers may be included in a planar section of the 3D object, or may be a planar 3D object (e.g., a flat plane). In some instances, part of at least one layer within the 3D object has the radius of curvature mentioned herein.

Figure 18:
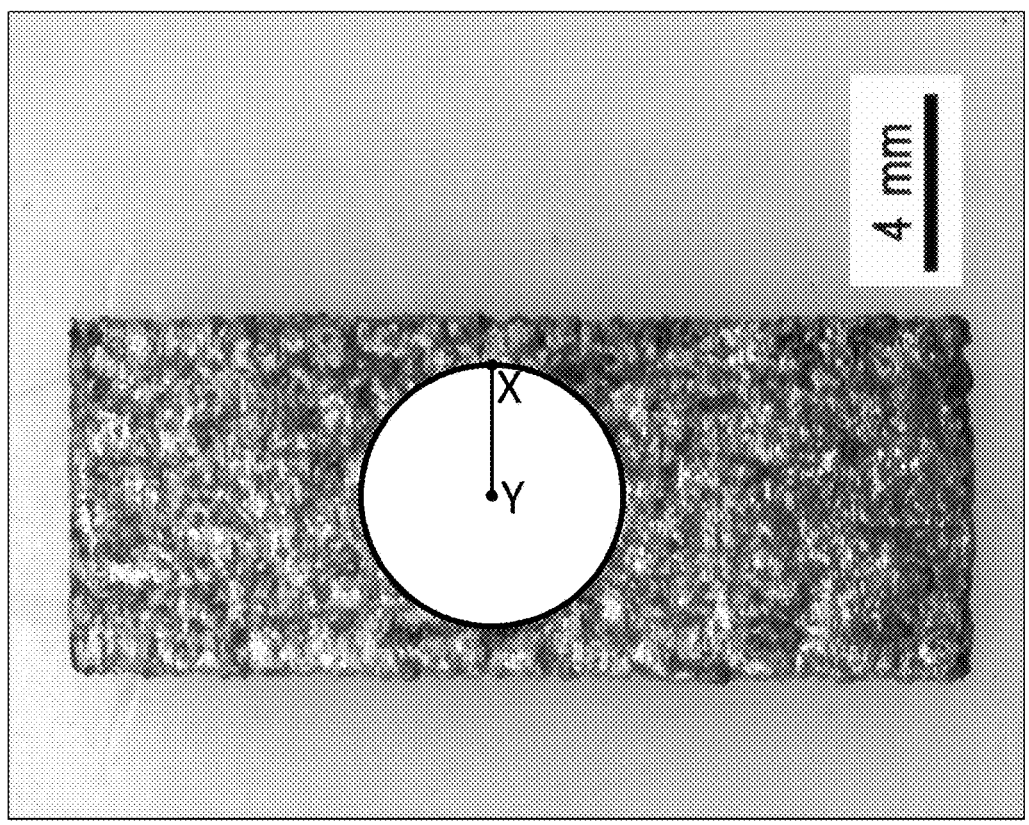
FIG. 18 shows a horizontal view of a 3D object.

In some examples, the 3D object comprises a layering plane N of the layered 3D structure. The 3D object may comprise points X and Y, which reside on the surface of the 3D object, wherein X is spaced apart from Y by at least about 10.5 millimeters or more. FIG. 18 shows an example of points X and Y on the surface of a 3D object. In some embodiments, X is spaced apart from Y by the auxiliary support feature spacing distance disclosed herein. In some examples, a sphere of radius XY that is centered at X lacks one or more auxiliary supports or one or more auxiliary support marks that are indicative of a presence or removal of the one or more auxiliary support features. In some embodiments, Y is spaced apart from X by at least about 10.5 millimeters or more. In some examples, an acute angle between the straight line XY and the direction normal to N may be from about 45 degrees to about 90 degrees. The acute angle between the straight line XY and the direction normal to the layering plane may be of the value of the acute angle alpha disclosed herein. When the angle between the straight line XY and the direction of normal to N is greater than 90 degrees, one considers the complementary acute angle. The layer structure may comprise any material(s) used for 3D printing described herein. Each layer of the 3D structure can be made of a single material or of multiple materials. Sometimes one part of the layer may comprise one material, and another part may comprise a second material different than the first material. A layer of the 3D object may be composed of a composite material. The 3D object may be composed of a composite material. The 3D object may comprise a functionally graded material.

In some embodiments, the generated 3D object is generated with the accuracy of at least about 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 150 μm, 200 μm, 250 μm, 300 μm, 400 μm, 500 μm, 600 μm, 700 μm, 800 μm, 900 μm, 1000 μm, 1100 μm, or 1500 μm as compared to a model of the 3D object (e.g., the requested 3D object). In some embodiments, the generated 3D object is generated with the accuracy of at most about 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 150 μm, 200 μm, 250 μm, 300 μm, 400 μm, 500 μm, 600 μm, 700 μm, 800 μm, 900 μm, 1000 μm, 1100 μm, or 1500 μm as compared to a model of the 3D object. As compared to a model of the 3D object, the generated 3D object may be generated with the accuracy of any accuracy value between the afore-mentioned values (e.g., from about 5 μm to about 100 μm, from about 15 μm to about 35 μm, from about 100 μm to about 1500 μm, from about 5 μm to about 1500 μm, or from about 400 μm to about 600 μm).

In some situations, the hardened layer of transformed material deforms (e.g., during and/or after the 3D printing). For example, the deformation causes a height deviation from a uniformly planar layer of hardened material. The height uniformity (e.g., deviation from average surface height) of the planar surface of the layer of hardened material may be at least about 100 μm, 90 μm, 80 μm, 70 μm, 60 μm, 50 μm, 40 µm, 30 µm, 20 µm, 10 µm, or 5 µm. The height uniformity of the planar surface of the layer of hardened material may be at most about 100 µm, 90 µm, 80, 70 µm, 60 µm, 50 µm, 40 µm, 30 µm, 20 µm, 10 µm, or 5 µm. The height uniformity of the planar surface of the layer of hardened material may be any value between the afore-mentioned height deviation values (e.g., from about 100 µm to about 5 µm, from about 50 µm to about 5 µm, from about 30 µm to about 5 µm, or from about 20 µm to about 5 µm). For example, the height uniformity be included in a high precision uniformity of the 3D printing. In some embodiments, the resolution of the 3D object is at least about 100 dots per inch (dpi), 300 dpi, 600 dpi, 1200 dpi, 2400 dpi, 3600 dpi, or 4800 dpi. In some embodiments, the resolution of the 3D object is at most about 100 dpi, 300 dpi, 600 dpi, 1200 dpi, 2400 dpi, 3600 dpi, or 4800 dpi. The resolution of the 3D object may be any value between the afore-mentioned values (e.g., from 100 dpi to 4800 dpi, from 300 dpi to 2400 dpi, or from 600 dpi to 4800 dpi).

In some embodiments, the height uniformity of a layer of hardened material persists across a portion of the layer surface that has a width or a length of at least about 1 mm, 2 mm, 3 mm, 4 mm, 5 mm, or 10 mm, have a height deviation of at least about 10 mm, 9 mm, 8 mm, 7 mm, 6 mm, 5 mm, 4 mm, 3 mm, 2 mm, 1 mm, 500 µm, 400 µm, 300 µm, 200 µm, 100 µm, 90 µm, 80 µm, 70 µm, 60 µm, 50 µm, 40 µm, 30 µm, 20 µm, or 10 µm. In some embodiments, the height uniformity of a layer of hardened material persists across a portion of the target surface that has a width or a length of most about 10 mm, 9 mm, 8 mm, 7 mm, 6 mm, 5 mm, 4 mm, 3 mm, 2 mm, 1 mm, 500 µm, 400 µm, 300 µm, 200 µm, 100 µm, 90 µm, 80, 70 µm, 60 µm, 50 µm, 40 µm, 30 µm, 20 µm, or 10 µm. The height uniformity of a layer of hardened material may persist across a portion of the target surface that has a width or a length of or of any value between the afore-mentioned width or length values (e.g., from about 10 mm to about 10 µm, from about 10 mm to about 100 µm, or from about 5 mm to about 500 µm).

Characteristics of the hardened material and/or any of its parts (e.g., layer of hardened material) can be measured by any of the following measurement methodologies. For example, the FLS values (e.g., width), height uniformity, auxiliary support space, an/d or radius of curvature of the layer of the 3D object and any of its components (e.g., layer of hardened material) may be measured by any of the following measuring methodologies. The FLS of opening ports may be measured by one or more of following measurement methodologies. The measurement methodologies may comprise a microscopy method (e.g., any microscopy method described herein). The measurement methodologies may comprise a coordinate measuring machine (CMM), measuring projector, vision measuring system, and/or a gauge. The gauge can be a gauge distometer (e.g., caliper). The gauge can be a go-no-go gauge. The measurement methodologies may comprise a caliper (e.g., vernier caliper), positive lens, interferometer, or laser (e.g., tracker). The measurement methodologies may comprise a contact or by a non-contact method. The measurement methodologies may comprise one or more sensors (e.g., optical sensors and/or metrological sensors). The measurement methodologies may comprise a metrological measurement device (e.g., using metrological sensor(s)). The measurements may comprise a motor encoder (e.g., rotary and/or linear). The measurement methodologies may comprise using an electromagnetic beam (e.g., visible or IR). The microscopy method may comprise ultrasound or nuclear magnetic resonance. The microscopy method may comprise optical microscopy. The microscopy method may comprise electromagnetic, electron, or proximal probe microscopy. The electron microscopy may comprise scanning, tunneling, X-ray photo-, or Auger electron microscopy. The electromagnetic microscopy may comprise confocal, stereoscope, or compound microscopy. The microscopy method may comprise an inverted and/or non-inverted microscope. The proximal probe microscopy may comprise atomic force, or scanning tunneling microscopy, or any other microscopy described herein. The microscopy measurements may comprise using an image analysis system. The measurements may be conducted at ambient temperatures (e.g., R.T.).

The microstructures (e.g., of melt pools) of the 3D object may be measured by a microscopy method (e.g., any microscopy method described herein). The microstructures may be measured by a contact or by a non-contact method. The microstructures may be measured by using an electromagnetic beam (e.g., visible or IR). The microstructure measurements may comprise evaluating the dendritic arm spacing and/or the secondary dendritic arm spacing (e.g., using microscopy). The microscopy measurements may comprise using an image analysis system. The measurements may be conducted at ambient temperatures (e.g., R.T.).

Various distances relating to the chamber can be measured using any of the following measurement techniques. Various distances within the chamber can be measured using any of the following measurement techniques. For example, the gap distance (e.g., from the cooling member to the exposed surface of the material bed) may be measured using any of the following measurement techniques. The measurements techniques may comprise interferometry and/or confocal chromatic measurements. The measurements techniques may comprise at least one motor encoder (rotary, linear). The measurement techniques may comprise one or more sensors (e.g., optical sensors and/or metrological sensors). The measurement techniques may comprise at least one inductive sensor. The measurement techniques may include an electromagnetic beam (e.g., visible or IR). The measurements may be conducted at ambient temperature (e.g., R.T.).

The methods described herein can provide surface uniformity across the exposed surface of the material bed (e.g., top of a powder bed) such that portions of the exposed surface that comprises the dispensed material, which are separated from one another by a distance of from about 1 mm to about 10 mm, have a height deviation from about 100 µm to about 5 µm. The methods described herein may achieve a deviation from a planar uniformity of the layer of pre-transformed material (e.g., powder) in at least one plane (e.g., horizontal plane) of at most about 20%, 10%, 5%, 2%, 1% or 0.5%, as compared to the average plane (e.g., horizontal plane) created at the exposed surface of the material bed (e.g., top of a powder bed). The height deviation can be measured by using one or more sensors (e.g., optical sensors).

The 3D object can have various surface roughness profiles, which may be suitable for various applications. The surface roughness may be the deviations in the direction of the normal vector of a real surface, from its ideal form. The surface roughness may be measured as the arithmetic average of the roughness profile (hereinafter "Ra"). In some examples, the formed 3D object can have a Ra value of at most about 300 µm, 200 µm, 100 µm, 75 µm, 50 µm, 45 µm, 40 µm, 35 µm, 30 µm, 25 µm, 20 µm, 15 µm, 10 µm, 7 µm, or 5 µm. The 3D object can have a Ra value between any of the afore-mentioned Ra values (e.g., from about 300 µm to about 5 µm, from about 300 µm to about 40 µm, from about 100 µm to about 5 µm, or from about 100 µm to about 20

μm). The Ra values may be measured by a contact or by a non-contact method. The Ra values may be measured by a roughness tester and/or by a microscopy method (e.g., any microscopy method described herein). The measurements may be conducted at ambient temperatures (e.g., R.T.). The roughness may be measured by a contact or by a non-contact method. The roughness measurement may comprise one or more sensors (e.g., optical sensors). The roughness measurement may comprise a metrological measurement device (e.g., using metrological sensor(s)). The roughness may be measured using an electromagnetic beam (e.g., visible or IR).

The 3D object may be composed of successive layers (e.g., successive cross sections) of solid material that originated from a transformed material (e.g., fused, sintered, melted, bound or otherwise connected powder material), and subsequently hardened. The transformed pre-transformed material may be connected to a hardened (e.g., solidified) material as part of its transformation. The hardened material may reside within the same layer, or in another layer (e.g., a previously formed layer of hardened material). In some examples, the hardened material comprises disconnected parts of the 3D object, that are subsequently connected by the newly transformed material (e.g., by fusing, sintering, melting, binding or otherwise connecting a pre-transformed material).

A cross section (e.g., vertical cross section) of the generated (i.e., formed) 3D object may reveal a microstructure or a grain structure indicative of a layered deposition. Without wishing to be bound to theory, the microstructure or grain structure may arise due to the solidification of transformed powder material that is typical to and/or indicative of the 3D printing method. For example, a cross section may reveal a microstructure resembling ripples or waves that are indicative of solidified melt pools that may be formed during the 3D printing process. The repetitive layered structure of the solidified melt pools may reveal the orientation at which the part was printed. The cross section may reveal a substantially repetitive microstructure or grain structure. The microstructure or grain structure may comprise substantially repetitive variations in material composition, grain orientation, material density, degree of compound segregation or of element segregation to grain boundaries, material phase, metallurgical phase, crystal phase, crystal structure, material porosity, or any combination thereof. The microstructure or grain structure may comprise substantially repetitive solidification of layered melt pools. The layer of hardened material may have an average layer height of at least about 0.5 μm, 1 μm, 5 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, or 500 μm. The layer of hardened material may have an average layer height of at most about 500 μm, 450 μm, 400 μm, 350 μm, 300 μm, 250 μm, 200 μm, 150 μm, 100 μm, 90 μm, 80 μm, 70 μm, 60 μm, 50 μm, 40 μm, 30 μm, 20 μm, or 10 μm. The layer of hardened material may have an average layer height of any value between the afore-mentioned values of layer heights (e.g., from about 0.5 μm to about 500 μm, from about 15 μm to about 50 μm, from about 5 μm to about 150 μm, from about 20 μm to about 100 μm, or from about 10 μm to about 80 μm).

The pre-transformed material within the material bed (e.g., powder) can be configured to provide support to the 3D object. For example, the supportive pre-transformed may be of the same type of pre-transformed material from which the 3D object is generated, of a different type, or any combination thereof. In some instances, a low flowability pre-transformed material (e.g., powder) can support a 3D object better than a high flowability pre-transformed material. A low flowability pre-transformed material can be achieved inter alia with a particulate material composed of relatively small particles, with particles of non-uniform size or with particles that attract each other. The pre-transformed material may be of low, medium, or high flowability. The pre-transformed material may have compressibility of at least about 1%, 2%, 3%, 4%, 5%, 6%, 7%, 8%, 9%, or 10% in response to an applied force of 15 kilo Pascals (kPa). The pre-transformed material may have a compressibility of at most about 9%, 8%, 7%, 6%, 5%, 4.5%, 4.0%, 3.5%, 3.0%, 2.5%, 2.0%, 1.5%, 1.0%, or 0.5% in response to an applied force of 15 kilo Pascals (kPa). The pre-transformed material may have basic flow energy of at least about 100 milli-Joule (mJ), 200 mJ, 300 mJ, 400 mJ, 450 mJ, 500 mJ, 550 mJ, 600 mJ, 650 mJ, 700 mJ, 750 mJ, 800 mJ, or 900 mJ. The pre-transformed material may have basic flow energy of at most about 200 mJ, 300 mJ, 400 mJ, 450 mJ, 500 mJ, 550 mJ, 600 mJ, 650 mJ, 700 mJ, 750 mJ, 800 mJ, 900 mJ, or 1000 mJ. The pre-transformed material may have basic flow energy in between the above listed values of basic flow energy (e.g., from about 100 mj to about 1000 mJ, from about 100 mj to about 600 mJ, or from about 500 mj to about 1000 mJ). The pre-transformed material may have a specific energy of at least about 1.0 milli-Joule per gram (mJ/g), 1.5 mJ/g, 2.0 mJ/g, 2.5 mJ/g, 3.0 mJ/g, 3.5 mJ/g, 4.0 mJ/g, 4.5 mJ/g, or 5.0 mJ/g. The pre-transformed material may have a specific energy of at most 5.0 mJ/g, 4.5 mJ/g, 4.0 mJ/g, 3.5 mJ/g, 3.0 mJ/g, 2.5 mJ/g, 2.0 mJ/g, 1.5 mJ/g, or 1.0 mJ/g. The powder may have a specific energy in between any of the above values of specific energy (e.g., from about 1.0 mJ/g to about 5.0 mJ/g, from about 3.0 mJ/g to about 5 mJ/g, or from about 1.0 mJ/g to about 3.5 mJ/g).

In some embodiments, the 3D object includes one or more auxiliary features. The auxiliary feature(s) can be supported by the material (e.g., powder) bed. The term "auxiliary features," as used herein, generally refers to features that are part of a printed 3D object, but are not part of the desired, intended, designed, ordered, modeled, or final 3D object. Auxiliary features (e.g., auxiliary supports) may provide structural support during and/or after the formation of the 3D object. Auxiliary features may enable the removal or energy from the 3D object that is being formed. Examples of auxiliary features comprise heat fins, wires, anchors, handles, supports, pillars, columns, frame, footing, scaffold, flange, projection, protrusion, mold (a.k.a. mould), or other stabilization features. In some instances, the auxiliary support is a scaffold that encloses the 3D object or part thereof. The scaffold may comprise lightly sintered or lightly fused powder material. The 3D object can have auxiliary features that can be supported by the material bed (e.g., powder bed) and not touch the base, substrate, container accommodating the material bed, or the bottom of the enclosure. The 3D part (3D object) in a complete or partially formed state can be completely supported by the material bed (e.g., suspended anchorlessly in the material bed without touching the substrate, base, container accommodating the material bed, or the enclosure). The 3D object in a complete or partially formed state can be completely supported by the material bed (e.g., without touching anything except the material bed). The 3D object in a complete or partially formed state can be suspended in the material bed without resting on any additional support structures. In some cases, the 3D object in a complete or partially formed (i.e., nascent) state can freely float (e.g., anchorless) in the material bed. In some examples, the 3D object may not be anchored (e.g., connected) to the platform and/or walls that define the material bed (e.g., during formation). The 3D object may not touch (e.g., contact) to the platform and/or walls that define the material bed (e.g., during formation). The 3D object be suspended (e.g., float) anchorlessly in the material bed. The scaffold may comprise a continuously sintered (e.g., lightly sintered) structure that is at most 1 millimeter (mm), 2 mm, 5 mm or 10 mm. The scaffold may comprise a continuously sintered structure that is at least 1 millimeter (mm), 2 mm, 5 mm or 10 mm. The scaffold may comprise a continuously sintered structure having dimensions between any of the afore-mentioned dimensions (e.g., from about 1 mm to about 10 mm, or from about 1 mm to about 5 mm). In some examples, the 3D object may be printed without a supporting scaffold. The supporting scaffold may engulf the 3D object. The supporting scaffold may float anchorlessly in the material bed. The scaffold may comprise a lightly sintered structure.

In some embodiments, the printed 3D object is printed (i) without the use of auxiliary supports, (ii) using a reduced amount of auxiliary supports, or (iii) using spaced apart auxiliary supports. In some embodiments, the printed 3D object may be devoid of one or more auxiliary supports or auxiliary support marks that are indicative of a presence or removal of the auxiliary support features. The 3D object may be devoid of one or more auxiliary supports and of one or more marks of an auxiliary feature (including a base structure) that were removed (e.g., subsequent to, or contemporaneous with, the generation of the 3D object). In some embodiments, the printed 3D object comprises a single auxiliary support mark. The single auxiliary feature (e.g., auxiliary support or auxiliary structure) may be a platform (e.g., a building platform such as a base or substrate), or a mold. The auxiliary support may be adhered (e.g., and anchored) to the platform or mold. The 3D object may comprise marks belonging to one or more auxiliary structures. The 3D object may comprise two or more marks belonging to auxiliary features. The 3D object may be devoid of marks pertaining to an auxiliary support. The 3D object may be devoid of auxiliary support. The mark may comprise variation in grain orientation, variation in layering orientation, layering thickness, material density, the degree of compound segregation to grain boundaries, material porosity, the degree of element segregation to grain boundaries, material phase, metallurgical phase, crystal phase, or crystal structure; wherein the variation may not have been created by the geometry of the 3D object alone, and may thus be indicative of a prior existing auxiliary support that was removed. The variation may be forced upon the generated 3D object by the geometry of the support. In some instances, the 3D structure of the printed object may be forced by the auxiliary support (e.g., by a mold). For example, a mark may be a point of discontinuity (e.g., formed due to a cut or trimming) that is not explained by the geometry of the 3D object, which does not include any auxiliary supports. A mark may be a surface feature that cannot be explained by the geometry of a 3D object, which does not include any auxiliary supports (e.g., a mold). The two or more auxiliary features or auxiliary support feature marks may be spaced apart by a spacing distance of at least 1.5 millimeters (mm), 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of at most 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of any value between the afore-mentioned auxiliary support space values (e.g., from 1.5 mm to 500 mm, from 2 mm to 100 mm, from 15 mm to 50 mm, or from 45 mm to 200 mm). Collectively referred to herein as the "auxiliary support feature spacing distance."

The 3D object may comprise a layered structure indicative of 3D printing process that is devoid of one or more auxiliary support features or one or more auxiliary support feature marks that are indicative of a presence or removal of the one or more auxiliary support features. The 3D object may comprise a layered structure indicative of 3D printing process, which includes one, two, or more auxiliary support marks. The supports or support marks can be on the surface of the 3D object. The auxiliary supports or support marks can be on an external, on an internal surface (e.g., a cavity within the 3D object), or both. The layered structure can have a layering plane. In one example, two auxiliary support features or auxiliary support feature marks present in the 3D object may be spaced apart by the auxiliary feature spacing distance. The acute (i.e., sharp) angle alpha between the straight line connecting the two auxiliary supports or auxiliary support marks and the direction of normal to the layering plane may be at least about 45 degrees (°), 50°, 55°, 60°, 65°, 70°, 75°, 80°, or 85°. The acute angle alpha between the straight line connecting the two auxiliary supports or auxiliary support marks and the direction of normal to the layering plane may be at most about 90°, 85°, 80°, 75°, 70°, 65°, 60°, 55°, 50°, or 45°. The acute angle alpha between the straight line connecting the two auxiliary supports or auxiliary support marks and the direction of normal to the layering plane may be any angle range between the afore-mentioned angles (e.g., from about 45 degrees (°), to about 90°, from about 60° to about 90°, from about 75° to about 90°, from about 80° to about 90°, from about 85° to about 90°). The acute angle alpha between the straight line connecting the two auxiliary supports or auxiliary support marks and the direction normal to the layering plane may from about 87° to about 90°. An example of a layering plane can be seen in FIG. 17 showing a vertical cross section of a 3D object 1711 that comprises layers 1 to 6, each of which are planar. In the schematic example in FIG. 17, the layering plane of the layers can be the layer. For example, layer 1 could correspond to both the layer and the layering plane of layer 1. When the layer is not planar (e.g., FIG. 17, layer 5 of 3D object 1712), the layering plane would be the average plane of the layer. The two auxiliary supports or auxiliary support feature marks can be on the same surface. The same surface can be an external surface or an internal surface (e.g., a surface of a cavity within the 3D object). When the angle between the shortest straight line connecting the two auxiliary supports or auxiliary support marks and the direction of normal to the layering plane is greater than 90 degrees, one can consider the complementary acute angle. In some embodiments, any two auxiliary supports or auxiliary support marks are spaced apart by the auxiliary feature spacing distance.

Figure 19:
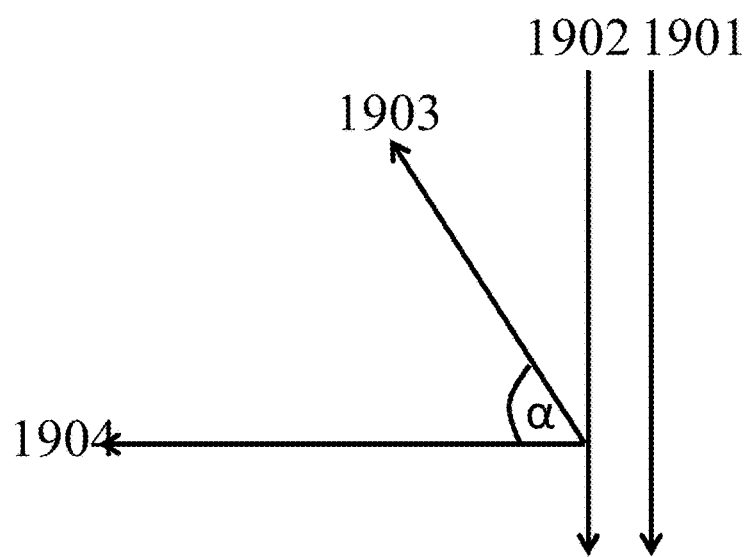
FIG. 19 schematically illustrates a coordinate system.
Figure 20A:
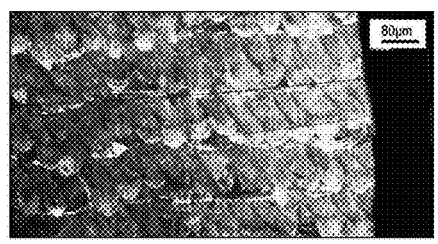
FIGS. 20A-20C show various 3D objects.
Figure 20B:
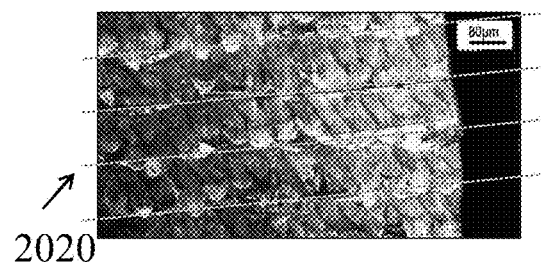
Figure 20C:
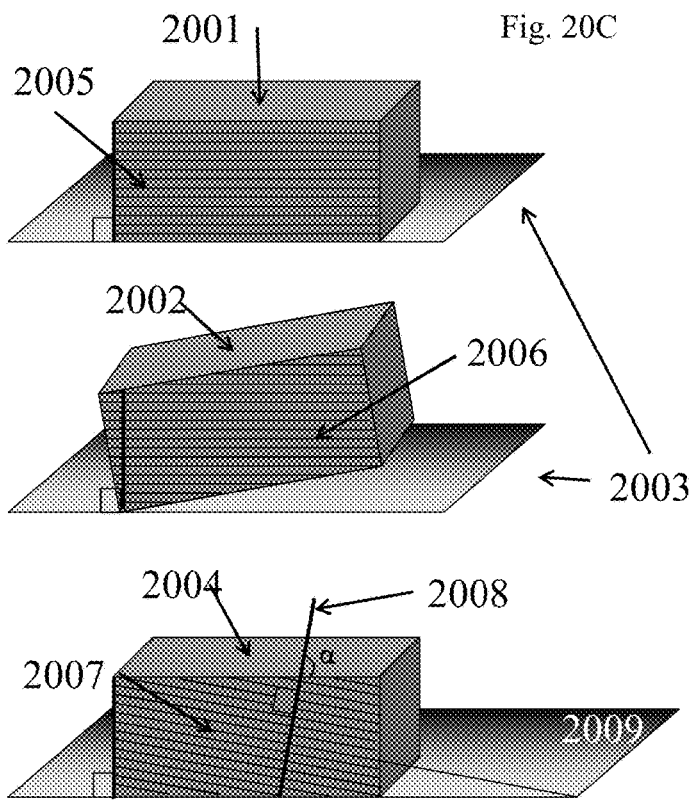

FIG. 20C shows an example of a 3D object comprising an exposed surface 2001 that was formed with layers of hardened material (e.g., having layering plane 2005) that are substantially planar and parallel to the platform 2003. FIG. 20C shows an example of a 3D object comprising an exposed surface 2002 that was formed with layers of hardened material (e.g., having layering plane 2006) that are substantially planar and parallel to the platform 2003 resulting in a tilted 3D object (e.g., box). The 3D object that was formed as a tiled 3D object during its formation, is shown lying flat on a surface 2009 as a 3D object having an exposed surface 2004 and layers of hardened material (e.g., having layering plane 2007) having a normal 2008 to the layering plane that forms acute angle alpha with the exposed surface 2004 of the 3D object. FIGS. 20A and 20B show 3D objects comprising layers of solidified melt pools that are arranged in layers having layering planes (e.g., 2020). FIG. 19 shows a vertical cross section in a coordinate system. Line 1904 represents a vertical cross section of the top surface of a platform. Line 1903 represents a normal to the average layering plane. Line 1902 represent the normal to the top surface of the platform. Line 1901 represents the direction of the gravitational field. The angle alpha in FIG. 19 is formed between the normal to the layering plane, and the top platform surface.

In some instances, the one or more auxiliary features are specific to a 3D object and can increase the time needed to generate the requested 3D object. The one or more auxiliary features can be removed prior to use or distribution of the requested 3D object. Eliminating the need for auxiliary features can decrease the time and cost associated with generating the three-dimensional part. In some examples, the diminished number of auxiliary supports or lack of one or more auxiliary support, will provide a 3D printing process that requires a smaller amount of material, produces a smaller amount of material waste, and/or requires smaller energy as compared to commercially available 3D printing processes. The smaller amount can be smaller by at least about 1.1, 1.3, 1.5, 2, 3, 4, 5, 6, 7, 8, 9, or 10. The smaller amount may be smaller by any value between the aforesaid values (e.g., from about 1.1 to about 10, or from about 1.5 to about 5).

In some examples, the 3D object is formed with auxiliary features. In some examples, the 3D object may be formed with contact (e.g., but not anchor) to the container accommodating the material bed (e.g., side(s) and/or bottom of the container). The longest dimension of a cross-section of an auxiliary feature can be at most about 50 nm, 100 nm, 200 nm, 300 nm, 400 nm, 500 nm, 600 nm, 700 nm, 800 nm, 900 nm, or 1000 nm, 1 µm, 3 µm, 10 µm, 20 µm, 30 µm, 100 µm, 200 µm, 300 µm, 400 µm, 500 µm, 700 µm, 1 mm, 3 mm, 5 mm, 10 mm, 20 mm, 30 mm, 50 mm, 100 mm, or 300 mm. The longest dimension of a cross-section of an auxiliary feature can be at least about 50 nm, 100 nm, 200 nm, 300 nm, 400 nm, 500 nm, 600 nm, 700 nm, 800 nm, 900 nm, or 1000 nm, 1 µm, 3 µm, 10 µm, 20 µm, 30 µm, 100 µm, 200 µm, 300 µm, 400 µm, 500 µm, 700 µm, 1 mm, 3 mm, 5 mm, 10 mm, 20 mm, 30 mm, 50 mm, 100 mm, or 300 mm. The longest dimension of a cross-section of an auxiliary feature can be any value between the above-mentioned values (e.g., from about 50 nm to about 300 mm, from about 5 µm to about 10 mm, from about 50 nm to about 10 mm, or from about 5 mm to about 300 mm).

At least a portion of the 3D object can sink in the material bed. At least a portion of the 3D object can be surrounded by pre-transformed material within the material bed (e.g., submerged). At least a portion of the 3D object can rest in the pre-transformed material without substantial sinking (e.g., vertical movement). Lack of substantial sinking can amount to a sinking (e.g., vertical movement) of at most about 40%, 20%, 10%, 5%, or 1% layer thickness. Lack of substantial sinking can amount to at most about 100 µm, 30 µm, 10 µm, 3 µm, or 1 µm. At least a portion of the 3D object can rest in the pre-transformed material without substantial movement (e.g., horizontal movement, movement at an angle). Lack of substantial movement can amount to at most 100 µm, 30 µm, 10 µm, 3 µm, or 1 µm. The 3D object can rest on the substrate when the 3D object is sunk or submerged in the material bed.

FIG. 1 depicts an example of a system that can be used to generate a 3D object using a 3D printing process disclosed herein. The system can include an enclosure (e.g., 107). At least a fraction of the components in the system can be enclosed in the chamber. At least a fraction of the chamber can be filled with at least one gas to create a gaseous environment (i.e., an atmosphere). The gas can be an inert gas (e.g., Argon, Neon, Helium, Nitrogen). The chamber can be filled with another gas or mixture of gases. The gas can be a non-reactive gas (e.g., an inert gas). The gaseous environment can comprise argon, nitrogen, helium, neon, krypton, xenon, hydrogen, carbon monoxide, or carbon dioxide. The gas can be an ultrahigh purity gas. For example, the ultrahigh purity gas can be at least about 99%, 99.9%, 99.99%, or 99.999% pure. The gas may comprise less than about 2 ppm oxygen, less than about 3 ppm moisture, less than about 1 ppm hydrocarbons, or less than about 6 ppm nitrogen. In some examples, the pressure in the chamber is at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or more. In some examples, the pressure in the chamber is at least about 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. In some examples, the pressure in the chamber is at most about $10^{-7}$ Torr, $10^{-6}$ Torr, $10^{-5}$ Torr, or $10^{-4}$ Torr, $10^{-3}$ Torr, $10^{-2}$ Torr, $10^{-1}$ Torr, 1 Torr, 10 Torr, 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at a range between any of the afore-mentioned pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr). The pressure can be measured by a pressure gauge. The pressure can be measured at ambient temperature (e.g., R.T.). In some cases, the pressure in the chamber can be standard atmospheric pressure. In some cases, the pressure in the chamber can be ambient pressure (i.e., surrounding pressure). In some examples, the chamber can be under vacuum pressure. In some examples, the chamber can be under a positive pressure (i.e., above ambient pressure). The pressure in the enclosure may be at a constant value at least during a portion of the 3D printing process (e.g., during the entire 3D printing). In some embodiments, the 3D printing takes place in a (e.g., substantially) constant pressure. Constant pressure excludes pressure gradients in the material bed during the 3D printing.

The concentration of oxygen and/or humidity in the enclosure (e.g., chamber) can be minimized (e.g., below a predetermined threshold value). For example, the gas composition of the chamber can contain a level of oxygen and/or humidity that is at most about 100 parts per billion (ppb), 10 ppb, 1 ppb, 0.1 ppb, 0.01 ppb, 0.001 ppb, 100 parts per million (ppm), 10 ppm, 1 ppm, 0.1 ppm, 0.01 ppm, or 0.001 ppm. The gas composition of the chamber can contain an oxygen and/or humidity level between any of the aforementioned values (e.g., from about 100 ppb to about 0.001 ppm, from about 1 ppb to about 0.01 ppm, or from about 1 ppm to about 0.1 ppm). The gas composition may be measures by one or more sensors (e.g., an oxygen and/or humidity sensor.). In some cases, the chamber can be opened at or after printing the 3D object. When the chamber is opened, ambient air containing oxygen and/or humidity can enter the chamber. Exposure of one or more components inside of the chamber to air can be reduced by, for example, flowing an inert gas while the chamber is open (e.g., to prevent entry of ambient air), or by flowing a heavy gas (e.g., argon) that rests on the surface of the powder bed. In some cases, components that absorb oxygen and/or humidity on to their surface(s) can be sealed while the chamber is open. In some embodiments, the chamber is minimally exposed to the external environment by usage of one or more load lock chambers. In the load lock chamber, the purging of gas may be done in a smaller gas volume as compared to the chamber gas volume.

The chamber can be configured such that gas inside of the chamber has a relatively low leak rate from the chamber to an environment outside of the chamber. In some cases, the leak rate can be at most about 100 milliTorr/minute (mTorr/min), 50 mTorr/min, 25 mTorr/min, 15 mTorr/min, 10 mTorr/min, 5 mTorr/min, 1 mTorr/min, 0.5 mTorr/min, 0.1 mTorr/min, 0.05 mTorr/min, 0.01 mTorr/min, 0.005 mTorr/min, 0.001 mTorr/min, 0.0005 mTorr/min, or 0.0001 mTorr/min. The leak rate may be between any of the aforementioned leak rates (e.g., from about 0.0001 mTorr/min to about, 100 mTorr/min, from about 1 mTorr/min to about, 100 mTorr/min, or from about 1 mTorr/min to about, 100 mTorr/min). The leak rate may be measured by one or more pressure gauges and/or sensors (e.g., at ambient temperature). The enclosure can be sealed such that the leak rate of gas from inside the chamber to an environment outside of the chamber is low (e.g., below a certain level). The seals can comprise O-rings, rubber seals, metal seals, load-locks, or bellows on a piston. In some cases, the chamber can have a controller configured to detect leaks above a specified leak rate (e.g., by using at least one sensor). The sensor may be coupled to a controller. In some instances, the controller identifies and/or control (e.g., direct and/or regulate). For example, the controller may be able to identify a leak by detecting a decrease in pressure in side of the chamber over a given time interval.

In some examples, a pressure system is in fluid communication with the enclosure and/or material removal mechanism. The pressure system can be configured to regulate the pressure in the enclosure and/or material removal mechanism. In some examples, the pressure system includes one or more vacuum pumps selected from mechanical pumps, rotary vain pumps, turbomolecular pumps, ion pumps, cryopumps, and diffusion pumps. The vacuum pump may be any pump disclosed herein. The pressure system can include a pressure sensor for measuring the pressure and relaying the pressure to the controller, which can regulate the pressure with the aid of one or more vacuum pumps of the pressure system. The pressure sensor can be operatively coupled to a control system. The pressure can be electronically or manually controlled (during, before, or after the 3D printing). The pressure may be measured in the enclosure, and/or in the material removal mechanism. For example, the pressure can be measured (i) just outside the nozzle, (ii) in the internal reservoir, and/or (iii) in the nozzle of the material removal mechanism. The pressure can be measured along the channel that couples the material removal mechanism to the force generator (e.g., pressure pump).

In some examples, the system and/or apparatus components described herein are adapted and configured to generate a 3D object. The 3D object can be generated through a 3D printing process. A first layer of material can be provided adjacent to a platform. A base can be a previously formed layer of the 3D object or any other surface upon which a layer or bed of material is spread, held, placed, or supported. In the case of formation of the first layer of the 3D object the first material layer can be formed in the material bed without a base, without one or more auxiliary support features (e.g., rods), or without other supporting structure other than the material (e.g., within the material bed). Subsequent layers can be formed such that at least one portion of the subsequent layer melts, sinters, fuses, binds and/or otherwise connects to the at least a portion of a previously formed layer. In some instances, the at least a portion of the previously formed layer that is transformed and subsequently hardens into a hardened material, acts as a base for formation of the 3D object. In some cases, the first layer comprises at least a portion of the base. The material of the material can be any material described herein. The material layer can comprise particles of homogeneous or heterogeneous size and/or shape.

The system and/or apparatus described herein may comprise at least one energy source (e.g., the scanning energy source generating the first scanning energy, second scanning energy. E.g., the tiling energy source generating the tiling energy flux). In some cases, the system can comprise 1, 2, 3, 4, 5, 6, 7, 8, 9, 10, 30, 100, 300, 1000 or more energy fluxes (e.g., beams) and/or sources. The system can comprise an array of energy sources (e.g., laser diode array) and/or fluxes. Alternatively or additionally the target surface, material bed, 3D object (or part thereof), or any combination thereof may be heated by a heating mechanism. The heating mechanism may comprise dispersed energy beams. In some cases, the at least one energy source is a single (e.g., first) energy source.

An energy source can be a source configured to deliver energy to an area (e.g., a confined area). An energy source can deliver energy to the confined area through radiative heat transfer. The energy source can project energy (e.g., heat energy, and/or energy beam). The energy (e.g., beam) can interact with at least a portion of the material bed. The energy can heat the material bed portion before, during and/or after the material is being transformed. The energy can heat at least a fraction of a 3D object at any point during formation of the 3D object. Alternatively or additionally, the material bed may be heated by a heating mechanism projecting energy (e.g., radiative heat and/or energy beam). The energy may include an energy beam and/or dispersed energy (e.g., radiator or lamp). The radiative heat may be projected by a dispersive energy source (e.g., a heating mechanism) comprising a lamp, a strip heater (e.g., mica strip heater, or any combination thereof), a heating rod (e.g., quartz rod), or a radiator (e.g., a panel radiator). The heating mechanism may comprise an inductance heater. The heating mechanism may comprise a resistor (e.g., variable resistor). The resistor may comprise a varistor or rheostat. A multiplicity of resistors may be configured in series, parallel, or any combination thereof. In some cases, the system can have a single (e.g., first) energy source. An energy source can be a source configured to deliver energy to an area (e.g., a confined area). An energy source can deliver energy to the confined area through radiative heat transfer (e.g., as described herein).

In some examples, the energy beam includes a radiation comprising an electromagnetic, or charged particle beam. The energy beam may include radiation comprising electromagnetic, electron, positron, proton, plasma, or ionic radiation. The electromagnetic beam may comprise microwave, infrared, ultraviolet, or visible radiation. The energy beam may include an electromagnetic energy beam, electron beam, particle beam, or ion beam. An ion beam may include a cation or an anion. A particle beam may include radicals. The electromagnetic beam may comprise a laser beam. The energy beam may comprise plasma. The energy source may include a laser source. The energy source may include an electron gun. The energy source may include an energy source capable of delivering energy to a point or to an area. In some embodiments, the energy source is a laser source. The laser source may comprise a $CO_2$, Nd:YAG, Neodymium (e.g., neodymium-glass), an Ytterbium, or an excimer laser. The laser may be a fiber laser. The energy source may include an energy source capable of delivering energy to a point or to an area. The energy source (e.g., first scanning energy source) can provide an energy beam having an energy density of at least about 50 joules/cm$^2$ (RCM), 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source (e.g., first scanning energy source) can provide an energy beam having an energy density of at most about 50 J/cm$^2$, 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 500 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source (e.g., first scanning energy source) can provide an energy beam having an energy density of a value between the afore-mentioned values (e.g., from about 50 J/cm$^2$ to about 5000 J/cm$^2$, from about 200 J/cm$^2$ to about 1500 J/cm$^2$, from about 1500 J/cm$^2$ to about 2500 J/cm$^2$, from about 100 J/cm$^2$ to about 3000 J/cm$^2$, or from about 2500 J/cm$^2$ to about 5000 J/cm$^2$). In an example a laser (e.g., first scanning energy source) can provide light energy at a peak wavelength of at least about 100 nanometer (nm), 400 nm, 500 nm, 750 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 2000 nm, 1900 nm, 1800 nm, 1700 nm, 1600 nm, 1500 nm, 1200 nm, 1100 nm, 1090 nm, 1080 nm, 1070 nm, 1060 nm, 1050 nm, 1040 nm, 1030 nm, 1020 nm, 1010 nm, 1000 nm, 750 nm, 500 nm, 400 nm, or 100 nm. The laser can provide light energy at a peak wavelength between any of the afore-mentioned peak wavelength values (e.g., from about 100 nm to about 2000 nm, from about 500 nm to about 1500 nm, or from about 1000 nm to about 1100 nm). The energy source (e.g., laser) may have a power of at least about 0.5 Watt (W), 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy source may have a power of at most about 0.5 W, 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy source may have a power between any of the afore-mentioned laser power values (e.g., from about 0.5 W to about 100 W, from about 1 W to about 10 W, from about 100 W to about 1000 W, or from about 1000 W to about 4000 W). The first energy source (e.g., producing the first scanning energy beam) may have at least one of the characteristics of the second energy source (e.g., producing the second scanning energy beam). The tiling energy flux may have at least one of the characteristics disclosed herein for the energy beam. The tiling energy flux may be generated from the same energy source or from different energy sources as compared with the scanning energy beam. The tiling energy flux may be of a lesser power density as compared to the scanning energy beam. Lesser power may be by about 0.25, 0.5, 0.75, or 1 (one) order of magnitude. The scanning energy beam may operate independently or synchronously with the tiling energy flux (e.g., during the 3D printing). In some examples, the scanning energy beam and the tiling energy flux are generated by the same energy source that operates in two modules (e.g., different modules) respectively.

An energy beam from the energy source(s) can be incident on, or be directed perpendicular to, the target surface. An energy beam from the energy source(s) can be directed at an acute angle within a value of from parallel to perpendicular relative to the target surface. The energy beam can be directed to a pre-transformed and/or a transformed material for a specified time-period. That pre-transformed and/or a transformed material can absorb the energy from the energy beam and, and as a result, a localized region of the material bed can increase in temperature. The energy beam can be moveable (e.g., using a scanner) such that it can translate relative to the target surface. At times, the energy source of the irradiated energy is movable such that it can translate relative to the target surface. At times, the energy source of the irradiated energy is stationary. At least two (e.g., all) of the energy sources can be movable with the same scanner. A least two (e.g., all) of the energy beams can be movable with the same scanner. At least two of the energy source(s) and/or beam(s) can be translated independently of each other. In some cases, at least two of the energy source(s) and/or beam(s) can be translated at different rates (e.g., velocities). In some cases, at least two of the energy source(s) and/or beam(s) can be comprise at least one different characteristic. The characteristics of the irradiated energy may comprise wavelength, power, amplitude, trajectory, footprint, intensity, energy, fluence, Andrew Number, hatch spacing, scan speed, or charge. The charge can be electrical and/or magnetic charge. Andrew number is proportional to the power of the irradiating energy over the multiplication product of its velocity (e.g., scan speed) by the its hatch spacing. The Andrew number is at times referred to as the area filling power of the irradiating energy.

The energy source can be an array, or a matrix, of energy sources (e.g., laser diodes). Each of the energy sources in the array, or matrix, can be independently controlled (e.g., by a control mechanism) such that the energy beams can be turned off and on independently. At least a part of the energy sources in the array or matrix can be collectively controlled such that the at least two (e.g., all) of the energy sources can be turned off and on simultaneously. In some embodiments, the energy per unit area (or intensity) of at least two energy sources in the matrix or array are modulated independently (e.g., by a control mechanism or system). At times, the energy per unit area or intensity of at least two (e.g., all) of the energy sources in the matrix or array is modulated simultaneously (e.g., by a control mechanism). The energy source can scan along target surface by mechanical movement of the energy source(s), one or more adjustable reflective mirrors, and/or one or more polygon light scanners. The energy source(s) can project energy using a DLP modulator, a one-dimensional scanner, a two-dimensional scanner, or any combination thereof. The target and/or source surface can translate vertically, horizontally, or in an angle (e.g., planar or compound).

The energy source can comprise a modulator. The irradiated energy by the energy source can be modulated. The modulator can include amplitude modulator, phase modulator, or polarization modulator. The modulation may alter the intensity of the energy beam. The modulation may alter the current supplied to the energy source (e.g., direct modulation). The modulation may affect the irradiated energy (e.g., external modulation such as external light modulator). The modulation may include direct modulation (e.g., by a modulator). The modulation may include an external modulator. The modulator can include an aucusto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

In some examples, the irradiated energy is moveable relative to the target surface such that it can translate relative to the target surface. The scanner may comprise a galvanometer scanner, a polygon, a mechanical stage (e.g., X-Y stage), a piezoelectric device, gimble, or any combination of thereof. The galvanometer may comprise a mirror. The scanner may comprise a modulator. The scanner may comprise a polygonal mirror. The scanner can be the same scanner for two or more energy sources and/or beams. At least two (e.g., each) energy source and/or beam may have a separate scanner. The energy sources can be translated independently of each other. In some cases, at least two irradiated energies (e.g., the scanning energy beam and the tiling energy flux) can be translated at different rates, along different trajectories, and/or along different paths (e.g., during formation of a layer of hardened material). For example, the movement of the scanning energy beam may be faster (e.g., greater rate) as compared to the movement of the tiling energy flux. In some embodiments, the systems and/or apparatuses disclosed herein comprise one or more shutters (e.g., safety shutters). The galvanometer scanner may comprise a two-axis galvanometer scanner. The scanner may comprise a modulator (e.g., as described herein). The energy source(s) can project energy and translate it using a DLP modulator, a one-dimensional scanner, a two-dimensional scanner, or any combination thereof. The energy source(s) can be stationary or translatable. The irradiated energy can translate vertically, horizontally, or in an angle (e.g., planar or compound angle). The scanner can be included in an optical system that is configured to direct energy from the energy source to a predetermined position on the target surface (e.g., exposed surface of the material bed). The controller can be programmed to control a trajectory of the irradiated energy with the aid of the optical system. The controller can regulate a supply of energy from the energy source to the material (e.g., at the target surface) to form a transformed material.

In some embodiments, the layer dispensing mechanism dispenses the material, level, distribute, spread, and/or remove the material in a material bed. The layer dispensing mechanism may comprise at least one, two or three of (i) a material dispensing mechanism, (ii) material removal mechanism, and (iii) material leveling mechanism. The layer dispensing mechanism may be controlled by the controller. At least a part (e.g., portion and/or component) of the layer dispensing mechanism may be temperature regulated (e.g., heated, temperature maintained, or cooled). At least one component within the layer dispensing mechanism may be heated or cooled. At least one component within the layer dispensing mechanism that contacts the material (e.g., powder and/or transformed material) may be heated or cooled. The movement of the layer dispensing mechanism may be programmable. The movement of the layer dispensing mechanism may be predetermined. The movement of the layer dispensing mechanism may be according to an algorithm (e.g., considering the model of the 3D object).

In some embodiments, the layer dispensing mechanism or any of its components are exchangeable, removable, non-removable, or non-exchangeable. The layer dispensing mechanism (e.g., any of its components) may comprise exchangeable parts. The layer dispensing mechanism may distribute material across the target surface. The layer dispensing mechanism or any of its components (e.g., flattening mechanism) can provide a pre-transformed material (e.g., powder) uniformity across the target surface (e.g., exposed surface of the material bed) such that portions of the target surface (e.g., that comprise the dispensed material) that are separated from one another by at least about 1 mm, 2 mm, 3 mm, 4 mm, 5 mm, or 10 mm, have a height deviation of at most about 10 mm, 9 mm, 8 mm, 7 mm, 6 mm, 5 mm, 4 mm, 3 mm, 2 mm, 1 mm, 500 µm, 400 µm, 300 µm, 200 µm, 100 µm, 90 µm, 80, 70 µm, 60 µm, 50 µm, 40 µm, 30 µm, 20 µm, or 10 µm; or of any value between the aforementioned height deviation values (e.g., from about 10 µm to about 10 mm, from about 10 µm to about 1 mm, from about 50 µm to about 100 µm, from about 40 µm to about 200 µm, or from about 10 µm to about 200 µm). The layer dispensing mechanism may achieve a deviation from a planar uniformity of the target surface in at least one plane (e.g., horizontal plane) of at most about 20%, 10%, 5%, 2%, 1% or 0.5%, as compared to the average plane (e.g., horizontal plane) created at the target surface (e.g., top of a powder bed). The layer dispensed by the layer dispensing mechanism may be substantially planar (e.g., flat). The exposed surface that was leveled by the planarizing mechanism may be substantially planar (e.g., flat). The exposed surface that was leveled by the leveling and/or material removal mechanism may be substantially planar (e.g., flat).

In some examples, at least two components of the layer dispensing mechanism (e.g., material dispensing mechanism, leveling member, and/or material removal member) are individually or jointly controlled. Jointly controlled may include simultaneously controlled. Individually controlled may be non-simultaneously controlled. Individually controlled may be separately controlled. At least one component of the layer dispensing mechanism follows another component relative to the direction of travel. When the layer dispensing mechanism reaches the end of the material bed, or precedes the end of the powder bed, the direction of movement may switch. Sometimes, the switch may involve concerted alteration of the relative positions of the components of the layer dispensing mechanism. Sometimes, the switch may not involve concerted alteration of the relative positions of the components of the layer dispensing mechanism. The layer dispensing mechanism and it components may be any of the ones disclosed in U.S. 62/317,070 or Ser. No. PCT/US15/36802, both of which are entirely incorporated herein by reference.

In some examples, the systems and/or apparatuses disclosed herein comprise a material removal mechanism. The material removal mechanism may be any material removal mechanism disclosed in Ser. No. PCT/US15/36802, which is fully incorporated herein by reference. The material removal mechanism may be coupled to the material dispensing mechanism and/or the material leveling mechanism. The material removal mechanism can be disposed adjacent to (e.g., above, below, or to the side of) the material bed. The material removal mechanism may translatable horizontally, vertically, or at an angle. The powder removal mechanism may be movable. The removal mechanism may be movable manually and/or automatically (e.g., controlled by a controller). The movement of the material removal mechanism may be programmable. The movement of the material removal mechanism may be predetermined. The movement of the powder removal mechanism may be according to an algorithm.

In some examples, the material removal mechanism comprises a material entrance opening port and a material exit opening port. The material entrance port and material exit port may be the same opening. The material entrance port and material exit port may be different openings. The material entrance and material exit ports may be spatially separated. The spatial separation may be on the external surface of the material removal mechanism. The spatial separation may be on the surface area of the material removal mechanism. The material entrance and material exit ports may be connected. The material entrance and material exit ports may be connected within the material removal mechanism. The connection may be an internal cavity within the material removal mechanism.

In some embodiments, the material removal mechanism comprises a force that causes the material to travel from the material bed (e.g., exposed surface thereof) towards the interior of the material removal mechanism (e.g., the reservoir). That travel may be in an anti-gravitational manner and/or upwards direction. The material removal mechanism may comprise negative pressure (e.g., vacuum), electrostatic force, electric force, magnetic force, or physical force. In some examples, the material removal mechanism does not contact the target surface while removing material from it. For example, the material removal mechanism is separated from the target surface by a gas gap. The material dispensing mechanism may comprise negative pressure (e.g., vacuum) that causes the material to leave the target surface and travel into the entrance opening of the material removal mechanism. The material dispensing mechanism may comprise positive pressure (e.g., a gas flow) that causes the material to leave the target surface and travel into the entrance opening of the material removal mechanism. The gas may comprise any gas disclosed herein. The gas may aid in fluidizing the pre-transformed material (e.g., powder) that remains in the material bed. The removed material may be recycled and re-applied into the source surface by the material dispensing mechanism. The pre-transformed material may be continuously recycled through the operation of the material removal system. The pre-transformed material may be recycled after each layer of material has been removed (e.g., from the source surface). The pre-transformed material may be recycled after several layers of material have been removed. The pre-transformed material may be recycled after each 3D object has been printed.

Any of the material removal mechanism described herein can comprise a reservoir of pre-transformed material and/or a mechanism configured to deliver the pre-transformed material from the reservoir to the material dispensing mechanism. The pre-transformed material in the reservoir can be treated. The treatment may include heating, cooling, maintaining a predetermined temperature, sieving, filtering, charging, or fluidizing (e.g., with a gas). The reservoir can be emptied after each pre-transformed material layer has been deposited and/or leveled, at the end of the build cycle, and/or at a whim. The reservoir can be continuously emptied during the operation of the material removal mechanism. At times, the material removal mechanism does not have a reservoir. At times, the material removal mechanism is (e.g., fluidly) connected to a reservoir. At times, the material removal mechanism constitutes a material removal (e.g., a suction) channel that leads to an external reservoir and/or to the material dispensing mechanism. The material removal and/or dispensing mechanism may comprise an internal reservoir and/or an opening port. The reservoir of the material dispensing mechanism and/or the material removal mechanism can be of any shape. For example, the reservoir can be a tube (e.g., flexible or rigid). The reservoir can be a funnel. The reservoir can have a rectangular cross section or a conical cross section. The reservoir can have an amorphous shape.

The material removal mechanism may include one or more suction nozzles. The suction nozzle may comprise any of the nozzles described herein. The nozzles may comprise of a single opening or a multiplicity of openings as described herein. The openings may be vertically leveled or not leveled. The openings may be vertically aligned, or misaligned (e.g., FIGS. 13, 1317, 1318, and 1319). In some examples, at least two of the multiplicity of openings may be misaligned. The multiplicity suction nozzles may be aligned at the same height relative to the surface (e.g., source surface), or at different heights (e.g., vertical height). The different height nozzles may form a pattern, or may be randomly situated in the suction device. The nozzles may be of one type, or of different types. The material removal mechanism (e.g., suction device) may comprise a curved surface, for example adjacent to a side of a nozzle (e.g., FIG. 33, 3320). Pre-transformed material that enters through the nozzle (e.g., along 3301) may be collected at the curved surface. The nozzle may comprise a cone. The cone may be a converging cone or a diverging cone.

In an example, the material removal mechanism travels laterally before the leveling mechanism (e.g., a roller) relative to the direction of movement. In an example, the material removal mechanism travels laterally after the leveling mechanism, relative to the direction of movement. The material removal mechanism may be integrated (e.g., electronically and/or mechanically) with the leveling mechanism. The material removal mechanism may be (e.g., reversibly) connected to the leveling mechanism (e.g., FIG. 34D, 3443 and 3447). The material removal mechanism may be disconnected from the leveling mechanism.

In some embodiments, the material removal mechanism and the material dispensing mechanism are integrated into one mechanism (e.g., FIG. 28C). For example, the exit opening ports of the material dispensing mechanism and the material entrance ports of the material removal mechanism may be integrated into a single mechanical components. For example, the two port types may be arranged in a single file. For example, the two port types may be interchangeably arranged. The material removal mechanism may comprise an array of material entry ports (e.g., suction devices or nozzles). The ports (e.g., material entry and/or exit ports) within the array may be spaced apart evenly or unevenly. The ports within the array may be spaced apart at most about 0.1 mm, 0.5 mm, 1 mm, 1.5 mm, 2 mm, 3 mm, 4 mm, or 5 mm. The ports within the array may be spaced apart at least about 0.1 mm, 0.3 mm, 0.5 mm, 1 mm, 1.5 mm, 2 mm, 3 mm, 4 mm, or 5 mm. The ports within the array may be spaced apart between any of the afore-mentioned spaces (e.g., from about 0.1 mm to about 5 mm, from about 0.1 mm to about 2 mm, from about 1.5 mm to about 5 mm).

In some embodiments, one or more sensors (at least one sensor) detect the topology of the exposed surface of the material bed and/or the exposed surface of the 3D object or any part thereof. The sensor can detect the amount of material deposited on the target surface. The sensor can be a proximity sensor. For example, the sensor can detect the amount of pre-transformed material deposited on the exposed surface of a material bed. The sensor can detect the physical state of material deposited on the target surface (e.g., liquid or solid (e.g., powder or bulk)). The sensor can detect the crystallinity of pre-transformed material deposited on the target surface. The sensor can detect the amount of pre-transformed material deposited by the material dispensing mechanism. The sensor can detect the amount of relocated by a leveling mechanism. The sensor can detect the temperature of the pre-transformed material. For example, the sensor may detect the temperature of the in a material dispensing mechanism, and/or in the material bed. The sensor may detect the temperature of the material during and/or after its transformation (e.g., in real-time). The sensor may detect the temperature and/or pressure of the atmosphere within an enclosure (e.g., chamber). The sensor may detect the temperature of the material (e.g., powder) bed at one or more locations. The detection by the sensor can be before, after, and/or during the 3D printing (e.g., in real-time).

In some embodiments, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise a measurement sensor (e.g., height, length, width, angle, and/or volume). For example, the metrology sensor can be a height sensor. The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The metrology sensor may measure (e.g., a metrology property of) the tile. The metrology sensor may measure the gap. The metrology sensor may measure at least a portion of the layer of material. The layer of material may be a pre-transformed material (e.g., powder), transformed material, or hardened material. The metrology sensor may measure at least a portion of the 3D object. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensors, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The weight of the material bed can be monitored by one or more weight sensors in, or adjacent to, the material. For example, a weight sensor in the material bed can be at the bottom of the material bed. The weight sensor can be between the bottom of the enclosure (e.g., FIG. 1, 111) and the substrate (e.g., FIG. 1, 109) on which the base (e.g., FIG. 1, 102) or the material bed (e.g., FIG. 1, 104) may be disposed. The weight sensor can be between the bottom of the enclosure and the base on which the material bed may be disposed. The weight sensor can be between the bottom of the enclosure and the material bed. A weight sensor can comprise a pressure sensor. The weight sensor may comprise a spring scale, a hydraulic scale, a pneumatic scale, or a balance. At least a portion of the pressure sensor can be exposed on a bottom surface of the material bed. In some cases, the weight sensor can comprise a button load cell. The button load cell can sense pressure from pre-transformed material adjacent to the load cell. In another example, one or more sensors (e.g., optical sensors or optical level sensors) can be provided adjacent to the material bed such as above, below, or to the side of the material bed. In some examples, the one or more sensors can sense the pre-transformed material level (e.g., height or volume). The pre-transformed material level sensor can be in communication with a material dispensing mechanism (e.g., powder dispenser). Alternatively, or additionally a sensor can be configured to monitor the weight of the material bed by monitoring a weight of a structure that contains the material bed. One or more position sensors (e.g., height sensors) can measure the height of the material bed relative to the substrate. The position sensors can be optical sensors. The position sensors can determine a distance between one or more energy beams (e.g., a laser or an electron beam.) and a surface of the material (e.g., powder). The one or more sensors may be connected to a control system (e.g., to a processor, to a computer).

The systems and/or apparatuses disclosed herein may comprise one or more actuators. The actuator may comprise a motor. The motors may comprise servomotors. The servomotors may comprise actuated linear lead screw drive motors. The motors may comprise belt drive motors. The motors may comprise rotary encoders. The apparatuses and/or systems may comprise switches. The switches may comprise homing or limit switches. The motors may comprise actuators. The actuators may comprise linear actuators. The motors may comprise belt driven actuators. The motors may comprise lead screw driven actuators. The systems and/or apparatuses disclosed herein may comprise one or more pistons.

In some examples, the pressure system includes one or more pumps. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump, or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valveless pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump. The pump may be a vacuum pump. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector. The pressure system can include valves; such as throttle valves.

The systems, apparatuses, and/or methods described herein can comprise a material recycling mechanism. The recycling mechanism can collect unused pre-transformed material and return the unused pre-transformed material to a reservoir. The reservoir can be of a material dispensing mechanism (e.g., the material dispensing reservoir), or to the bulk reservoir that feeds into the material dispensing mechanism. Unused pre-transformed material may be material that was not used to form at least a portion of the 3D object. At least a fraction of the pre-transformed material removed from the material bed by the leveling mechanism and/or material removal mechanism can be recovered by the recycling system. At least a fraction of the material within the material bed that did not transform to subsequently form the 3D object can be recovered by the recycling system. A vacuum nozzle (e.g., which can be located at an edge of the material bed) can collect unused pre-transformed material. Unused pre-transformed material can be removed from the material bed without vacuum. Unused pre-transformed (e.g., powder) material can be removed from the material bed manually. Unused pre-transformed material can be removed from the material bed by positive pressure (e.g., by blowing away the unused material). Unused pre-transformed material can be removed from the material bed by actively pushing it from the material bed (e.g., mechanically or using a positive pressurized gas). Unused pre-transformed material can be removed from the material bed by the material removal mechanism. Unused pre-transformed material can be removed from the material bed by utilizing the force source. A gas flow can direct unused pre-transformed material to the vacuum nozzle. A material collecting mechanism (e.g., a shovel) can direct unused material to exit the material bed (and optionally enter the recycling mechanism). The recycling mechanism can comprise one or more filters to control a size range of the particles returned to the reservoir. In some cases, a Venturi scavenging nozzle can collect unused material. The nozzle can have a high aspect ratio (e.g., at least about 2:1, 5:1, 10:1, 20:1, 30:1, 40:1, or 100:1) such that the nozzle does not become clogged with material particle(s). In some embodiments, the material may be collected by a drainage mechanism through one or more drainage ports that drain material from the material bed into one or more drainage reservoirs. The material in the one or more drainage reservoirs may be re used (e.g., after filtration and/or further treatment).

In some cases, unused material can surround the 3D object in the material bed. The unused material can be substantially removed from the 3D object. In some embodiments, the unused material is removed from the 3D object in the environment (e.g., atmosphere and/or enclosure) in which the 3D object is printed. In some embodiments, the unused material is removed from the 3D object in a different environment (e.g., atmosphere and/or enclosure) from the one in which the 3D object is printed. The unused material is referred herein as the "remainder." Substantial removal may refer to material covering at most about 20%, 15%, 10%, 8%, 6%, 4%, 2%, 1%, 0.5%, or 0.1% of the surface of the 3D object after removal. Substantial removal may refer to removal of all the material that was disposed in the material bed and remained as material at the end of the 3D printing process (i.e., the remainder), except for at most about 10%, 3%, 1%, 0.3%, or 0.1% of the weight of the remainder. Substantial removal may refer to removal of all the remainder except for at most abbot 50%, 10%, 3%, 1%, 0.3%, or 0.1% of the weight of the printed 3D object. The unused material can be removed to permit retrieval of the 3D object without digging through the material bed. For example, the unused material can be suctioned out of the material bed by one or more vacuum ports (e.g., nozzles) built adjacent to the material bed, by brushing off the remainder of unused material, by lifting the 3D object from the unused material, by allowing the unused material to flow away from the 3D object (e.g., by opening an exit opening port on the side(s) or on the bottom of the material bed from which the unused material can exit). After the unused material is evacuated, the 3D object can be removed and the unused material can be re-circulated to a material reservoir for use in future builds. Unused material can be removed from the 3D object by system and apparatuses to clean a 3D object (e.g., FIG. 16), such as the one disclosed in U.S. 62/317,070, and in Ser. No. PCT/US15/36802, each of which is entirely incorporated herein by reference.

In some embodiments, the final form of the 3D object is retrieved soon after cooling of a final material layer. Soon after cooling may be at most about 1 day, 12 hours (h), 6 h, 5 h, 4 h, 3 h, 2 h, 1 h, 30 minutes, 15 minutes, 5 minutes, 240 s, 220 s, 200 s, 180 s, 160 s, 140 s, 120 s, 100 s, 80 s, 60 s, 40 s, 20 s, 10 s, 9 s, 8 s, 7 s, 6 s, 5 s, 4 s, 3 s, 2 s, or 1 s. Soon after cooling may be between any of the afore-mentioned time values (e.g., from about 1s to about 1 day, from about is to about 1 hour, from about 30 minutes to about 1 day, or from about 20 s to about 240 s). In some cases, the cooling can occur by method comprising active cooling by convection using a cooled gas or gas mixture comprising argon, nitrogen, helium, neon, krypton, xenon, hydrogen, carbon monoxide, carbon dioxide, or oxygen. Cooling may be cooling to a temperature that allows a person to handle the 3D object. Cooling may be cooling to a handling temperature. The 3D object can be retrieved during a time-period between any of the afore-mentioned time-periods (e.g., from about 12 h to about 1 s, from about 12 h to about 30 min, from about 1 h to about 1 s, or from about 30 min to about 40 s).

In some embodiments, the generated 3D object requires very little or no further processing after its retrieval. In some examples, the diminished further processing or lack thereof, will afford a 3D printing process that requires smaller amount of energy and/or less waste as compared to commercially available 3D printing processes. The smaller amount can be smaller by at least about 1.1, 1.3, 1.5, 2, 3, 4, 5, 6, 7, 8, 9, or 10. The smaller amount may be smaller by any value between the afore-mentioned values (e.g., from about 1.1 to about 10, or from about 1.5 to about 5). Further processing may comprise trimming, as disclosed herein. Further processing may comprise polishing (e.g., sanding). For example, in some cases the generated 3D object can be retrieved and finalized without removal of transformed material and/or auxiliary features. The 3D object can be retrieved when the three-dimensional part, composed of hardened (e.g., solidified) material, is at a handling temperature that is suitable to permit the removal of the 3D object from the material bed without substantial deformation. The handling temperature can be a temperature that is suitable for packaging of the 3D object. The handling temperature a can be at most about 120° C., 100° C., 80° C., 60° C., 40° C., 30° C., 25° C., or 20° C. The handling temperature can be of any value between the afore-mentioned temperature values (e.g., from about 120° C. to about 20° C.).

The methods and systems provided herein can result in fast and efficient formation of 3D objects. In some cases, the 3D object can be transported at a rate of at least about 0.1 centimeters squared per second (cm²/sec), 0.5 cm²/sec, 1.0 cm²/sec, 1.5 cm²/sec, 2.0 cm²/sec, 2.5 cm²/sec, 5 cm²/sec, 10 cm²/sec, 15 cm²/sec, 20 cm²/sec, 30 cm²/sec, 50 cm²/sec, 70 cm²/sec, 80 cm²/sec, 90 cm²/sec, 100 cm²/sec, or 120 cm²/sec. In some cases, the 3D object is transported at a rate that is between the above-mentioned rates (e.g., from about 0.1 cm²/sec to about 120 cm²/sec, from about 1.5 cm²/sec to about 80 cm²/sec, or from about 1.0 cm²/sec to about 100 cm²/sec). In some examples, the 3D part has the herein stated accuracy value immediately after its formation, without additional processing and/or manipulation.

In some embodiments, one or more 3D object (e.g., a stock of 3D objects) are supplied to a customer. A customer can be an individual, a corporation, organization, government, non-profit organization, company, hospital, medical practitioner, engineer, retailer, any other entity, or individual. The customer may be one that is interested in receiving the 3D object and/or that ordered the 3D object. A customer can submit a request for formation of a 3D object. The customer can provide an item of value in exchange for the 3D object. The customer can provide a design or a model for the 3D object. The customer can provide the design in the form of a stereo lithography (STL) file. The customer can provide a design where the design can be a definition of the shape and dimensions of the 3D object in any other numerical or physical form. In some cases, the customer can provide a 3D model, sketch, or image as a design of an object to be generated. The design can be transformed in to instructions usable by the printing system to additively generate the 3D object. The customer can provide a request to form the 3D object from a specific material or group of materials (e.g., a material as described herein). In some cases, the design may not contain auxiliary features or marks of any past presence of auxiliary support features.

In an embodiment, in response to the customer request the 3D object is formed with the printing method, system and/or apparatus described herein, using one or more materials as specified by the customer. The 3D object can subsequently be delivered to the customer. The 3D object can be formed without generation or removal of auxiliary features (e.g., that is indicative of a presence or removal of the auxiliary support feature). Auxiliary features can be support features that prevent a 3D object from shifting, deforming or moving during the 3D printing.

In some instances, the intended dimensions of the 3D object derive from a model design of the 3D object. The 3D object (e.g., solidified material) that is generated for the customer can have an average deviation value from the intended dimensions of at most about 0.5 microns (μm), 1 μm, 3 μm, 10 μm, 30 μm, 100 μm, 300 μm, or less. The deviation can be any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). The 3D object can have a deviation from the intended dimensions in a specific direction, according to the formula $Dv+L/K_{Dv}$, wherein Dv is a deviation value, L is the length of the 3D object in a specific direction, and $K_{Dv}$ is a constant. Dv can have a value of at most about 300 μm, 200 μm, 100 μm, 50 μm, 40 μm, 30 μm, 20 μm, 10 μm, 5 μm, 1 μm, or 0.5 μm. Dv can have a value of at least about 0.5 μm, 1 μm, 3 μm, 5 μm, 10 μm, 20 μm, 30 μm, 50 μm, 70 μm, 100 μm, or 300 μm. Dv can have any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the afore-mentioned values (e.g., from about 3000 to about 500, from about 1000 to about 2500, from about 500 to about 2000, from about 1000 to about 3000, or from about 1000 to about 2500).

The system and/or apparatus can comprise a controlling mechanism (e.g., a controller). The methods, systems, and/or apparatuses disclosed herein may incorporate a controller mechanism that controls one or more of the components of the 3D printer described herein. The controller may comprise a computer-processing unit (e.g., a computer) coupled to any of the systems and/or apparatuses, or their respective components (e.g., the energy source(s)). The computer can be operatively coupled through a wired and/or through a wireless connection. In some cases, the computer can be on board a user device. A user device can be a laptop computer, desktop computer, tablet, smartphone, or another computing device. The controller can be in communication with a cloud computer system and/or a server. The controller can be programmed to selectively direct the energy source(s) to apply energy to the at least a portion of the target surface at a power per unit area. The controller can be in communication with the scanner configured to articulate the energy source(s) to apply energy to at least a portion of the target surface at a power per unit area.

The controller may control the layer dispensing mechanism and/or any of its components. The controller may control the platform. The control may comprise controlling (e.g., directing and/or regulating) the speed (velocity) of movement. The movement may be horizontal, vertical, and/or in an angle. The controller may control the level of pressure (e.g., vacuum, ambient, or positive pressure) in the material removal mechanism material dispensing mechanism, and/or the enclosure (e.g., chamber). The pressure level (e.g., vacuum, ambient, or positive pressure) may be constant or varied. The pressure level may be turned on and off manually and/or by the controller. The controller may control the force generating mechanism. For example, the controller may control the amount of magnetic, electrical, pneumatic, and/or physical force generated by force generating mechanism. For example, the controller may control the polarity type of magnetic, and/or electrical charge generated by the force generating mechanism. The controller may control the timing and the frequency at which the force is generated. The controller may control the direction and/or rate of movement of the translating mechanism. The controller may control the cooling member (e.g., external and/or internal). In some embodiments, the external cooling member may be translatable. The movement of the layer dispensing mechanism or any of its components may be predetermined. The movement of the layer dispensing mechanism or any of its components may be according to an algorithm. The control may be manual and/or automatic. The control may be programmed and/or be effectuated a whim. The control may be according to an algorithm. The algorithm may comprise a printing algorithm, or motion control algorithm. The algorithm may consider the model of the 3D object.

Figure 22:
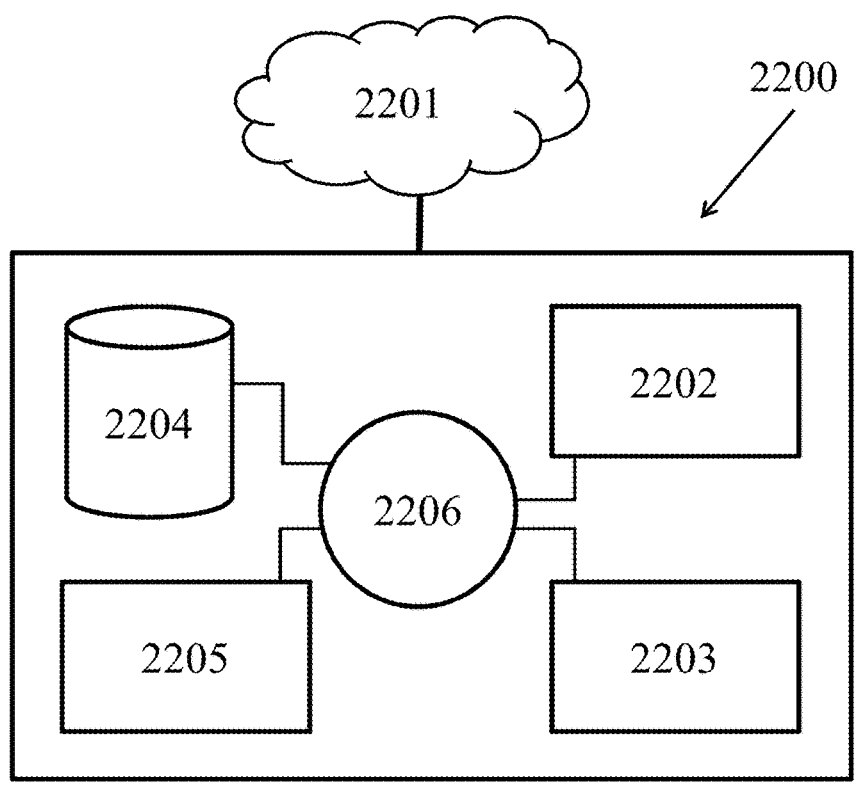
FIG. 22 schematically illustrates a computer control system that is programmed or otherwise configured to facilitate the formation of one or more 3D objects.

The controller may comprise a processing unit. The processing unit may be central. The processing unit may comprise a central processing unit (herein "CPU"). The controllers or control mechanisms (e.g., comprising a computer system) may be programmed to implement methods of the disclosure. The controller may control at least one component of the systems and/or apparatuses disclosed herein. FIG. 22 is a schematic example of a computer system 2200 that is programmed or otherwise configured to facilitate the formation of a 3D object per the methods provided herein. The computer system 2200 can control (e.g., direct and/or regulate) various features of printing methods, apparatuses and systems of the present disclosure, such as, for example, regulating force, translation, heating, cooling and/or maintaining the temperature of a powder bed, process parameters (e.g., chamber pressure), scanning route of the energy source, position and/or temperature of the cooling member(s), application of the amount of energy emitted to a selected location, or any combination thereof. The computer system 2201 can be part of, or be in communication with, a printing system or apparatus, such as a 3D printing system or apparatus of the present disclosure. The computer may be coupled to one or more mechanisms disclosed herein, and/or any parts thereof. For example, the computer may be coupled to one or more sensors, valves, switches, motors, pumps, or any combination thereof Control may comprise regulate, monitor, restrict, limit, govern, restrain, supervise, direct, guide, manipulate, or modulate. The controller can be operatively coupled to one or more of the apparatuses, system and/or their parts as disclosed herein. The controller and the computer system can be any of the one disclosed in patent applications U.S. 62/297,067, 62/401,534, 62/252,330, 62/396,584, or Ser. No. PCT/US16/59781, all of which are fully incorporated herein by reference.

The computer system 2200 can include a processing unit 2206 (also "processor," "computer" and "computer processor" used herein). The computer system may include memory or memory location 2202 (e.g., random-access memory, read-only memory, flash memory), electronic storage unit 2204 (e.g., hard disk), communication interface 2203 (e.g., network adapter) for communicating with one or more other systems, and peripheral devices 2205, such as cache, other memory, data storage and/or electronic display adapters. The memory 2202, storage unit 2204, interface 2203, and peripheral devices 2205 are in communication with the processing unit 2206 through a communication bus (solid lines), such as a motherboard. The storage unit can be a data storage unit (or data repository) for storing data. The computer system can be operatively coupled to a computer network ("network") 2201 with the aid of the communication interface. The network can be the Internet, an Internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 2202. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 2200 can be included in the circuit.

The storage unit 2204 can store files, such as drivers, libraries and saved programs. The storage unit can store user data, e.g., user preferences and user programs. The computer system in some cases can include one or more additional data storage units that are external to the computer system, such as located on a remote server that is in communication with the computer system through an intranet or the Internet.

The computer system can communicate with one or more remote computer systems through the network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system, such as, for example, on the memory 2202 or electronic storage unit 2204. The machine executable or machine-readable code can be provided in the form of software. During use, the processor 2206 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The processing unit may include one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the aforementioned numbers (e.g., from about 0.2 BT to about 100 BT, from about 1 BT to about 8 BT, from about 8 BT to about 40 BT, or from about 40 BT to about 100 BT). The integrated circuit chip may have an area of at least 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of at most 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of any value between the afore-mentioned values (e.g., from about 50 mm$^2$ to about 800 mm$^2$, from about 50 mm$^2$ to about 500 mm$^2$, or from about 500 mm$^2$ to about 800 mm$^2$). The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The multiplicity of cores can be parallel cores. The multiplicity of cores can function in parallel. The multiplicity of cores may include at least 2, 10, 40, 100, 400, 1000, 2000, 3000, 4000, 5000, 6000, 7000, 8000, 9000, or 10000 cores. The multiplicity of cores may include at most 1000, 2000, 3000, 4000, 5000, 6000, 7000, 8000, 9000, 10000, or 40000 cores. The multiplicity of cores may include cores of any number between the afore-mentioned numbers (e.g., from 2 to 40000, from 2 to 400, from 400 to 4000, from 2000 to 4000, or from 4000 to 10000 cores). The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating point operations per second (FLOPS). The number of FLOPS may be at least about 1 Tera Flops (T-FLOPS), 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 5 T-FLOPS, 6 T-FLOPS, 7 T-FLOPS, 8 T-FLOPS, 9 T-FLOPS, 10 T-FLOPS, 20 T-FLOPS, or 30 T-FLOPS. The number of FLOPS may be any value between the afore-mentioned values (e.g., from about 1 T-FLOP to about 30 T-FLOP, from about 4 T-FLOPS to about 10 T-FLOPS, from about 1 T-FLOPS to about 10 T-FLOPS, or from about 10 T-FLOPS to about 30 T-FLOPS. The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance UNPACK, matrix multiplication (e.g., DGEMM), sustained memory bandwidth to/from memory (e.g., STREAM), array transposing rate measurement (e.g., PTRANS), RandomAccess, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). UNPACK refers to a software library for performing numerical linear algebra on a digital computer. DGEMM refers to double precision general matrix multiplication. STREAM. PTRANS. MPI refers to Message Passing Interface.

The computer system may include hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by Nvidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

The computer system may include an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

The computer system may include configurable computing, partially reconfigurable computing, reconfigurable computing, or any combination thereof. The computer system may include a FPGA. The computer system may include an integrated circuit that performs the algorithm. For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration.

The computing system may include an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most 0.1 microsecond (µs), 1 µs, 10 µs, 100 µs, or 1 millisecond (msec). The physical unit may produce the algorithm output in any time between the above-mentioned times (e.g., from about 0.1 µs, to about 1 msec, from about 0.1 µs, to about 100 µs, or from about 0.1 µs to about 10 µs). In some instances, the controller may use calculations, real time measurements, or any combination thereof to regulate the energy beam(s). In some instances, the real-time measurements (e.g., temperature measurements) may provide input at a rate of at least about 0.1 KHz, 1 KHz, 10 KHz, 100 KHz, 1000 KHz, or 10000 KHz). In some instances, the real-time measurements may provide input at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s).

Aspects of the systems, apparatuses, and/or methods provided herein, such as the computer system, can be embodied in programming. Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all of the tangible memory of the computers, processors or the like, or associated modules thereof, such as various semiconductor memories, tape drives, disk drives, external drives, and the like, which may provide non-transitory storage at any time for the software programming.

The memory may comprise a random-access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. The memory and/or storage may comprise a storing device external to and/or removable from device, such as a Universal Serial Bus (USB) memory stick, or a hard disk. Many of these forms of computer readable media may be involved in carrying one or more sequences of one or more instructions to a processor for execution.

The computer system can include or be in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may rely on feedback mechanisms that have been pre-programmed. The feedback mechanisms may rely on input from sensors (described herein) that are connected to the control unit (i.e., control system or control mechanism e.g., computer). The computer system may store historical data concerning various aspects of the operation of the 3D printing system. The historical data may be retrieved at predetermined times and/or at a whim. The historical data may be accessed by an operator and/or by a user. The historical and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total time, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as optionally output by the output unit.

The system and/or apparatus described herein (e.g., controller) and/or any of their components may comprise an output and/or an input device. The input device may comprise a keyboard, touch pad, or microphone. The output device may be a sensory output device. The output device may include a visual, tactile, or audio device. The audio device may include a loudspeaker. The visual output device may include a screen and/or a printed hard copy (e.g., paper). The output device may include a printer. The input device may include a camera, a microphone, a keyboard, or a touch screen. The system and/or apparatus described herein (e.g., controller) and/or any of their components may comprise Bluetooth technology. The system and/or apparatus described herein (e.g., controller) and/or any of their components may comprise a communication port. The communication port may be a serial port or a parallel port. The communication port may be a Universal Serial Bus port (i.e., USB). The system and/or apparatus described herein (e.g., controller) and/or any of their components may comprise USB ports. The USB can be micro or mini USB. The USB port may relate to device classes comprising 00 h, 01 h, 02 h, 03 h, 05 h, 06 h, 07 h, 08 h, 09 h, 0 Ah, 0 Bh, 0 Dh, 0 Eh, 0 Fh, 10 h, 11 h, DCh, E0 h, EFh, FEh, or FFh. The system and/or apparatus described herein (e.g., controller) and/or any of their components may comprise a plug and/or a socket (e.g., electrical, AC power, DC power). The system and/or apparatus described herein (e.g., controller) and/or any of their components may comprise an adapter (e.g., AC and/or DC power adapter). The system and/or apparatus described herein (e.g., controller) and/or any of their components may comprise a power connector. The power connector can be an electrical power connector. The power connector may comprise a magnetically coupled (e.g., attached) power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80, or 100 pins.

Figure 23:
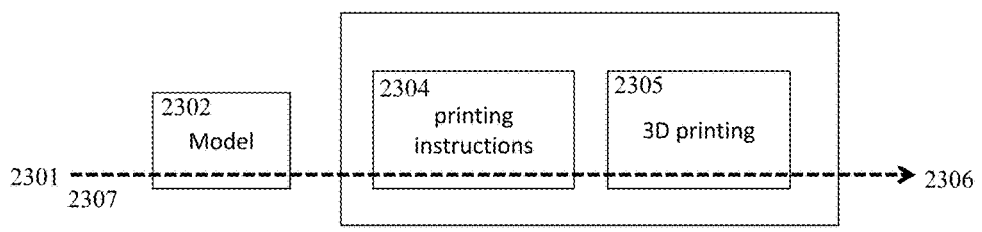
FIG. 23 schematically illustrates a flow chart for a control system.

The systems, methods, and/or apparatuses disclosed herein may comprise receiving a request for a 3D object (e.g., from a customer). The request can include a model (e.g., CAD) of the desired 3D object. Alternatively or additionally, a model of the desired 3D object may be generated. The model may be used to generate 3D printing instructions. The 3D printing instructions may exclude the 3D model. The 3D printing instructions may be based on the 3D model. The 3D printing instructions may take the 3D model into account. The 3D printing instructions may be based on simulations. The 3D printing instructions may use the 3D model. The 3D printing instructions may comprise using an algorithm (e.g., embedded in a software) that considers the 3D model. The algorithm may consider a deviation from the model. The deviation may be a corrective deviation. The corrective deviation may be such that at least a portion of the 3D object is printed as a deviation from the 3D model, and upon hardening, the at least a portion of the 3D object (and/or the entire 3D object) will not substantially deviate from the model of the desired 3D object. The printing instructions may be used to print the desired 3D object. The printed 3D object may substantially correspond to the requested 3D object. In some embodiments, the algorithm used to form the 3D printing instructions excludes a feedback control loop (e.g., closed loop). 3D printing instructions may exclude considering metrology measurements of the generated 3D object (e.g., measurements of the 3D object) or parts thereof. In some embodiments, the 3D printing instructions may comprise an open loop control. The algorithm may use historical (e.g., empirical) data. The empirical data may be of characteristic structures (e.g., that are included in the desired 3D object). The characteristic structures may be substantially similar at least portions of the 3D object. The empirical data may be previously obtained. In some embodiments, the algorithm may use a theoretical model. The algorithm may use a model of energy flow (e.g., heat flow). The generation of the 3D object using an altered model may exclude an iterative process. The generation of the 3D object may not involve an alteration of the 3D model (e.g., CAD), but rather generate a new set of 3D printing instructions. In some embodiments, the algorithm is used to alter instructions received by at least one of the components involved in the 3D printing process (e.g., energy beam). In some embodiments, the algorithm does not alter the 3D model. The algorithm may comprise a generic approach to printing a desired 3D object or portions thereof. In some embodiments, the algorithm is not based on altering 3D printing instructions that are based on printing the desired 3D object, measuring errors in the printed 3D object, and revising the printing instructions. In some embodiments, the algorithm is not based on an iterative process that considers the desired and printed 3D object (e.g., in realtime). The algorithm may be based on an estimation of one or more errors during the printing of the desired 3D object. The algorithm may be based on correct the estimated errors through the generation of respective 3D printing instructions that considers the anticipated errors. In this manner, the algorithm may circumvent the generation of the errors. The algorithm may be based on an estimation of one or more errors during the printing of the desired 3D object, and correcting them through the generation of respective 3D printing instructions that considers the anticipated errors and thus circumvent the generation of the errors. The error may comprise the deviation from the model of the desired 3D object. The estimation may be based on simulation, modeling, and/or historical data (e.g., of representative structures or structure segments). FIG. 23 shows an example of a flow chart representing the 3D printing process steps that are executed by a 3D printing system and/or apparatus described herein. The desired 3D object is requested in step 2301. A 3D model is provided or generated in step 2302. Step 2304 illustrates the generation of printing instructions for the 3D object, in which both the model and the algorithm are utilized. The 3D object is subsequently generated using the printing instructions in step 2305. The desired 3D object is delivered in step 2306. Arrow 2307 designates the direction of the execution of the steps from step 2301 to step 2306. The absence of back feeding arrow represents the lack of feedback loop control.

EXAMPLES

The following are illustrative and non-limiting examples of methods of the present disclosure.

Example 1

In a 25 cm by 25 cm by 30 cm container at ambient temperature and pressure, Inconel 718 powder of average particle size 32 µm is deposited in a container accommodating a powder bed. The container is disposed in an enclosure at ambient temperature and pressure. The enclosure is purged with Argon gas (Ar) for 5 min. Above the exposed surface of the powder bed, a planar layer of powder material with an average height of 0.05 mm was placed in the container accommodating a powder bed. A 200 W fiber 1060 nm laser beam fabricated a substantially flat surface that was anchorlessly suspended in the powder bed as follows: The exposed surface of the powder bed was irradiated with a defocused Gaussian spot of cross section diameter 0.4 mm for about 100 milliseconds to form a first tile of molten powder. After forming the first tile, the laser beam moved away to another spot on the powder bed that was far away from the tile. After more than 5 seconds (e.g., the intermission), the laser beam returned to the vicinity of the first tile, to form a second tile of molten powder. During the intermission, the molten material of the first tile cooled down. The distance between the centers of the first and second tiles ranges from about 0.1 mm to about 0.2 mm, forming overlapping tiles. The rectangular 3D object having one layer was fabricated by successively forming such tiles. The rectangular 3D object (box) measured 8 mm by 20 mm having a high as depicted in FIG. 39A. The 3D object was vertically cross sectioned, and a portion of its vertical cross section was imaged by a 2 Mega pixel charge-coupled device (CCD) camera, which portion of its vertical cross section is shown in the example in FIG. 39A.

Example 2

Following the layer formed in Example 1, a second planar layer of powder material was deposited on the exposed surface of the powder bed (comprising the one layered 3D object), at ambient temperature and pressure, under Argon. The deposited planar powder layer had an average height of 0.05. The 200 W fiber 1060 nm laser beam fabricated a substantially flat surface on the first layer in Example 1, to form a second layer as part of the 3D object, which 3D object was anchorlessly suspended in the powder bed as described above for forming the first layer. The rectangular 3D object was fabricated by successively forming such tiles. A portion of the second layer deposited on the first layer is shown in the top view of FIG. 30, 3050. Tiles forming the second layer are shown in 3070, which second layer is disposed on the first layer 3060. The rectangular 3D object (box) measured 8 mm by 20 mm having a high as depicted in FIG. 39A. The 3D object was vertically cross sectioned, and portion of its vertical cross section was imaged by the 2 Mega pixel CCD camera, which portion of its vertical cross section is shown in the example in FIG. 39B.

Example 3

Following the layer formed in Example 2, a third planar layer of powder material was deposited on the exposed surface of the powder bed (comprising the one layered 3D object), at ambient temperature and pressure, under Argon. The deposited planar powder layer had an average height of 0.05. The 200 W fiber 1060 nm laser beam fabricated a substantially flat surface on the second layer in Example 2, to form a third layer as part of the 3D object, which 3D object was anchorlessly suspended in the powder bed as described above for forming the second and first layer. The rectangular 3D object was fabricated by successively forming such tiles. The rectangular 3D object (box) measured 8 mm by 20 mm having a high as depicted in FIG. 36. The 3D object was vertically cross sectioned, and a portion of its vertical cross section was imaged by the 2 Mega pixel CCD camera, which portion of its vertical cross section is shown in the example in FIG. 36, 3610.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method for printing a three-dimensional object, comprising:
    (a) providing a material bed comprising a pre-transformed material;
    (b) irradiating an exposed surface of the material bed at a first position using an energy beam during a first time period of at least one millisecond, to transform the pre-transformed material at the first position to a transformed material to form a first tile as part of the three-dimensional object, which first position is along a path-of-tiles, wherein during the first time period, the energy beam is stationary or substantially stationary such that it at most undergoes back and forth movement with respect to the first position on the exposed surface;
    (c) translating the energy beam to a second position of the exposed surface along the path-of-tiles, which second position is different from the first position, wherein the energy beam is translated during an intermission without transforming the pre-transformed material along the path-of-tiles, wherein during the intermission, the energy beam irradiates a portion of the material bed that is not along the path-of-tiles; and
    (d) irradiating the exposed surface of the material bed at the second position with the energy beam at the second position during a second time period of at least one millisecond, to transform the pre-transformed material at the second position to a transformed material to form a second tile as part of the three-dimensional object, wherein during the second time period, the energy beam is stationary or substantially stationary such that it at most undergoes back and forth movement with respect to the second position on the exposed surface.

2. The method of claim 1, wherein the first time period is equal to the second time period.

3. The method of claim 1, wherein in (c) the energy beam is translated within a time period of at least 1 millisecond.

4. The method of claim 1, wherein a diameter of a cross section of the energy beam is at least 50 micrometers.

5. The method of claim 1, wherein the second tile contacts the first tile.

6. The method of claim 5, wherein the second tile at least partially overlaps the first tile.

7. The method of claim 1, wherein the second tile at least partially overlaps the first tile.

8. The method of claim 1, further comprising dispensing a layer of the pre-transformed material by removing an excess of pre-transformed material from the exposed surface of the material bed using a gas flow and cyclonically separating the pre-transformed material from the gas flow.

9. The method of claim 1, wherein in (b), the energy beam that is stationary or substantially stationary comprises spatial oscillations of the energy beam that are smaller than a diameter of the energy beam.

10. The method of claim 1, wherein the three-dimensional object comprises one or more layers with a radius of curvature of at least five centimeters.

11. The method of claim 1, wherein the three-dimensional object has a porosity of at most 10%.

12. The method of claim 1, wherein the second position is directly adjacent to and separated from the first position by a pre-transformed material gap.

13. The method of claim 1, further comprising (e) translating the energy beam to a third position of the exposed surface along the path-of-tiles, which third position follows the second position along the path-of-tiles and is different from the first position and different from the second position, which energy beam is translated during an intermission without transforming the pre-transformed material along the path-of-tiles; and (f) irradiating the exposed surface of the material bed by the energy beam at the third position during a third time period to transform the pre-transformed material at the third position to a transformed material to form a third tile as part of the three-dimensional object, which third tile contacts the second tile, wherein during the third time period, the energy beam is stationary or substantially stationary such that it at most undergoes back and forth movement with respect to the third position on the exposed surface, wherein the third tile follows the second tile that follows the first tile along the path-of-tiles.

14. The method of claim 13, wherein the first tile, second tile, and third tile are successively arranged in a single file.

15. The method of claim 14, wherein a diameter of a cross section of the energy beam is at least 50 micrometers.

16. A method for printing a three-dimensional object, comprising:
    (a) providing a material bed comprising a pre-transformed material;
    (b) irradiating an exposed surface of the material bed at a first position using an energy beam during a first time period, to transform the pre-transformed material at the first position to a transformed material to form a first tile as part of the three-dimensional object, which first position is along a path-of-tiles, which energy beam has a power density of at most 8000 Watts per millimeter squared, wherein during the first time period, the energy beam is stationary or substantially stationary such that it at most undergoes back and forth movement with respect to the first position on the exposed surface;
    (c) translating the energy beam to a second position of the exposed surface along the path-of-tiles, which second position is different from the first position, which energy beam is translated during an intermission without transforming the pre-transformed material along the path-of-tiles, wherein during the intermission, the energy beam irradiates a portion of the material bed that is not along the path-of-tiles; and
    (d) irradiating the exposed surface of the material bed at the second position with the energy beam at the second position during a second time period to transform the pre-transformed material at the second position to a transformed material to form a second tile as part of the three-dimensional object, wherein during the second time period, the energy beam is stationary or substantially stationary such that it at most undergoes back and forth movement with respect to the second position on the exposed surface,
        wherein the first time period and/or second time period is of at least one tenth (0.1) of a millisecond.

17. The method of claim 16, wherein a diameter of a cross section of the energy beam is at least 50 micrometers.

18. The method of claim 16, wherein in (c), the energy beam is translated within a time period of at least 1 millisecond.

19. The method of claim 16, wherein the second tile contacts the first tile.

20. The method of claim 19, wherein the second tile at least partially overlaps the first tile.

21. The method of claim 16, wherein the first time period and/or the second time period is at least 1 millisecond.

22. The method of claim 16, wherein the three-dimensional object has a porosity of at most 10%.

23. The method of claim 16, wherein the three-dimensional object comprises one or more layers with a radius of curvature of at least five centimeters.

24. The method of claim 16, wherein the second position is directly adjacent to and separated from the first position by a pre-transformed material gap.

25. The method of claim 16, further comprising (e) translating the energy beam to a third position of the exposed surface along the path-of-tiles, which third position follows the second position along the path-of-tiles and is different from the first position and different from the second position, which energy beam is translated during an intermission without transforming the pre-transformed material along the path-of-tiles; and (f) irradiating the exposed surface of the material bed by the energy beam at the third position during a third time period to transform the pre-transformed material at the third position to a transformed material to form a third tile as part of the three-dimensional object, which third tile contacts the second tile, wherein during the third time period, the energy beam is stationary or substantially stationary such that it at most undergoes back and forth movement with respect to the third position on the exposed surface, wherein the third tile follows the second tile that follows the first tile along the path-of-tiles.

26. A method for printing a three-dimensional object, comprising:
 (a) providing a material bed comprising a pre-transformed material;
 (b) irradiating an exposed surface of the material bed at a first position using an energy beam during a first time period to transform the pre-transformed material at the first position to a transformed material to form a first tile as part of the three-dimensional object, which first position is along a path-of-tiles, wherein during the first time period, the energy beam is stationary or substantially stationary such that it at most undergoes back and forth movement with respect to the first position on the exposed surface, wherein the energy beam is defocused;
 (c) translating the energy beam to a second position of the exposed surface along the path-of-tiles, which second position is different from the first position, which energy beam is translated during an intermission without transforming the pre-transformed material along the path-of-tiles, wherein during the intermission, the energy beam irradiates a portion of the material bed that is not along the path-of-tiles, wherein the energy beam is defocused; and
 (d) irradiating the exposed surface of the material bed at the second position with the energy beam at the second position during a second time period to transform the pre-transformed material in the second position to a transformed material to form a second tile as part of the three-dimensional object, wherein during the second time period, the energy beam is stationary or substantially stationary such that it at most undergoes back and forth movement with respect to the second position on the exposed surface,
 wherein the first time period and/or second time period is of at least one tenth (0.1) of a millisecond, wherein the energy beam is defocused.

27. The method of claim 26, wherein a diameter of a cross section of the energy beam is at least 50 micrometers.

28. The method of claim 26, wherein in (c), the energy beam is translated within a time period of at least 1 millisecond.

29. The method of claim 26, wherein the second tile contacts the first tile.

30. The method of claim 29, wherein the second tile at least partially overlaps the first tile.

31. The method of claim 26, wherein the intermission is at least one (1) millisecond.

32. The method of claim 26, wherein the three-dimensional object comprises one or more layers with a radius of curvature of at least five centimeters.

33. The method of claim 26, wherein during the intermission, the energy beam provides no radiation or provides a reduced amount of radiation along the path-of-tiles, which reduced amount of radiation is insufficient to transform the pre-transformed material along the path-of-tiles.

34. The method of claim 26, wherein the second position is directly adjacent to and separated from the first position by a pre-transformed material gap.

35. The method of claim 26, further comprising (e) translating the energy beam to a third position of the exposed surface along the path-of-tiles, which third position that follows the second position along the path-of-tiles and is different from the first position and different from the second position, which energy beam is translated during an intermission without transforming the pre-transformed material along the path-of-tiles; and (f) irradiating the exposed surface of the material bed by the energy beam at the third position during a third time period to transform the pre-transformed material at the third position to a transformed material to form a third tile as part of the three-dimensional object, which third tile contacts the second tile, wherein during the third time period, the energy beam is stationary or substantially stationary such that it at most undergoes back and forth movement with respect to the third position on the exposed surface, wherein the third tile follows the second tile that follows the first tile along the path-of-tiles.

* * * * *